US010538704B2

(12) United States Patent
Archetti et al.

(10) Patent No.: US 10,538,704 B2
(45) Date of Patent: Jan. 21, 2020

(54) COMPOUNDS FOR THE HOMEOTROPIC ALIGNMENT OF LIQUID-CRYSTALLINE MEDIA

(71) Applicant: MERCK PATENT GMBH, Darmstadt (DE)

(72) Inventors: Graziano Archetti, Darmstadt (DE); Edward Plummer, Frankfurt am Main (DE); Helmut Haensel, Muehltal (DE); Rocco Fortte, Frankfurt am Main (DE); Timo Uebel, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 47 days.

(21) Appl. No.: 15/817,893

(22) Filed: Nov. 20, 2017

(65) Prior Publication Data

US 2018/0142152 A1    May 24, 2018

(30) Foreign Application Priority Data

Nov. 21, 2016 (DE) .................. 10 2016 013 815

(51) Int. Cl.
| | | |
|---|---|---|
| *C09K 19/12* | (2006.01) | |
| *C09K 19/30* | (2006.01) | |
| *G02F 1/1337* | (2006.01) | |
| *C09K 19/04* | (2006.01) | |

(52) U.S. Cl.
CPC .......... *C09K 19/3003* (2013.01); *C09K 19/12* (2013.01); *G02F 1/1337* (2013.01); *C09K 2019/0448* (2013.01); *C09K 2019/122* (2013.01); *C09K 2019/301* (2013.01); *C09K 2019/3019* (2013.01); *G02F 2001/133742* (2013.01)

(58) Field of Classification Search
CPC ................................... C09K 19/14
See application file for complete search history.

(56) References Cited

U.S. PATENT DOCUMENTS

| 9,809,748 | B2 | 11/2017 | Archetti et al. | |
| 2015/0252265 | A1* | 9/2015 | Archetti | ............. C09K 19/3402 |
| | | | | 349/130 |
| 2018/0023001 | A1* | 1/2018 | Tanaka | .................... C07C 69/54 |
| | | | | 252/299.4 |
| 2018/0079960 | A1 | 3/2018 | Lan | |

FOREIGN PATENT DOCUMENTS

| CN | 105733557 A | 7/2016 | | |
| DE | 102015008172 A1 | 1/2016 | | |
| EP | 2918658 A2 | 9/2015 | | |
| WO | 2016015803 A1 | 2/2016 | | |
| WO | 2016114093 A1 | 7/2016 | | |
| WO | WO-2016114093 A1 * | 7/2016 | ............. | C07C 69/54 |
| WO | 2017041893 A1 | 3/2017 | | |
| WO | WO-2017041893 A1 * | 3/2017 | ............. | C09K 19/56 |

OTHER PUBLICATIONS

English Abstract of WO2016015803, Publication Date: Feb. 4, 2016.
Search Report in corresponding EP application 17202476 dated Mar. 28, 2018.

* cited by examiner

*Primary Examiner* — Chanceity N Robinson
(74) *Attorney, Agent, or Firm* — Millen White Zelano and Branigan, PC; Csaba Henter

(57) ABSTRACT

Disclosed are liquid-crystalline media (LC media) comprising a low-molecular-weight component and a polymerisable component. The polymerisable component contains self-aligning, polymerisable meso-gens (polymerisable self-alignment additives) which effect homeotropic (vertical) alignment of the LC media at a surface or the cell walls of a liquid-crystal display (LC display). Disclosed are also LC displays having homeotropic alignment of the LC medium without alignment layers. Further disclosed are the structures for polymerisable self-alignment additives.

20 Claims, No Drawings

COMPOUNDS FOR THE HOMEOTROPIC ALIGNMENT OF LIQUID-CRYSTALLINE MEDIA

The present invention relates to liquid-crystalline media (LC media) comprising a low-molecular-weight component and a polymerisable component. The polymerisable component comprises self-aligning, polymerisable mesogens (polymerisable self-alignment additives) which effect homeotropic (vertical) alignment of the LC media at a surface or the cell walls of a liquid-crystal display (LC display). The invention therefore also encompasses LC displays having homeotropic alignment of the liquid-crystalline medium (LC medium) without alignment layers for homeotropic alignment. The invention discloses novel structures for polymerisable self-alignment additives.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have homeotropic edge alignment (VA technology= vertically aligned).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs . . . ", SID 2004 International Symposium, Digest of Technical Papers, XXXV, Book I, pp. 6 to 9, and Liu, C. T. et al., paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Considerable effort is associated with the production of VA displays having two or more domains of different preferential direction. It is an aim of this invention to simplify the production processes and the display devices themselves without giving up the advantages of VA technology, such as relatively short response times and good viewing-angle dependence.

VA displays which comprise LC media having positive dielectric anisotropy are described in S. H. Lee et al. Appl. Phys. Lett. (1997), 71, 2851-2853. These displays use interdigital electrodes arranged on a substrate surface (in-plane addressing electrode configuration having a comb-shaped structure), as employed, inter alia, in the commercially available IPS (in-plane switching) displays (as disclosed, for example, in DE 40 00 451 and EP 0 588 568), and have a homeotropic arrangement of the liquid-crystal medium, which changes to a planar arrangement on application of an electric field.

Further developments of the above-mentioned display can be found, for example, in K. S. Hun et al. J. Appl. Phys. (2008), 104, 084515 (DSIPS: 'double-side in-plane switching' for improvements of driver voltage and transmission), M. Jiao et al. App. Phys. Lett (2008), 92, 111101 (DFFS: 'dual fringe field switching' for improved response times) and Y. T. Kim et al. Jap. J. App. Phys. (2009), 48, 110205 (VAS: 'viewing angle switchable' LCD). In addition, VA-IPS displays are also known under the name positive-VA and HT-VA.

In all such displays (referred to below in general as VA-IPS displays), an alignment layer is applied to both substrate surfaces for homeotropic alignment of the LC medium; the production of this layer has hitherto been associated with considerable effort.

It is an aim of this invention to simplify the production processes themselves without giving up the advantages of VA-IPS technology, such as relatively short response times, good viewing-angle dependence and high contrast.

Industrial application of these effects in electro-optical display elements requires LC phases, which have to satisfy a multiplicity of requirements. Particularly important here are chemical resistance to moisture, air, the materials in the substrate surfaces and physical influences, such as heat, infrared, visible and ultraviolet radiation and direct and alternating electric fields.

Furthermore, industrially usable LC phases are required to have a liquid-crystalline mesophase in a suitable temperature range and low viscosity.

VA and VA-IPS displays are generally intended to have very high specific resistance at the same time as a large working-temperature range, short response times and a low threshold voltage, with the aid of which various grey shades can be produced.

In conventional VA and VA-IPS displays, a polyimide layer on the substrate surfaces ensures homeotropic alignment of the liquid crystal. The production of a suitable alignment layer in the display requires considerable effort. In addition, interactions of the alignment layer with the LC medium may impair the electrical resistance of the display. Owing to possible interactions of this type, the number of suitable liquid-crystal components is considerably reduced.

It would therefore be desirable to achieve homeotropic alignment of the LC medium without polyimide.

The disadvantage of the active-matrix TN displays frequently used is due to their comparatively low contrast, the relatively high viewing-angle dependence and the difficulty of producing grey shades in these displays.

VA displays have significantly better viewing-angle dependences and are therefore used principally for televisions and monitors.

A further development are the so-called PS (polymer sustained) or PSA (polymer sustained alignment) displays, for which the term "polymer stabilised" is also occasionally used. The PSA displays are distinguished by the shortening of the response times without significant adverse effects on other parameters, such as, in particular, the favourable viewing-angle dependence of the contrast.

In these displays, a small amount (for example 0.3% by weight, typically <1% by weight) of one or more polymerisable compound(s) is added to the LC medium and, after introduction into the LC cell, is polymerised or crosslinked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable. PSA technology has hitherto been employed principally for LC media having negative dielectric anisotropy.

Unless indicated otherwise, the term "PSA" is used below as representative of PS displays and PSA displays.

In the meantime, the PSA principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a 'pretilt' in the cell. In the case of PSA-OCB displays, for example, it is possible for the bend structure to be stabilised so that an offset voltage is unnecessary or can be reduced. In the case of PSA-VA displays, the pretilt has a positive effect on the response times. A standard MVA or PVA pixel and electrode layout can be used for PSA-VA displays. In addition, however, it is also possible, for example, to manage with only one structured electrode side and no protrusions, which significantly simplifies production and at the same time results in very good contrast at the same time as very good light transmission.

PSA-VA displays are described, for example, in JP 10-036847 A, EP 1 170 626 A2, U.S. Pat. Nos. 6,861,107, 7,169,449, US 2004/0191428 A1, US 2006/0066793 A1 and US 2006/0103804 A1. PSA-OCB displays are described, for example, in T.-J-Chen et al., Jpn. J. Appl. Phys. (2006), 45, 2702-2704 and S. H. Kim, L.-C-Chien, Jpn. J. Appl. Phys. (2004), 43, 7643-7647. PSA-IPS displays are described, for example, in U.S. Pat. No. 6,177,972 and Appl. Phys. Lett. (1999), 75(21), 3264. PSA-TN displays are described, for example, in Optics Express (2004), 12(7), 1221. PSA-VA-IPS displays are disclosed, for example, in WO 2010/089092 A1.

Like the conventional LC displays described above, PSA displays can be operated as active-matrix or passive-matrix (PM) displays. In the case of active-matrix displays, individual pixels are usually addressed by integrated, non-linear active elements, such as, for example, transistors (for example thin-film transistors or "TFTs"), while in the case of passive-matrix displays, individual pixels are usually addressed by the multiplex method, both methods being known from the prior art.

In particular for monitor and especially TV applications, optimisation of the response times, but also of the contrast and luminance (i.e. also transmission), of the LC display is still sought after. The PSA method can provide crucial advantages here. In particular in the case of PSA-VA displays, a shortening of the response times, which correlate with a pretilt which can be measured in test cells, can be achieved without significant adverse effects on other parameters.

In the prior art, polymerisable compounds of the following formula, for example, are used for PSA-VA:

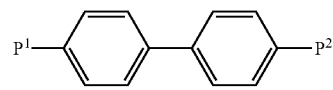

in which P denotes a polymerisable group, usually an acrylate or methacrylate group, as described, for example, in U.S. Pat. No. 7,169,449.

The effort for the production of a polyimide layer, treatment of the layer and improvement with bumps or polymer layers is relatively great. A simplifying technology which on the one hand reduces production costs and on the other hand helps to optimise the image quality (viewing-angle dependence, contrast, response times) would therefore be desirable.

The specification EP 2918658 A2 describes self-aligning, polymerisable mesogens containing an anchor group (e.g. OH) and liquid-crystalline media comprising such additives. The additives disclosed there have a different structure to the compounds according to the invention.

However, the existing approaches for obtaining VA display applications without a polyimide layer are not yet entirely satisfactory.

The present invention relates to compounds of the following formula I, and to an LC medium comprising a low-molecular-weight, non-polymerisable, liquid-crystalline component and a polymerisable or polymerised component comprising one or more compounds of the formula I, where the polymerised component is obtainable by polymerisation of the polymerisable component,

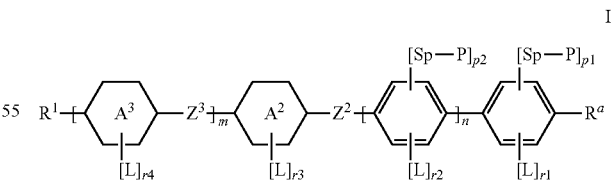

in which

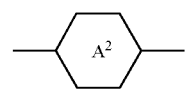

denotes a ring of the formula

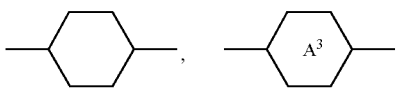

denotes a ring of the formula

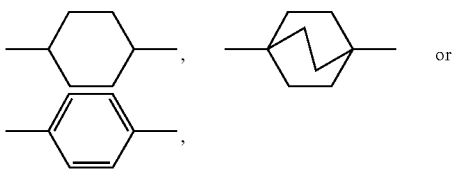 or

L in each case, independently of one another, denotes straight-chain or branched alkyl, alkenyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, or denotes F, Cl, Br, I, —CN, —NO$_2$, —NCO, —NCS, —OCN, —SCN, —C(=O)N(R$^0$)$_2$, —C(=O)R$^0$, optionally substituted aryl or cycloalkyl having 3 to 20 C atoms,
P denotes a polymerisable group,
Sp denotes a spacer group (also called spacer) or a single bond,
R$^a$ denotes an anchor group of the formula

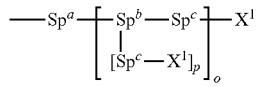

p denotes 1 or 2, preferably 1,
o denotes 0 or 1,
X$^1$, independently of one another, denotes H, alkyl, fluoroalkyl, —OH, —SH, —NH$_2$, —NHR$^{11}$, —NR$^{11}$$_2$, NHC(O)—R$^{11}$, —OR$^{11}$, —C(O)OH or —CHO,
    where at least one group X$^1$ denotes a radical selected from —OH, —SH, —NH$_2$, —NHR$^{11}$, —C(O)OH and —CHO,
R$^{11}$ denotes alkyl having 1 to 12 C atoms,
Sp$^a$, Sp$^c$ in each case, independently of one another, denotes a spacer group or a single bond,
Sp$^b$ denotes a tri- or tetravalent group, preferably CH, N or C,
R$^1$, independently of one another, denotes H, halogen, straight-chain, branched or cyclic alkyl having 1 to 25 C atoms, in which, in addition, one or more non-adjacent CH$_2$ groups may be replaced by —O—, —S—, —CH=CH—, —C≡C—, —CO—, —CO—O—, —O—CO— or —O—CO—O— in such a way that O and/or S atoms are not linked directly to one another and in which, in addition, one or more H atoms may be replaced by F or Cl, or denotes a group -Sp-P,
m denotes 1, 2 or 3, preferably 1 or 2, particularly preferably 2,
n denotes 0 or 1, with the proviso that n=0 in the case where o=1,
p1, p2, independently of one another, denote 0, 1 or 2, where p1+p2=1 or 2,
r1 denotes 0, 1 or 2, preferably 0,
r2 denotes 0, 1 or 2, preferably 1,
r3 denotes 0 or 1, preferably 0,
r4 in each case, independently of one another, denotes 0 or 1, preferably 0,
Z$^2$, Z$^3$ in each case, independently of one another, denote a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—C≡C—, —CH=CH—COO—, —OCO—CH=CH— or —(CR$^0$R$^{00}$)$_{n1}$—,
n1 denotes 1, 2, 3 or 4,
R$^0$ in each case, independently of one another, denotes alkyl having 1 to 12 C atoms,
R$^{00}$ in each case, independently of one another, denotes H or alkyl having 1 to 12 C atoms.

The polymerisable or polymerised component of the LC medium optionally comprises further polymerisable compounds. Use is preferably made of those which are suitable for the PSA principle.

An embodiment of the invention is therefore also a polymer which comprises monomers of the formula I, i.e. a polymer which is built up at least partly from corresponding polymerisation product.

The invention furthermore relates to an LC display comprising an LC cell having two substrates and at least two electrodes, where at least one substrate is transparent to light and at least one substrate has one or two electrodes, and a layer of an LC medium according to the invention located between the substrates. The LC display is preferably one of the PSA type.

The invention furthermore relates to the use of compounds of the formula I as additive for LC media for effecting homeotropic alignment with respect to a surface delimiting the LC medium.

A further aspect of the present invention is a process for the preparation of an LC medium according to the invention, which is characterised in that one or more polymerisable self-alignment additives (compounds of the formula I) are mixed with a low-molecular-weight, liquid-crystalline component, and optionally one or more further polymerisable compounds are added.

The invention furthermore relates to a process for the production of an LC display comprising an LC cell having two substrates and at least two electrodes, where at least one substrate is transparent to light and at least one substrate has one or two electrodes, comprising the process steps:
    filling of the cell with an LC medium according to the invention, where homeotropic (vertical) alignment of the LC medium with respect to the substrate surfaces becomes established, and
    polymerisation of the polymerisable component(s), optionally with application of a voltage to the cell or under the action of an electric field, in one or more process steps.

The use according to the invention of the self-alignment additives as additives of LC media is not tied to particular LC media. The LC medium or the non-polymerisable component present therein can have positive or negative dielectric anisotropy. The LC medium is preferably nematic, since most displays based on the VA principle comprise nematic LC media.

The polymerisable self-alignment additive is introduced into the LC medium as additive. It effects homeotropic alignment of the liquid crystal with respect to the substrate surfaces (such as, for example, a surface made from glass or coated with ITO or with polyimide). In view of the investigations in connection with this invention, it appears that the polar anchor group interacts with the substrate surface. This causes the self-alignment additives on the substrate surface to align and induce a homeotropic alignment of the adjacent LC medium. In this view, the anchor group should be sterically accessible, i.e. not, as in the case of a phenolic (phenyl-substituted) OH group, surrounded by tert-butyl groups in the ortho position, as is the case, for example, in 2,6-di-tert-butylphenol, i.e. compounds containing a head group (corresponding to the radicals $R^a$ or $-A^1-R^a$) of the formula

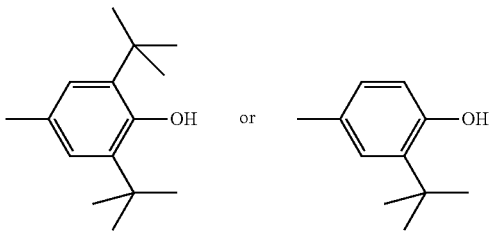 [SMILES: Cc1cc(C(C)(C)C)c(O)c(C(C)(C)C)c1 ; "or" ; Cc1ccc(O)c(C(C)(C)C)c1]

are preferably not included in formula I and the sub-formulae. More generally, phenolic head groups -Ph-OH in which the anchor group denotes —OH are preferably not included.

The self-alignment additives according to the invention are predominantly crystalline solids at room temperature, as a consequence of which the handling and storability are improved compared with, for example, oily substances. The melting point can furthermore be varied by variation of the side chains.

In addition, the compounds provide the LC media with comparatively good VHR values under applicational conditions, i.e. after the UV irradiation process of display manufacture. This now also enables mixture concepts which have hitherto resulted in instabilities in the exposure test to be achieved with the additives according to the invention. The other parameters of VA displays, such as, for example, the response times or the stability of the tilt angle in the production of PS-VA displays, are not adversely affected by the additives according to the invention.

The LC cell of the LC display according to the invention preferably has no alignment layer, in particular no polyimide layer for homeotropic alignment of the LC medium. Alignment layer here means a layer which is already present before the cell is filled. The polymerised component of the LC medium is in this connection not regarded as an alignment layer. An LC cell may nevertheless have an alignment layer or a comparable layer, but this layer is preferably not the sole cause of the homeotropic alignment, but instead supports or modifies the effect of the self-alignment additive. Rubbing of, for example, polyimide layers is, in accordance with the invention, not necessary in order to achieve homeotropic alignment of the LC medium with respect to the substrate surface. The LC display according to the invention is preferably a VA display comprising an LC medium having negative dielectric anisotropy and electrodes arranged on opposite substrates. Alternatively, it is a VA-IPS display comprising an LC medium having positive dielectric anisotropy and interdigital electrodes arranged at least on one substrate.

The polymerisable self-alignment additive of the formula I is preferably employed in a concentration of less than 10% by weight, particularly preferably ≤5% by weight and very particularly ≤3% by weight. It is preferably employed in a concentration of at least 0.05% by weight, preferably at least 0.2% by weight. The use of 0.1 to 2.5% by weight of the self-alignment additive generally already results in completely homeotropic alignment of the LC layer in the case of the usual cell thicknesses (3 to 4 μm) with the conventional substrate materials and under the conventional conditions of the production processes of an LC display. Due to the polymerisable nature, higher concentrations of self-alignment additives are also possible without influencing the LC medium in the long term, since the polymerisable substance is bound again by the polymerisation.

A preferred self-alignment additive of the formula I is an additive selected from the formulae IA, IB and IC:

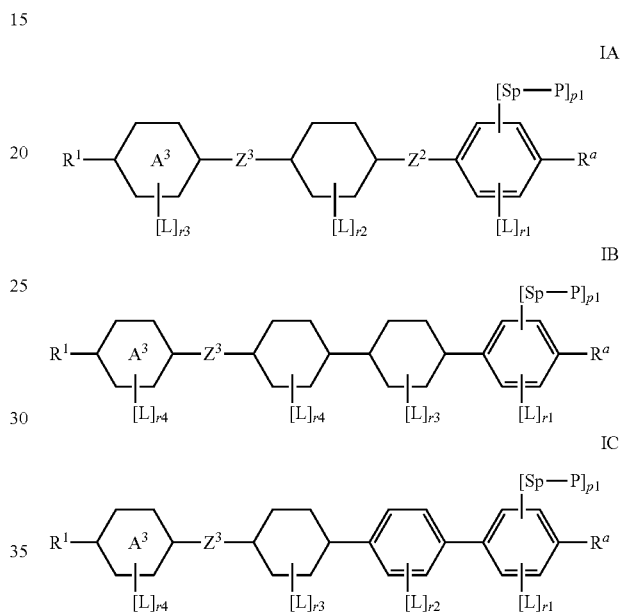

in which
$R^1$, Sp, P, p1, L, r1, r2, r3 and $R^a$ are defined as for formula I, and

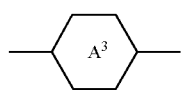

denotes a ring of the formula

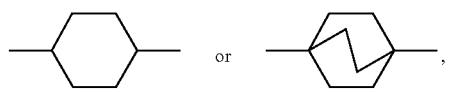

preferably

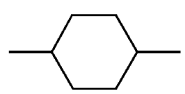

Further preferred and illustrative embodiments of the self-alignment additives of the formula I according to the invention and their sub-formulae IA to IC, etc. are disclosed below.

By definition, the anchor group $R^a$ contains one, two or three groups $X^1$, which are intended to serve as binding member to a surface. In accordance with formula I, compounds where n=1 and the sub-formulae IC and IC-1 to IC-3 (cf. formula I, n=1) are defined in such a way that the anchor group $R^a$ for these (preferably) only contains a single OH group.

The spacer groups $Sp^a$ to $Sp^c$ are intended to form a flexible bond between the mesogenic group with rings and the group(s) $X^1$. The structure of the spacer groups is therefore very variable and in the most general case of the formula I not definitively defined. The person skilled in the art will recognise that a multiplicity of possible variations of chains come into question here.

An anchor group of the formula

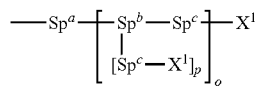

as defined above and below,
preferably stands for an anchor group selected from the following formulae:

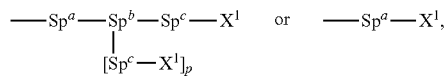

in which in each case independently the groups are as defined above and below,
particularly preferably for a group of the formulae

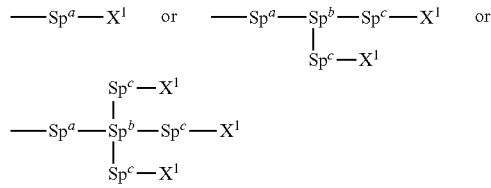

in which in each case independently the groups are as defined above and below.

The group $Sp^b$ preferably denotes a trivalent group of the formulae selected from CH, $C(R^3)$ or N (for p=1), or the tetravalent group C (tetravalent carbon atom, for p=2). $Sp^b$ particularly preferably denotes —CH or —$CR^3$ (for p=1) or C (for p=2),
in which $R^3$ is as defined below.

The group $R^3$ in $Sp^b$ denotes an alkyl radical having 1 to 10 C atoms, which is linear or branched. The melting point of the additives of the formula (I) according to the invention can be adjusted in a broad range through the choice of the radical $R^3$. The radical $R^3$ may also have an influence on the homogeneous distribution of the additives on the substrate surface. In a preferred embodiment, $Sp^b$ is a group —$C(R^3)$, in which $R^3$ denotes a radical having 1 to 8 C atoms, for example preferably $C(CH_2CH_2CH_3)$, $C(CH_2CH_2CH_2CH_3)$, $C(CH_2CH(CH_3)CH_3)$ or $C(CH_2CH_2C(CH_3)_3)$. $R^3$ is particularly preferably a group having 1 to 8 C atoms, in particular n-butyl or 3,3-dimethylbutyl. Preferred radicals $R^3$ are also disclosed below in the explicit anchor groups.

The group $Sp^a$ preferably does not denote a single bond, preferably denotes a straight-chain or branched alkylene chain having 1 to 8 C atoms, in which one or more $CH_2$ groups may be replaced by —O—, and in which, in addition, one or more H atoms may be replaced by F, Cl or —OH, particularly preferably a group selected from the formulae: —$CH_2$—, —$CH_2CH_2$—, —$OCH_2CH_2$—, —$CH_2CH_2CH_2$—, —$OCH_2CH_2CH_2$—, —$CH_2CH_2CH_2CH_2$—, —$OCH_2CH_2CH_2CH_2$—, —$CH_2CH_2OCH_2CH_2$— and —$OCH_2CH_2OCH_2CH_2$—, particularly preferably —$CH_2CH_2$—, —$OCH_2CH_2$—, —$OCH_2CH_2CH_2$—, —$OCH_2CH_2CH_2CH_2$— and —$CH_2CH_2CH_2$—.

The group $Sp^c$ preferably does not denote a single bond, preferably denotes a straight-chain or branched alkylene chain having 1 to 8 C atoms, in which one or more $CH_2$ groups may be replaced by —O—, and in which, in addition, one or more H atoms may be replaced by F, Cl or —OH, preferably a group selected from the formulae —$CH_2$—, —$CH_2CH_2$—, —$CH_2CH_2CH_2$—, —$CH_2CH_2CH_2CH_2$— and —$CH_2CH_2OCH_2CH_2$—, particularly preferably —$CH_2$—.

The anchor group $R^a$ in the above formulae particularly preferably contains one, two or three OH groups.

Particularly preferred anchor groups of the formula $R^a$ are selected from the following sub-formulae, where the group $R^a$ is bonded to the respective formula via the dashed bond:

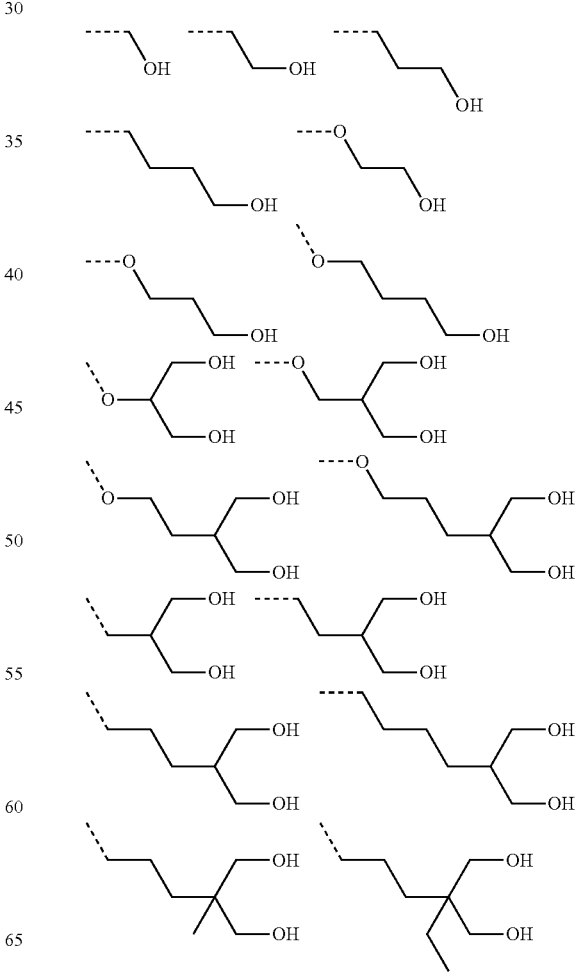

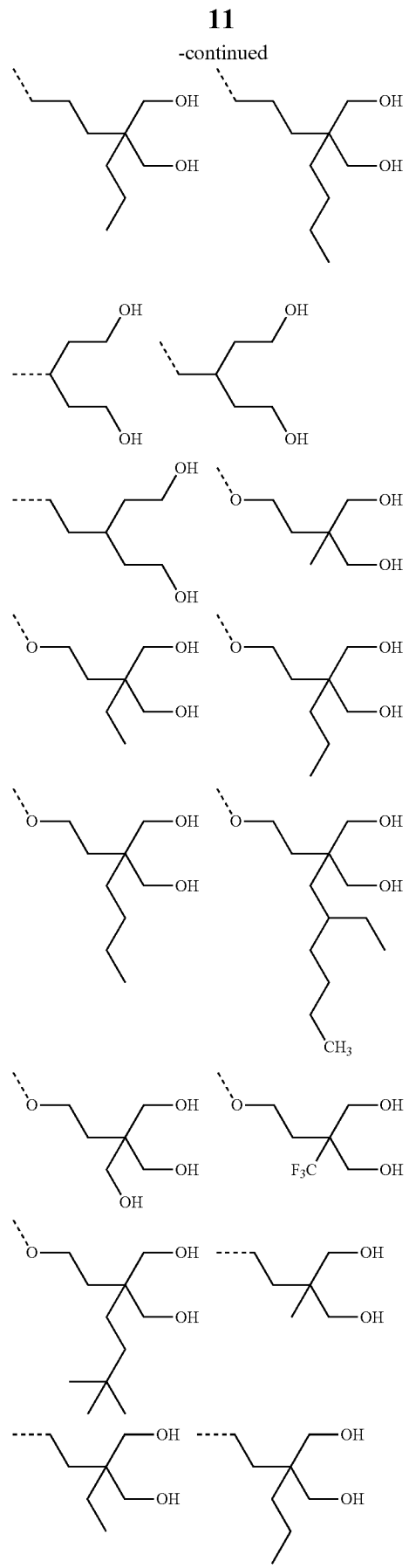
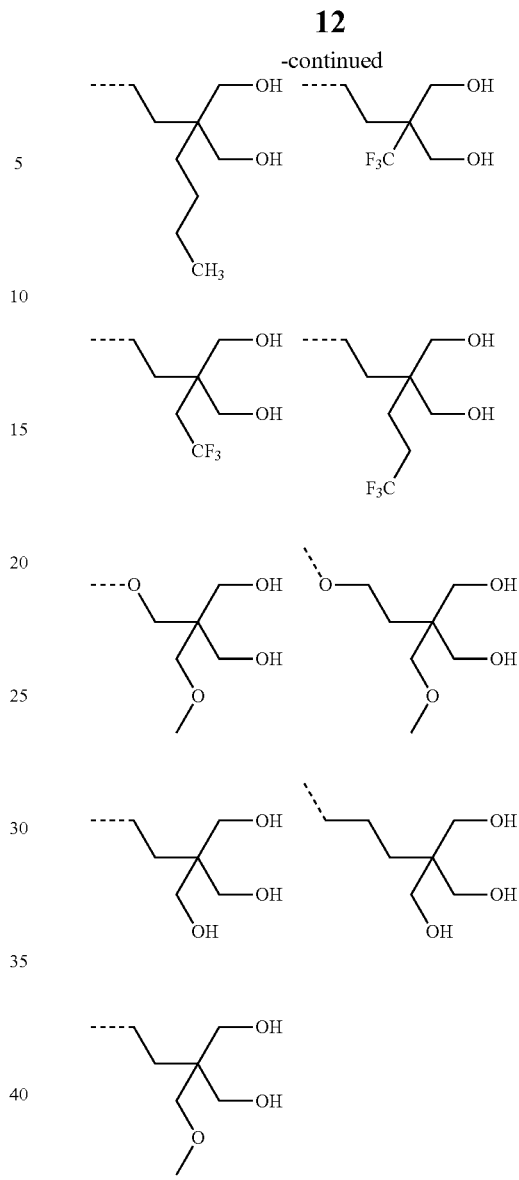

In the formula I and sub-formulae thereof, the variables r3 and r4 preferably both denote 0. The variable r1 preferably denotes 0 or 1. The variable r2 preferably denotes 0 or 1.

The index m in the formula I preferably denotes 1 or 2, preferably 1. The index n preferably denotes 0.

The number of polymerisable groups P in the additives of the formula I according to the invention is represented by the indices p1 and p2. The index p1 in the formula I preferably denotes 1 or 2, preferably 1. The index p2 in the formula I preferably denotes 0 or 1, preferably 0. The compounds of the formula I have a number (n+m) of polymerisable groups P, where (n+m) is preferably 1 or 2.

The group L preferably denotes H, F, Cl, $CH_3$, ethyl, propyl, cyclopropyl or isopropyl.

The bridge group $Z^2$ of the formula I and associated sub-formulae preferably denotes a single bond. The bridge group $Z^3$ of the formula I and associated sub-formulae preferably denotes a single bond.

Particularly preferred self-alignment additives according to the invention are selected from the following formulae:

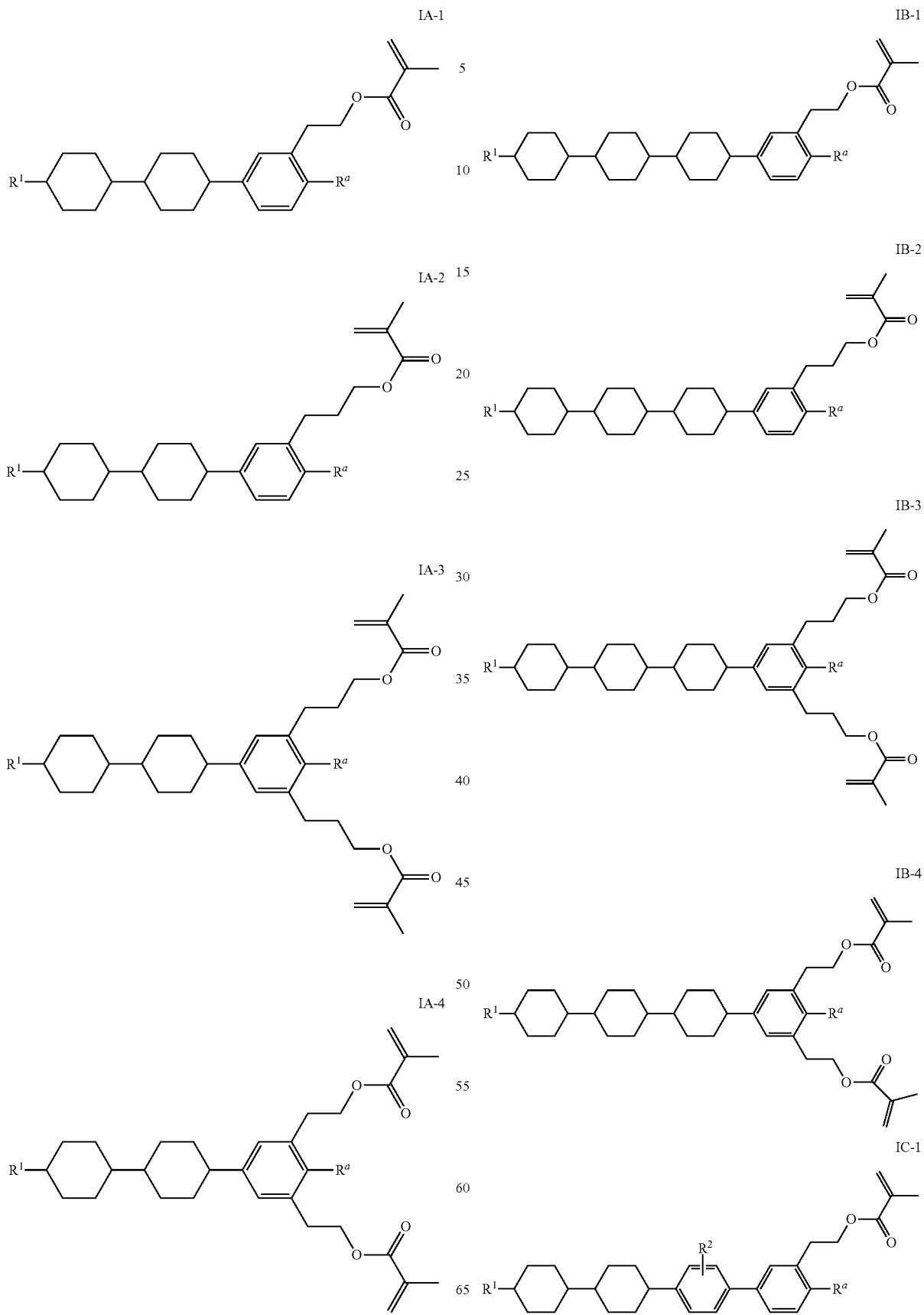

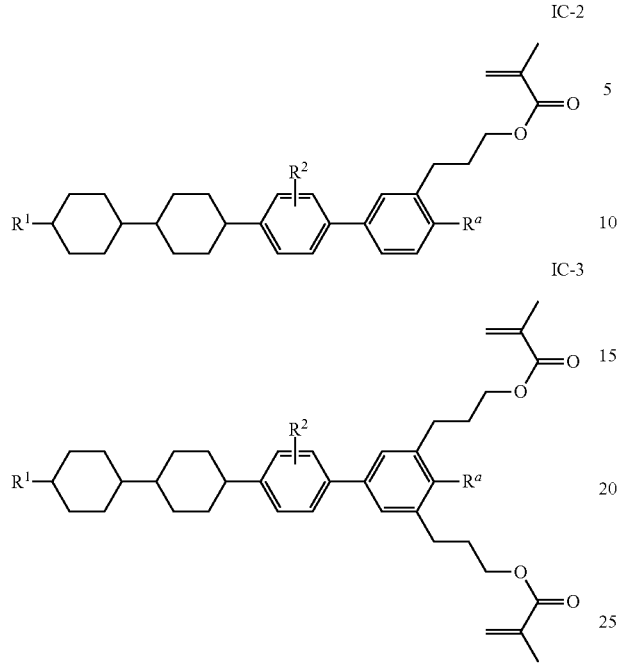
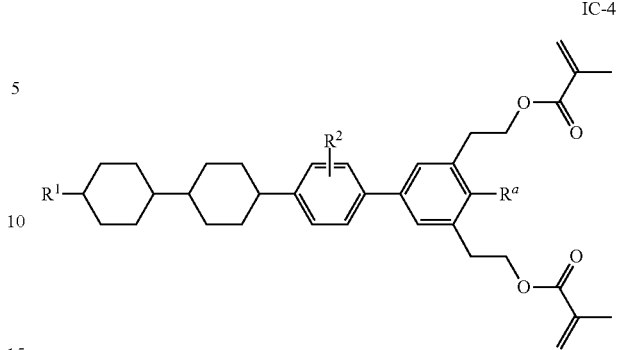
in which $R^1$ and $R^a$ are defined independently as for formula I and the sub-formulae, and
$R^2$ is defined like L in formula I.
The following formulae are illustrative of very particularly preferred self-alignment additives:
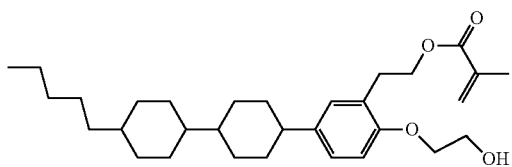
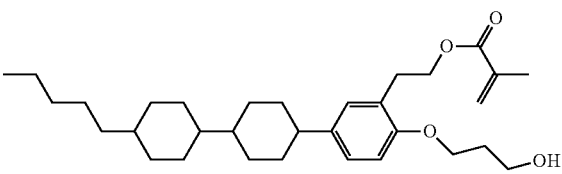
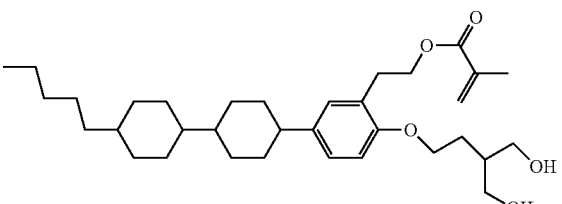
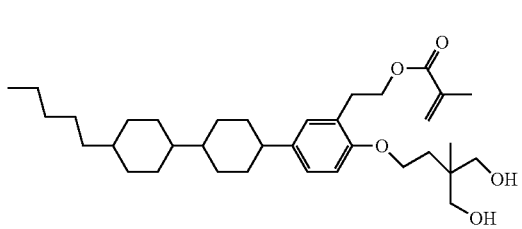
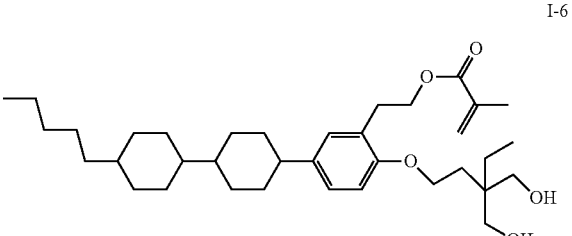
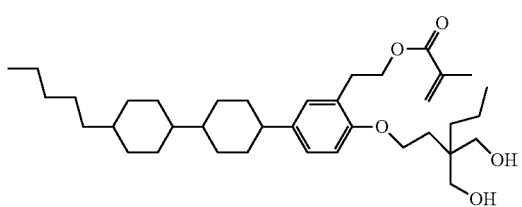
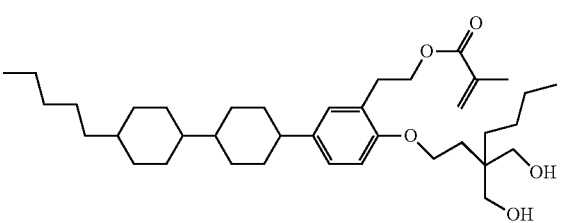

-continued
I-9
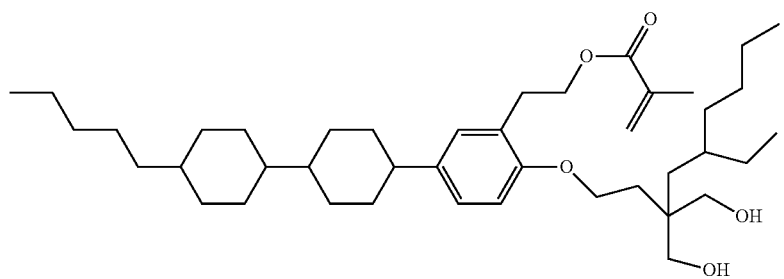
I-10
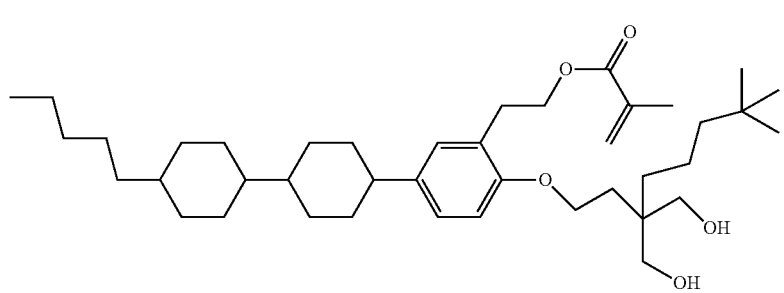
I-11
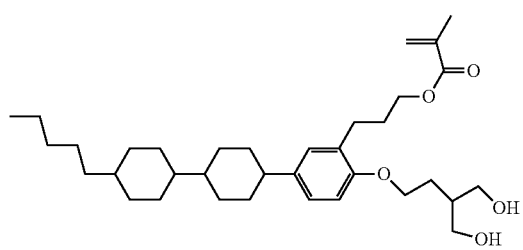
I-12
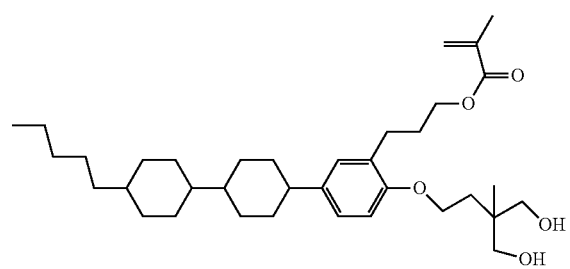
I-13
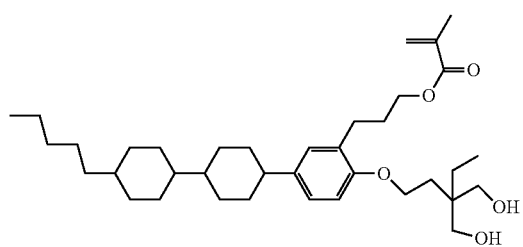
I-14
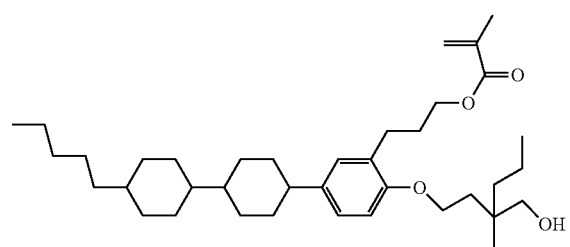
I-15
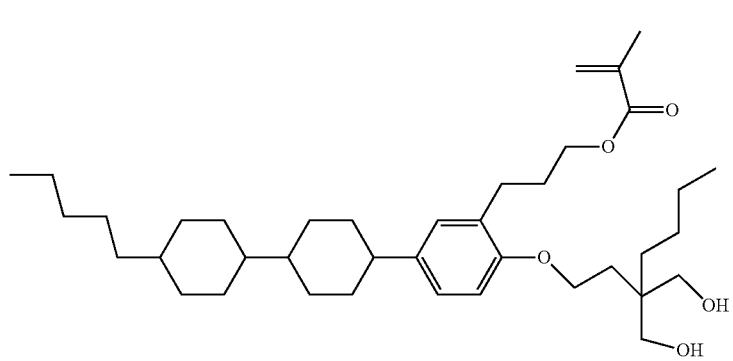

-continued
I-16
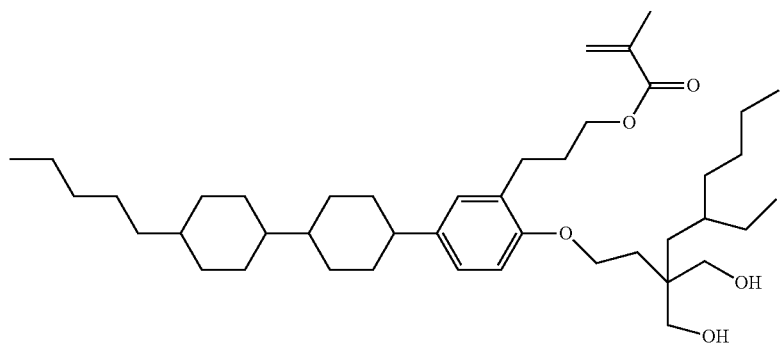
I-17
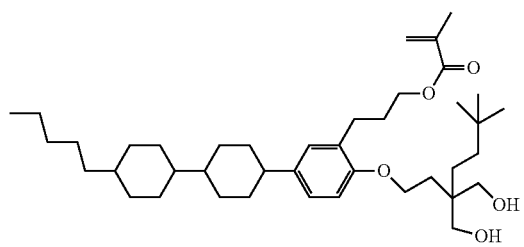
I-18
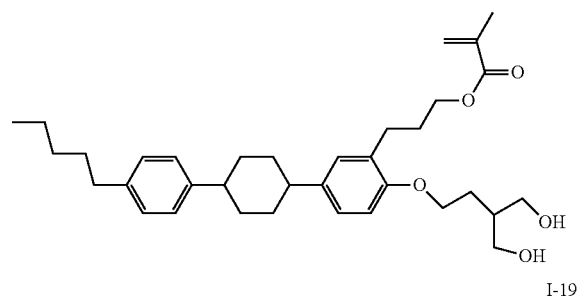
I-19
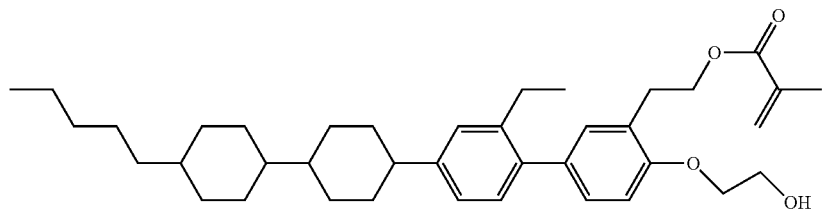
I-20
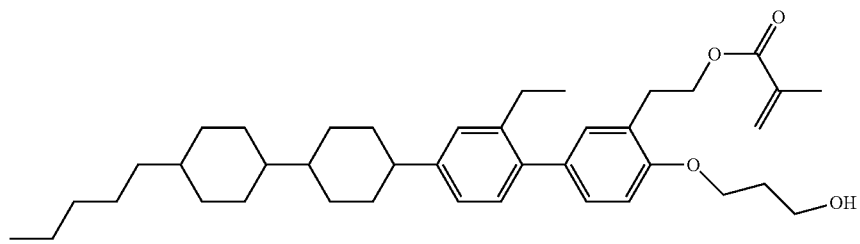
I-21
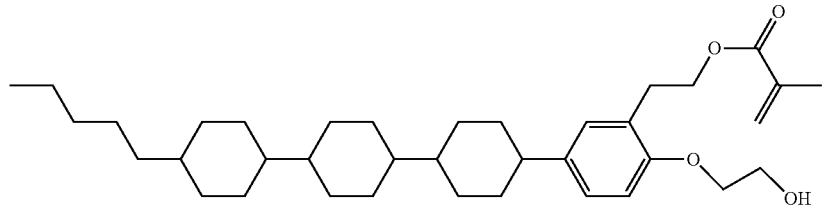
I-22

-continued
I-23
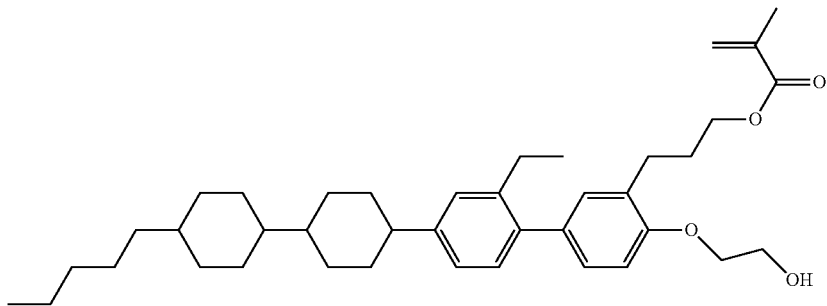
I-24
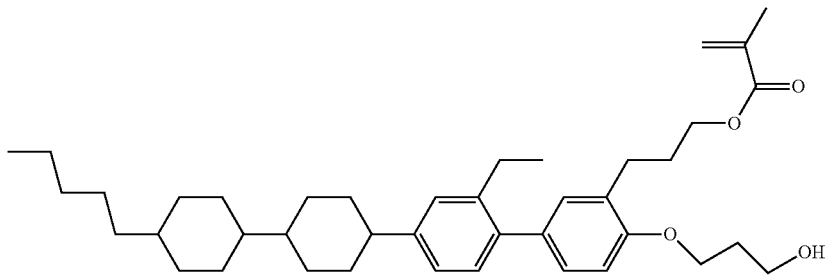
I-25
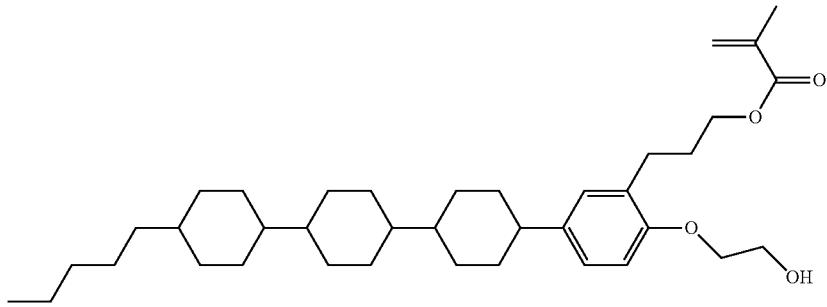
I-26
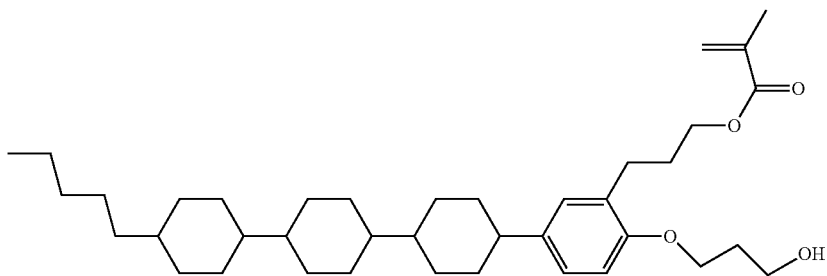
I-27
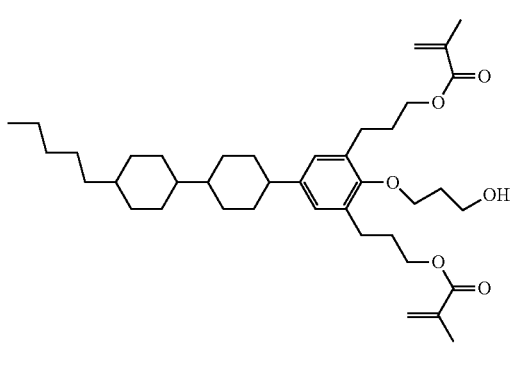
I-28
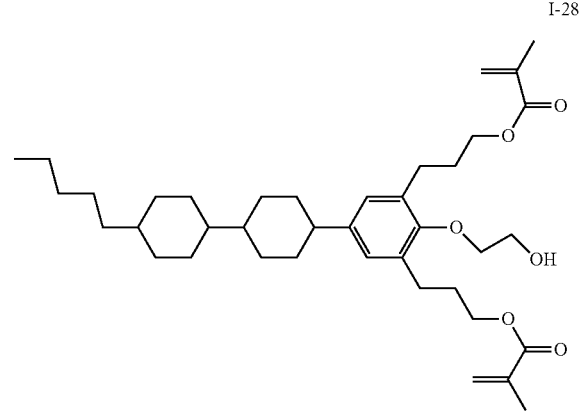

I-29
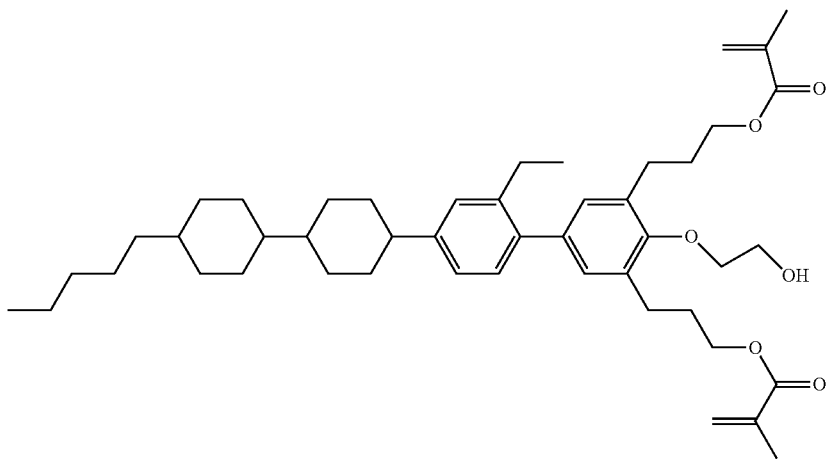
I-30
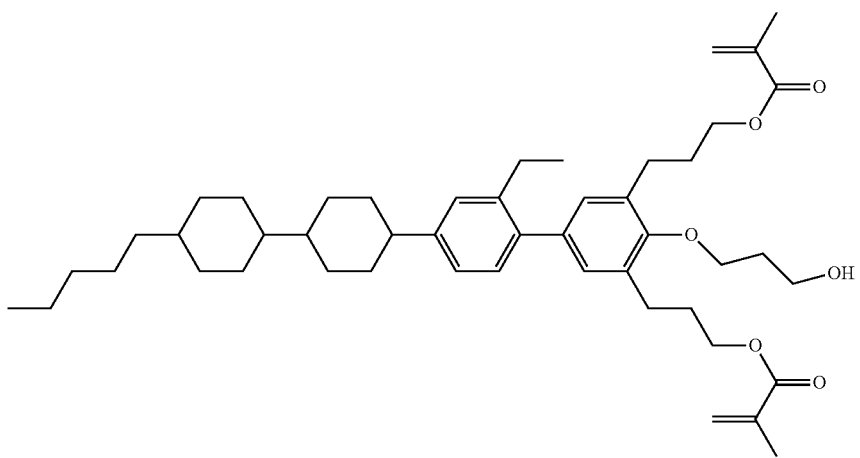
I-31
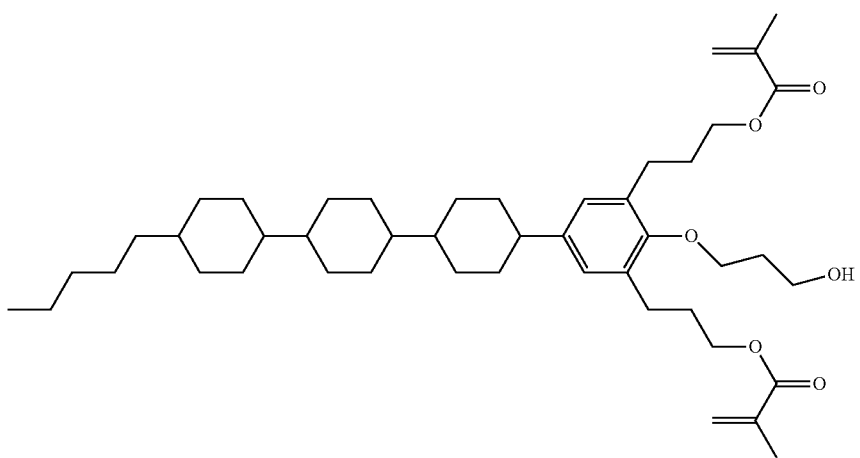

I-32
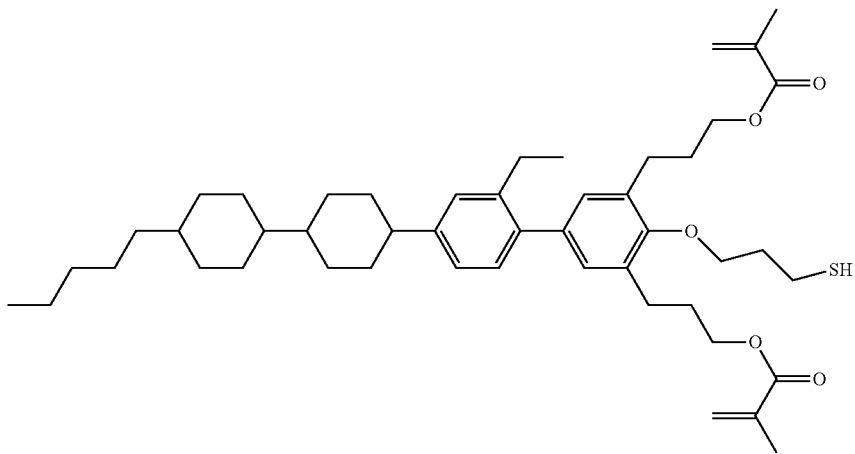
I-33
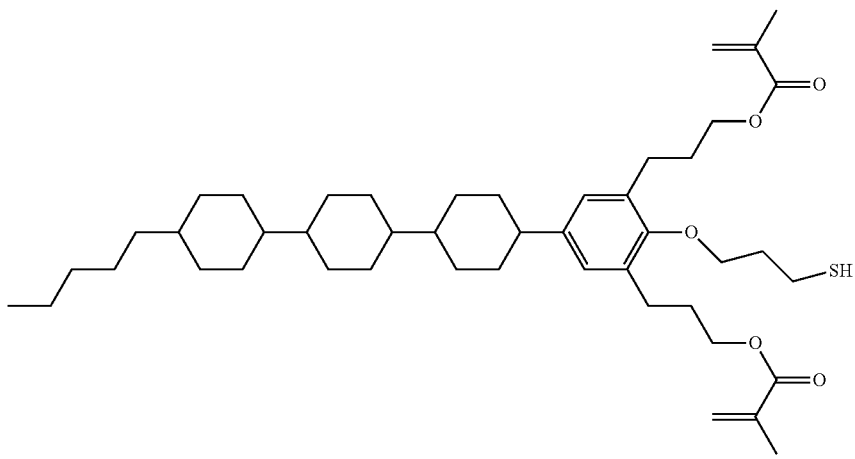
I-34
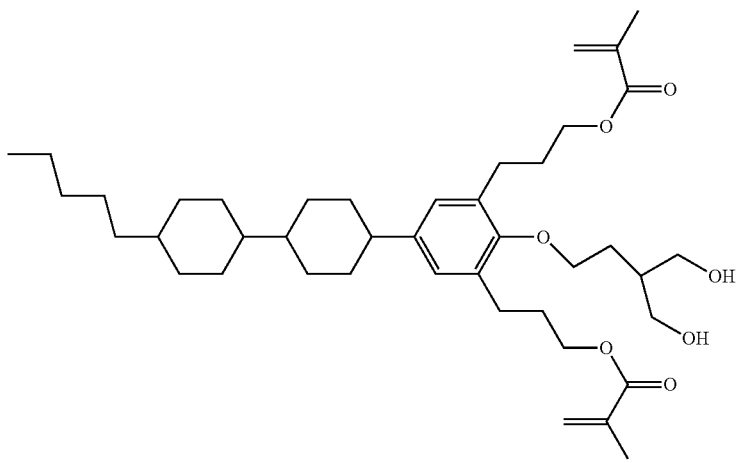

-continued
I-35
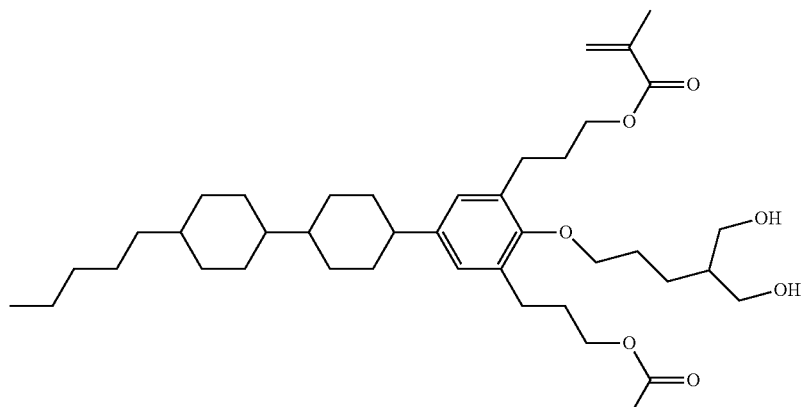
I-36
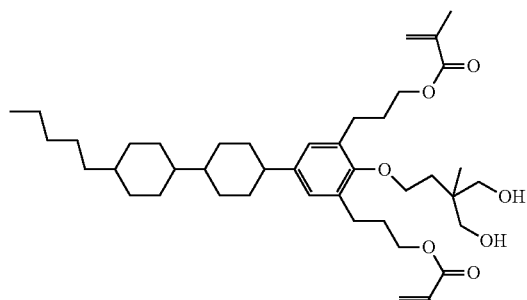
I-37
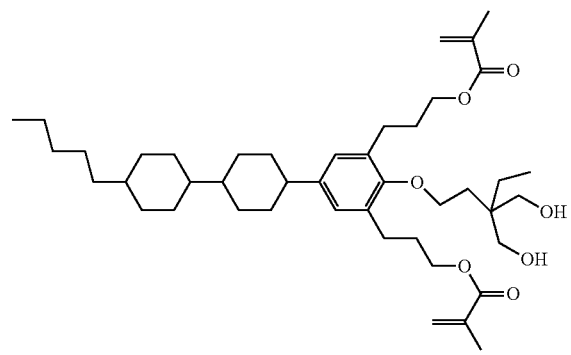
I-38
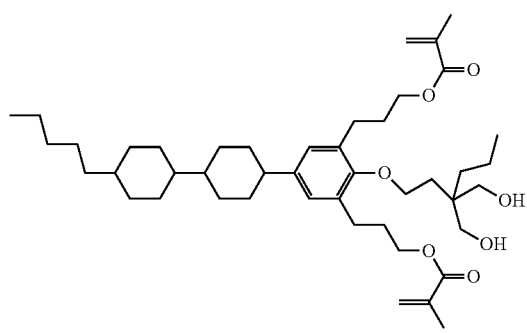
I-39
I-40
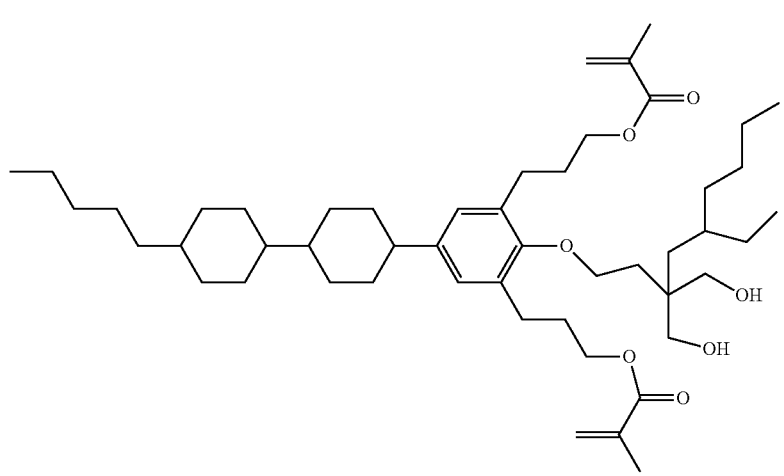

-continued
I-41
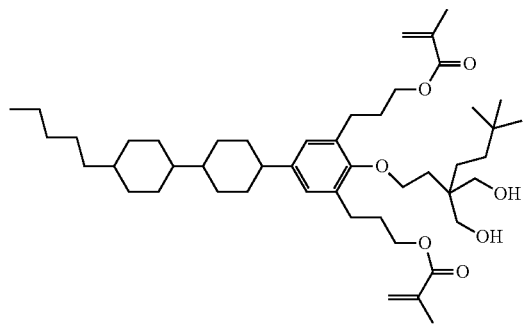
I-42
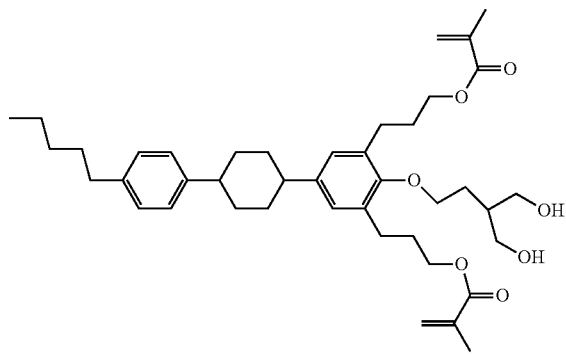
I-43
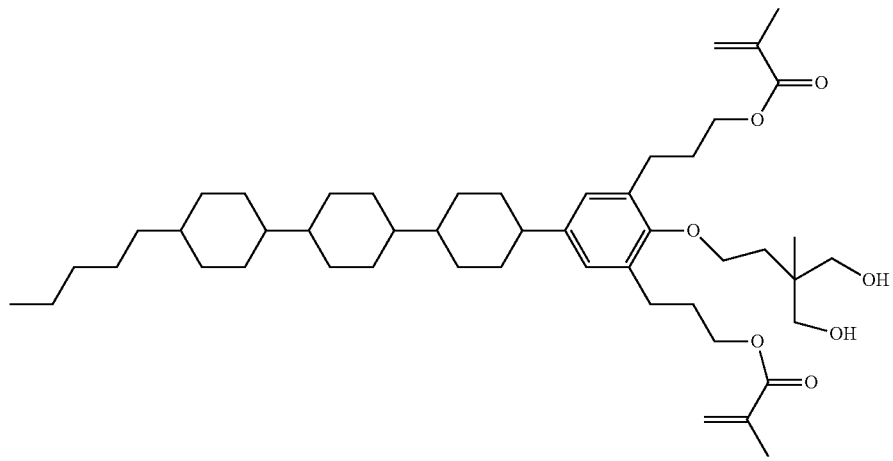
I-44
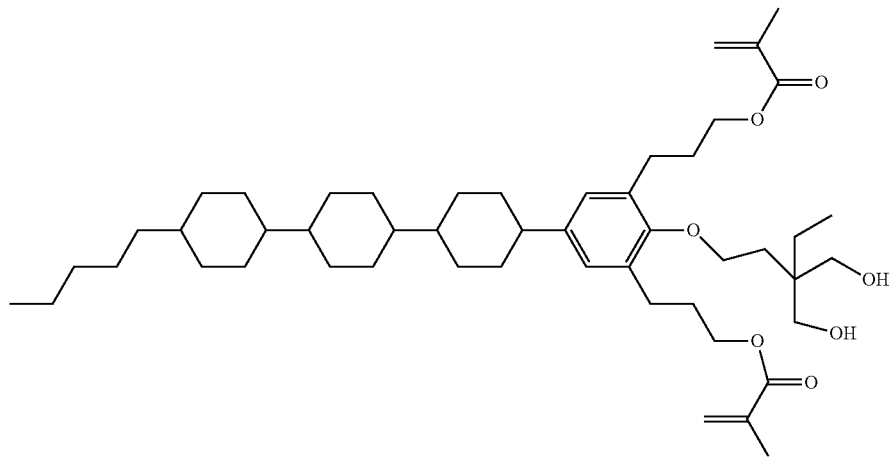

-continued
I-45
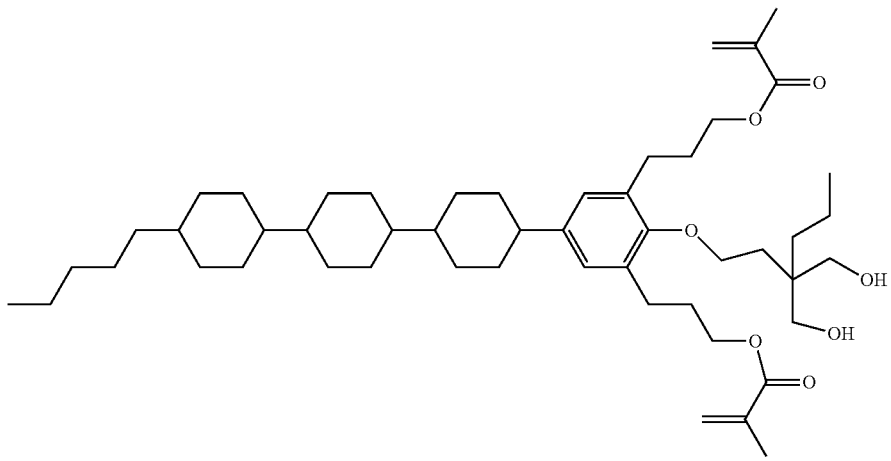
I-46
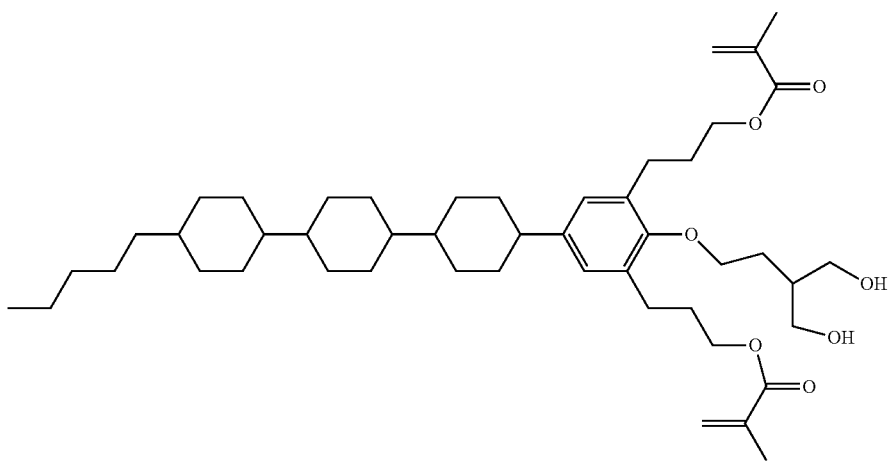
I-47
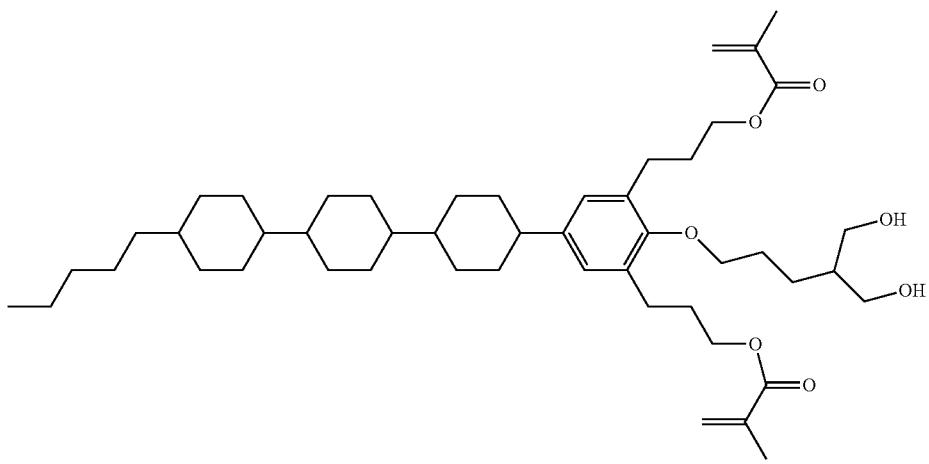

-continued
I-48
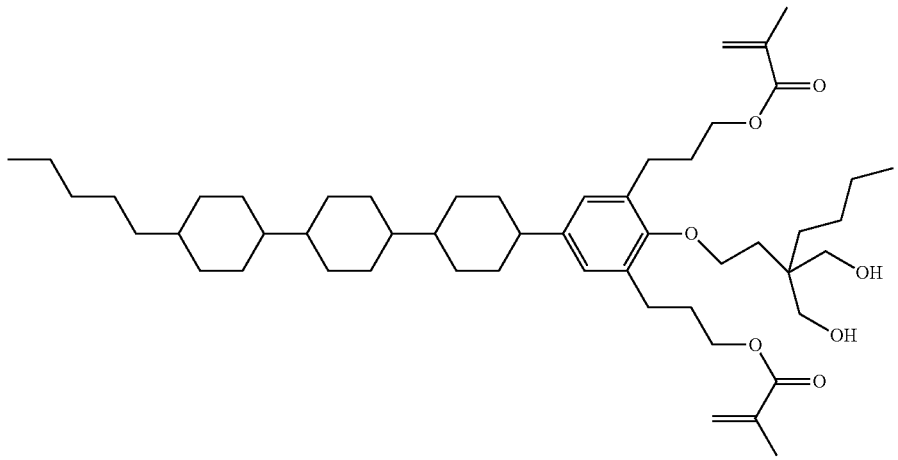
I-49
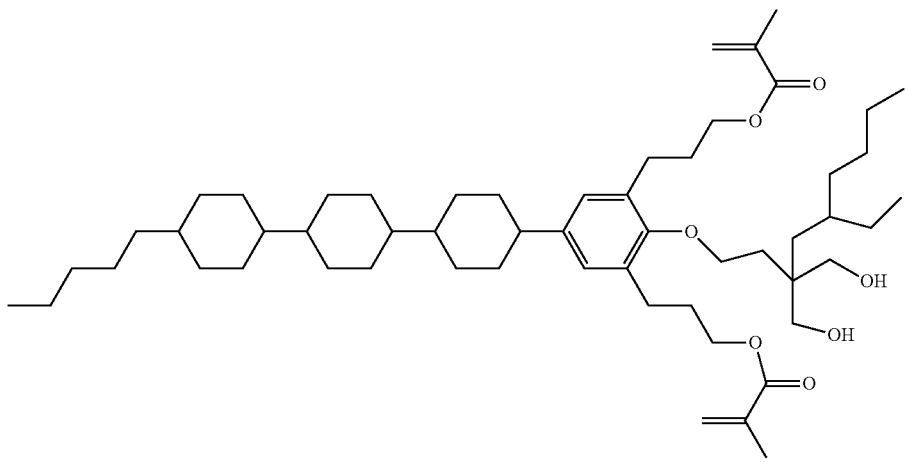
I-50
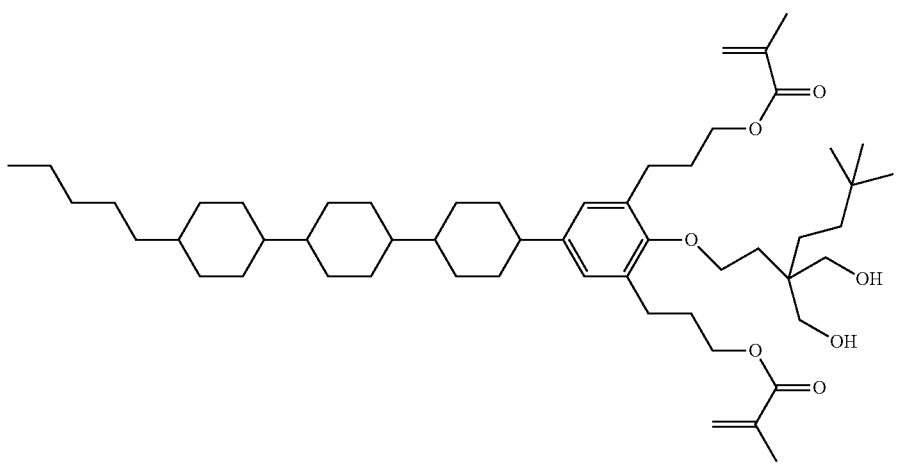

-continued
I-51
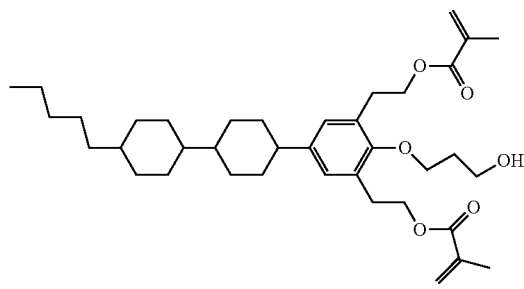
I-52
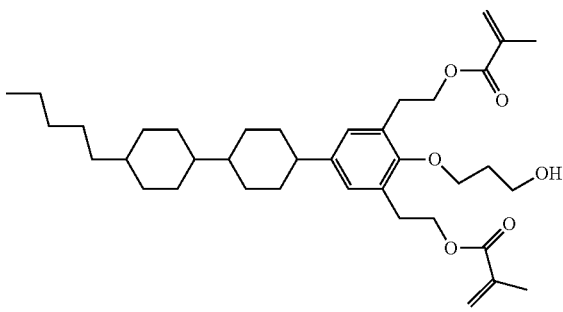
I-53
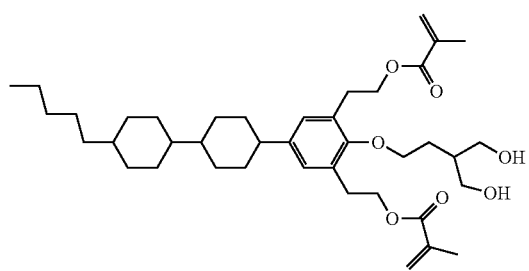
I-54
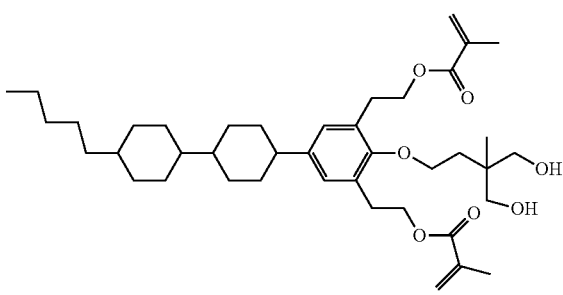
I-55
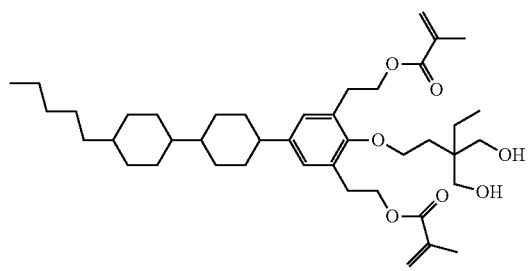
I-56
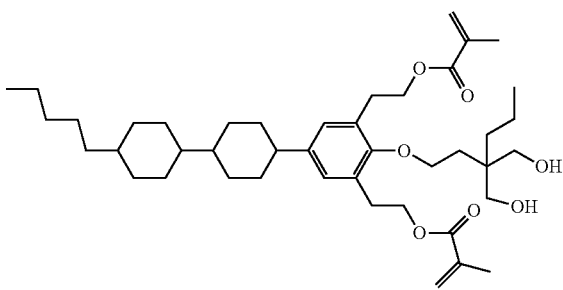
I-57
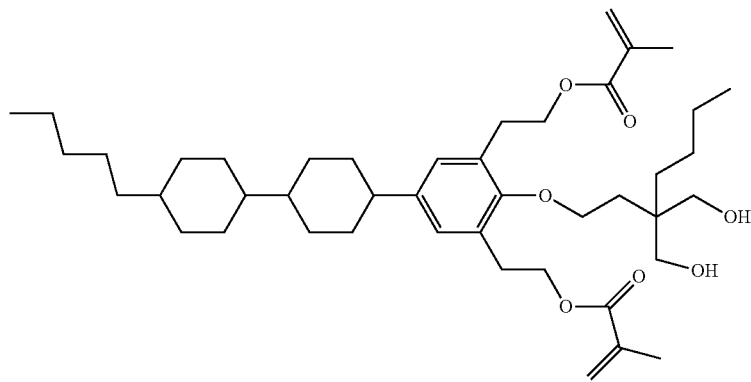

I-58
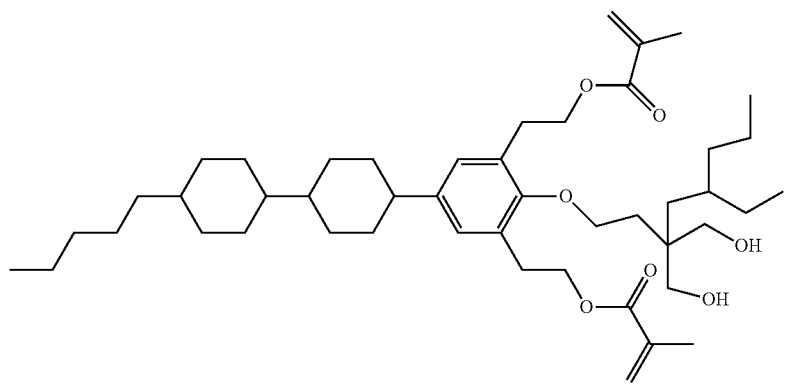
I-59
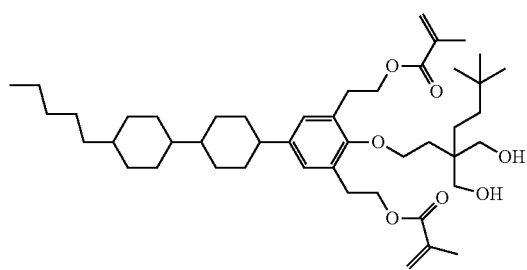
I-60
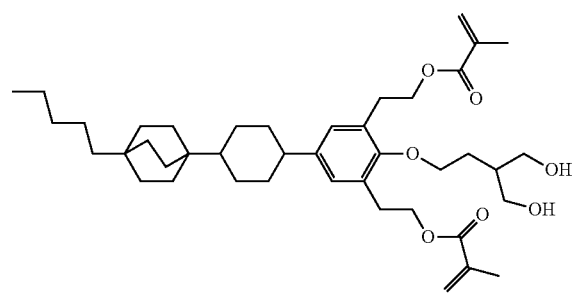
I-61
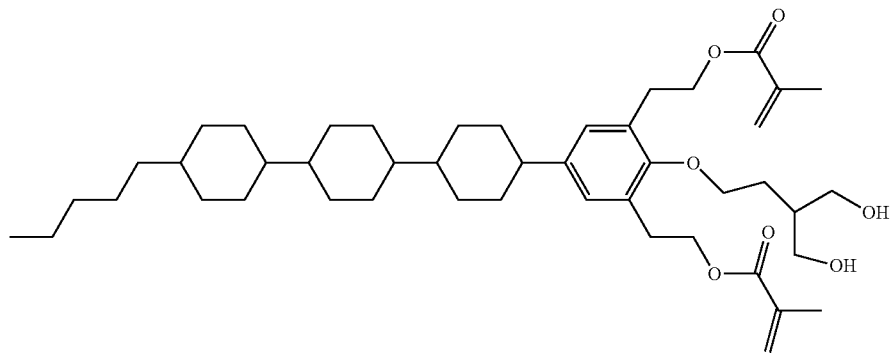
I-62
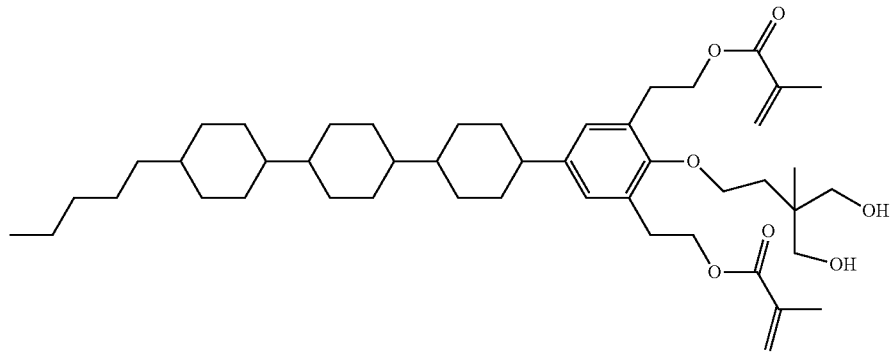

-continued
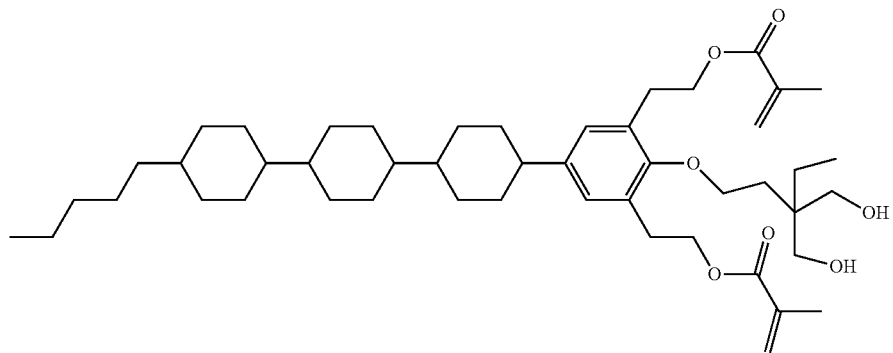
I-63
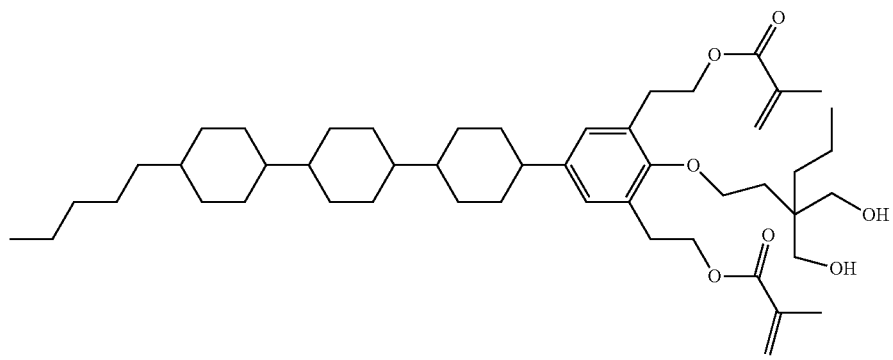
I-64
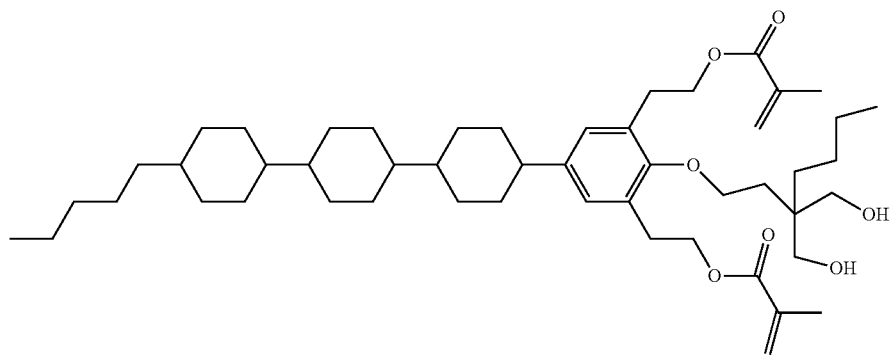
I-65
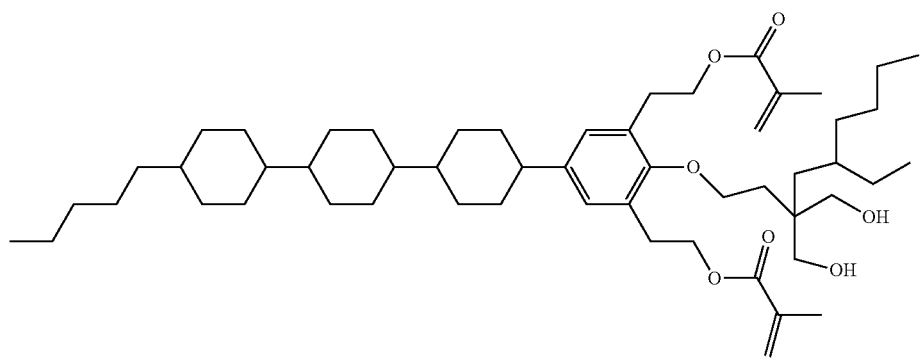
I-66

-continued

I-67

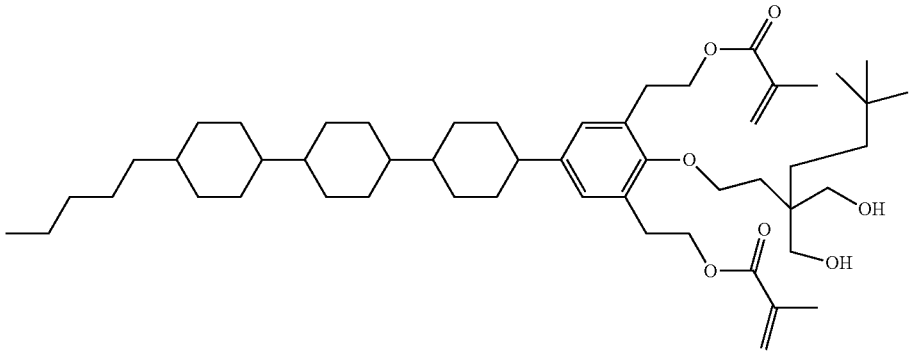

Besides the polymerisable self-alignment additives of the formula I, the LC medium according to the invention may also comprise further self-alignment additives K which are not polymerisable or have a different structure. The concentration of the polymerisable self-alignment additives and the further (conventional) self-alignment additives together is preferably the values indicated above, i.e., for example, 0.1 to 2.5% by weight.

The further, optionally unpolymerisable self-alignment additives may have a structure of the formula K, where compounds of the formula I are excluded in formula K:

K in which the groups $R^1$, $Z^2$ and $R^a$ are defined as for formula I above, and m denotes 1, 2, 3 or 4, $A^{K1}$, $A^{K2}$ in each case, independently of one another, denote an aromatic, heteroaromatic, alicyclic or heterocyclic group, which may also contain anellated rings and which may also be mono- or polysubstituted by a group L or -Sp-P, L in each case, independently of one another, denotes straight-chain or branched alkyl, alkenyl, alkoxy, alkylcarbonyl, alkoxycarbonyl, alkylcarbonyloxy or alkoxycarbonyloxy having 1 to 25 C atoms, in which, in addition, one or more H atoms may be replaced by F or Cl, or denotes F, Cl, Br, I, —CN, —NO$_2$, —NCO, —NCS, —OCN, —SCN, —C(=O)N(R$^0$)$_2$, —C(=O)R$^0$, optionally substituted aryl or cycloalkyl having 3 to 20 C atoms, P denotes a polymerisable group, Sp denotes a spacer group (also called spacer) or a single bond, $R^0$ in each case, independently of one another, denotes alkyl having 1 to 12 C atoms, $R^{00}$ in each case, independently of one another, denotes H or alkyl having 1 to 12 C atoms, and $R^1$, independently of one another, denotes H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO— or —O—CO—O— in such a way that O and/or S atoms are not linked directly to one another and in which, in addition, one or more H atoms may be replaced by F or Cl, where compounds of the formula I are excluded.

The formula K, in contrast to the formula I, also encompasses unpolymerisable compounds and, for example, terphenyl derivatives. The preferred embodiments of the anchor group $R^a$, the elements $A^2$, $Z^2$, $R^1$ and the substituents L and -Sp-P, etc., can also be applied to the conventional additives of the formula K, so long as there is no contradiction.

The ring groups $A^{K1}$ and $A^{K2}$ in the above formula K and sub-formulae thereof preferably each independently denote 1,4- or 1,3-phenylene, naphthalene-1,4-diyl or naphthalene-2,6-diyl, where, in addition, one or more CH groups in these groups may be replaced by N, cyclohexane-1,4-diyl, in which, in addition, one or more non-adjacent CH$_2$ groups may be replaced by O and/or S, 3,3'-bicyclobutylidene, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, perhydrocyclopenta[a]phenanthrene-3,17-diyl (in particular gonane-3,17-diyl), where all these groups may be unsubstituted or mono- or polysubstituted by a group L.

Particularly preferably, the groups $A^{K1}$ and $A^{K2}$ each independently denote a group selected from a) the group consisting of 1,4-phenylene and 1,3-phenylene, in which, in addition, one or more H atoms may be replaced by L, b) the group consisting of trans-1,4-cyclohexylene, 1,4-cyclohexenylene and 4,4'-bicyclohexylene, in which, in addition, one or more non-adjacent CH$_2$ groups may be replaced by —O— and/or —S— and in which, in addition, one or more H atoms may be replaced by F or L. The groups $A^{K1}$ and $A^{K2}$ especially preferably denote a group from the above sub-group a). $A^{K1}$ and $A^{K2}$ independently very particularly preferably denote 1,4-phenylene or cyclohexane-1,4-diyl, each of which may be mono- or polysubstituted by a group L.

The compounds of the formula K (conventional self-alignment additives) include, for example, compounds of the formulae:

KA

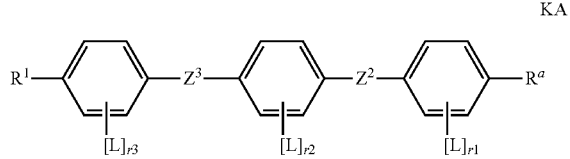

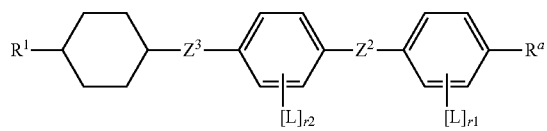

KB

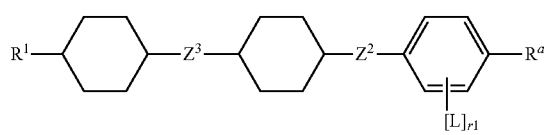

KC

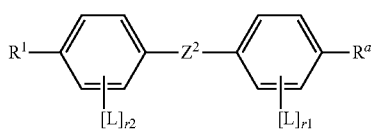

KD

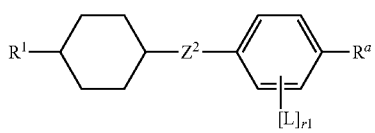

KE in which $R^1$, $R^a$, $Z^2$, $Z^3$ and L independently are as defined for the above formula I', and r1, r2, r3 independently denote 0, 1, 2, 3 or 4, preferably 0, 1 or 2.

The preparation of the conventional self-alignment additives is disclosed, for example, in the specification WO 2012/038026 or EP 2918658 A2.

The term "aryl" denotes an aromatic carbon group or a group derived therefrom.

Aryl groups may be monocyclic or polycyclic, i.e. they may contain one ring (such as, for example, phenyl) or two or more fused rings. At least one of the rings here has an aromatic configuration. Heteroaryl groups contain one or more heteroatoms, preferably selected from O, N, S and Se.

Particular preference is given to mono-, bi- or tricyclic aryl groups having 6 to 25 C atoms. Preference is furthermore given to 5-, 6- or 7-membered aryl groups, in which, in addition, one or more CH groups may be replaced by N, S or O in such a way that O atoms and/or S atoms are not linked directly to one another.

Preferred aryl groups are, for example, phenyl, naphthyl, anthracene, phenanthrene, pyrene, dihydropyrene, chrysene, perylene, tetracene, pentacene, benzopyrene, fluorene, indene, indenofluorene, spirobifluorene, etc.

In connection with the present invention, the term "alkyl" denotes a straight-chain or branched, saturated or unsaturated, preferably saturated, aliphatic hydrocarbon radical having 1 to 15 (i.e. 1, 2, 3, 4, 5, 6, 7, 8, 9, 10, 11, 12, 13, 14 or 15) carbon atoms.

The term "cyclic alkyl" includes alkyl groups which have at least one carbocyclic part, i.e., for example, also cycloalkylalkyl, alkylcycloalkyl and alkyl-cycloalkylalkyl. The carbocyclic groups therein include, for example, cyclopropyl, cyclobutyl, cyclopentyl, bicyclo[1.1.1]pentyl, cyclohexyl, spiro[3.3]-bicycloheptyl, cycloheptyl, cyclooctyl, etc.

In connection with the present invention, the term "fluoroalkyl" denotes a straight-chain or branched, saturated or unsaturated, preferably saturated, aliphatic hydrocarbon radical having 1 to 15 (i.e. 1, 2, 3, 4, 5, 6, 7, 8, 9, 10, 11, 12, 13, 14 or 15) carbon atoms which is substituted by one or more fluorine atoms. The radical is preferably perfluorinated.

"Halogen" in connection with the present invention stands for fluorine, chlorine, bromine or iodine, preferably for fluorine or chlorine.

The term "spacer group" or "spacer", generally denoted by "Sp" (or $Sp^{a/c/d/1/2/3}$) herein, is known to the person skilled in the art and is described in the literature, for example in Pure Appl. Chem. 73(5), 888 (2001) and C. Tschierske, G. Pelzl, S. Diele, Angew. Chem. (2004), 116, 6340-6368. In the present disclosure, the term "spacer group" or "spacer" denotes a connecting group, for example an alkylene group, which connects a mesogenic group to a polymerisable group. Whereas the mesogenic group generally contains rings, the spacer group generally contains no ring systems, i.e. is in chain form, where the chain may also be branched. The term chain is applied, for example, to an alkylene group. Substitutions on and in the chain, for example by —O— or —COO—, are generally also included.

The above preferred compounds of the formula I can in principle be prepared by the following illustrative synthetic routes (Schemes 1-3):

Scheme 1. Preparation of compounds of the formula I. The substituents are defined as in formula I. Sp denotes a spacer (branched or linear), so that the formulae correspondingly add up to give a compound of the formula I.
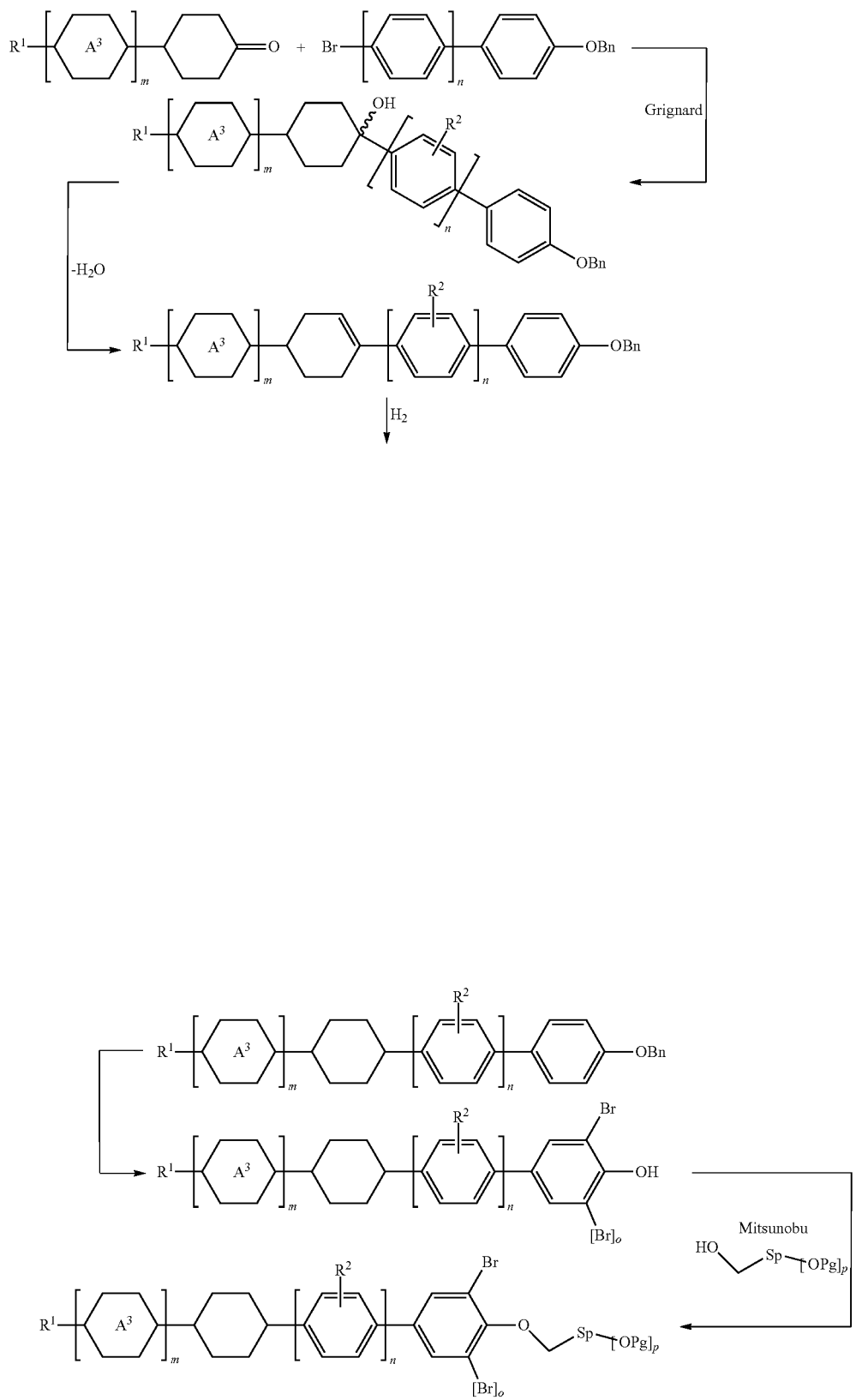

Scheme 2. Preparation of compounds of the formula I (continued from Scheme 1).
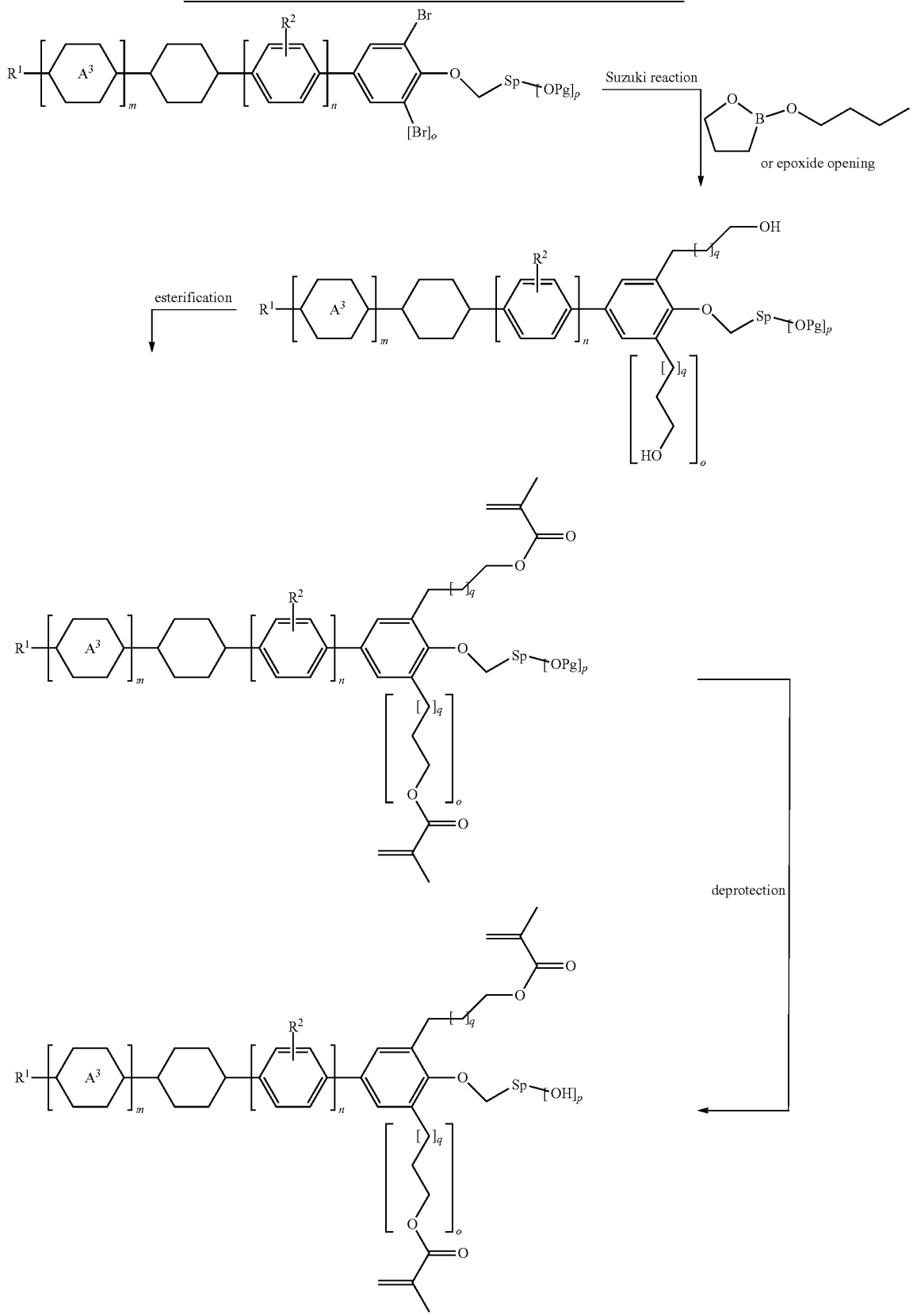

Scheme 3. Preparation of compounds of the formula I (part-synthesis of the anchor group in Scheme 1). $Pg^2$ = protecting group 2 = TBDMS, TIPS etc.; $R^3$ = H or alkyl radical having 1-8 C atoms.

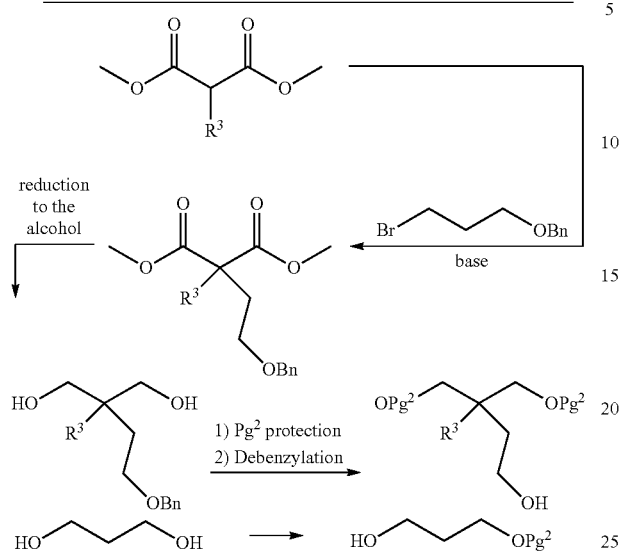

Besides the compounds of the formula I, the polymerisable component of the LC medium according to the invention preferably comprises further polymerisable or (partially) polymerised compounds. These are preferably conventional polymerisable compounds without an anchor group, preferably mesogenic compounds, in particular those which are suitable for the PSA technique. Polymerisable compounds which are preferred for this purpose are the structures indicated below for formula M and the sub-formulae thereof. The polymer formed therefrom is able to stabilise the alignment of the LC medium, optionally form a passivation layer and optionally generate a pre-tilt.

The LC media according to the invention therefore preferably comprise >0 to <5% by weight, particularly preferably 0.05 to 1% by weight and very particularly preferably 0.2 to 1% by weight of polymerisable compounds without an anchor group $R^a$, in particular compounds of the formula M as defined below and the preferred formulae falling thereunder.

The polymerisation of the polymerisable component(s) is carried out together or in part-steps under different polymerisation conditions. The polymerisation is preferably carried out under the action of UV light. In general, the polymerisation is initiated with the aid of a polymerisation initiator and UV light. In the case of the preferred acrylates, virtually complete polymerisation is achieved in this way. During the polymerisation, a voltage can optionally be applied to the electrodes of the cell or another electric field can be applied in order additionally to influence the alignment of the LC medium.

Particular preference is given to LC media according to the invention which, besides the compounds of the formula I, comprise further polymerisable or (partially) polymerised compounds (without an anchor group) and further self-alignment additives which are not polymerisable. These further non-polymerisable self-alignment additives are preferably those as described above, cf. formulae K and KA to KE.

The optionally present further monomers of the polymerisable component of the LC medium are preferably described by the following formula M:

$P^1$-$Sp^1$-$A^2$-$(Z^1$-$A^1)_n$-$Sp^2$-$P^2$        M in which the individual radicals have the following meanings:
$P^1$, $P^2$ each, independently of one another, denote a polymerisable group,
$Sp^1$, $Sp^2$ on each occurrence, identically or differently, denote a spacer group or a single bond,
$A^1$, $A^2$ each, independently of one another, denote a radical selected from the following groups:
  a) the group consisting of trans-1,4-cyclohexylene, 1,4-cyclohexenylene and 4,4'-bicyclohexylene, in which, in addition, one or more non-adjacent $CH_2$ groups may be replaced by —O— and/or —S— and in which, in addition, one or more H atoms may be replaced by a group L, or a radical of the formula

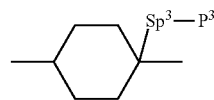

b) the group consisting of 1,4-phenylene and 1,3-phenylene, in which, in addition, one or two CH groups may be replaced by N and in which, in addition, one or more H atoms may be replaced by a group L or -$Sp^3$-P,
  c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L,
  d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

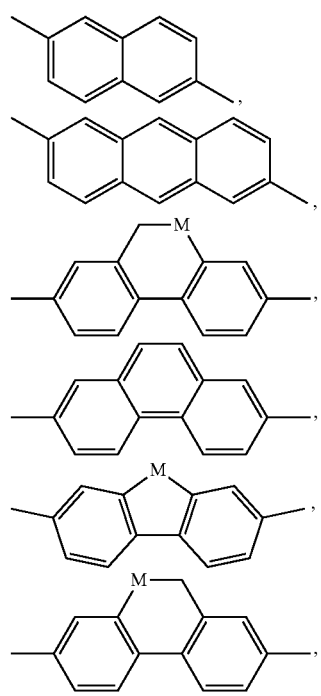

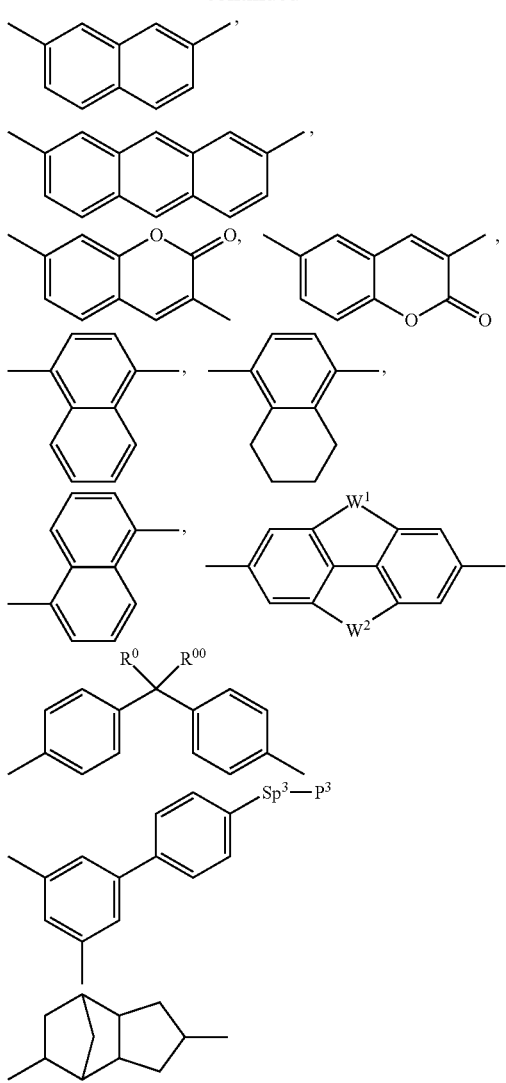

where, in addition, one or more H atoms in these radicals may be replaced by a group L or -Sp³-P, and/or one or more double bonds may be replaced by single bonds, and/or one or more CH groups may be replaced by N, P³ denotes a polymerisable group,
Sp³ denotes a spacer group,
n denotes 0, 1, 2 or 3, preferably 1 or 2,
Z¹ in each case, independently of one another, denotes —CO—O—, —O—CO—, —CH₂O—, —OCH₂—, —CF₂O—, —OCF₂—, or —(CH₂)ₙ—, where n is 2, 3 or 4, —O—, —CO—, —C(RᶜRᵈ)—, —CH₂CF₂—, —CF₂CF₂— or a single bond,
L on each occurrence, identically or differently, denotes F, Cl, CN, SCN, SF₅ or straight-chain or branched, in each case optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms,
R⁰, R⁰⁰ each, independently of one another, denote H, F or straight-chain or branched alkyl having 1 to 12 C atoms, in which, in addition, one or more H atoms may be replaced by F,
M denotes —O—, —S—, —CH₂—, —CHY¹— or —CY¹Y²—, and Y¹ and Y² each, independently of one another, have one of the meanings indicated above for R⁰ or denote Cl or CN or OCF₃, and preferably H, F, Cl, CN, OCF₃ or CF₃,
W¹, W² each, independently of one another, denote —CH₂CH₂—, —CH═CH—, —CH₂—O—, —O—CH₂—, —C(RᶜRᵈ)— or —O—,
Rᶜ and Rᵈ each, independently of one another, denote H or alkyl having 1 to 6 C atoms, preferably H, methyl or ethyl.
where one or more of the groups P¹—Sp¹-, -Sp²-P² and -Sp³-P³ may denote a radical Rᵃᵃ, with the proviso that at least one of the groups P¹—Sp¹-, -Sp²-P² and -Sp³-P³ present does not denote Rᵃᵃ,
Rᵃᵃ denotes H, F, Cl, CN or straight-chain or branched alkyl having 1 to 25 C atoms, in which, in addition, one or more non-adjacent CH₂ groups may each be replaced, independently of one another, by C(R⁰)═C(R⁰⁰)—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P¹—Sp¹-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals contain at least two C atoms and the branched radicals contain at least three C atoms), where the groups —OH, —NH₂, —SH, —NHR, —C(O)OH and —CHO are not present in Rᵃᵃ.

The polymerisable group P, P¹, P² or P³ in the formulae above and below is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C═C double bond or —C≡C— triple bond, and groups which are suitable for polymerisation with ring opening, such as, for example, oxetane or epoxide groups.

Preferred groups P/P¹/P²/P³ are selected from the group consisting of CH₂═CW¹—CO—O—, CH₂═CW¹—CO—,

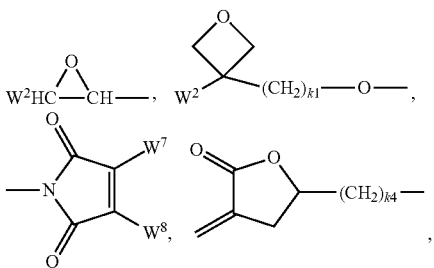

CH₂═CW²—(O)ₖ₃—, CW¹═CH—CO—(O)ₖ₃—, CH₃—CH═CH—O—, (CH₂═CH)₂CH—OCO—, (CH₂═CH—CH₂)₂CH—OCO—, (CH₂═CH)₂CH—O—, (CH₂═CH—CH₂)₂N—, (CH₂═CH—CH₂)₂N—CO—, CH₂═CH—(COO)ₖ₁-Phe-(O)ₖ₂—, CH₂═CH—(CO)ₖ₁-Phe-(O)ₖ₂—, Phe-CH═CH—, HOOC— and W⁴W⁵W⁶Si—, in which W¹ denotes H, F, Cl, CN, CF₃, phenyl or alkyl having 1 to 5 C atoms, in particular H, F, Cl or CH₃, W² and W³ each, independently of one another, denote H or alkyl having 1 to 5 C atoms, in particular H, methyl, ethyl or n-propyl, W⁴, W⁵ and W⁶ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups $P/P^1/P^2/P^3$ are selected from the group consisting of $CH_2=CW^1-CO-O-$, $CH_2=CW^1-CO-$,

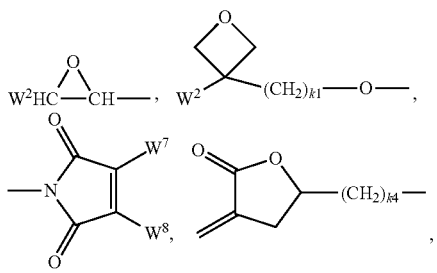

$CH_2=CW^2-O-$, $CW^1=CH-CO-(O)_{k3}-$, $(CH_2=CH)_2CH-OCO-$, $(CH_2=CHCH_2)_2CH-OCO-$, $(CH_2=CH)_2CH-O-$, $(CH_2=CH-CH_2)_2N-$, $(CH_2=CH-CH_2)_2NCO-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH— and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups $P/P^1/P^2/P^3$ are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

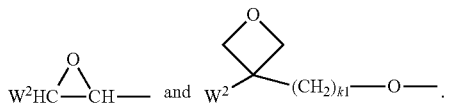

Very particularly preferred groups $P/P^1/P^2/P^3$ are therefore selected from the group consisting of acrylate, methacrylate, fluoroacrylate, furthermore vinyloxy, chloroacrylate, oxetane and epoxide groups, and of these in turn preferably an acrylate or methacrylate group.

Preferred spacer groups Sp, $Sp^1$, $Sp^2$ or $Sp^3$ are a single bond or selected from the formula Sp"-X", so that the radical $P^{1/2}$-$Sp^{1/2}$- conforms to the formula $P^{1/2}$-Sp"-X"— or P-Sp"-X"—, where Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —Si$(R^{00}R^{000})$—, —CO—, —CO—O—, —O—CO—, —O—CO—O—, —S—CO—, —CO—S—, —N($R^{00}$)—CO—O—, —O—CO—N($R^{00}$)—, —N($R^{00}$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N($R^{00}$)—, —N($R^{00}$)—CO—, —N($R^{00}$)—CO—N($R^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, $R^{00}$ in each case independently denotes alkyl having 1 to 12 C atoms, $R^{000}$ in each case independently denotes H or alkyl having 1 to 12 C atoms, and $Y^2$ and $Y^3$ each, independently of one another, denote H, F, Cl or CN.

X" is preferably —O—, —S—, —CO—, —COO—, —OCO—, —O—COO— or a single bond.

Typical spacer groups Sp" are, for example, a single bond, —(CH$_2$)$_{p1}$—, —O—(CH$_2$)$_{p1}$—, —(CH$_2$CH$_2$O)$_{q1}$—CH$_2$CH$_2$—, —CH$_2$CH$_2$—S—CH$_2$CH$_2$—, or —(SiR$^{00}$R$^{000}$—O)$_{p1}$—, in which p1 is an integer from 1 to 12, q1 is an integer from 1 to 3, and $R^{00}$ and $R^{000}$ have the meanings indicated above.

Particularly preferred groups -Sp"-X"— are —(CH$_2$)$_{p1}$—, —(CH$_2$)$_{p1}$—O—, —(CH$_2$)$_{p1}$—O—CO—, —(CH$_2$)$_{p1}$—O—CO—O—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethylene-oxyethylene, methyleneoxybutylene, ethylenethioethylene, ethylene-N-methyliminoethylene, 1-methylalkylene, ethenylene, propenylene and butenylene.

The substances of the formula M generally and preferably do not contain an anchor group, i.e. do not contain a group —OH, —NH$_2$, —SH, —C(O)OH or —CHO.

Suitable and preferred (co)monomers for use in displays according to the invention are selected, for example, from the following formulae:

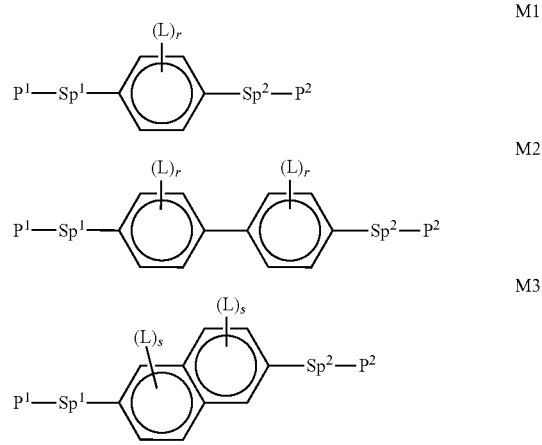

M4
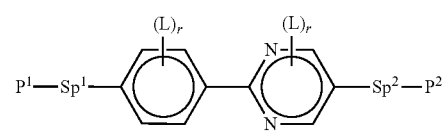
M5
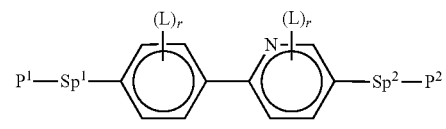
M6
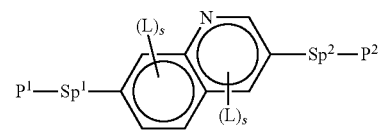
M7
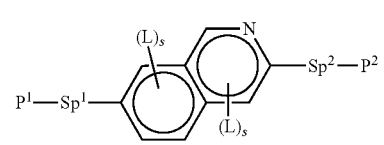
M8
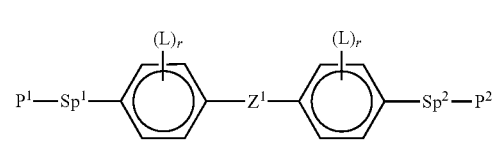
M9
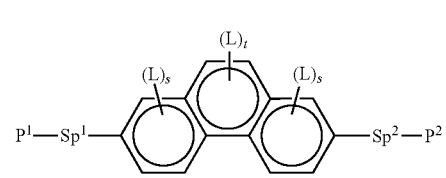
M10
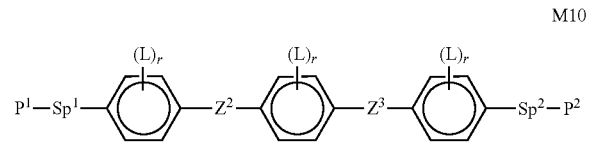
M11
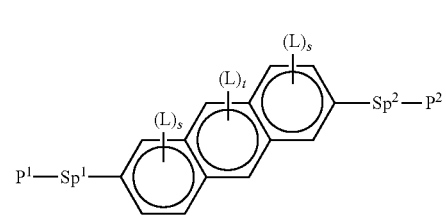
M12
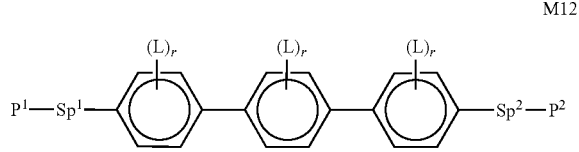
M13
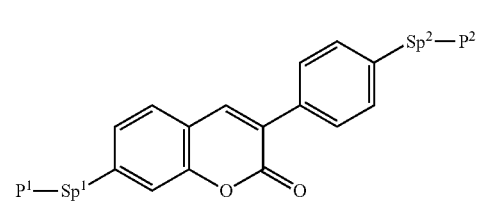
M14
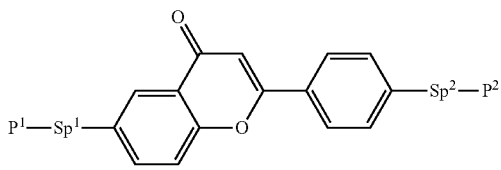
M15
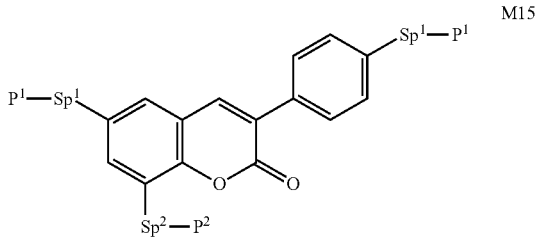
M16
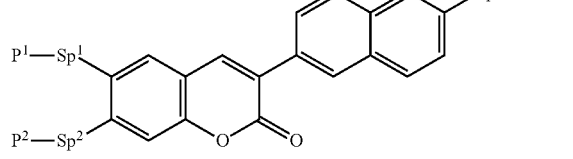
M17
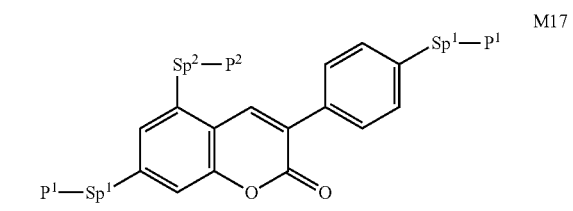
M18
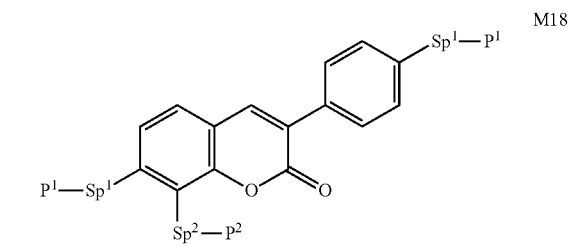
M19
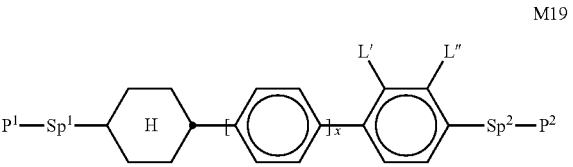
M20
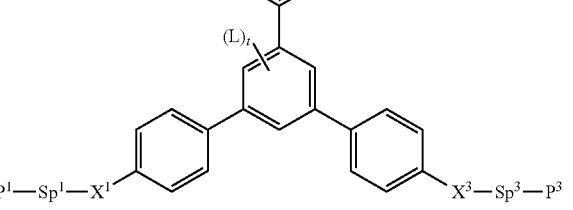

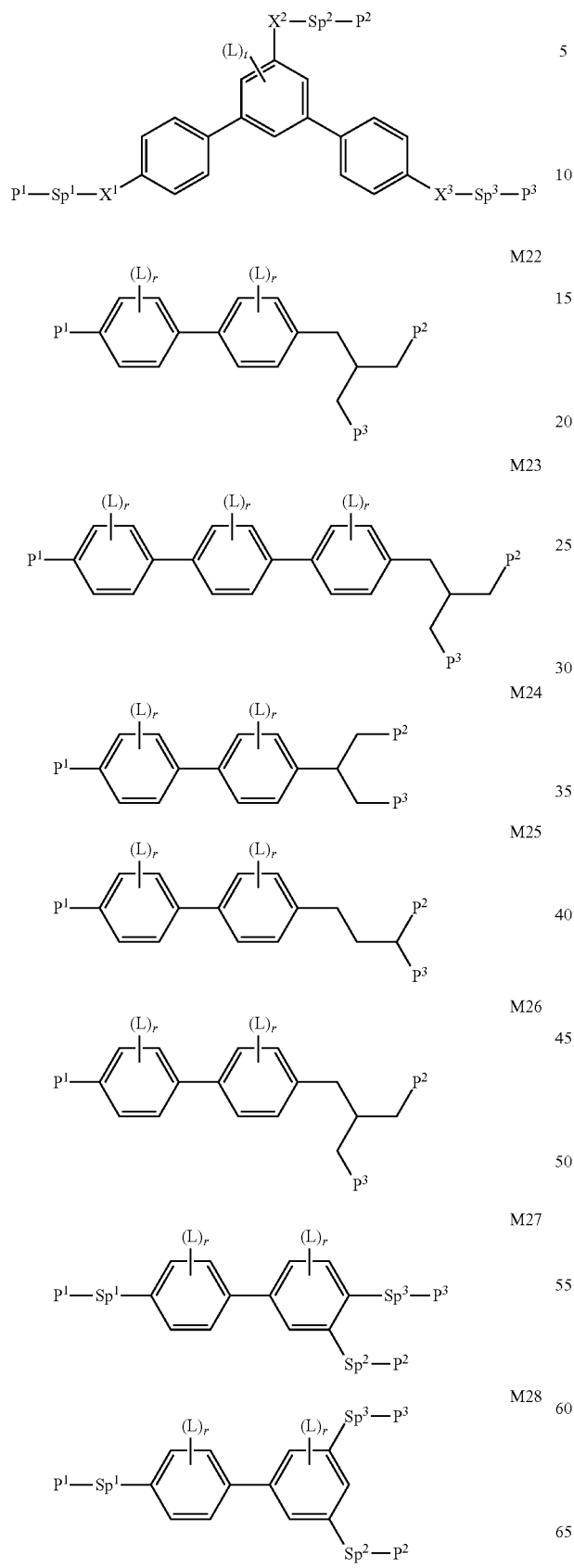

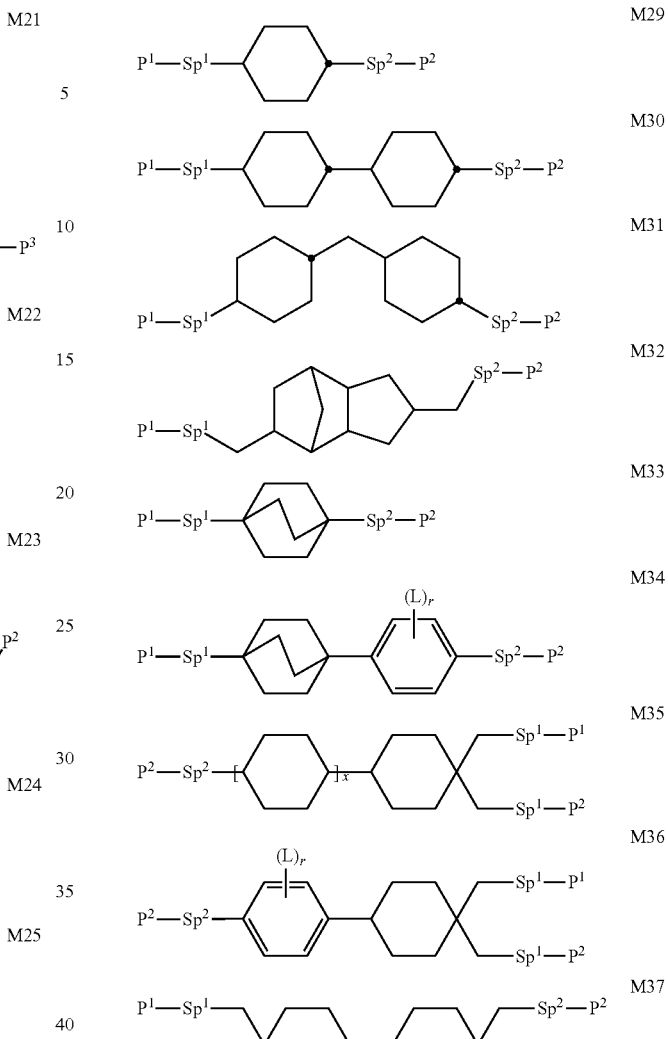

in which the individual radicals have the following meanings:

P$^1$, P$^2$ and P$^3$ each, independently of one another, denote a polymerisable group, preferably having one of the meanings indicated above and below for P, preferably an acrylate, methacrylate, fluoroacrylate, oxetane, vinyloxy or epoxide group, Sp$^1$, Sp$^2$ and Sp$^3$ each, independently of one another, denote a single bond or a spacer group, preferably having one of the meanings indicated above and below for M, and particularly preferably —(CH$_2$)$_{p1}$—, —(CH$_2$)$_{p1}$—O—, —(CH$_2$)$_{p1}$—CO—O— or —(CH$_2$)$_{p1}$—O—CO—O—, in which p1 is an integer from 1 to 12, and where the bonding to the adjacent ring in the last-mentioned groups takes place via the O atom, where, in addition, one or more of the radicals P$^1$-Sp$^1$-, P$^2$—Sp$^2$- and P$^3$—Sp$^3$- may denote a radical R$^{aa}$, with the proviso that at least one of the radicals P$^1$-Sp$^1$-, P$^2$—Sp$^2$- and P$^3$—Sp$^3$- present does not denote R$^{aa}$, R$^{aa}$ denotes H, F, Cl, CN or straight-chain or branched alkyl having 1 to 25 C atoms, in which, in addition, one or more nonadjacent CH$_2$ groups may each be replaced, independently of one another, by C(R$^0$)=C(R$^{00}$)—, —C≡C—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), where —OH, —$NH_2$, —SH, —NHR, —C(O)OH and —CHO are not present in the group $R^{aa}$, $R^0$, $R^{00}$ each, independently of one another and on each occurrence identically or differently, denote H or alkyl having 1 to 12 C atoms, $R^y$ and $R^z$ each, independently of one another, denote H, F, $CH_3$ or $CF_3$, $X^1$, $X^2$ and $X^3$ each, independently of one another, denote —CO—O—, O—CO— or a single bond, $Z^1$ denotes —O—, —CO—, —C($R^yR^z$)— or —$CF_2CF_2$—, $Z^2$ and $Z^3$ each, independently of one another, denote —CO—O—, —O—CO—, —$CH_2$O—, —O$CH_2$—, —$CF_2$O—, —O$CF_2$— or —$(CH_2)_n$—, where n is 2, 3 or 4, L on each occurrence, identically or differently, denotes F, Cl, CN, SCN, $SF_5$ or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

In the compounds of the formulae M1 to M42, the ring group

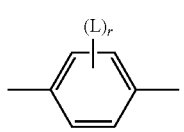

preferably denotes

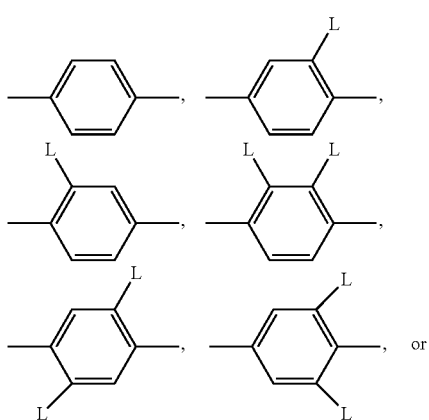

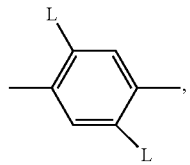

in which L, on each occurrence identically or differently, has one of the above meanings and preferably denotes F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp-, particularly preferably F, Cl, CN, $CH_3$, $C_2H_5$, $OCH_3$, $COCH_3$, $OCF_3$ or P-Sp-, very particularly preferably F, Cl, $CH_3$, $OCH_3$, $COCH_3$ or $OCF_3$, in particular F or $CH_3$.

The LC medium or the polymerisable component preferably comprises one or more compounds selected from the group of the formulae M1-M28, particularly preferably from the group of the formulae M2-M15, very particularly preferably from the group of the formulae M2, M3, M9, M14 and M15. The LC medium or the polymerisable component preferably comprises no compounds of the formula M10 in which $Z^2$ and $Z^3$ denote —(CO)O— or —O(CO)—.

For the production of PSA displays, the polymerisable compounds are polymerised or crosslinked (if a polymerisable compound contains two or more polymerisable groups) by in-situ polymerisation in the LC medium between the substrates of the LC display, optionally with application of a voltage. The polymerisation can be carried out in one step. It is also possible firstly to carry out the polymerisation with application of a voltage in a first step in order to produce a pretilt angle, and subsequently, in a second polymerisation step, to polymerise or crosslink the compounds which have not fully reacted in the first step without an applied voltage ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable component or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of the RMs or the polymerisable component, is preferably 10-10,000 ppm, particularly preferably 50-500 ppm.

Besides the self-alignment additives described above and the optional polymerisable compounds (M) described above, the LC media for use in the LC displays according to the invention comprise an LC mixture ("host mixture") comprising one or more, preferably two or more, low-molecularweight (i.e. monomeric or unpolymerised) compounds. The latter are stable or unreactive with respect to a polymerisation reaction under the conditions used for the polymerisation of the polymerisable compounds. In principle, any dielectrically negative or positive LC mixture which is suitable for use in conventional VA and VA-IPS displays is suitable as host mixture. The proportion of the host mixture for liquid-crystal displays is generally 95% by weight or more, preferably 97% by weight or more Suitable LC mixtures are known to the person skilled in the art and are described in the literature. LC media for VA displays having negative dielectric anisotropy are described, for example, in EP 1 378 557 A1 or WO 2013/004372.

Suitable LC mixtures having positive dielectric anisotropy which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521.

Preferred embodiments of the liquid-crystalline medium having negative dielectric anisotropy according to the invention are indicated below:

The LC medium preferably additionally comprises one or more compounds selected from the group of the compounds of the formulae A, B and C,

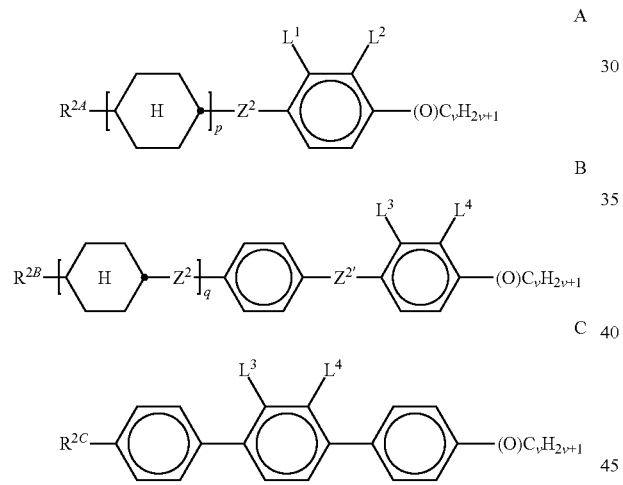

in which
R$^{2A}$, R$^{2B}$ and R$^{2C}$ each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

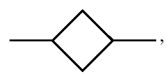

—C≡C—, —CH=CH—, —CF$_2$O—, —OCF$_2$—, —OC—O— or —O—CO— in such a way that O atoms are not linked directly to one another,
L$^{1-4}$ each, independently of one another, denote F, Cl, CF$_3$ or CHF$_2$,
Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF—, —CH=CHCH$_2$O—,
p denotes 1 or 2, preferably 1,
q denotes 0 or 1,
(O) denotes —O— or a single bond, and
v denotes 1 to 6.

In the compounds of the formulae A and B, Z$^2$ can have identical or different meanings. In the compounds of the formula B, Z$^2$ and Z$^{2'}$ can have identical or different meanings. In the compounds of the formulae A, B and C, R$^{2A}$, R$^{2B}$ and R$^{2C}$ each preferably denote alkyl having 1-6 C atoms, in particular CH$_3$, C$_2$H$_5$, n-C$_3$H$_7$, n-C$_4$H$_9$, n-C$_5$H$_{11}$.

In the compounds of the formulae A and B, L$^1$, L$^2$, L$^3$ and L$^4$ preferably denote L$^1$=L$^2$=F and L$^3$=L$^4$=F, furthermore L$^1$=F and L$^2$=Cl, L$^1$=Cl and L$^2$=F, L$^3$=F and L$^4$=Cl, L$^3$=Cl and L$^4$=F. Z$^2$ and Z$^{2'}$ in the formulae A and B preferably each, independently of one another, denote a single bond, furthermore a —C$_2$H$_4$— bridge.

If Z$^2$=—C$_2$H$_4$— in the formula B, Z$^{2'}$ is preferably a single bond, or if Z$^{2'}$=—C$_2$H$_4$—, Z$^2$ is preferably a single bond. In the compounds of the formulae A and B, (O)C$_V$H$_{2V+1}$ preferably denotes OC$_V$H$_{2V+1}$, furthermore C$_V$H$_{2V+1}$. In the compounds of the formula C, (O)C$_V$H$_{2V+1}$ preferably denotes C$_V$H$_{2V+1}$. In the compounds of the formula C, L$^3$ and L$^4$ preferably each denote F.

Preferred compounds of the formulae A, B and C are, for example:

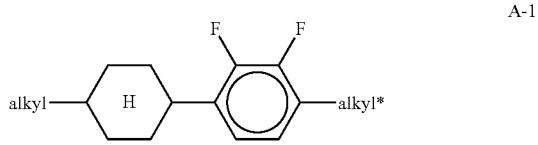

A-1

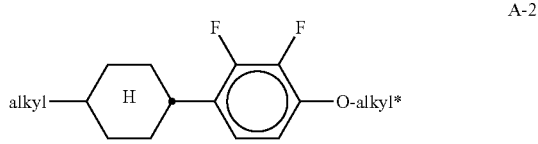

A-2

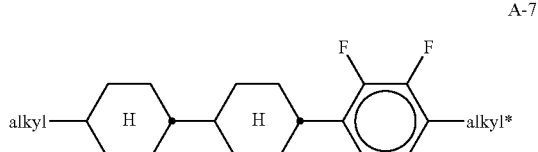

A-7

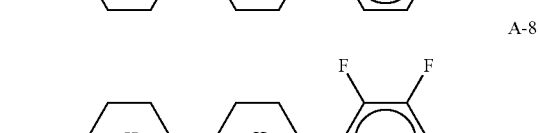

A-8

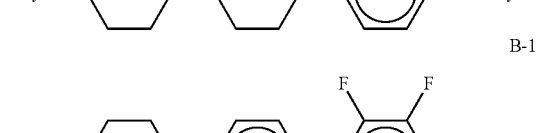

B-1

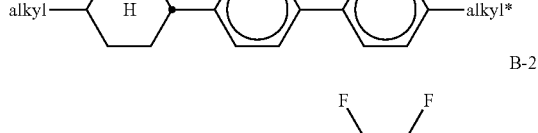

B-2

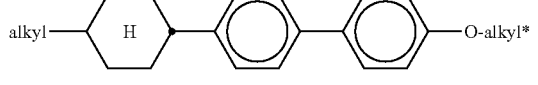

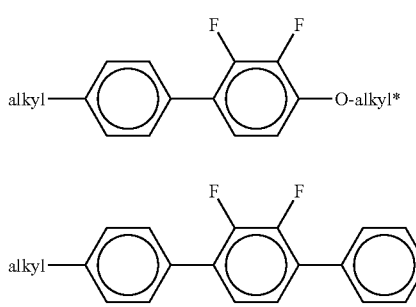

B-11

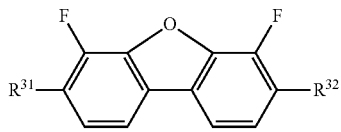

C-1 in which alkyl and alkyl* each, independently of one another, denote a straight-chain alkyl radical having 1-6 C atoms.

The LC medium preferably additionally comprises one or more compounds of the formula D,

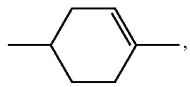

D in which $R^{31}$, $R^{32}$, independently of one another, denote an unsubstituted alkyl radical having 1 to 7 C atoms, preferably an n-alkyl radical, particularly preferably having 2 to 5 C atoms, or an unsubstituted alkoxy radical having 2 to 7 C atoms, particularly preferably having 2 to 5 C atoms, where preferably at least one of the radicals $R^{31}$ and $R^{32}$ denotes alkoxy.

The LC medium preferably has a Δε of −1.5 to −8.0, in particular of −2.5 to −6.0.

In a further preferred embodiment, the medium comprises one or more compounds of the formulae D-1 to D-3

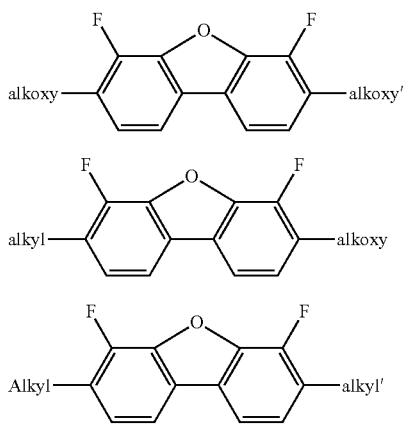

D-1

D-2

D-3 in which alkyl, alkyl' denote alkyl having 1 to 7 C atoms, preferably having 2-5 C atoms, and alkoxy, alkoxy' denote alkoxy having 1 to 7 C atoms, preferably having 2 to 5 C atoms.

The medium preferably comprises one or more compounds of the formula E:

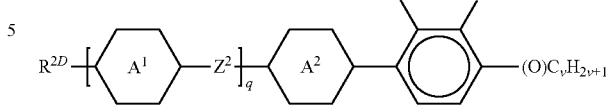

E in which $A^1$, $A^2$ independently denote a ring group selected from the formulae

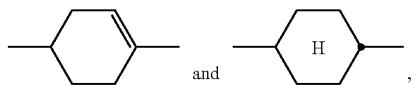

where formula D contains at least one group

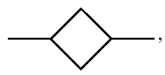

$R^{2D}$ independently denotes H, an alkyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—, —C≡C—, —$CF_2$O—, —O$CF_2$—, —OC—O— or —O—CO— in such a way that O atoms are not linked directly to one another, $L^5$, $L^6$ in each case, independently of one another, denote F, Cl, $CF_3$ or $CHF_2$, $Z^2$ independently denotes a single bond, —$CH_2CH_2$—, —CH═CH—, —$CF_2$O—, —O$CF_2$—, —$CH_2$O—, —O$CH_2$—, —COO—, —OCO—, —$C_2F_4$—, —CF═CF— or —CH═CH$CH_2$O—, q denotes 0 or 1, (O) denotes —O— or a single bond, and v denotes 1 to 6.

The values of the birefringence Δn in the liquid-crystal mixture are generally between 0.07 and 0.16, preferably between 0.08 and 0.12. The rotational viscosity $γ_1$ at 20° C. before the polymerisation is preferably ≤165 mPa·s, in particular ≤140 mPa·s.

Preferred embodiments of the liquid-crystalline medium according to the invention having negative or positive dielectric anisotropy are indicated below:

LC medium which additionally comprises one or more compounds of the formulae II and/or III:

enthält:

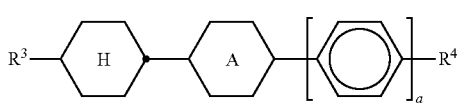

II

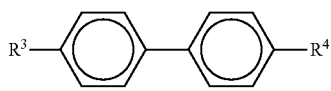

III in which
ring A denotes 1,4-phenylene or trans-1,4-cyclohexylene,
a is 0 or 1,
$R^3$ in each case, independently of one another, denotes alkyl having 1 to 9 C atoms or alkenyl having 2 to 9 C atoms, preferably alkenyl having 2 to 9 C atoms, and
$R^4$ in each case, independently of one another, denotes an unsubstituted or halogenated alkyl radical having 1 to 12 C atoms, where, in addition, one or two non-adjacent $CH_2$ groups may be replaced by —O—, —CH=CH—, —CH=CF—, —(CO)—, —O(CO)— or —(CO)O— in such a way that O atoms are not linked directly to one another, and preferably denotes alkyl having 1 to 12 C atoms or alkenyl having 2 to 9 C atoms.

The compounds of the formula II are preferably selected from the group consisting of the following formulae:

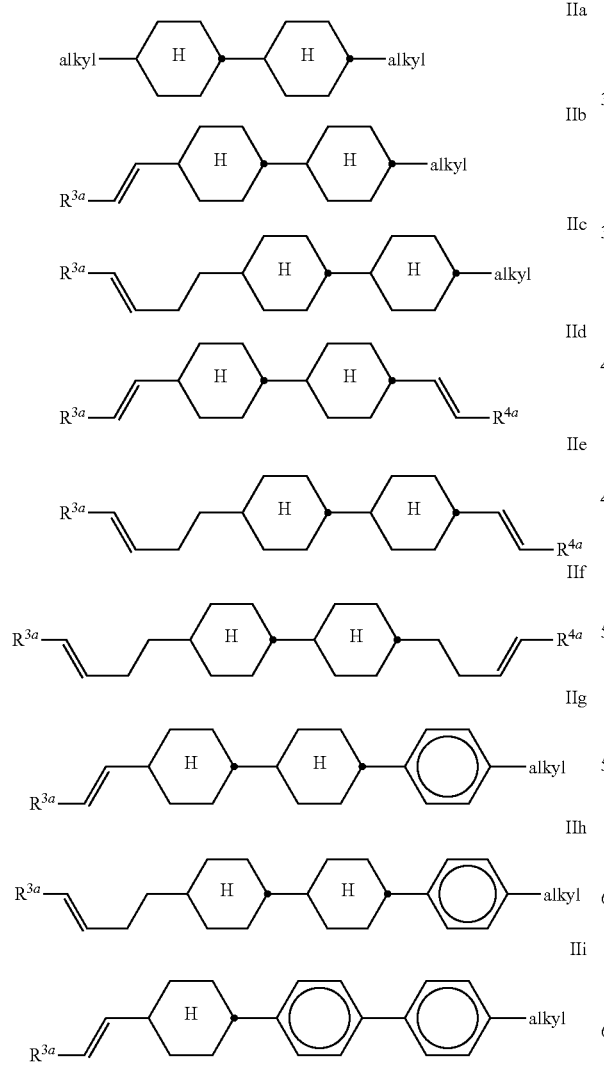

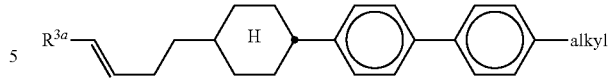

IIk in which $R^{3a}$ and $R^{4a}$ each, independently of one another, denote H, $CH_3$, $C_2H_5$ or $C_3H_7$, and "alkyl" in each case independently denotes a straight-chain alkyl group having 1 to 8, preferably 1, 2, 3, 4 or 5, C atoms. Particular preference is given to compounds of the formulae IIa, IIb and IIg, in particular those in which $R^{3a}$ denotes H or $CH_3$, preferably H, and compounds of the formula IId, in particular those in which $R^{3a}$ and $R^{4a}$ denote H, $CH_3$ or $C_2H_5$.

Preferred embodiments of the liquid-crystalline medium according to the invention having positive dielectric anisotropy are given below:

The LC medium preferably comprises one or more compounds of the formulae IV and V:

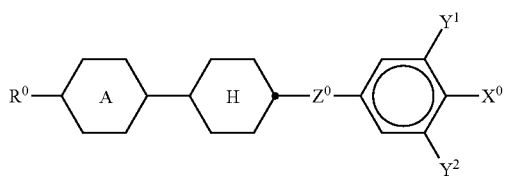

IV

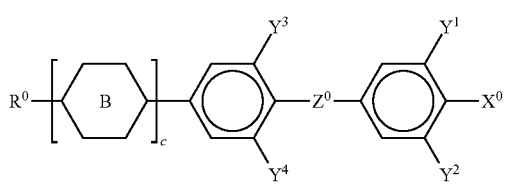

V in which
$R^0$ denotes an alkyl or alkoxy radical having 1 to 15 C atoms, in which, in addition, one or more $CH_2$ groups in these radicals are optionally substituted, independently of one another, by —C≡C—, —$CF_2$O—, —CH=CH—,

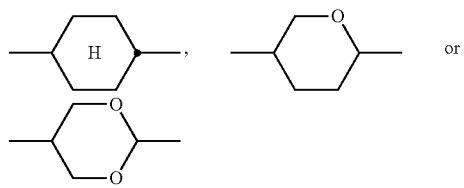

—O—, —(CO)O— or —O(CO)— in such a way that O atoms are not linked directly to one another, and in which, in addition, one or more H atoms may optionally be replaced by halogen,
ring A denotes

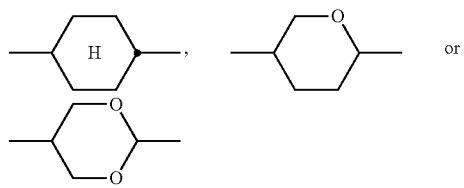

ring B, independently of one another, denotes 1,4-phenylene, optionally substituted by one or two F or Cl,

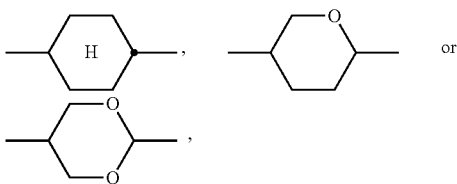 or

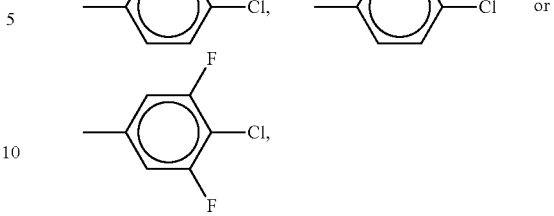

$X^0$ denotes F, Cl, CN, SF$_5$, SCN, NCS, a halogenated alkyl group, a halogenated alkenyl group, a halogenated alkoxy group or a halogenated alkenyloxy group, each having up to 6 C atoms, $Y^{1-4}$ each, independently of one another, denote H or F, $Z^0$ denotes —CF$_2$O—, —(CO)O— or a single bond, and c denotes 0, 1 or 2, preferably 1 or 2,

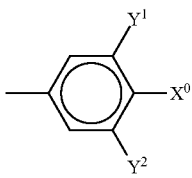

preferably denotes

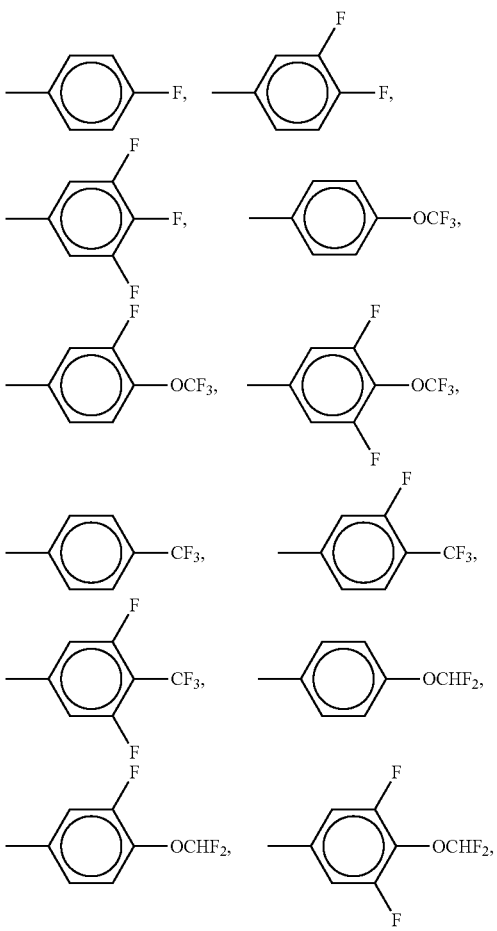

$R^0$ preferably denotes straight-chain alkyl or alkenyl having 2 to 7 C atoms, $X^0$ preferably denotes F, OCF$_3$, Cl or CF$_3$, in particular F.

The nematic phase of the dielectrically negative or positive LC medium in accordance with the invention preferably has a nematic phase in a temperature range from 10° C. or less to 60° C. or more, particularly preferably from 0 or less to 70° C. or more.

For the purposes of the present application, the two formulae for substituted benzene rings

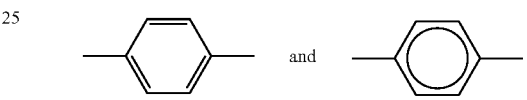

are equivalent. 1,4-substituted cyclohexane is represented by

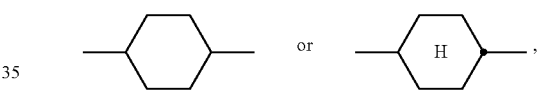

which is preferably in the 1,4-trans-configuration.

A phenylene ring of the formula

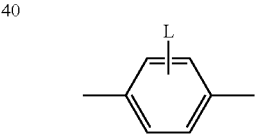

which is substituted by the group L is substituted by a group L at precisely one position as desired. Correspondingly, (L)$_r$ stands for a number r of substituents L at various free positions.

In the present invention and in particular in the following examples, the structures of the mesogenic compounds are indicated by abbreviations, which are also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl respectively, preferably 1-E-alkenyl, in each case having n, m or l C atoms respectively. Table A shows the codes used for the ring elements of the core structures of the compounds, while Table B shows the linking groups. Table C indicates the meanings of the codes for the end groups of the left-hand or right-hand side. The acronyms are composed of the codes for the ring elements with optional linking groups, followed by a first hyphen and the codes for the left-hand end group, and a second hyphen and the codes for the right-hand end group. Table D shows illustrative structures of compounds with their respective abbreviations.

TABLE A

Ring elements

TABLE A-continued

Ring elements tH2f 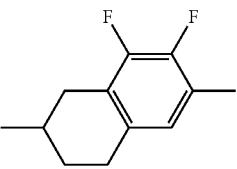   tH2fl 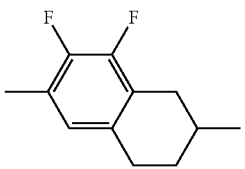

o2f 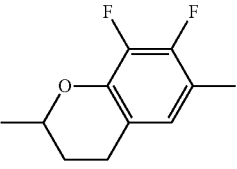   o2fl 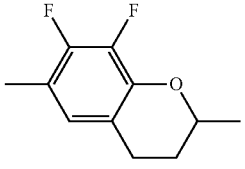

dh 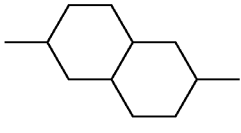   B 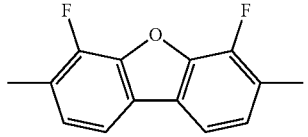

K 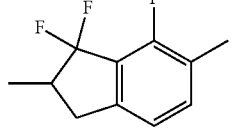   KI 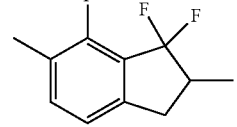

L 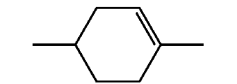   LI 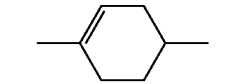

F 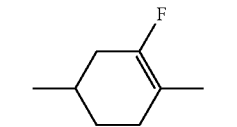   FI 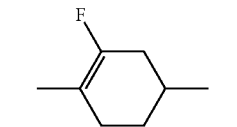

Nf 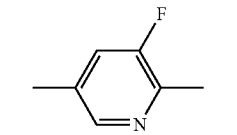   NFl 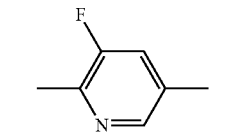

TABLE B

Bridging members

| | |
|---|---|
| E | —CH$_2$—CH$_2$— |
| V | —CH=CH— |
| T | —C≡C— |
| W | —CF$_2$—CF$_2$— |
| B | —CF=CF— |

TABLE B-continued

Bridging members

| | | | |
|---|---|---|---|
| Z | —CO—O— | ZI | —O—CO— |
| X | —CF=CH— | XI | —CH=CF— |
| O | —CH$_2$—O— | OI | —O—CH$_2$— |
| Q | —CF$_2$—O— | QI | —O—CF$_2$— |

TABLE C

End groups

| On the left individually or in combination | | On the right individually or in combination | |
|---|---|---|---|
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| -N- | N≡C— | -N | —C≡N |

TABLE C-continued

| End groups | | | |
|---|---|---|---|
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
|  |  | -OXF | —O—CH=CF2 |

| On the left only in combination | | On the right only in combination | |
|---|---|---|---|
| -...n...- | —C$_n$H$_{2n}$— | -...n... | —C$_n$H$_{2n}$— |
| -...M...- | —CFH— | -...M... | —CFH— |
| -...D...- | —CF$_2$— | -...D... | —CF$_2$— |
| -...V...- | —CH=CH— | -...V... | —CH=CH— |
| -...Z...- | —CO—O— | -...Z... | —CO—O— |
| -...Zl...- | —O—CO— | -...Zl... | —O—CO— |
| -...K...- | —CO— | -...K... | —CO— |
| -...W...- | —CF=CF— | -...W... | —CF=CF— |
|  |  | -...X... | —CH=CF— | in which n and m are each integers and the three dots "..." are placeholders for other abbreviations from this table.

The following table shows illustrative structures together with their respective abbreviations. These are shown in order to demonstrate the meaning of the rules for the abbreviations. Besides the compounds of the formula I, the mixtures according to the invention preferably comprise one or more compounds of the compounds mentioned below.

The following abbreviations are used:
(n, m and z, independently of one another, in each case an integer, preferably 1 to 6).

TABLE D

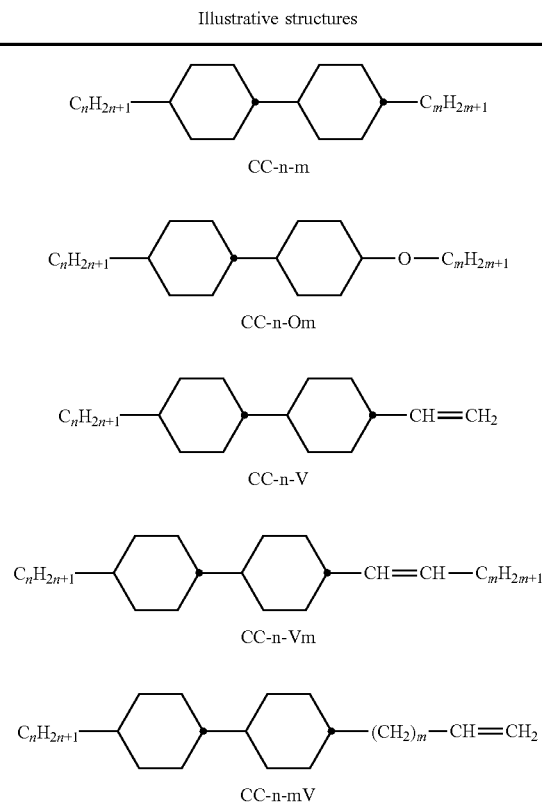

Illustrative structures

CC-n-m

CC-n-Om

CC-n-V

CC-n-Vm

CC-n-mV

TABLE D-continued
Illustrative structures
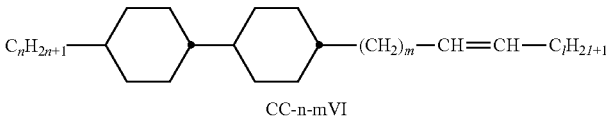
CC-n-mVl
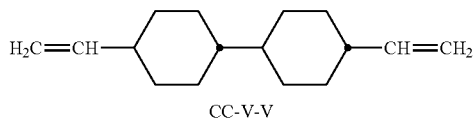
CC-V-V
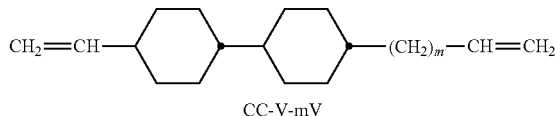
CC-V-mV
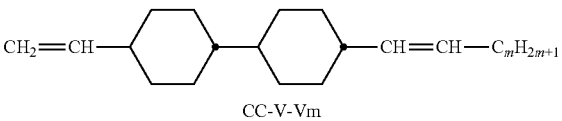
CC-V-Vm
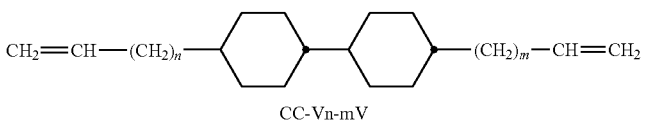
CC-Vn-mV
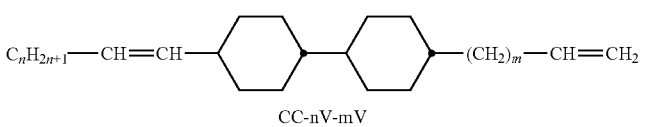
CC-nV-mV
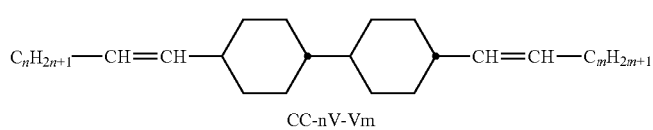
CC-nV-Vm
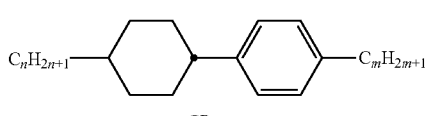
CP-n-m
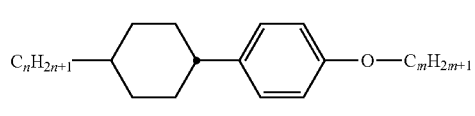
CP-n-Om
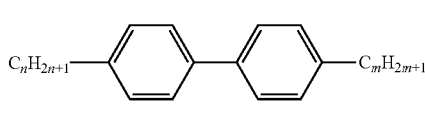
PP-n-m
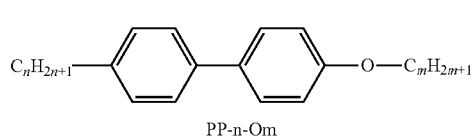
PP-n-Om TABLE D-continued
Illustrative structures
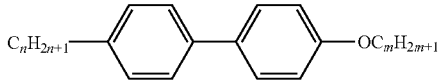
PP-n-Om
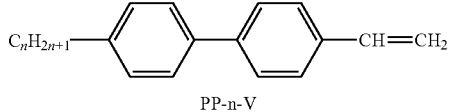
PP-n-V
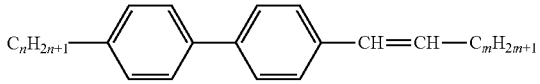
PP-n-Vm
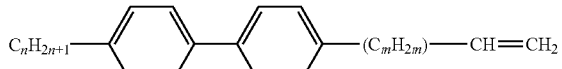
PP-n-mV
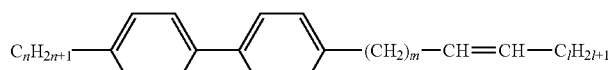
PP-n-mVl
CCP-n-m
CCP-n-Om
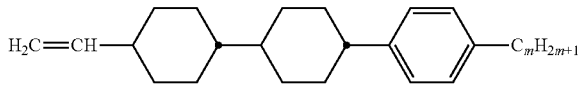
CCP-V-m
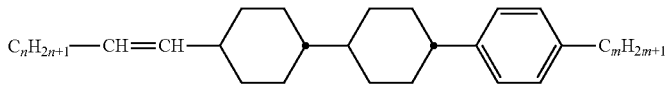
CCP-nV-m
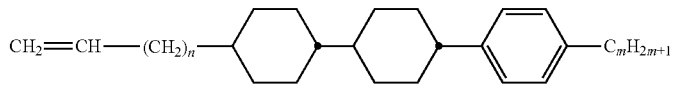
CCP-Vn-m
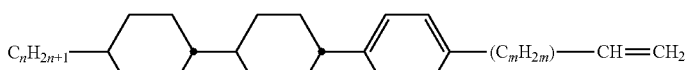
CCP-n-mV TABLE D-continued Illustrative structures $C_nH_{2n+1}$—CH=CH—$(CH_2)_m$—[Cy]—[Cy]—[Ph]—$C_lH_{2l+1}$
CCP-nVm-I $C_nH_{2n+1}$—[Cy]—[Ph]—[Ph]—$C_mH_{2m+1}$
CPP-n-m $C_nH_{2n+1}$—[Cy]—[Ph(F)]—[Ph]—$C_mH_{2m+1}$
CGP-n-m $C_nH_{2n+1}$—[Cy]—[Ph]—[Ph(F)]—$C_mH_{2m+1}$
CPG-n-m $C_nH_{2n+1}O$—[Cy]—[Ph]—[Ph]—$C_mH_{2m+1}$
CPP-nO-m $C_nH_{2n+1}$—[Cy]—[Ph]—[Ph]—$OC_mH_{2m+1}$
CPP-n-Om $H_2C$=CH—[Cy]—[Ph]—[Ph]—$C_mH_{2m+1}$
CPP-V-m $C_nH_{2n+1}$—CH=CH—[Cy]—[Ph]—[Ph]—$C_mH_{2m+1}$
CPP-nV-m $CH_2$=CH—$(C_nH_{2n})$—[Cy]—[Ph]—[Ph]—$C_mH_{2m+1}$
CPP-Vn-m $C_nH_{2n+1}$—CH=CH—$(C_mH_{2m})$—[Cy]—[Ph]—[Ph]—$C_lH_{2l+1}$
CPP-nVm-I $C_nH_{2n+1}$—[Ph]—[Ph(F)]—[Ph]—$C_mH_{2m+1}$
PGP-n-m TABLE D-continued
Illustrative structures
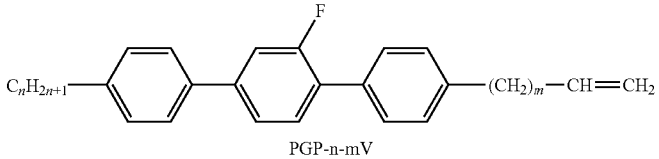
PGP-n-mV
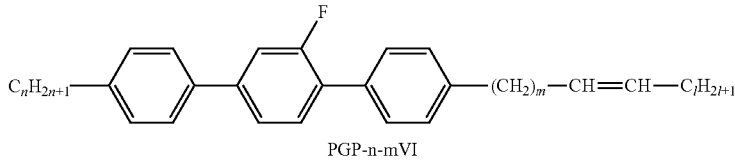
PGP-n-mVI
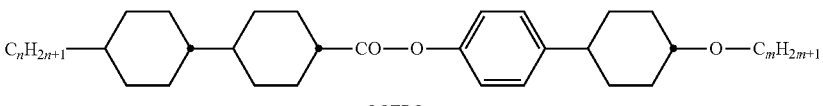
CCZPC-n-m
CPPC-n-m
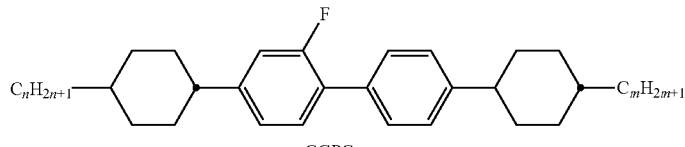
CGPC-n-m
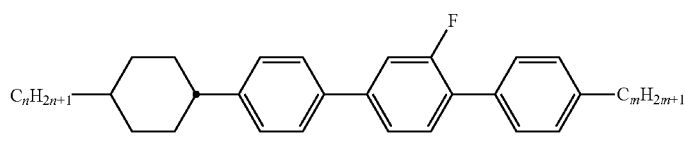
CPGP-n-m
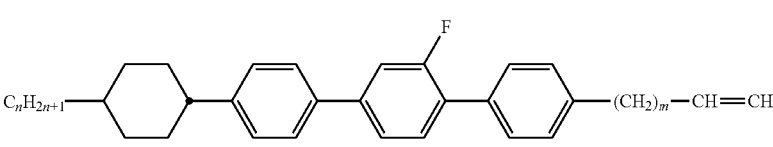
CPGP-n-mV
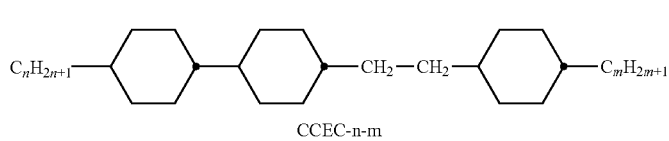
CCEC-n-m
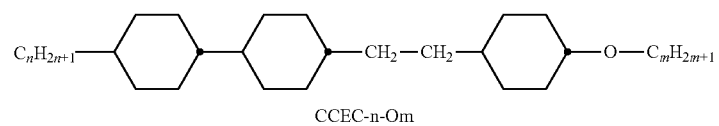
CCEC-n-Om
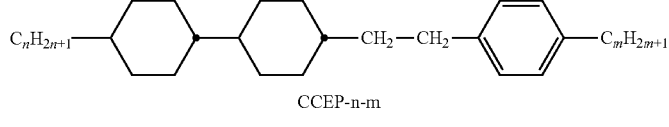
CCEP-n-m TABLE D-continued

| Illustrative structures |
|---|

$C_nH_{2n+1}$—[Cy]—[Cy]—$CH_2$—$CH_2$—[Ph]—O—$C_mH_{2m+1}$

CCEP-n-Om $C_nH_{2n+1}$—[Ph]—[Ph(F)]—[Ph(F)]—[Ph]—$C_mH_{2m+1}$

PGIGP-n-m $CH_2$=CH—[Cy]—[Ph(F,F)]—$C_nH_{2n+1}$

CY-V-n $CH_2$=CH—[Cy]—[Ph(F,F)]—O—$C_nH_{2n+1}$

CY-V-On $C_nH_{2n+1}$—CH=CH—[Cy]—[Ph(F,F)]—$C_mH_{2m+1}$

CY-nV-m $C_nH_{2n+1}$—CH=CH—[Cy]—[Ph(F,F)]—O—$C_mH_{2m+1}$

CY-nV-Om $CH_2$=CH—$C_nH_{2n}$—[Cy]—[Ph(F,F)]—$C_mH_{2m+1}$

CY-Vn-m $CH_2$=CH—$C_nH_{2n}$—[Cy]—[Ph(F,F)]—O—$C_mH_{2m+1}$

CY-Vn-Om $C_nH_{2n+1}$—CH=CH—$(CH_2)_m$—[Cy]—[Ph(F,F)]—$C_lH_{2l+1}$

CY-nVm-l

TABLE D-continued
Illustrative structures
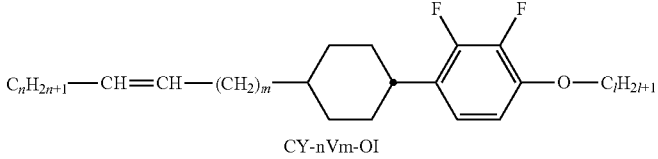
CY-nVm-OI
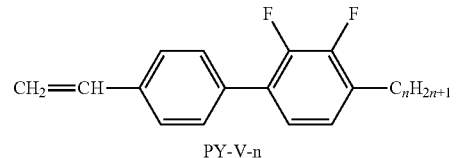
PY-V-n
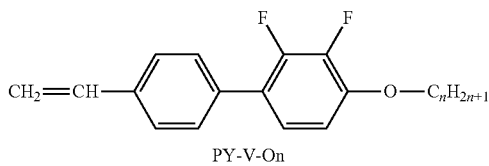
PY-V-On
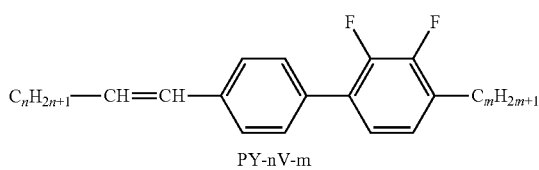
PY-nV-m
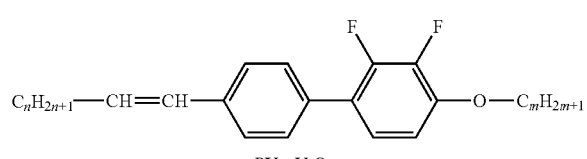
PY-nV-Om
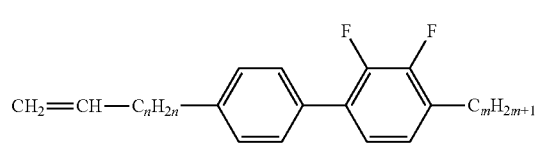
PY-Vn-m
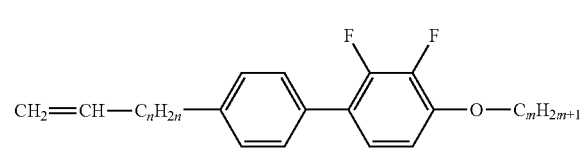
PY-Vn-Om
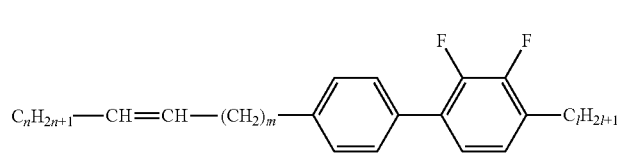
PY-nVm-I
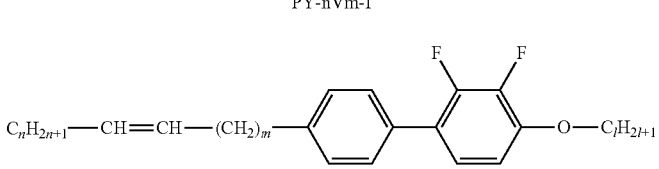
PY-nVm-OI TABLE D-continued
Illustrative structures
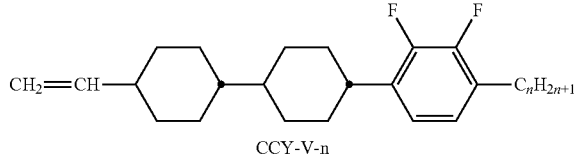
CCY-V-n
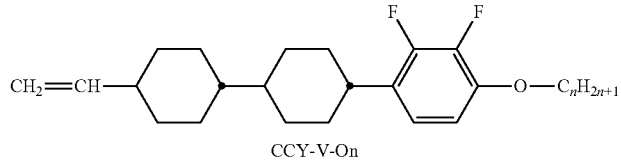
CCY-V-On
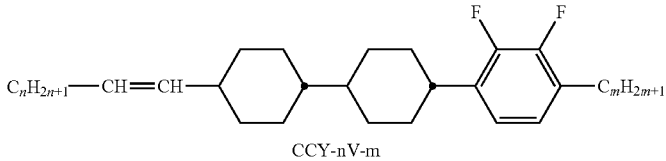
CCY-nV-m
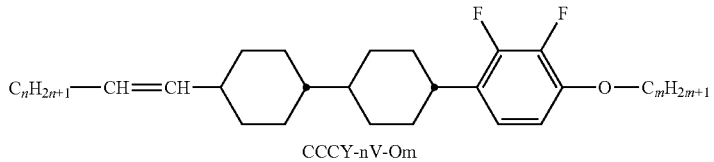
CCCY-nV-Om
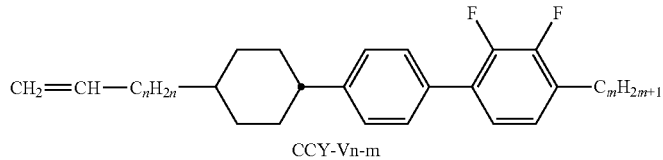
CCY-Vn-m
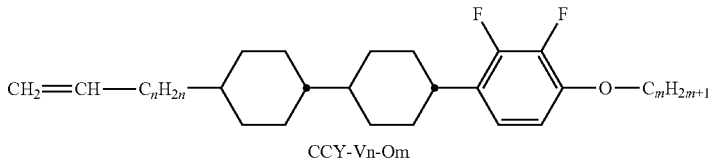
CCY-Vn-Om
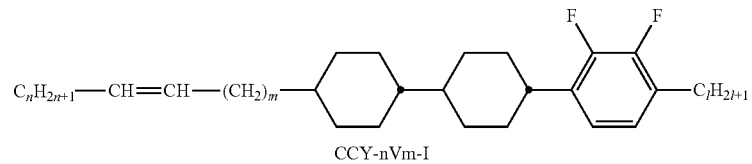
CCY-nVm-l
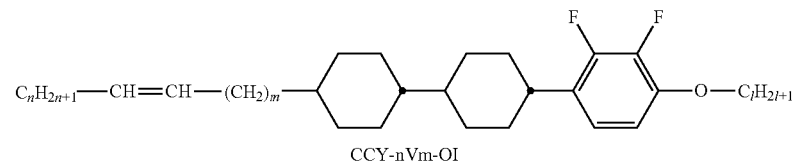
CCY-nVm-Ol
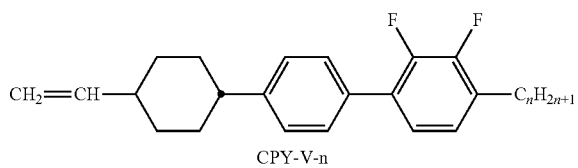
CPY-V-n TABLE D-continued Illustrative structures CH₂=CH—[Cy]—[Ph]—[Ph(2,3-F₂)]—O—C$_n$H$_{2n+1}$
CPY-V-On C$_n$H$_{2n+1}$—CH=CH—[Cy]—[Ph]—[Ph(2,3-F₂)]—C$_m$H$_{2m+1}$
CPY-nV-m C$_n$H$_{2n+1}$—CH=CH—[Cy]—[Ph]—[Ph(2,3-F₂)]—O—C$_m$H$_{2m+1}$
CPY-nV-Om CH₂=CH—C$_n$H$_{2n}$—[Cy]—[Ph]—[Ph(2,3-F₂)]—C$_m$H$_{2m+1}$
CPY-Vn-m CH₂=CH—C$_n$H$_{2n}$—[Cy]—[Ph]—[Ph(2,3-F₂)]—O—C$_m$H$_{2m+1}$
CPY-Vn-Om C$_n$H$_{2n+1}$—CH=CH—(CH₂)$_m$—[Cy]—[Ph]—[Ph(2,3-F₂)]—C$_l$H$_{2l+1}$
CPY-nVm-l C$_n$H$_{2n+1}$—CH=CH—(CH₂)$_m$—[Cy]—[Ph]—[Ph(2,3-F₂)]—O—C$_l$H$_{2l+1}$
CPY-nVm-Ol C$_n$H$_{2n+1}$—[Cy]—[Ph(2,3-F₂)]—C$_m$H$_{2m+1}$
CY-n-m C$_n$H$_{2n+1}$—[Cy]—[Ph(2,3-F₂)]—O—C$_m$H$_{2m+1}$
CY-n-Om TABLE D-continued
Illustrative structures
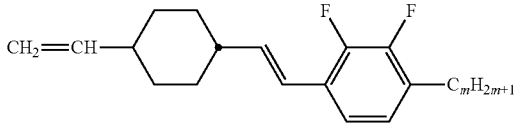
CVY-n-m
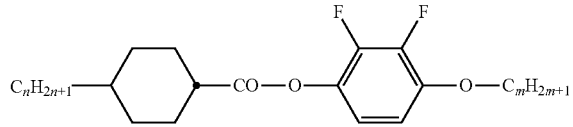
CZY-n-Om
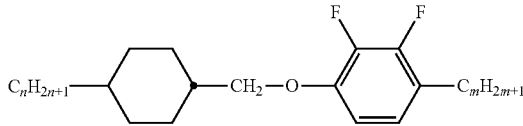
COY-n-m
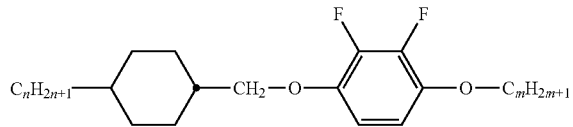
COY-n-Om
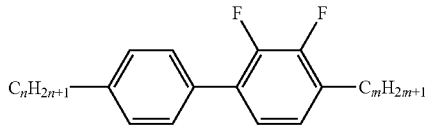
PY-n-m
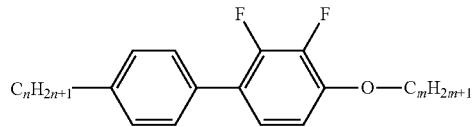
PY-n-Om
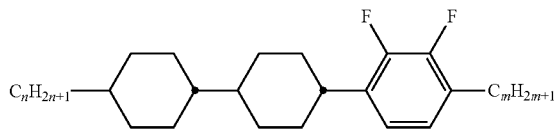
CCY-n-m
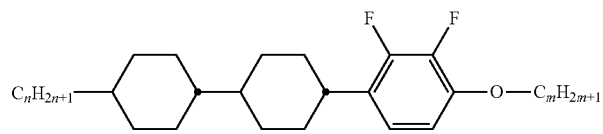
CCY-n-Om
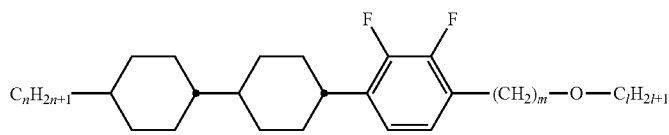
CCY-n-mOl TABLE D-continued Illustrative structures CCZY-n-Om CCOY-n-m CCOY-n-Om CPY-n-m CPY-n-Om PYP-n-m CP(F, Cl)-n-Om CLY-n-m CLY-n-Om TABLE D-continued
Illustrative structures
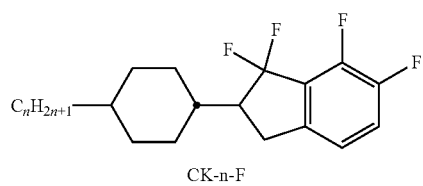
CK-n-F
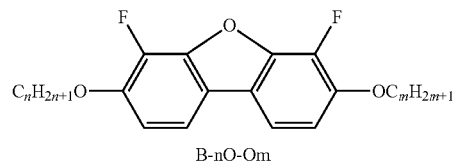
B-nO-Om
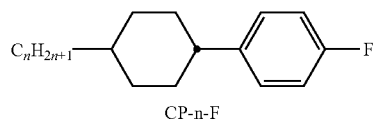
CP-n-F
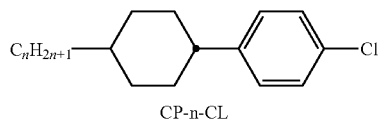
CP-n-CL
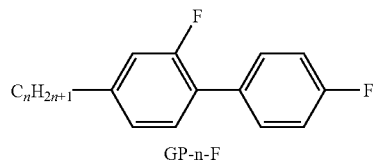
GP-n-F
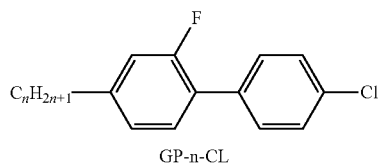
GP-n-CL
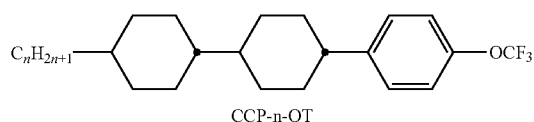
CCP-n-OT
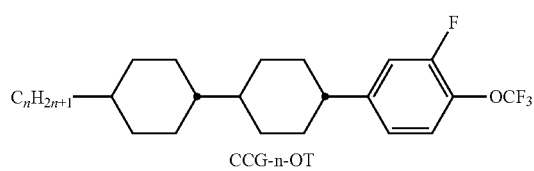
CCG-n-OT
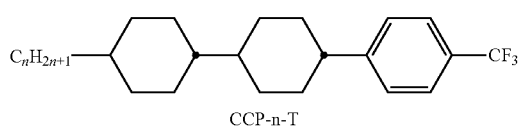
CCP-n-T TABLE D-continued
Illustrative structures
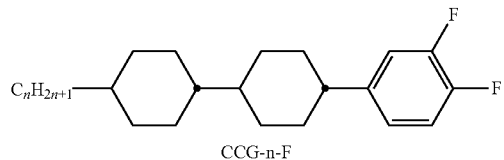
CCG-n-F
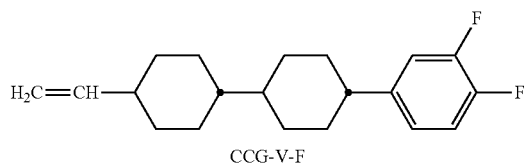
CCG-V-F
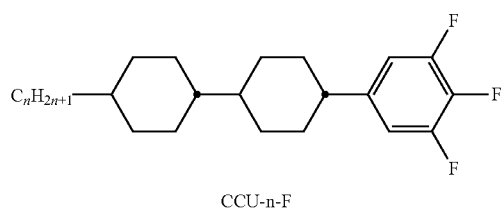
CCU-n-F
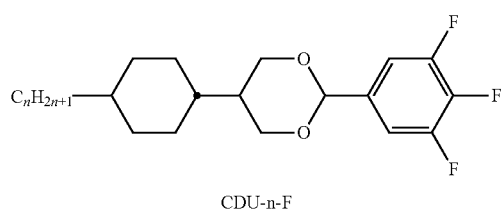
CDU-n-F
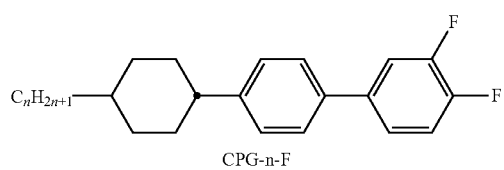
CPG-n-F
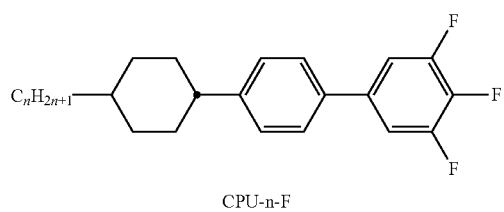
CPU-n-F
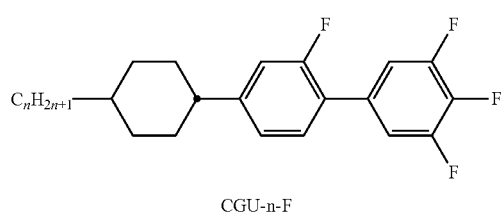
CGU-n-F TABLE D-continued
Illustrative structures
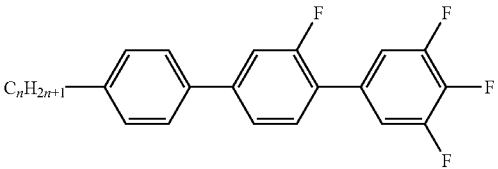
PGU-n-F
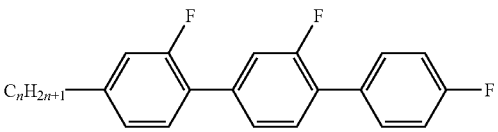
GGP-n-F
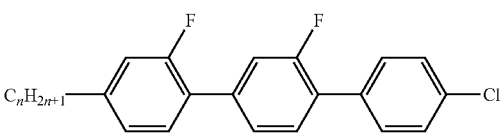
GGP-n-CL
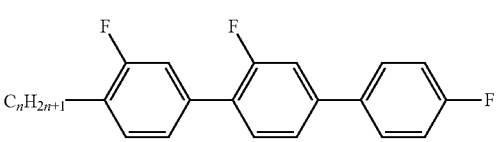
PGIGI-n-F
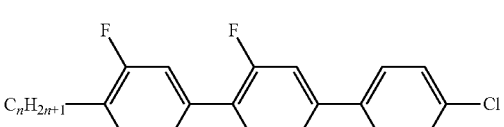
PGIGI-n-CL
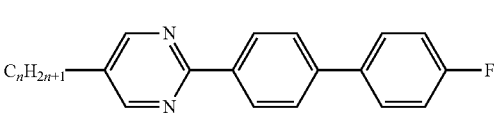
MPP-n-F
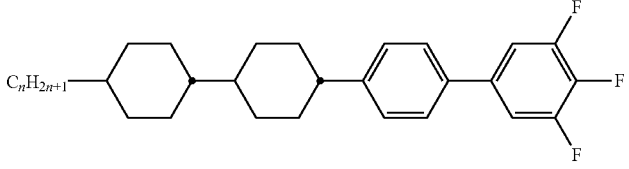
CCPU-n-F
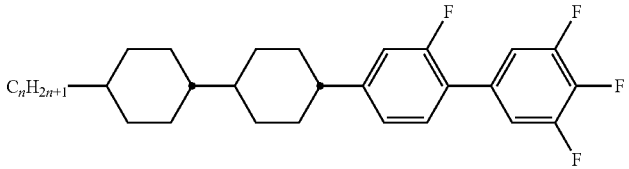
CCGU-n-F TABLE D-continued
Illustrative structures
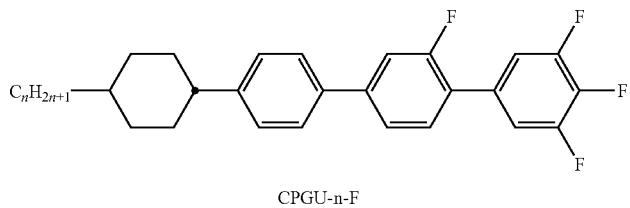
CPGU-n-F
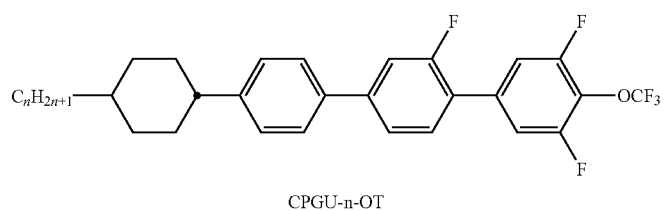
CPGU-n-OT
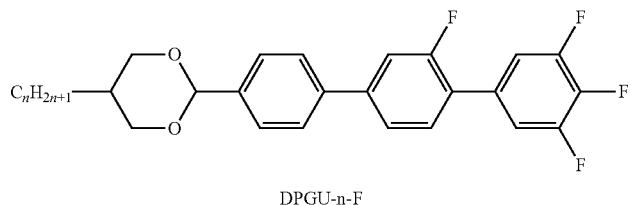
DPGU-n-F
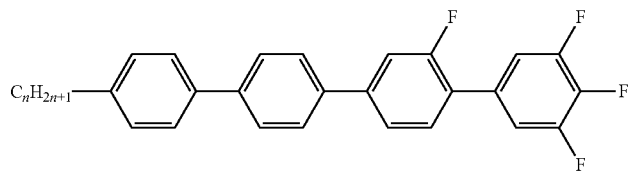
PPGU-n-F
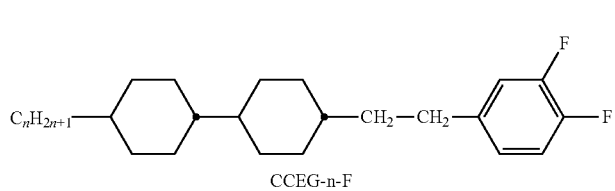
CCEG-n-F
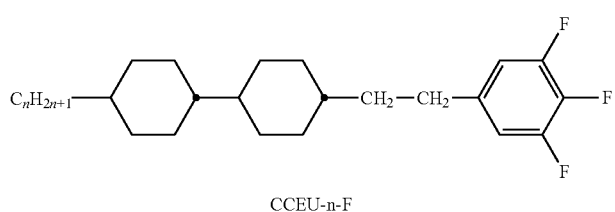
CCEU-n-F
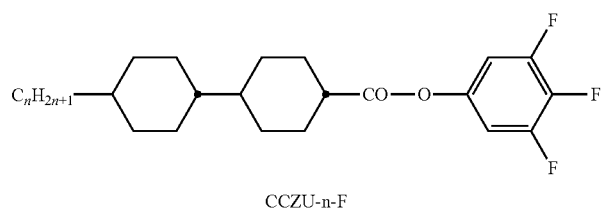
CCZU-n-F TABLE D-continued
Illustrative structures
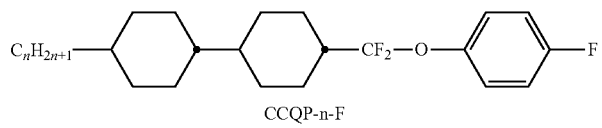
CCQP-n-F
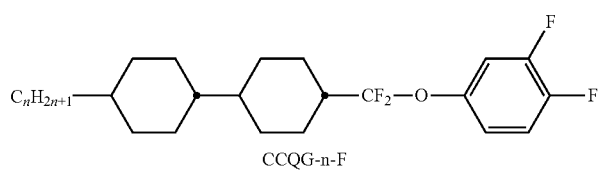
CCQG-n-F
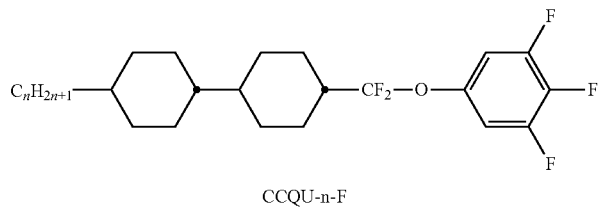
CCQU-n-F
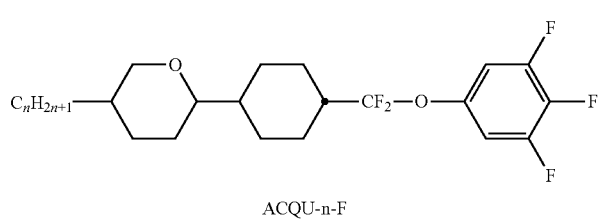
ACQU-n-F
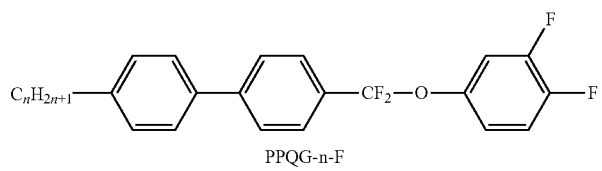
PPQG-n-F
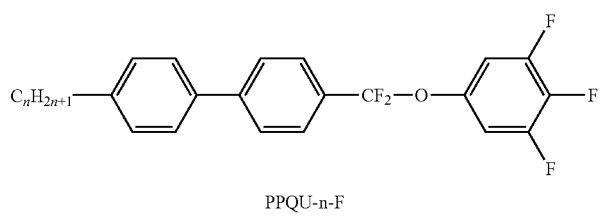
PPQU-n-F
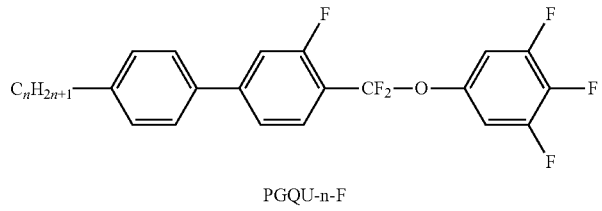
PGQU-n-F
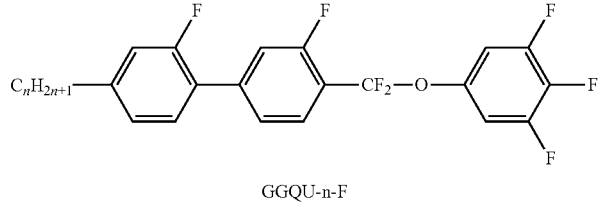
GGQU-n-F TABLE D-continued
Illustrative structures
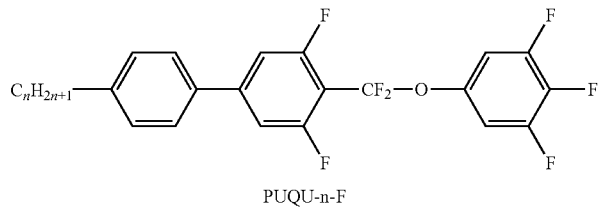
PUQU-n-F
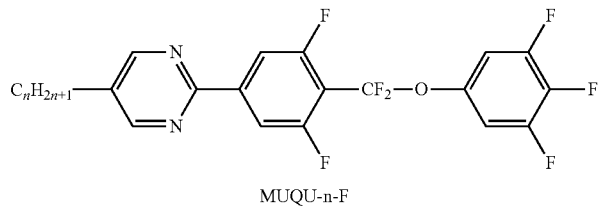
MUQU-n-F
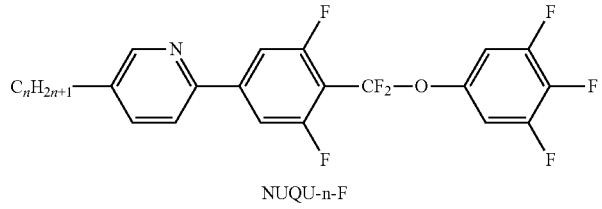
NUQU-n-F
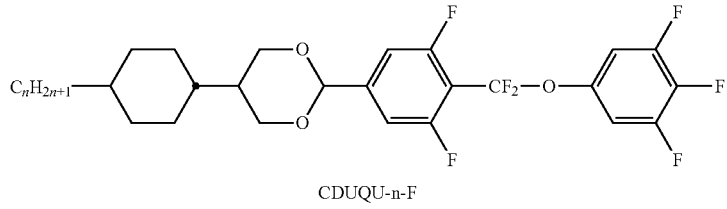
CDUQU-n-F
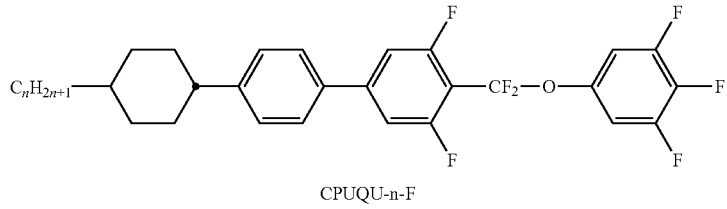
CPUQU-n-F
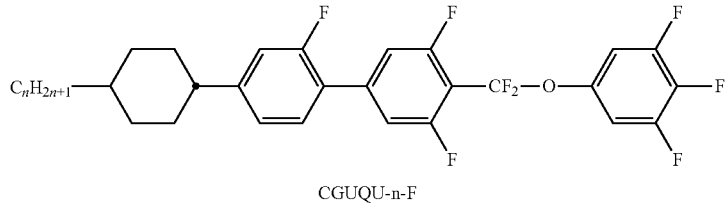
CGUQU-n-F
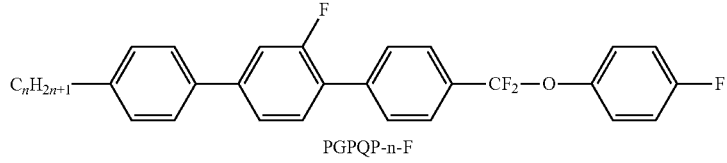
PGPQP-n-F TABLE D-continued
Illustrative structures
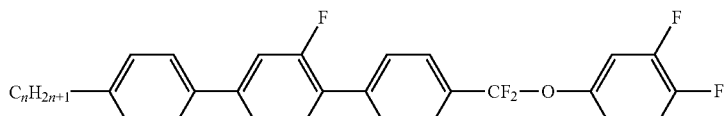
PGPQG-n-F
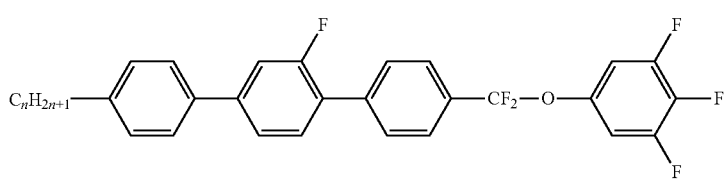
PGPQU-n-F
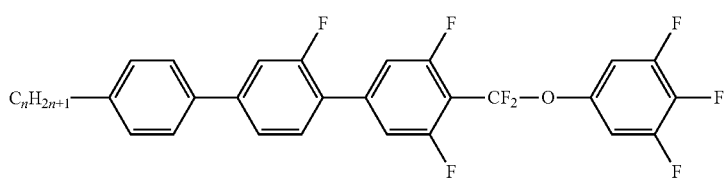
PGUQU-n-F
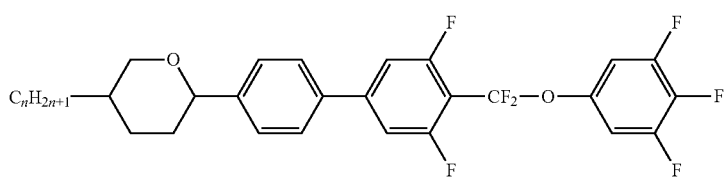
APUQU-n-F
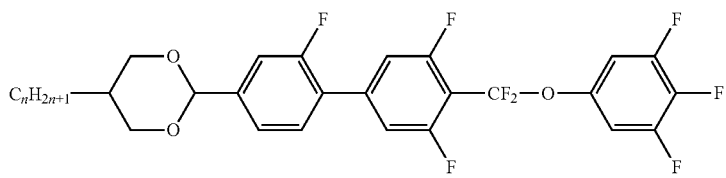
DGUQU-n-F
TABLE E
Table E shows possible chiral dopants which can be added to the LC media according to the invention.
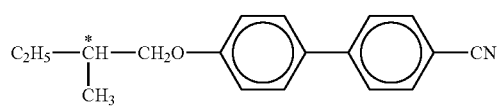
C 15
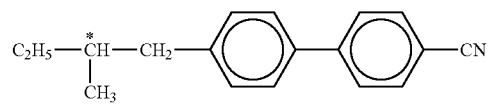
CB 15

TABLE E-continued
Table E shows possible chiral dopants which can be added to the LC media according to the invention.
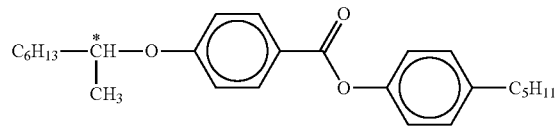
CM 21
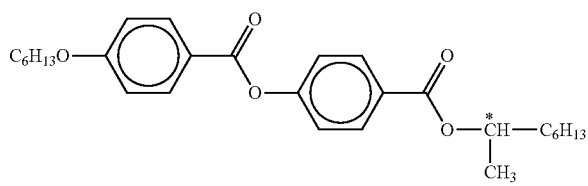
R/S-811
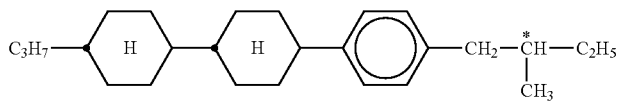
CM 44
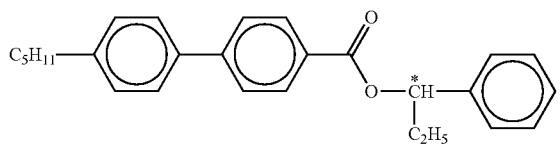
CM 45
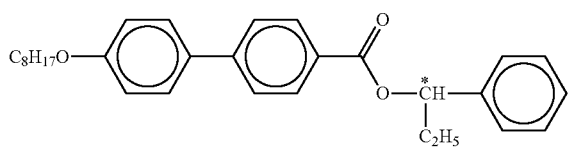
CM 47
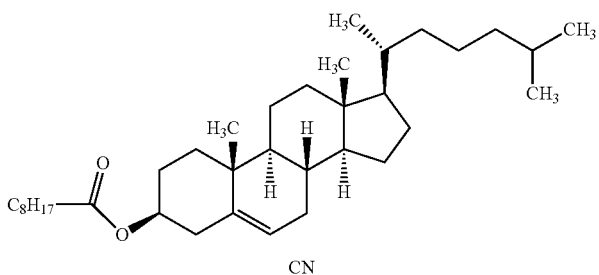
CN
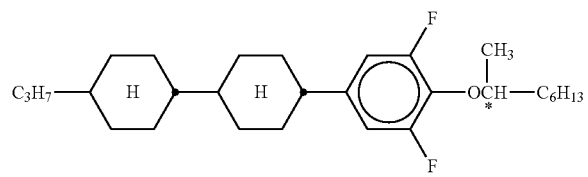
R/S-2011

TABLE E-continued

Table E shows possible chiral dopants which can be added to the LC media according to the invention.

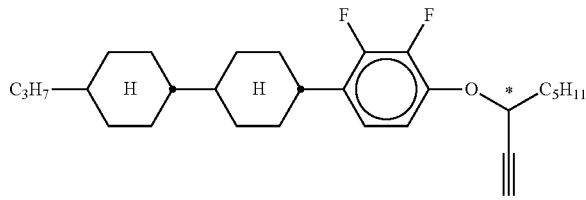

R/S-3011

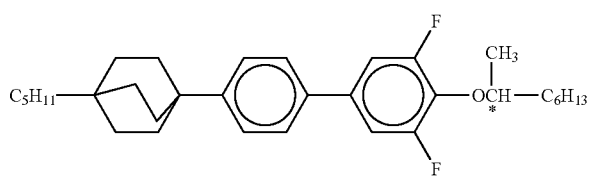

R/S-4011

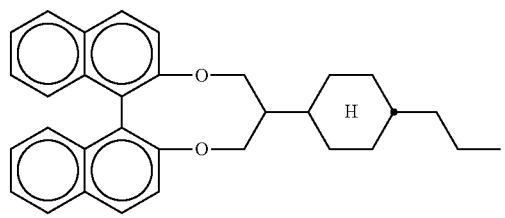

R/S-5011

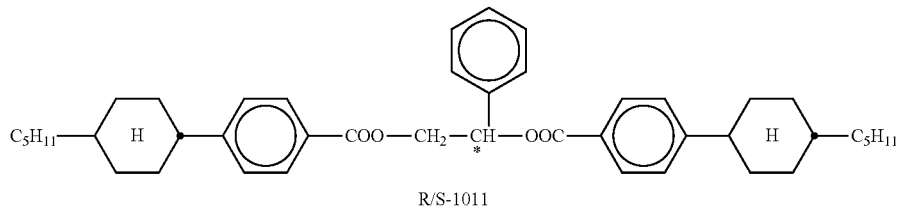

R/S-1011

The LC media optionally comprise 0 to 10% by weight, in particular 0.01 to 5% by weight, particularly preferably 0.1 to 3% by weight, of dopants, preferably selected from the group consisting of compounds from Table E.

TABLE F

Table F indicates possible stabilisers which can be added to the LC media according to the invention.
(n here donotes an integer from 1 to 12, preferably 1, 2, 3, 4, 5, 6, 7 or 8, terminal methyl groups are not shown).

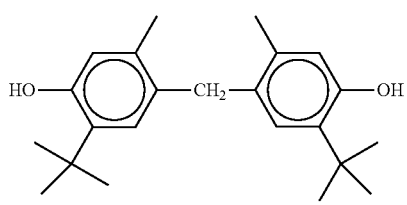

TABLE F-continued
Table F indicates possible stabilisers which can be added to the LC media according to the invention.
(n here donotes an integer from 1 to 12, preferably 1, 2, 3, 4, 5, 6, 7 or 8, terminal methyl groups are not shown).
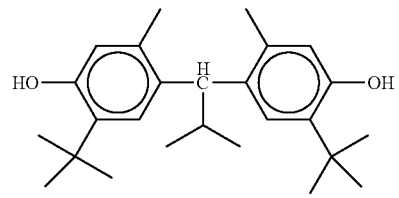
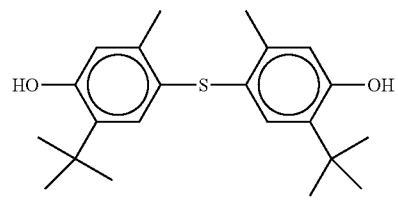
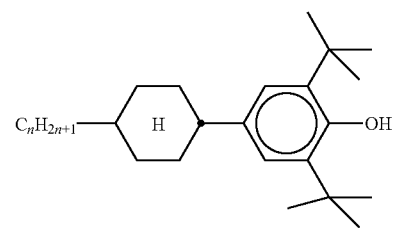
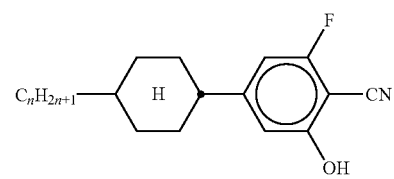
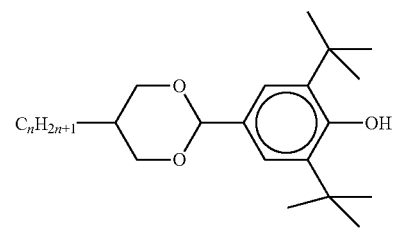
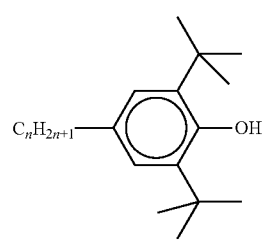
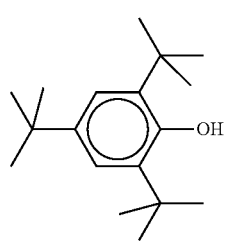

TABLE F-continued
Table F indicates possible stabilisers which can be added to the LC media according to the invention.
(n here donotes an integer from 1 to 12, preferably 1, 2, 3, 4, 5, 6, 7 or 8, terminal methyl groups are not shown).
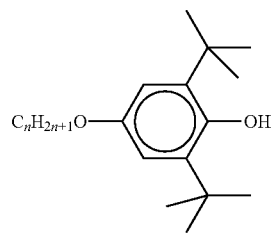
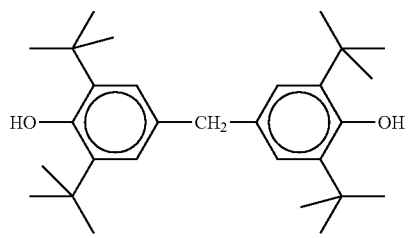
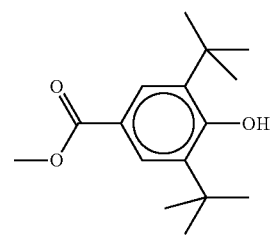
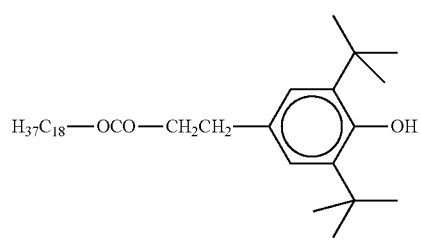
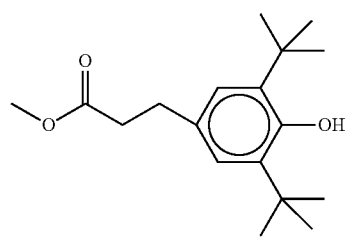
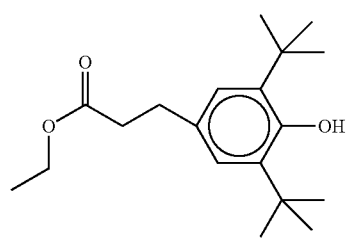

TABLE F-continued
Table F indicates possible stabilisers which can be added to the LC media according to the invention.
(n here donotes an integer from 1 to 12, preferably 1, 2, 3, 4, 5, 6, 7 or 8, terminal methyl groups are not shown).
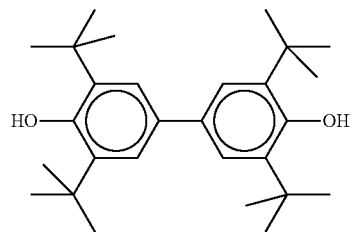
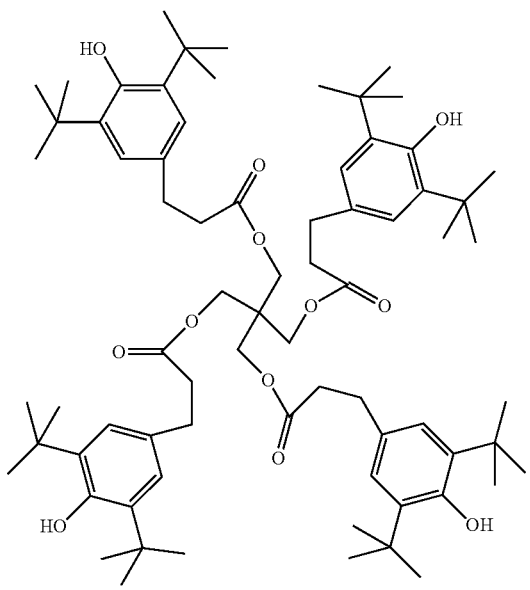 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
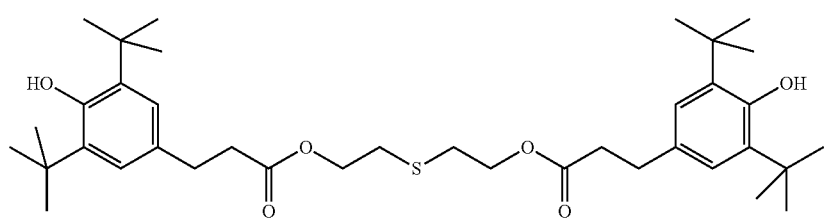 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
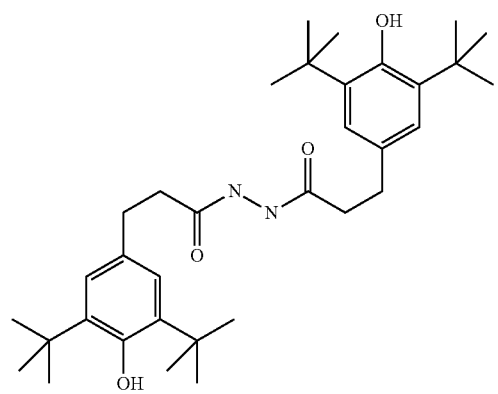 [SMILES: CC(C)(C)c1cc(CCC(=O)NNC(=O)CCc2cc(C(C)(C)C)c(O)c(C(C)(C)C)c2)cc(C(C)(C)C)c1O]

TABLE F-continued
Table F indicates possible stabilisers which can be added to the LC media according to the invention.
(n here donotes an integer from 1 to 12, preferably 1, 2, 3, 4, 5, 6, 7 or 8, terminal methyl groups are not shown).
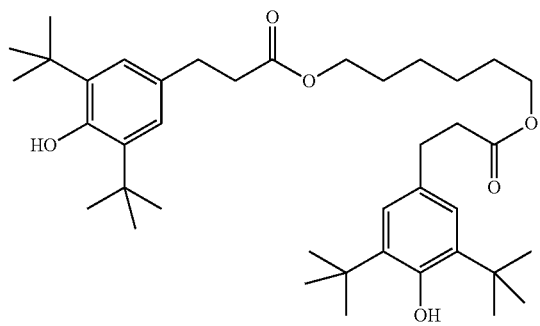 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
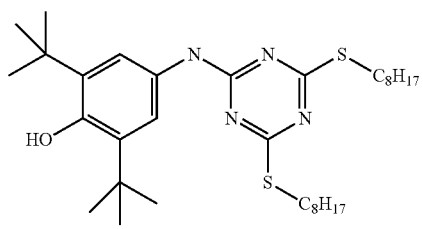
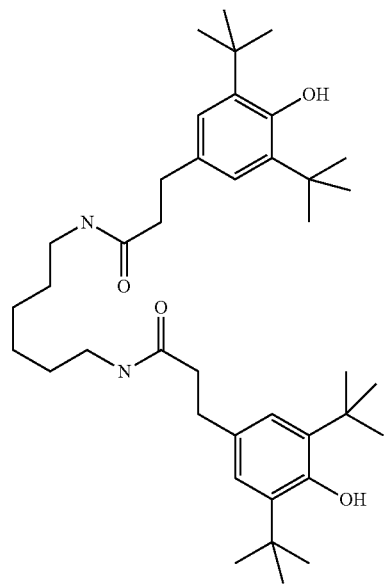 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE F-continued
Table F indicates possible stabilisers which can be added to the LC media according to the invention.
(n here donotes an integer from 1 to 12, preferably 1, 2, 3, 4, 5, 6, 7 or 8, terminal methyl groups are not shown).
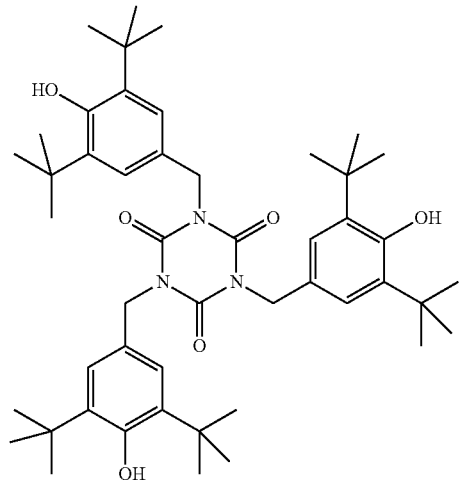 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
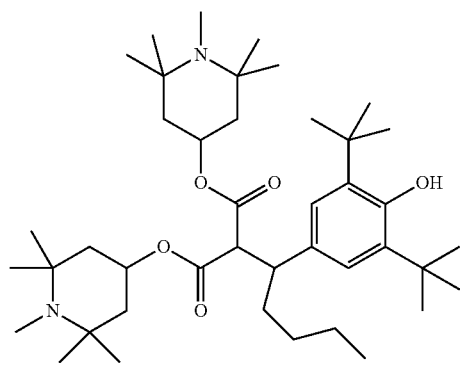 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
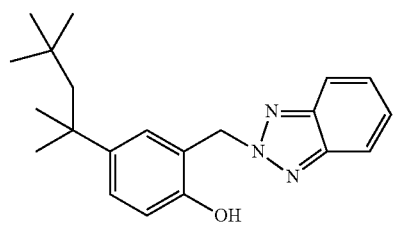 [SMILES: CC(C)(C)CC(C)(C)c1ccc(O)c(Cn2nc3ccccc3n2)c1]
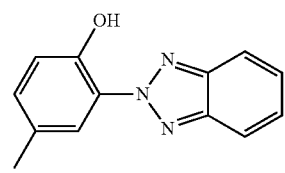 [SMILES: Cc1ccc(O)c(-n2nc3ccccc3n2)c1]
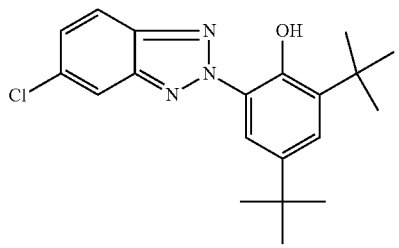 [SMILES: CC(C)(C)c1cc(-n2nc3ccc(Cl)cc3n2)c(O)c(C(C)(C)C)c1]

TABLE F-continued
Table F indicates possible stabilisers which can be added to the LC media according to the invention.
(n here donotes an integer from 1 to 12, preferably 1, 2, 3, 4, 5, 6, 7 or 8, terminal methyl groups are not shown).
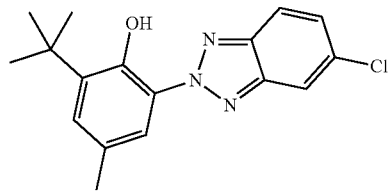 [SMILES: Cc1cc(-n2nc3ccc(Cl)cc3n2)c(O)c(C(C)(C)C)c1]
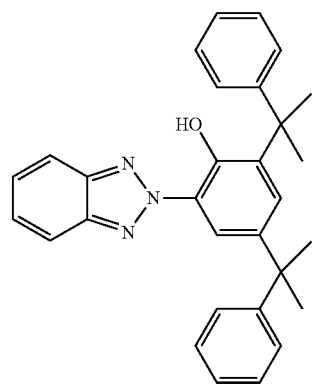 [SMILES: CC(C)(c1ccccc1)c1cc(-n2nc3ccccc3n2)c(O)c(C(C)(C)c2ccccc2)c1]
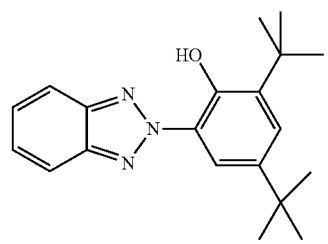 [SMILES: CC(C)(C)c1cc(-n2nc3ccccc3n2)c(O)c(C(C)(C)C)c1]
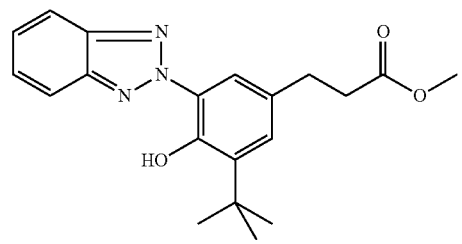 [SMILES: COC(=O)CCc1cc(-n2nc3ccccc3n2)c(O)c(C(C)(C)C)c1]
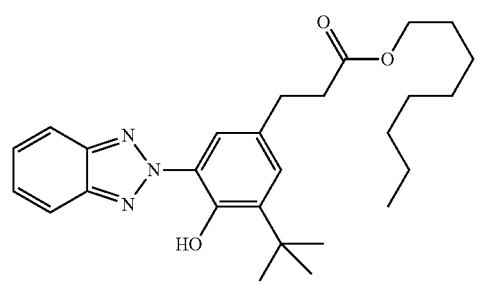 [SMILES: CCCCCCCCOC(=O)CCc1cc(-n2nc3ccccc3n2)c(O)c(C(C)(C)C)c1]

TABLE F-continued
Table F indicates possible stabilisers which can be added to the LC media according to the invention.
(n here donotes an integer from 1 to 12, preferably 1, 2, 3, 4, 5, 6, 7 or 8, terminal methyl groups are not shown).
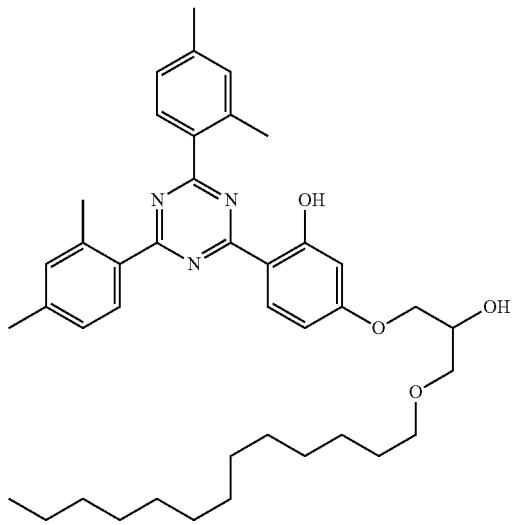 [SMILES: CCCCCCCCCCCCCOCC(O)COc1ccc(-c2nc(-c3ccc(C)cc3C)nc(-c3ccc(C)cc3C)n2)c(O)c1]
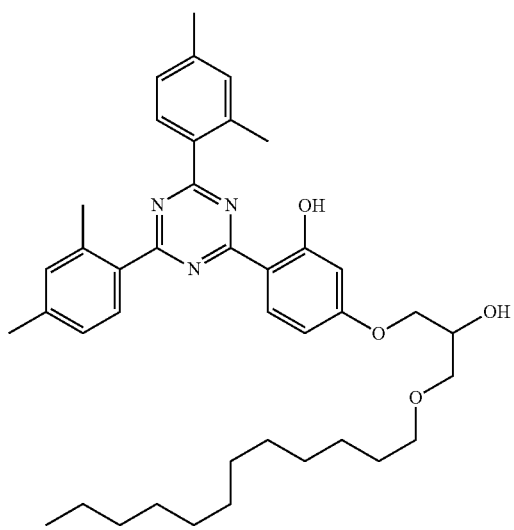 [SMILES: CCCCCCCCCCCCOCC(O)COc1ccc(-c2nc(-c3ccc(C)cc3C)nc(-c3ccc(C)cc3C)n2)c(O)c1]
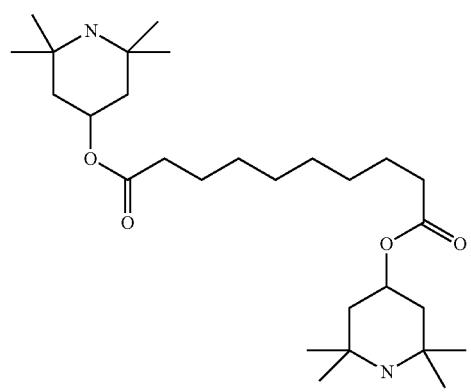

TABLE F-continued

Table F indicates possible stabilisers which can be added to the LC media according to the invention.
(n here donotes an integer from 1 to 12, preferably 1, 2, 3, 4, 5, 6, 7 or 8, terminal methyl groups are not shown).

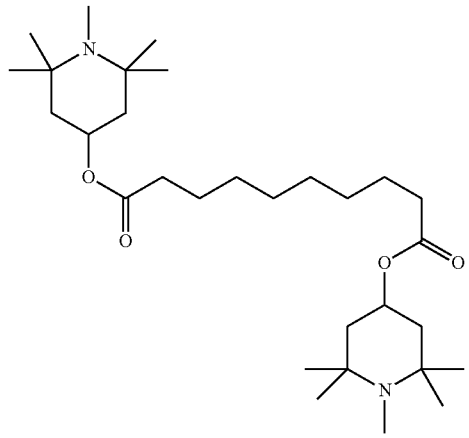

The LC media preferably comprise 0 to 10% by weight, in particular 1 ppm to 5% by weight, particularly preferably 1 ppm to 1% by weight, of stabilisers.

The LC media preferably comprise one or more stabilisers selected from the group consisting of compounds from Table F.

TABLE G

Table G shows illustrative compounds which can preferably be used as polymerisable compounds in the LC media in accordance with the present invention.

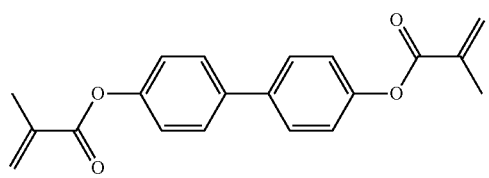

RM-1

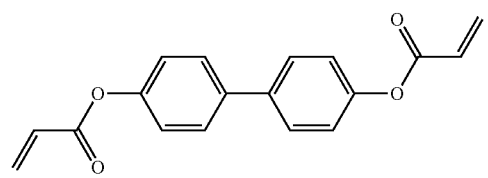

RM-2

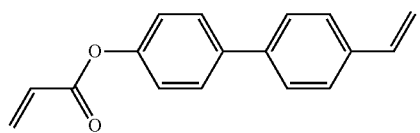 [SMILES: C=CC(=O)Oc1ccc(-c2ccc(C=C)cc2)cc1]

RM-3

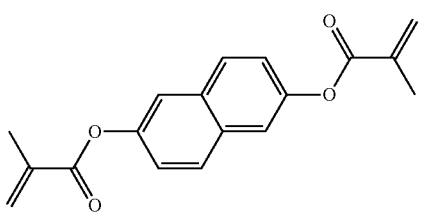 [SMILES: C=C(C)C(=O)Oc1ccc2cc(OC(=O)C(=C)C)ccc2c1]

RM-4

TABLE G-continued
Table G shows illustrative compounds which can preferably be used as polymerisable compounds in the LC media in accordance with the present invention.
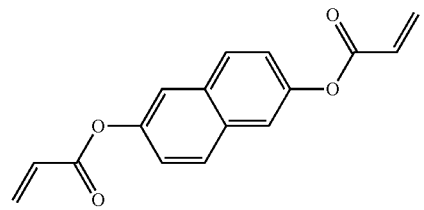 [SMILES: C=CC(=O)Oc1ccc2cc(OC(=O)C=C)ccc2c1]
RM-5
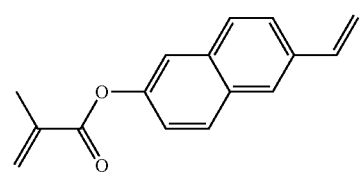 [SMILES: C=Cc1ccc2cc(OC(=O)C(=C)C)ccc2c1]
RM-6
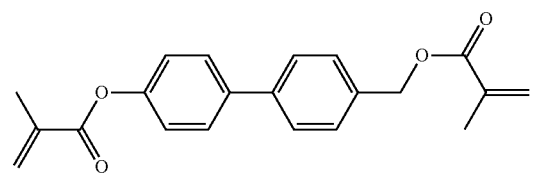 [SMILES: C=C(C)C(=O)OCc1ccc(-c2ccc(OC(=O)C(=C)C)cc2)cc1]
RM-7
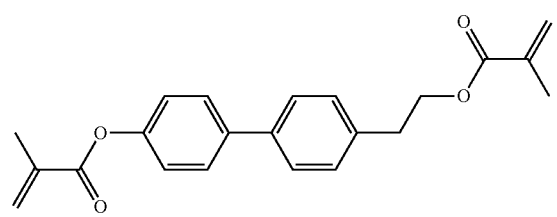 [SMILES: C=C(C)C(=O)OCCc1ccc(-c2ccc(OC(=O)C(=C)C)cc2)cc1]
RM-8
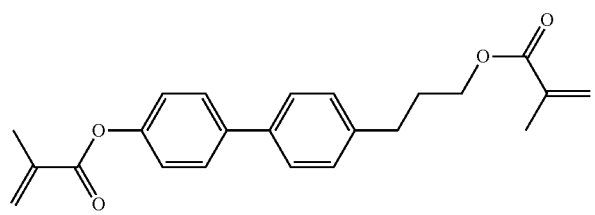 [SMILES: C=C(C)C(=O)OCCCc1ccc(-c2ccc(OC(=O)C(=C)C)cc2)cc1]
RM-9
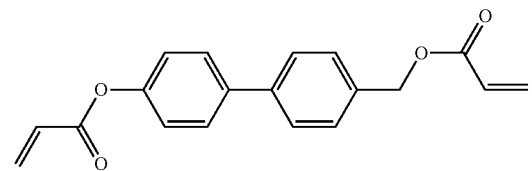 [SMILES: C=CC(=O)OCc1ccc(-c2ccc(OC(=O)C=C)cc2)cc1]
RM-10
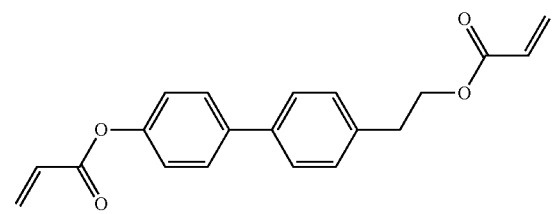 [SMILES: C=CC(=O)OCCc1ccc(-c2ccc(OC(=O)C=C)cc2)cc1]
RM-11

TABLE G-continued
Table G shows illustrative compounds which can preferably be used as polymerisable compounds in the LC media in accordance with the present invention.
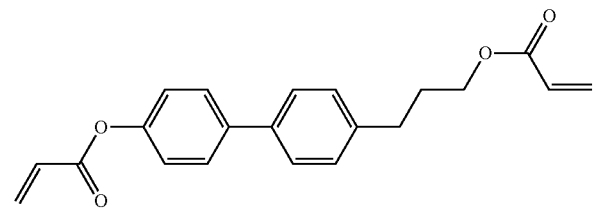 [SMILES: C=CC(=O)OCCCc1ccc(-c2ccc(OC(=O)C=C)cc2)cc1] RM-12
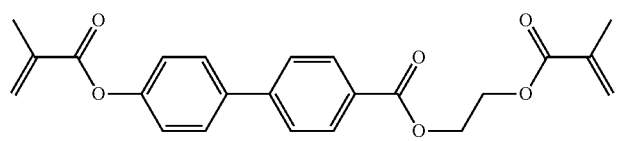 [SMILES: C=C(C)C(=O)OCCOC(=O)c1ccc(-c2ccc(OC(=O)C(=C)C)cc2)cc1] RM-13
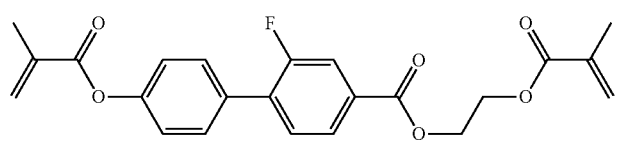 [SMILES: C=C(C)C(=O)OCCOC(=O)c1ccc(-c2ccc(OC(=O)C(=C)C)cc2)c(F)c1] RM-14
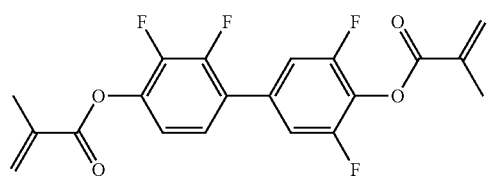 RM-15
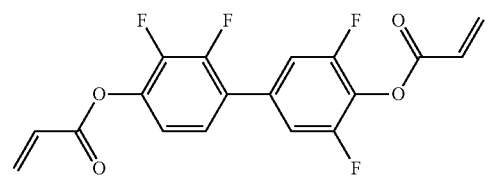 [SMILES: C=CC(=O)Oc1ccc(-c2cc(F)c(OC(=O)C=C)c(F)c2)c(F)c1F] RM-16
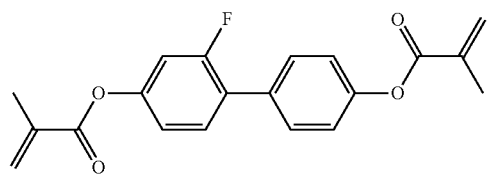 [SMILES: C=C(C)C(=O)Oc1ccc(-c2ccc(OC(=O)C(=C)C)cc2F)cc1] RM-17
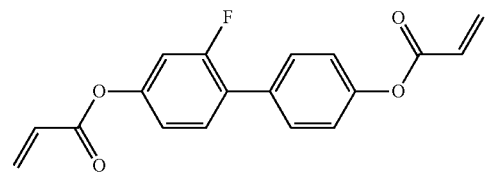 [SMILES: C=CC(=O)Oc1ccc(-c2ccc(OC(=O)C=C)cc2F)cc1] RM-18
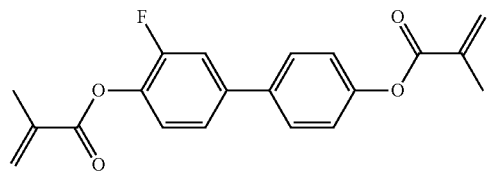 [SMILES: C=C(C)C(=O)Oc1ccc(-c2ccc(OC(=O)C(=C)C)c(F)c2)cc1] RM-19

TABLE G-continued
Table G shows illustrative compounds which can preferably be used as polymerisable compounds in the LC media in accordance with the present invention.
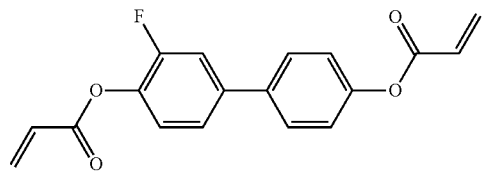 RM-20
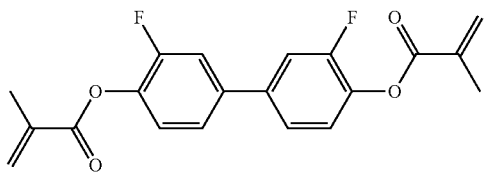 RM-21
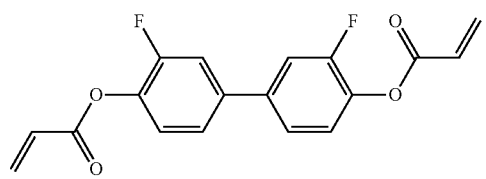 [SMILES: C=CC(=O)Oc1ccc(-c2ccc(OC(=O)C=C)c(F)c2)cc1] RM-22
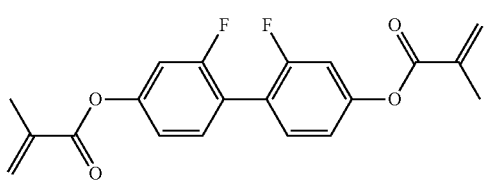 [SMILES: C=C(C)C(=O)Oc1ccc(-c2ccc(OC(=O)C(=C)C)cc2F)c(F)c1] RM-23
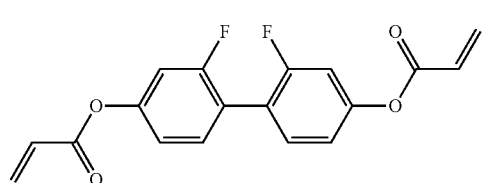 RM-24
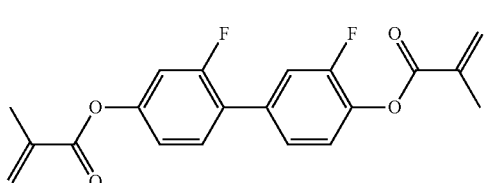 RM-25
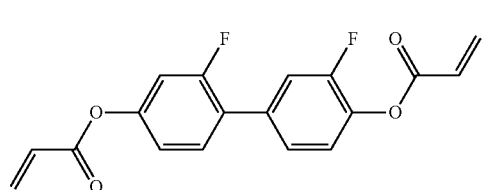 RM-26
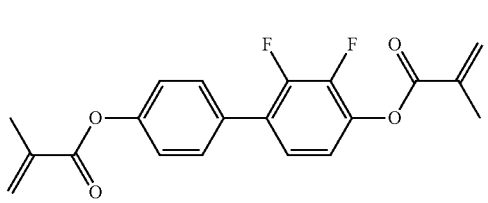 [SMILES: C=C(C)C(=O)Oc1ccc(-c2ccc(OC(=O)C(=C)C)c(F)c2F)cc1] RM-27

TABLE G-continued
Table G shows illustrative compounds which can preferably be used as polymerisable compounds in the LC media in accordance with the present invention.
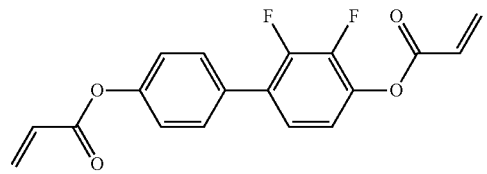 [SMILES: C=CC(=O)Oc1ccc(-c2ccc(OC(=O)C=C)c(F)c2F)cc1] RM-28
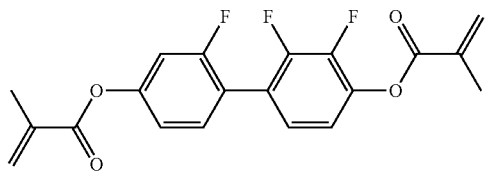 RM-29
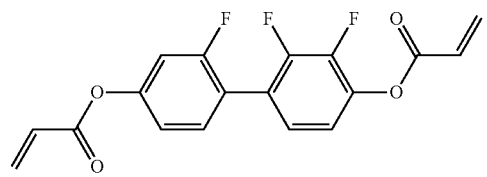 RM-30
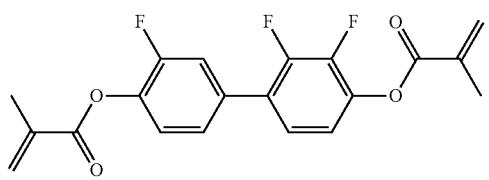 RM-31
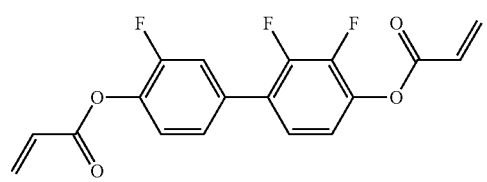 RM-32
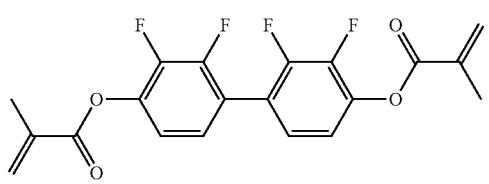 [SMILES: C=C(C)C(=O)Oc1ccc(-c2ccc(OC(=O)C(=C)C)c(F)c2F)c(F)c1] RM-33
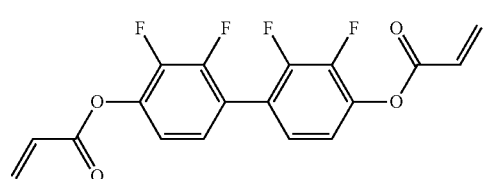 RM-34
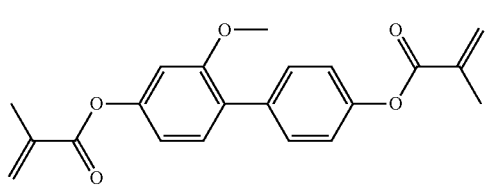 RM-35

TABLE G-continued
Table G shows illustrative compounds which can preferably be used as polymerisable compounds in the LC media in accordance with the present invention.
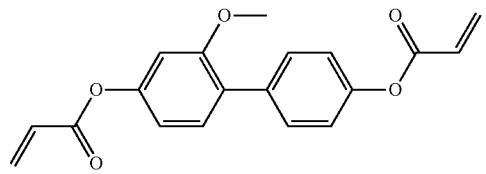  RM-36
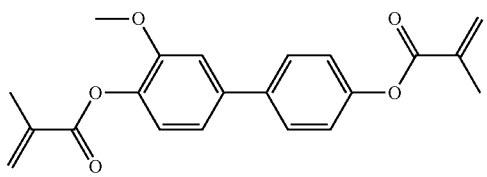  RM-37
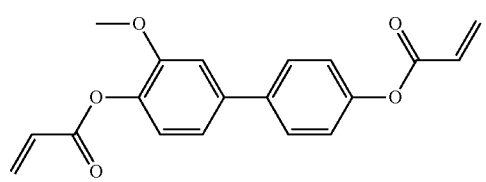  RM-38
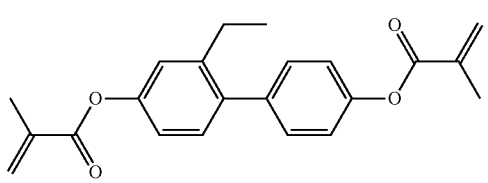 [SMILES: C=C(C)C(=O)Oc1ccc(-c2ccc(OC(=O)C(=C)C)cc2CC)cc1]  RM-39
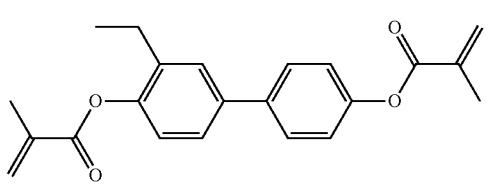 [SMILES: C=C(C)C(=O)Oc1ccc(-c2ccc(OC(=O)C(=C)C)c(CC)c2)cc1]  RM-40
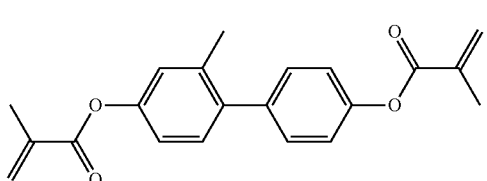  RM-41
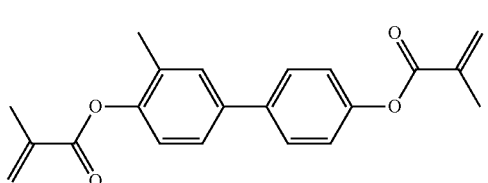  RM-42
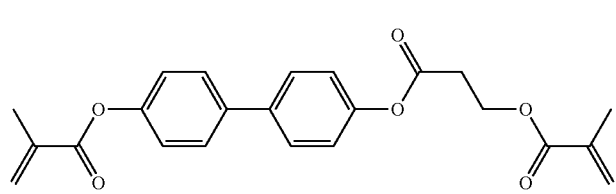 [SMILES: C=C(C)C(=O)OCCC(=O)Oc1ccc(-c2ccc(OC(=O)C(=C)C)cc2)cc1F]  RM-43

139
140
TABLE G-continued
Table G shows illustrative compounds which can preferably be used as polymerisable compounds
in the LC media in accordance with the present invention.
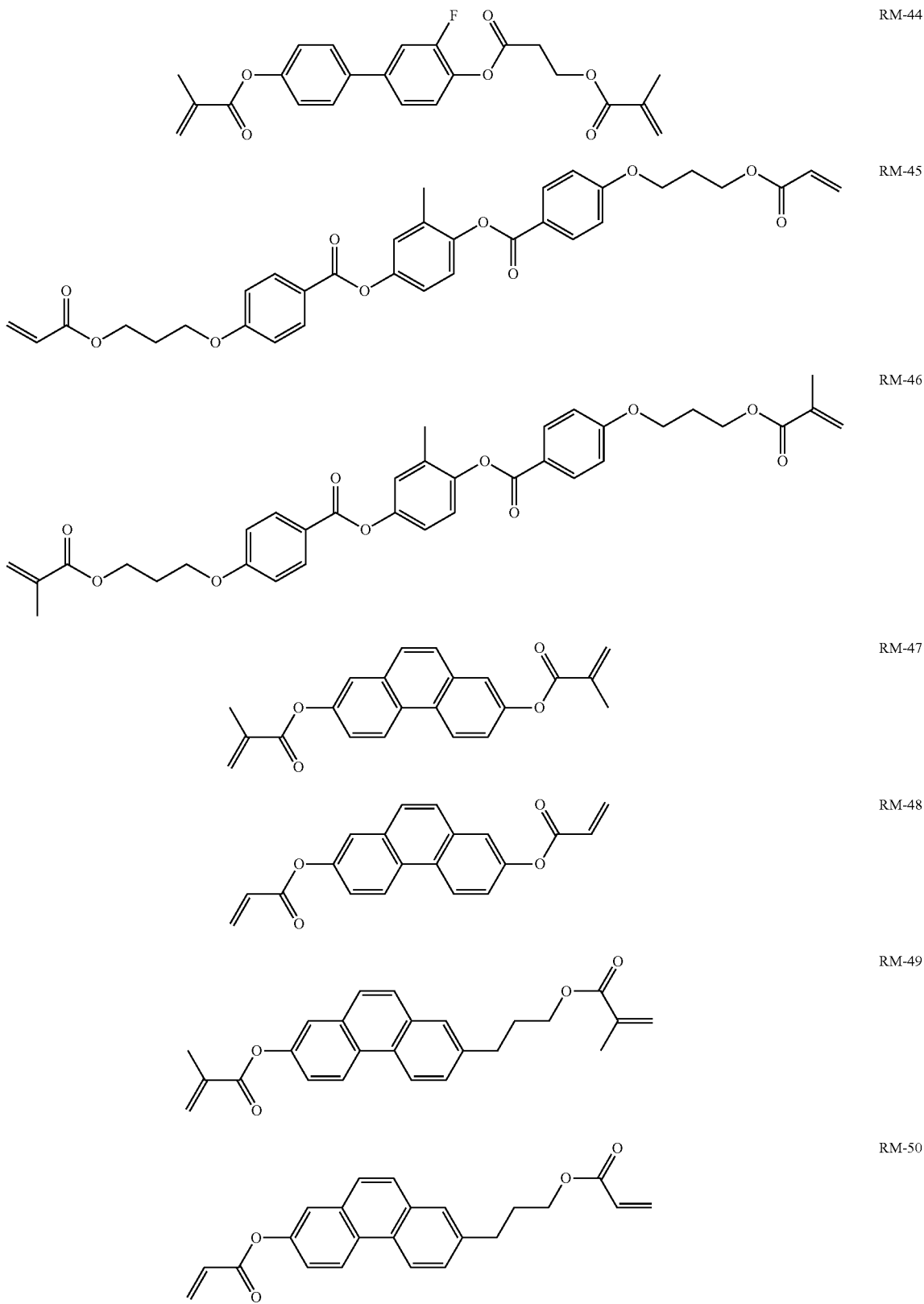

TABLE G-continued
Table G shows illustrative compounds which can preferably be used as polymerisable compounds in the LC media in accordance with the present invention.
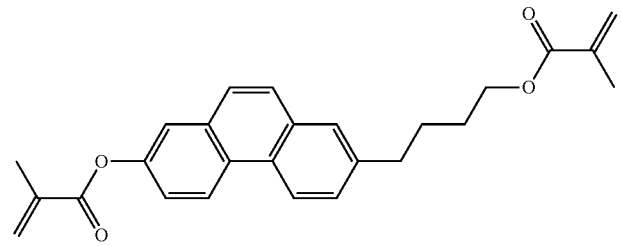 [SMILES: C=C(C)C(=O)OCCCCc1ccc2c(ccc3cc(OC(=O)C(=C)C)ccc32)c1] RM-51
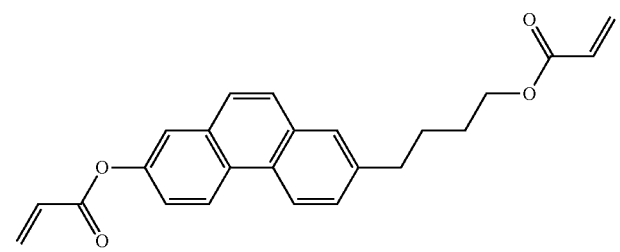 [SMILES: C=CC(=O)OCCCCc1ccc2c(ccc3cc(OC(=O)C=C)ccc32)c1] RM-52
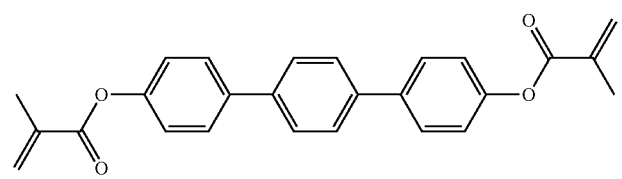 [SMILES: C=C(C)C(=O)Oc1ccc(-c2ccc(-c3ccc(OC(=O)C(=C)C)cc3)cc2)cc1] RM-53
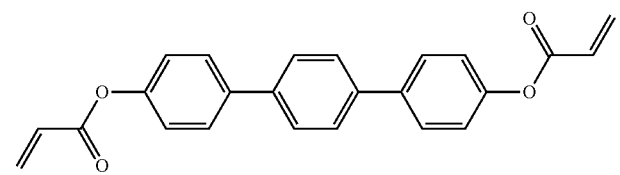 [SMILES: C=CC(=O)Oc1ccc(-c2ccc(-c3ccc(OC(=O)C=C)cc3)cc2)cc1] RM-54
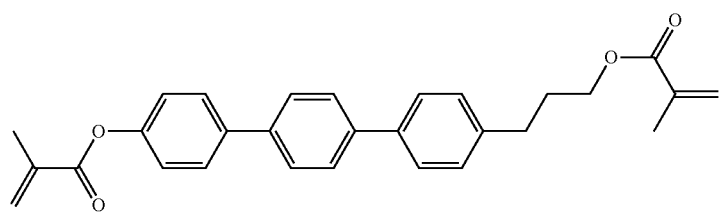 [SMILES: C=C(C)C(=O)OCCCc1ccc(-c2ccc(-c3ccc(OC(=O)C(=C)C)cc3)cc2)cc1] RM-55
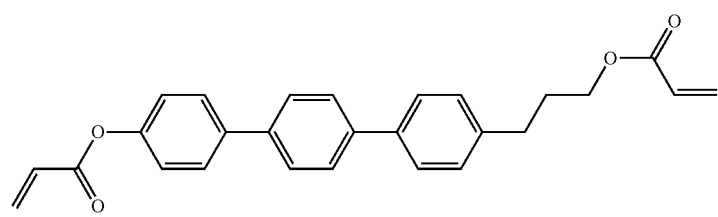 [SMILES: C=CC(=O)OCCCc1ccc(-c2ccc(-c3ccc(OC(=O)C=C)cc3)cc2)cc1] RM-56
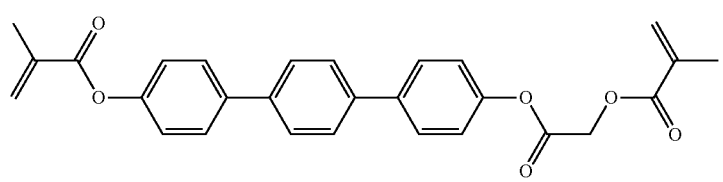 [SMILES: C=C(C)C(=O)OCC(=O)Oc1ccc(-c2ccc(-c3ccc(OC(=O)C(=C)C)cc3)cc2)cc1] RM-57

TABLE G-continued
Table G shows illustrative compounds which can preferably be used as polymerisable compounds in the LC media in accordance with the present invention.
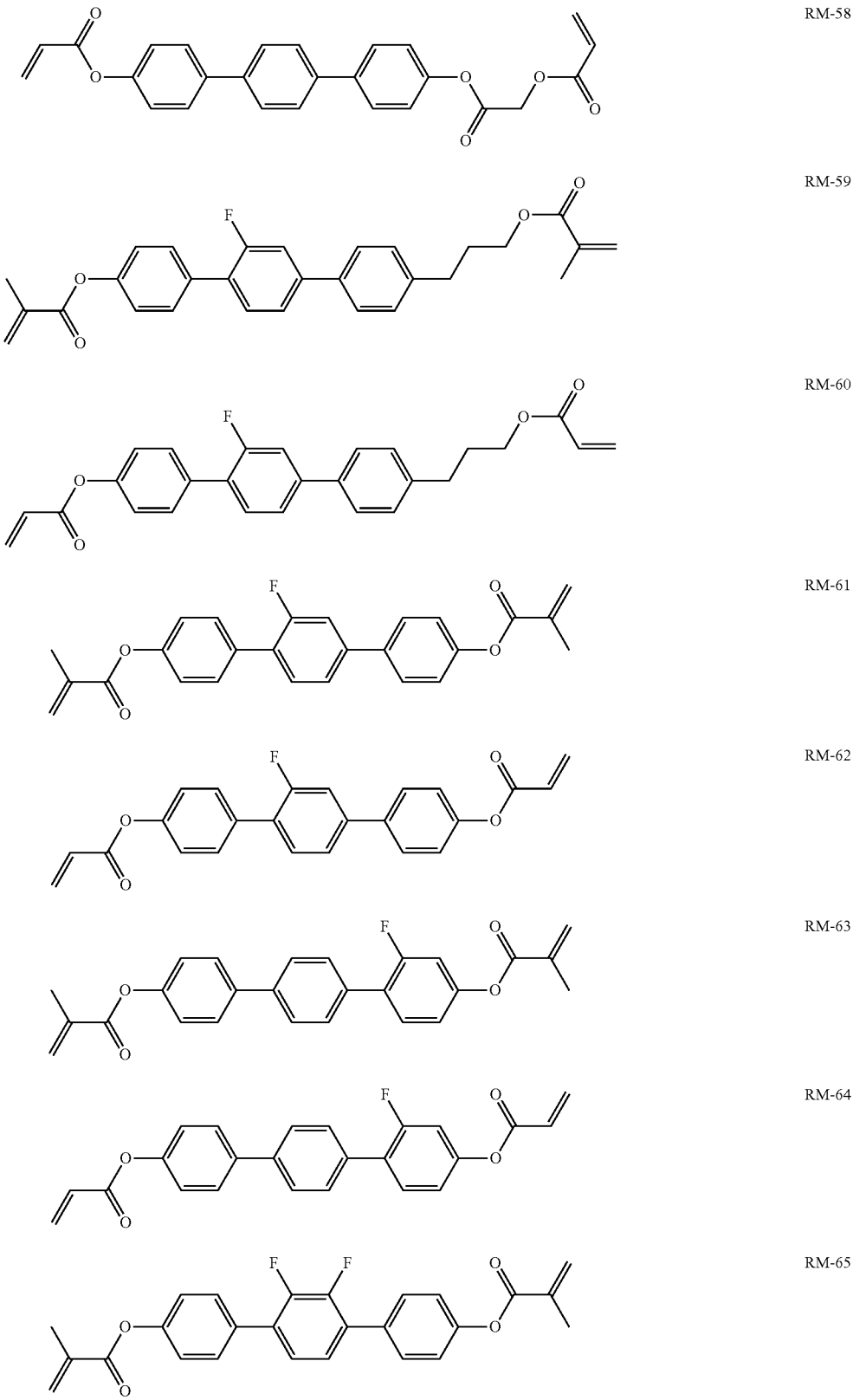

TABLE G-continued
Table G shows illustrative compounds which can preferably be used as polymerisable compounds in the LC media in accordance with the present invention.
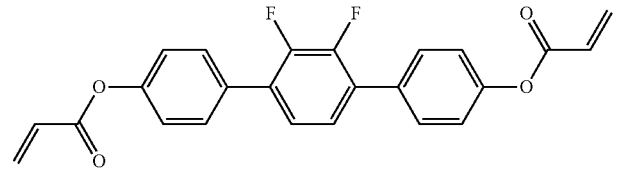 [SMILES: C=CC(=O)Oc1ccc(-c2ccc(-c3ccc(OC(=O)C=C)cc3)c(F)c2F)cc1] RM-66
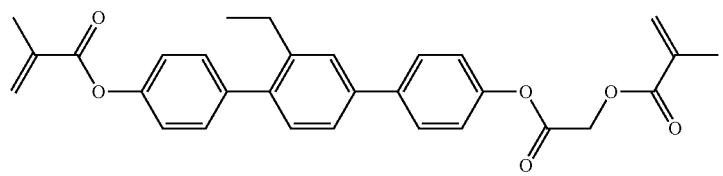 [SMILES: C=C(C)C(=O)OCC(=O)Oc1ccc(-c2ccc(-c3ccc(OC(=O)C(=C)C)cc3)c(CC)c2)cc1] RM-67
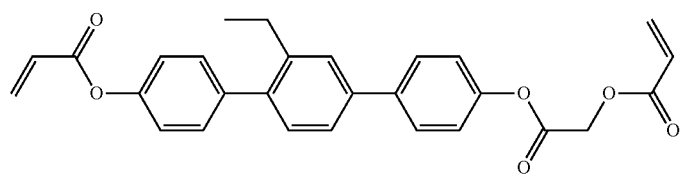 [SMILES: C=CC(=O)OCC(=O)Oc1ccc(-c2ccc(-c3ccc(OC(=O)C=C)cc3)c(CC)c2)cc1] RM-68
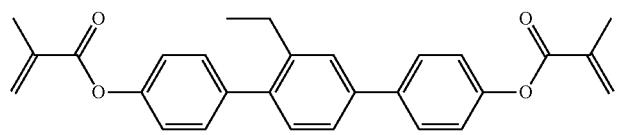 [SMILES: C=C(C)C(=O)Oc1ccc(-c2ccc(-c3ccc(OC(=O)C(=C)C)cc3)c(CC)c2)cc1] RM-69
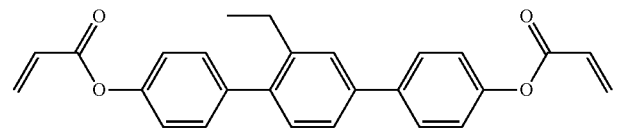 [SMILES: C=CC(=O)Oc1ccc(-c2ccc(-c3ccc(OC(=O)C=C)cc3)c(CC)c2)cc1] RM-70
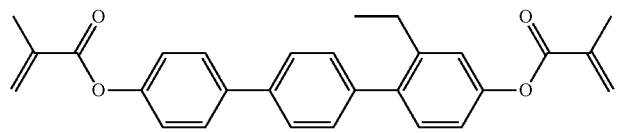 [SMILES: C=C(C)C(=O)Oc1ccc(-c2ccc(-c3ccc(OC(=O)C(=C)C)cc3CC)cc2)cc1] RM-71
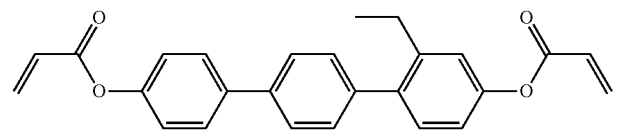 [SMILES: C=CC(=O)Oc1ccc(-c2ccc(-c3ccc(OC(=O)C=C)cc3CC)cc2)cc1] RM-72
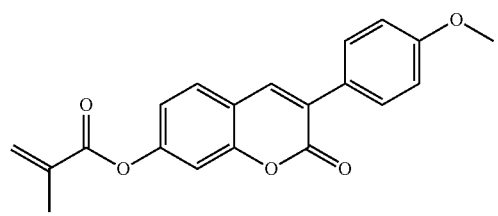 [SMILES: C=C(C)C(=O)Oc1ccc2cc(-c3ccc(OC)cc3)c(=O)oc2c1] RM-73
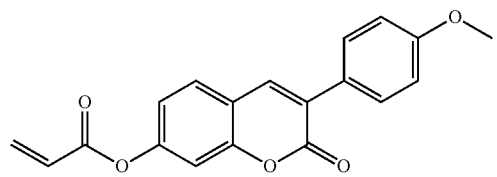 [SMILES: C=CC(=O)Oc1ccc2cc(-c3ccc(OC)cc3)c(=O)oc2c1] RM-74

TABLE G-continued
Table G shows illustrative compounds which can preferably be used as polymerisable compounds in the LC media in accordance with the present invention.
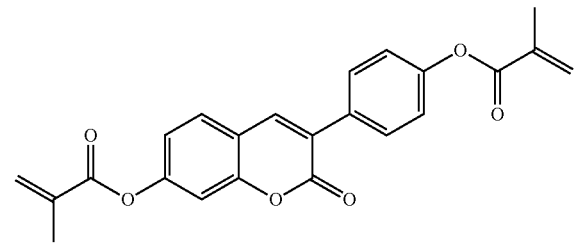 [SMILES: C=C(C)C(=O)Oc1ccc(-c2cc3ccc(OC(=O)C(=C)C)cc3oc2=O)cc1]
RM-75
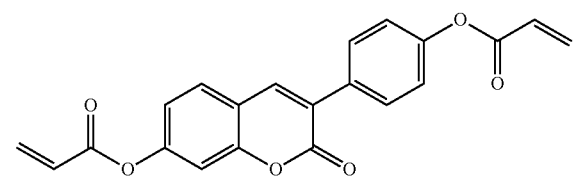 [SMILES: C=CC(=O)Oc1ccc(-c2cc3ccc(OC(=O)C=C)cc3oc2=O)cc1]
RM-76
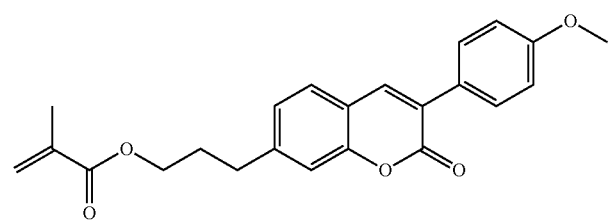 [SMILES: C=C(C)C(=O)OCCCc1ccc2cc(-c3ccc(OC)cc3)c(=O)oc2c1]
RM-77
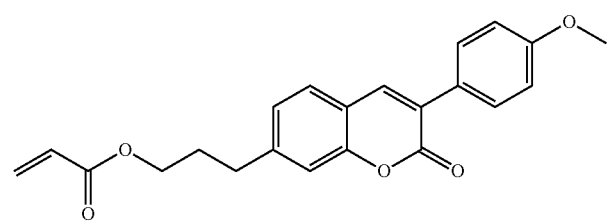 [SMILES: C=CC(=O)OCCCc1ccc2cc(-c3ccc(OC)cc3)c(=O)oc2c1]
RM-78
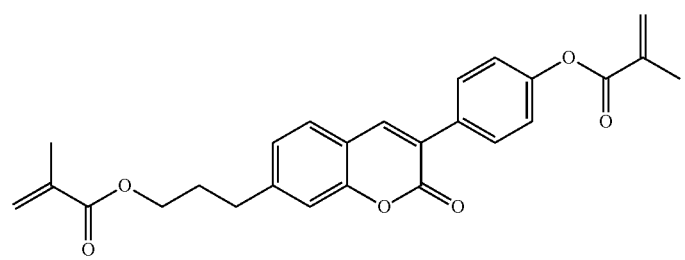 [SMILES: C=C(C)C(=O)OCCCc1ccc2cc(-c3ccc(OC(=O)C(=C)C)cc3)c(=O)oc2c1]
RM-79
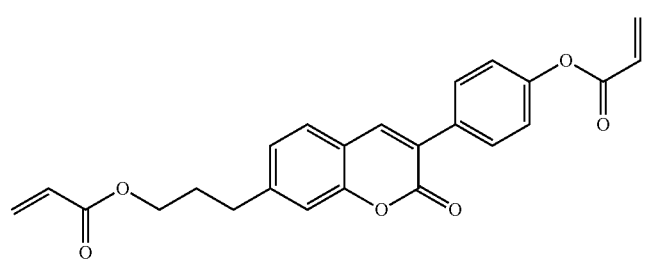 [SMILES: C=CC(=O)OCCCc1ccc2cc(-c3ccc(OC(=O)C=C)cc3)c(=O)oc2c1]
RM-80

TABLE G-continued
Table G shows illustrative compounds which can preferably be used as polymerisable compounds
in the LC media in accordance with the present invention.
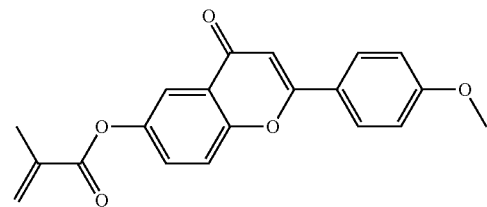 [SMILES: C=C(C)C(=O)Oc1ccc2oc(-c3ccc(OC)cc3)cc(=O)c2c1]
RM-81
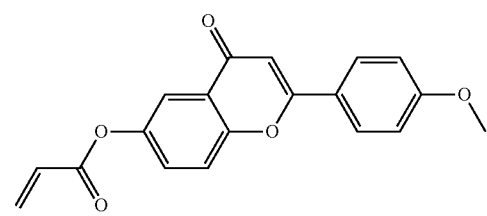 [SMILES: C=CC(=O)Oc1ccc2oc(-c3ccc(OC)cc3)cc(=O)c2c1]
RM-82
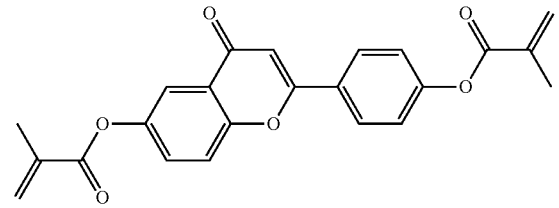 [SMILES: C=C(C)C(=O)Oc1ccc(-c2cc(=O)c3cc(OC(=O)C(=C)C)ccc3o2)cc1]
RM-83
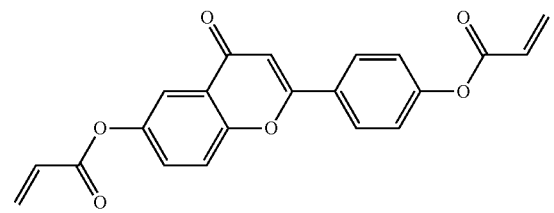 [SMILES: C=CC(=O)Oc1ccc(-c2cc(=O)c3cc(OC(=O)C=C)ccc3o2)cc1]
RM-84
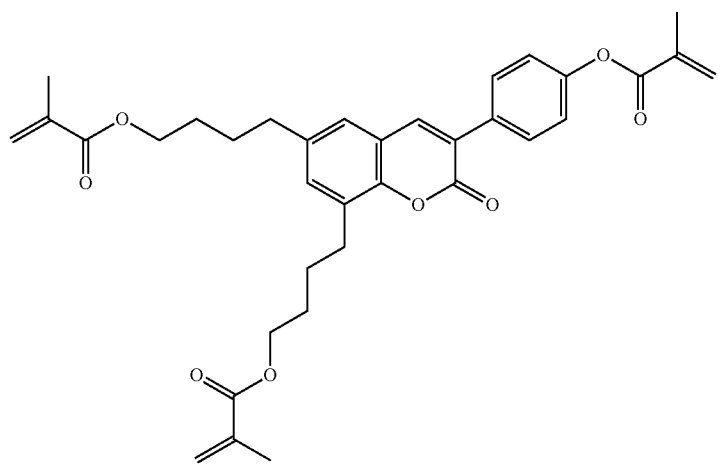 [SMILES: C=C(C)C(=O)OCCCCc1cc(CCCCOC(=O)C(=C)C)c2oc(=O)c(-c3ccc(OC(=O)C(=C)C)cc3)cc2c1]
RM-85

TABLE G-continued
Table G shows illustrative compounds which can preferably be used as polymerisable compounds in the LC media in accordance with the present invention.
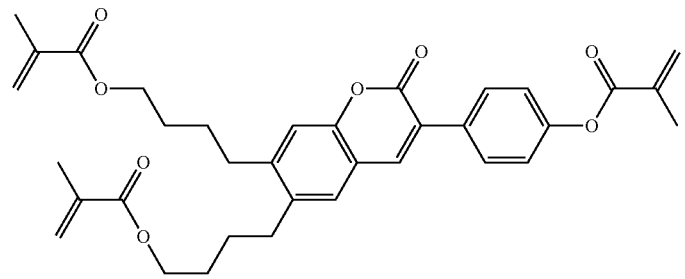 [SMILES: C=C(C)C(=O)OCCCCc1cc2cc(-c3ccc(OC(=O)C(=C)C)cc3)c(=O)oc2cc1CCCCOC(=O)C(=C)C]
RM-86
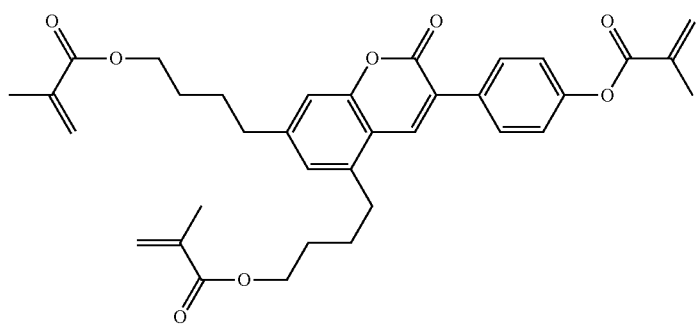 [SMILES: C=C(C)C(=O)OCCCCc1cc(CCCCOC(=O)C(=C)C)c2cc(-c3ccc(OC(=O)C(=C)C)cc3)c(=O)oc2c1]
RM-87
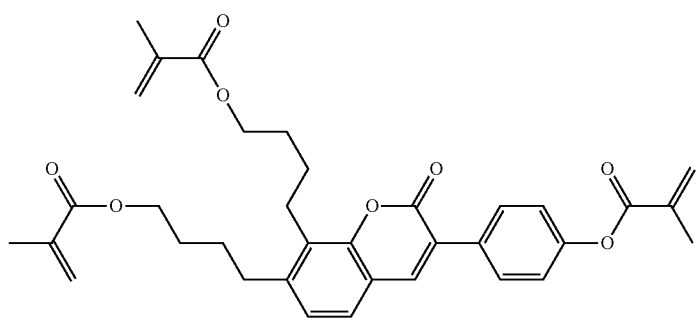 [SMILES: C=C(C)C(=O)OCCCCc1ccc2cc(-c3ccc(OC(=O)C(=C)C)cc3)c(=O)oc2c1CCCCOC(=O)C(=C)C]
RM-88
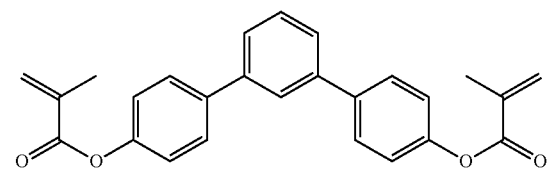 [SMILES: C=C(C)C(=O)Oc1ccc(-c2cccc(-c3ccc(OC(=O)C(=C)C)cc3)c2)cc1]
RM-89
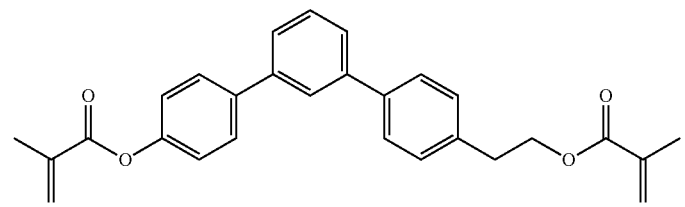 [SMILES: C=C(C)C(=O)OCCc1ccc(-c2cccc(-c3ccc(OC(=O)C(=C)C)cc3)c2)cc1]
RM-90
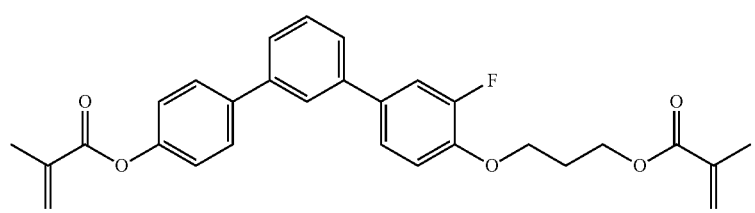 [SMILES: C=C(C)C(=O)OCCCOc1ccc(-c2cccc(-c3ccc(OC(=O)C(=C)C)cc3)c2)cc1F]
RM-91

TABLE G-continued
Table G shows illustrative compounds which can preferably be used as polymerisable compounds in the LC media in accordance with the present invention.
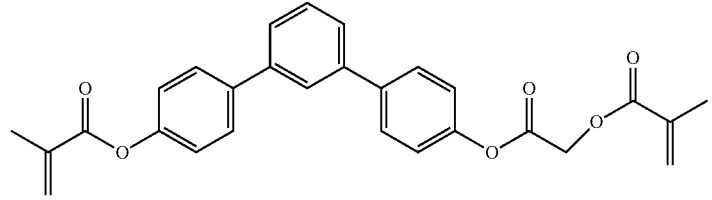 [SMILES: C=C(C)C(=O)OCC(=O)Oc1ccc(-c2cccc(-c3ccc(OC(=O)C(=C)C)cc3)c2)cc1]
RM-92
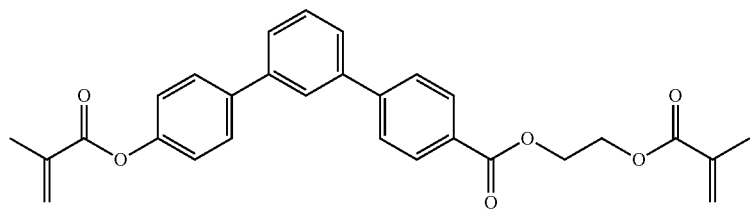 [SMILES: C=C(C)C(=O)OCCOC(=O)c1ccc(-c2cccc(-c3ccc(OC(=O)C(=C)C)cc3)c2)cc1]
RM-93
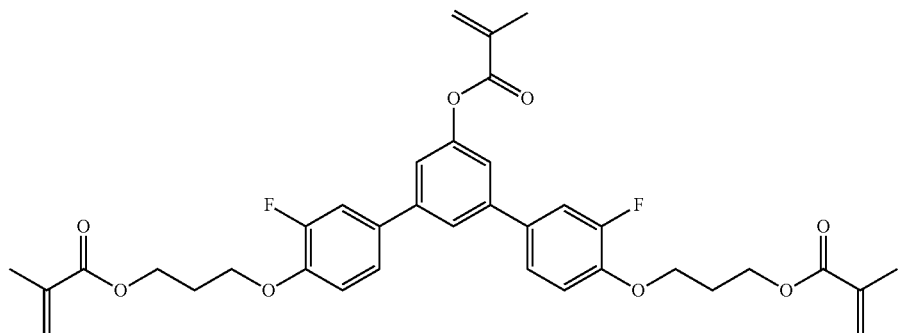 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-94
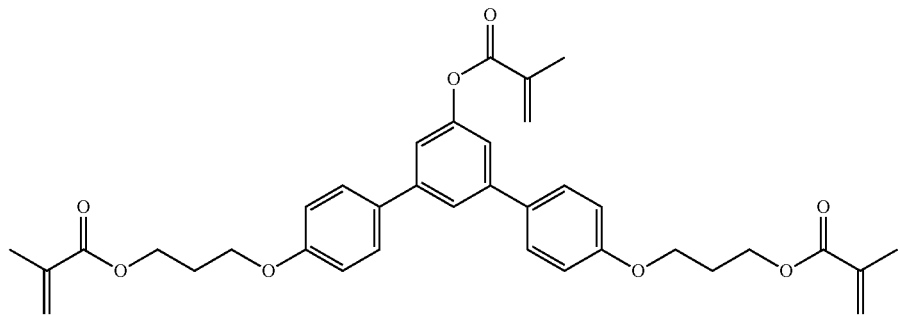 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-95
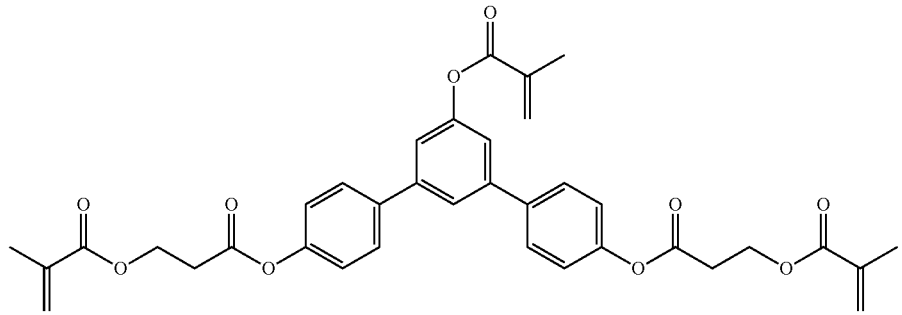 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-96

TABLE G-continued
Table G shows illustrative compounds which can preferably be used as polymerisable compounds in the LC media in accordance with the present invention.
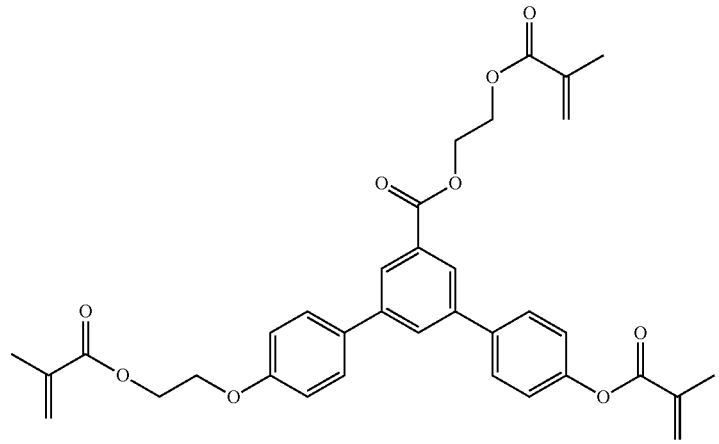 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-97
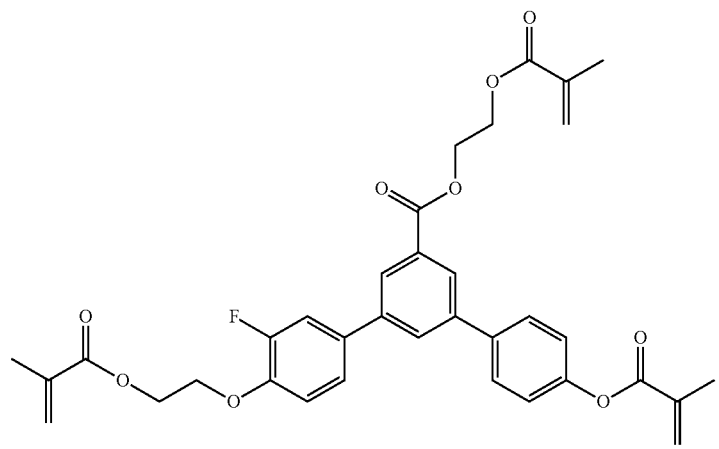 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-98
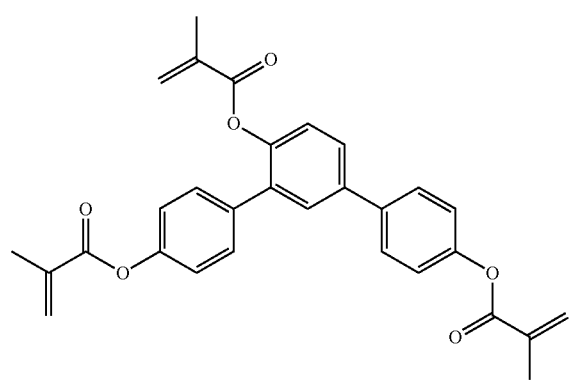 [SMILES: C=C(C)C(=O)Oc1ccc(-c2ccc(OC(=O)C(=C)C)c(-c3ccc(OC(=O)C(=C)C)cc3)c2)cc1]
RM-99

TABLE G-continued
Table G shows illustrative compounds which can preferably be used as polymerisable compounds in the LC media in accordance with the present invention.
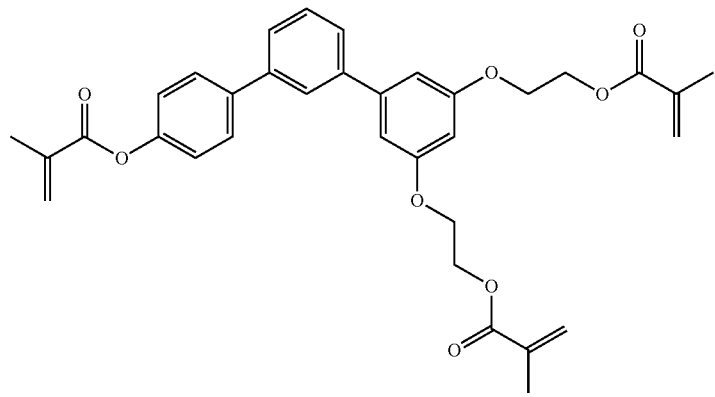 [SMILES: C=C(C)C(=O)OCCOc1cc(OCCOC(=O)C(=C)C)cc(-c2cccc(-c3ccc(OC(=O)C(=C)C)cc3)c2)c1]
RM-100
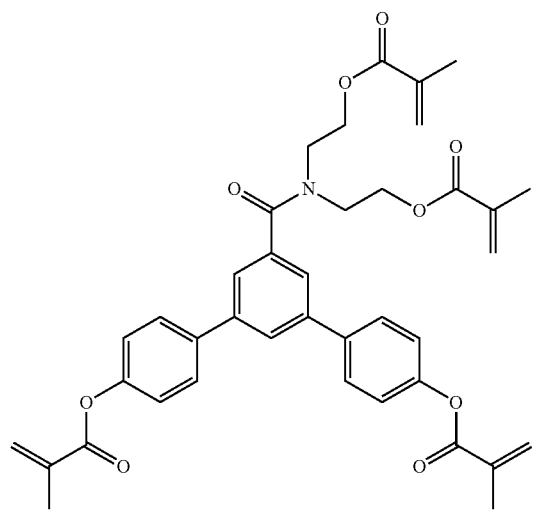 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-101
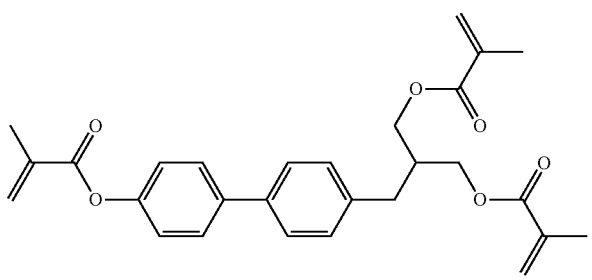 [SMILES: C=C(C)C(=O)OCC(COC(=O)C(=C)C)Cc1ccc(-c2ccc(OC(=O)C(=C)C)cc2)cc1]
RM-102
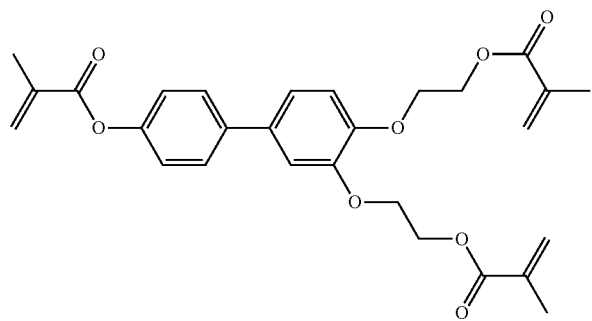
RM-103

TABLE G-continued
Table G shows illustrative compounds which can preferably be used as polymerisable compounds in the LC media in accordance with the present invention.
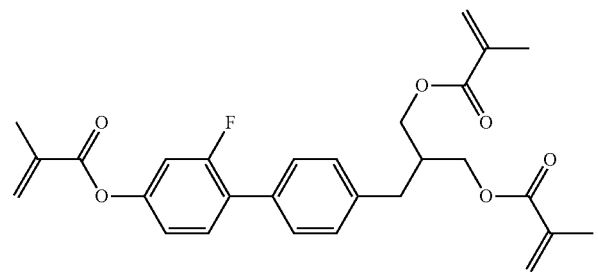 [SMILES: C=C(C)C(=O)OCC(COC(=O)C(=C)C)Cc1ccc(-c2ccc(OC(=O)C(=C)C)cc2F)cc1]
RM-104
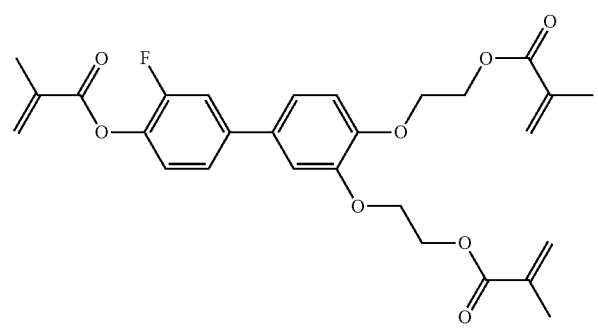 [SMILES: C=C(C)C(=O)OCCOc1ccc(-c2ccc(OC(=O)C(=C)C)c(F)c2)cc1OCCOC(=O)C(=C)C]
RM-105
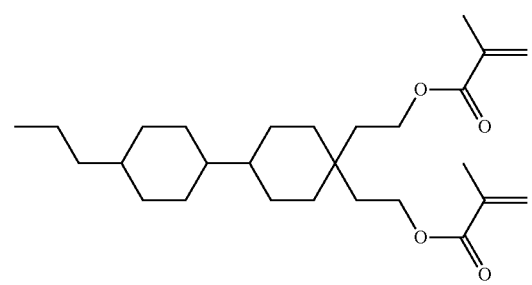 [SMILES: C=C(C)C(=O)OCCC1(CCOC(=O)C(=C)C)CCC(C2CCC(CCC)CC2)CC1]
RM-106
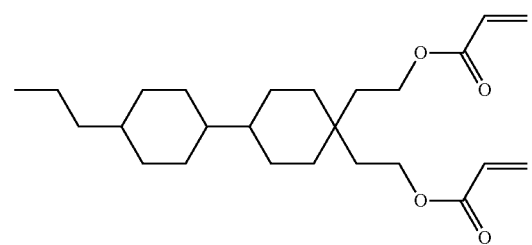 [SMILES: C=CC(=O)OCCC1(CCOC(=O)C=C)CCC(C2CCC(CCC)CC2)CC1]
RM-107
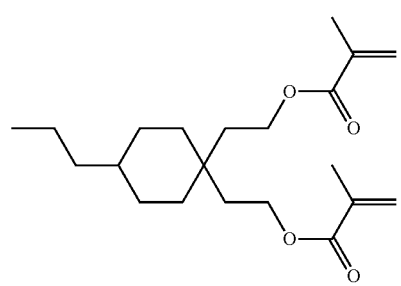 [SMILES: C=C(C)C(=O)OCCC1(CCOC(=O)C(=C)C)CCC(CCC)CC1]
RM-108

TABLE G-continued
Table G shows illustrative compounds which can preferably be used as polymerisable compounds
in the LC media in accordance with the present invention.
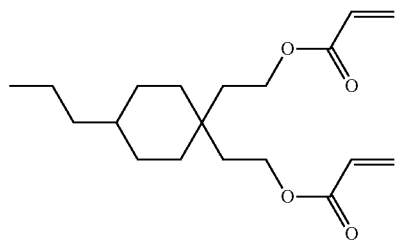 [SMILES: C=CC(=O)OCCC1(CCOC(=O)C=C)CCC(CCC)CC1]
RM-109
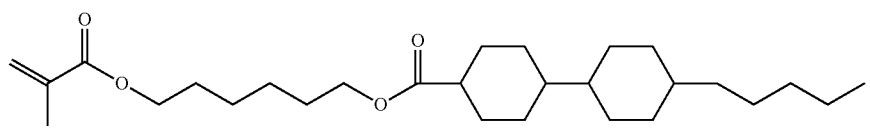 [SMILES: C=C(C)C(=O)OCCCCCCOC(=O)C1CCC(C2CCC(CCCCC)CC2)CC1]
RM-110
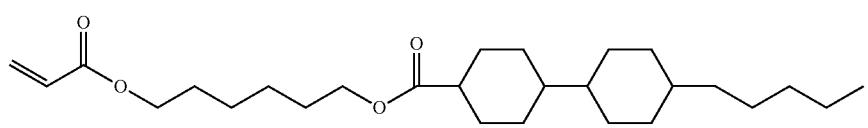 [SMILES: C=CC(=O)OCCCCCCOC(=O)C1CCC(C2CCC(CCCCC)CC2)CC1]
RM-111
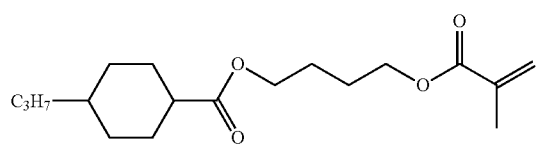
RM-112
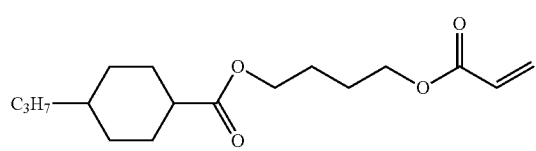
RM-113
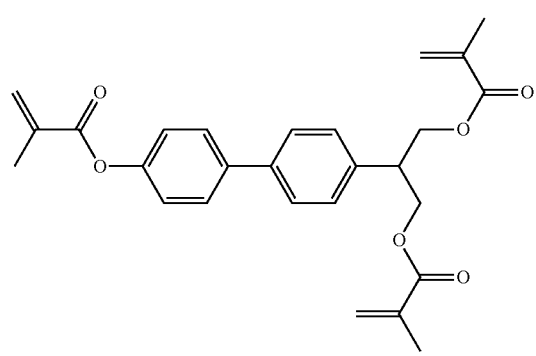 [SMILES: C=C(C)C(=O)OCC(COC(=O)C(=C)C)c1ccc(-c2ccc(OC(=O)C(=C)C)cc2)cc1]
RM-114
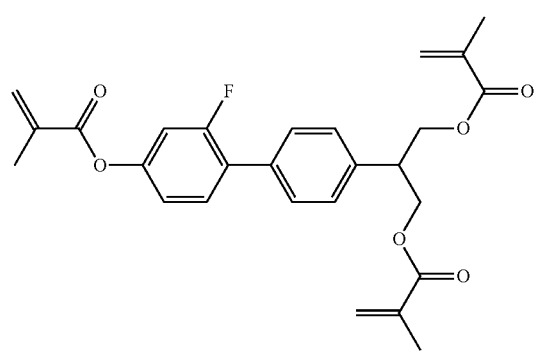 [SMILES: C=C(C)C(=O)OCC(COC(=O)C(=C)C)c1ccc(-c2ccc(OC(=O)C(=C)C)cc2F)cc1]
RM-115

TABLE G-continued
Table G shows illustrative compounds which can preferably be used as polymerisable compounds in the LC media in accordance with the present invention.
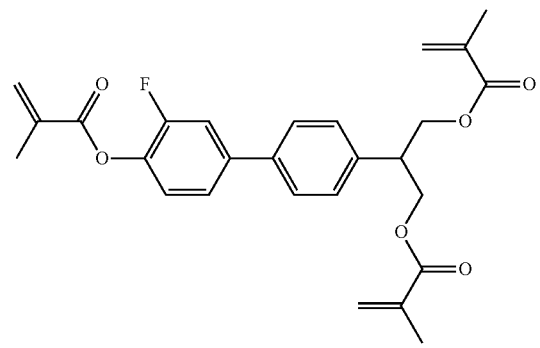 [SMILES: C=C(C)C(=O)OCC(COC(=O)C(=C)C)c1ccc(-c2ccc(OC(=O)C(=C)C)c(F)c2)cc1]
RM-116
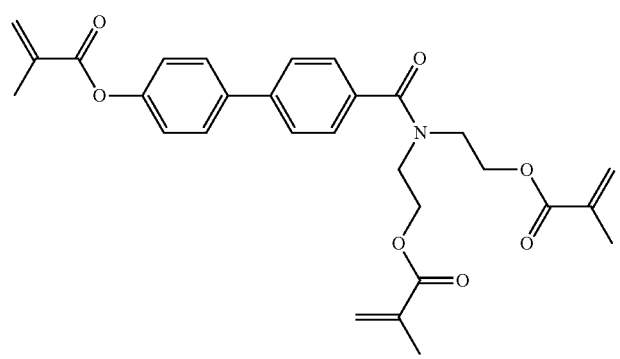 [SMILES: C=C(C)C(=O)OCCN(CCOC(=O)C(=C)C)C(=O)c1ccc(-c2ccc(OC(=O)C(=C)C)cc2)cc1]
RM-117
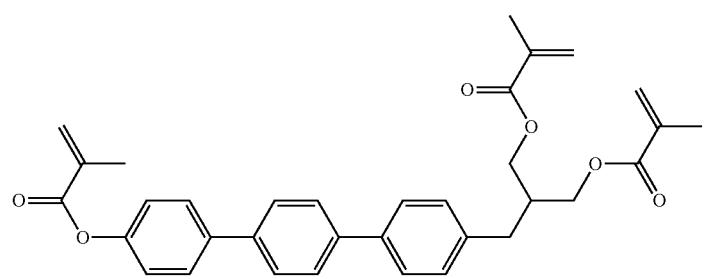 [SMILES: C=C(C)C(=O)OCC(COC(=O)C(=C)C)Cc1ccc(-c2ccc(-c3ccc(OC(=O)C(=C)C)cc3)cc2)cc1]
RM-118
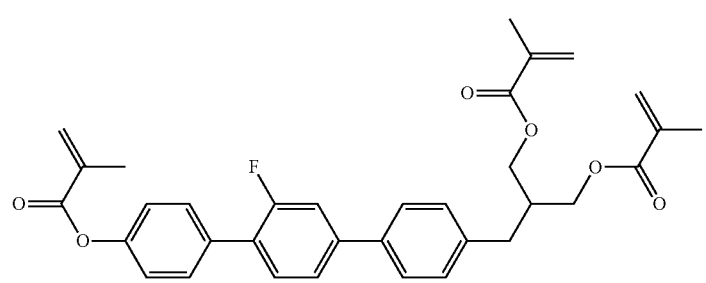 [SMILES: C=C(C)C(=O)OCC(COC(=O)C(=C)C)Cc1ccc(-c2ccc(-c3ccc(OC(=O)C(=C)C)cc3)c(F)c2)cc1]
RM-119

TABLE G-continued
Table G shows illustrative compounds which can preferably be used as polymerisable compounds in the LC media in accordance with the present invention.
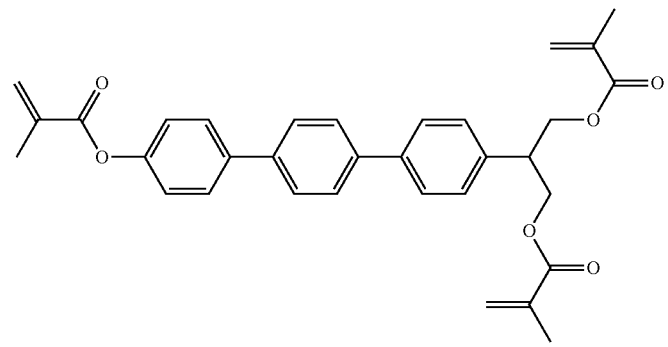 [SMILES: C=C(C)C(=O)OCC(COC(=O)C(=C)C)c1ccc(-c2ccc(-c3ccc(OC(=O)C(=C)C)cc3)cc2)cc1]
RM-120
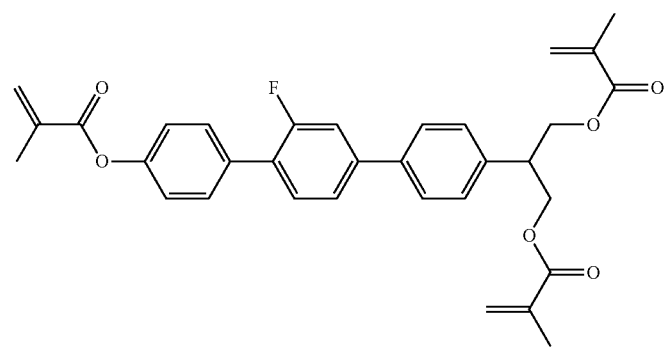 [SMILES: C=C(C)C(=O)OCC(COC(=O)C(=C)C)c1ccc(-c2ccc(-c3ccc(OC(=O)C(=C)C)cc3)c(F)c2)cc1]
RM-121
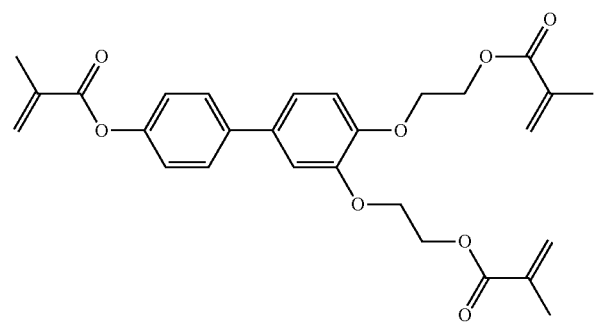
RM-122
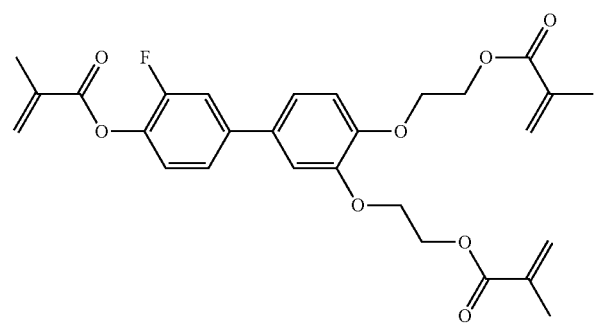 [SMILES: C=C(C)C(=O)OCCOc1ccc(-c2ccc(OC(=O)C(=C)C)c(F)c2)cc1OCCOC(=O)C(=C)C]
RM-123

TABLE G-continued
Table G shows illustrative compounds which can preferably be used as polymerisable compounds in the LC media in accordance with the present invention.
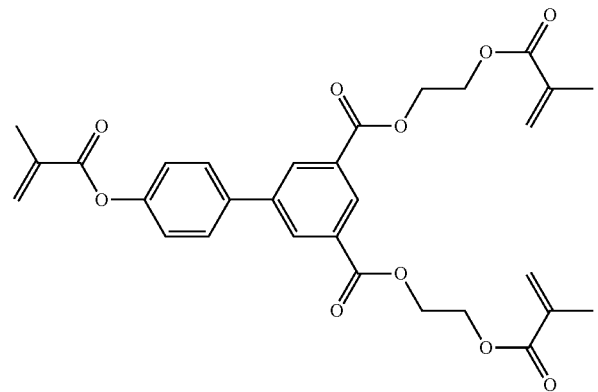 [SMILES: C=C(C)C(=O)OCCOC(=O)c1cc(C(=O)OCCOC(=O)C(=C)C)cc(-c2ccc(OC(=O)C(=C)C)cc2)c1]
RM-124
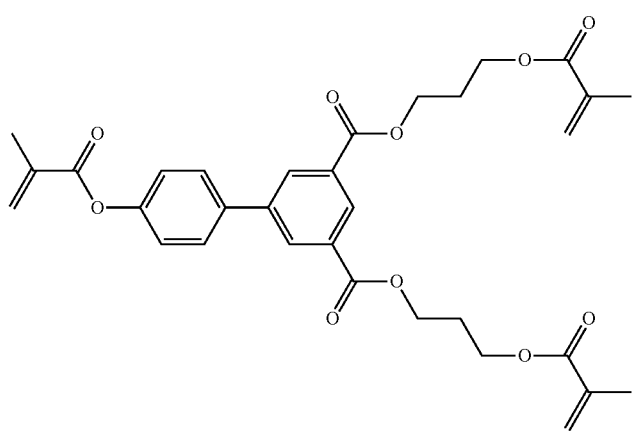 [SMILES: C=C(C)C(=O)OCCCOC(=O)c1cc(C(=O)OCCCOC(=O)C(=C)C)cc(-c2ccc(OC(=O)C(=C)C)cc2)c1]
RM-125
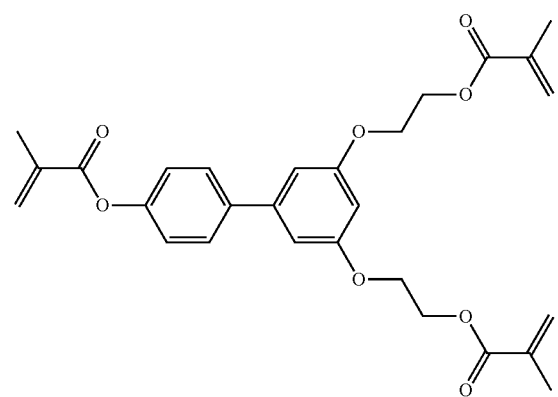 [SMILES: C=C(C)C(=O)OCCOc1cc(OCCOC(=O)C(=C)C)cc(-c2ccc(OC(=O)C(=C)C)cc2)c1]
RM-126

TABLE G-continued
Table G shows illustrative compounds which can preferably be used as polymerisable compounds in the LC media in accordance with the present invention.
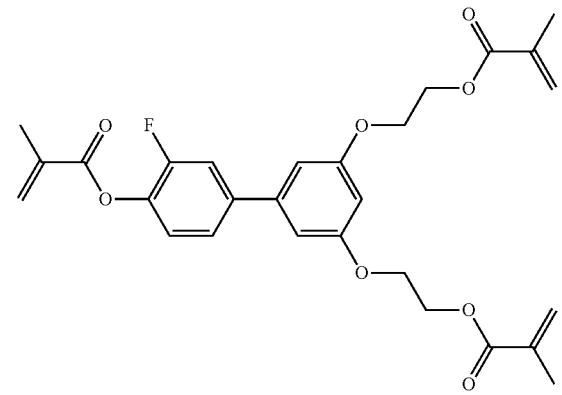 [SMILES: C=C(C)C(=O)OCCOc1cc(OCCOC(=O)C(=C)C)cc(-c2ccc(OC(=O)C(=C)C)c(F)c2)c1]
RM-127
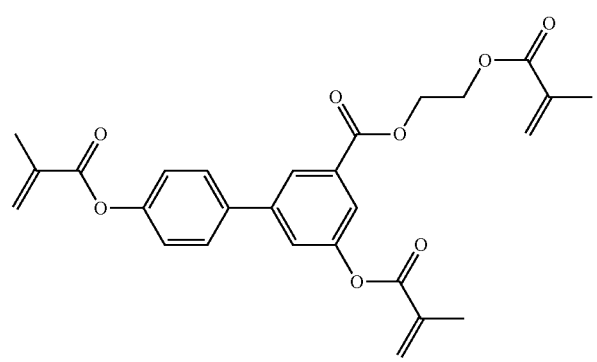 [SMILES: C=C(C)C(=O)OCCOC(=O)c1cc(OC(=O)C(=C)C)cc(-c2ccc(OC(=O)C(=C)C)cc2)c1]
RM-128
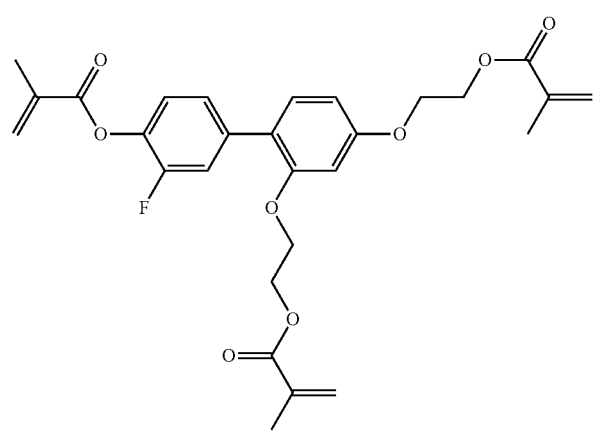 [SMILES: C=C(C)C(=O)OCCOc1ccc(-c2ccc(OC(=O)C(=C)C)c(F)c2)c(OCCOC(=O)C(=C)C)c1]
RM-129
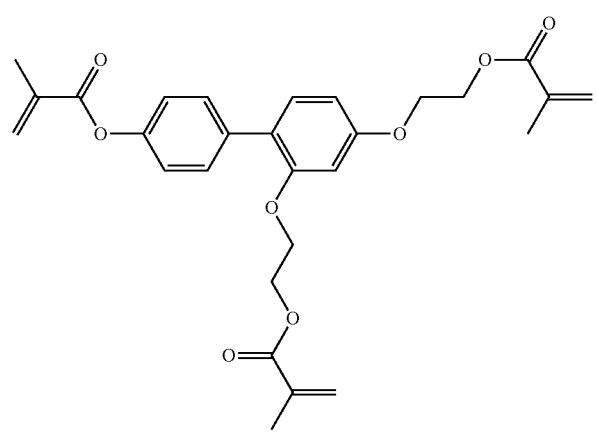 [SMILES: C=C(C)C(=O)OCCOc1ccc(-c2ccc(OC(=O)C(=C)C)cc2)c(OCCOC(=O)C(=C)C)c1]
RM-130

TABLE G-continued
Table G shows illustrative compounds which can preferably be used as polymerisable compounds
in the LC media in accordance with the present invention.
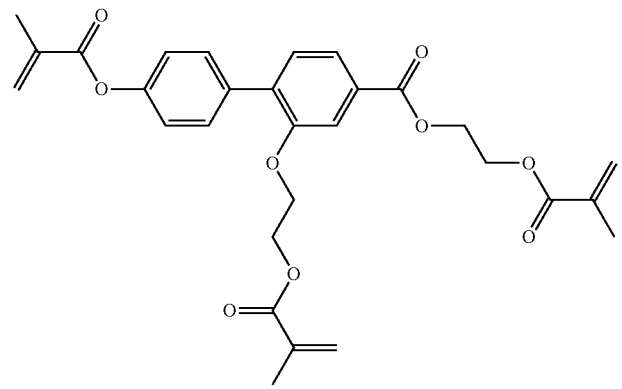 [SMILES: C=C(C)C(=O)OCCOC(=O)c1ccc(-c2ccc(OC(=O)C(=C)C)cc2)c(OCCOC(=O)C(=C)C)c1]
RM-131
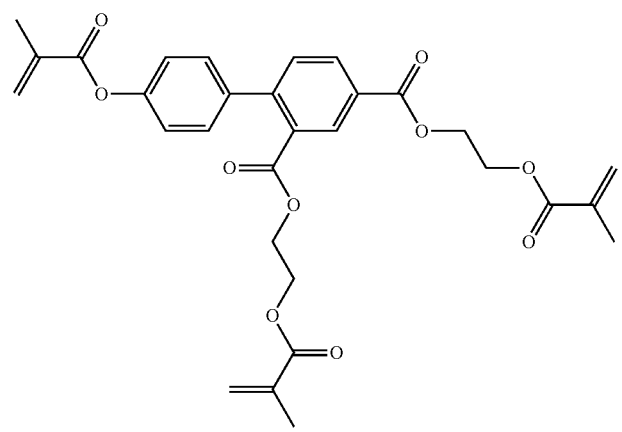 [SMILES: C=C(C)C(=O)OCCOC(=O)c1ccc(-c2ccc(OC(=O)C(=C)C)cc2)c(C(=O)OCCOC(=O)C(=C)C)c1]
RM-132
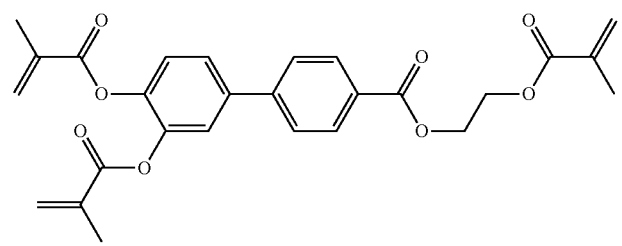 [SMILES: C=C(C)C(=O)OCCOC(=O)c1ccc(-c2ccc(OC(=O)C(=C)C)c(OC(=O)C(=C)C)c2)cc1]
RM-133
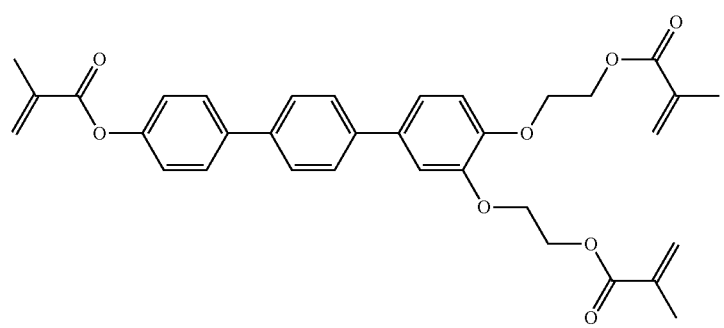
RM-134

TABLE G-continued
Table G shows illustrative compounds which can preferably be used as polymerisable compounds in the LC media in accordance with the present invention.
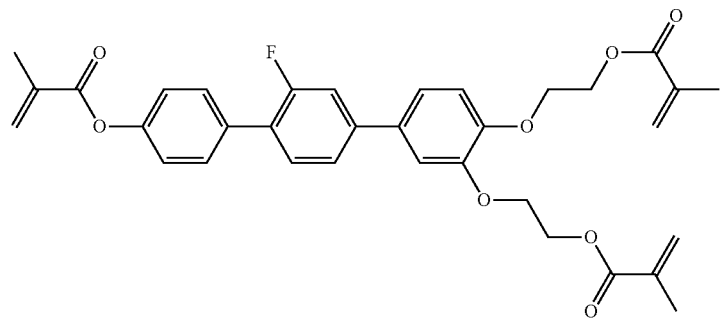 [SMILES: C=C(C)C(=O)OCCOc1ccc(-c2ccc(-c3ccc(OC(=O)C(=C)C)cc3)cc2)cc1OCCOC(=O)C(=C)C]
RM-135
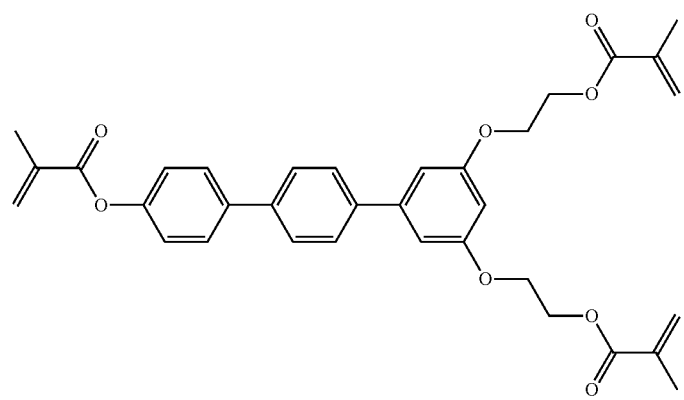 [SMILES: C=C(C)C(=O)OCCOc1cc(OCCOC(=O)C(=C)C)cc(-c2ccc(-c3ccc(OC(=O)C(=C)C)cc3)cc2)c1]
RM-136
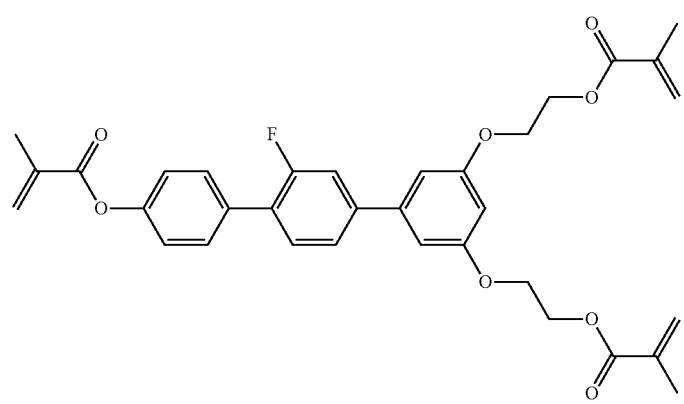 [SMILES: C=C(C)C(=O)OCCOc1cc(OCCOC(=O)C(=C)C)cc(-c2ccc(-c3ccc(OC(=O)C(=C)C)cc3)c(F)c2)c1]
RM-137
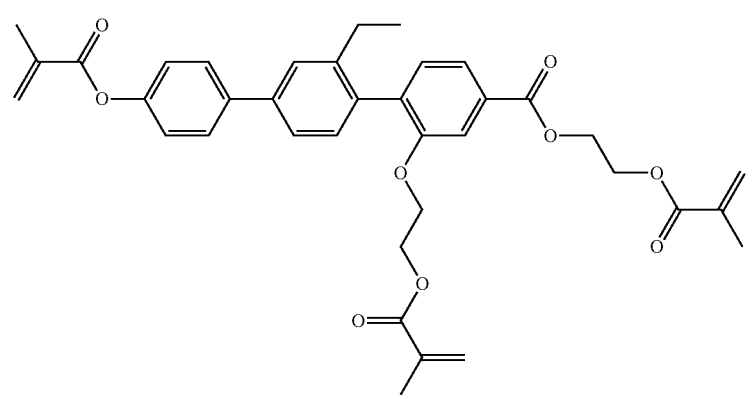 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]
RM-138

In a preferred embodiment of the present invention, the mesogenic media comprise one or more compounds selected from the group of the compounds from Table G.
TABLE H
Table H shows illustrative compounds which can preferably be employed as unpolymerisable self-alignment additives in the LC media in accordance with the present invention.
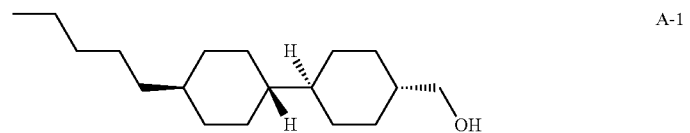
A-1
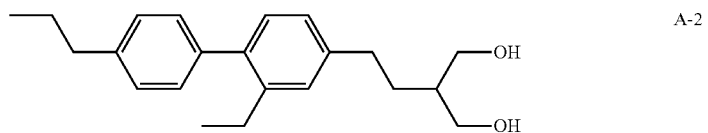
A-2
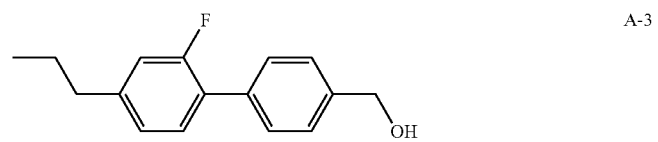
A-3
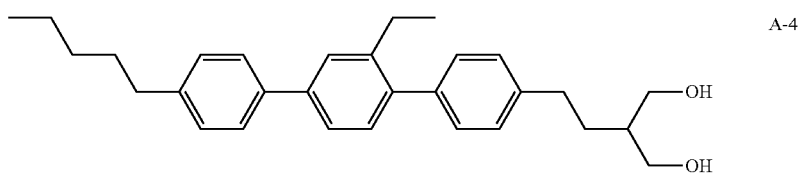
A-4
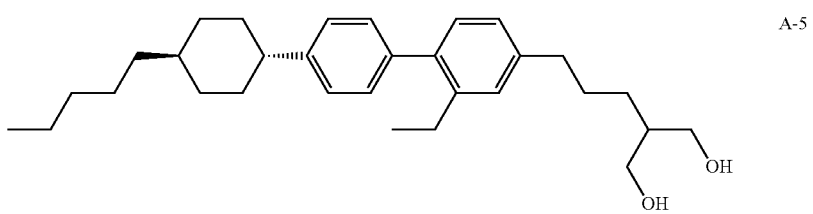
A-5
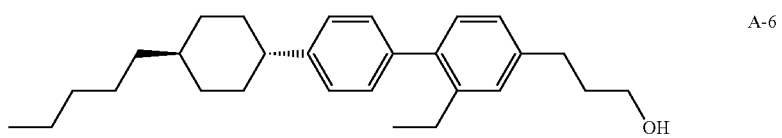
A-6
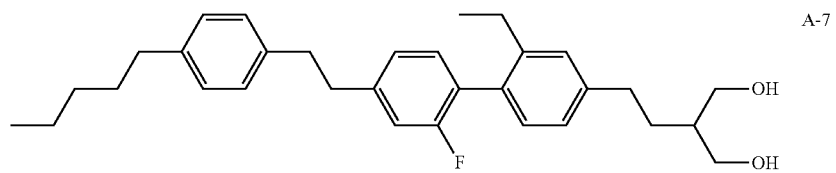
A-7
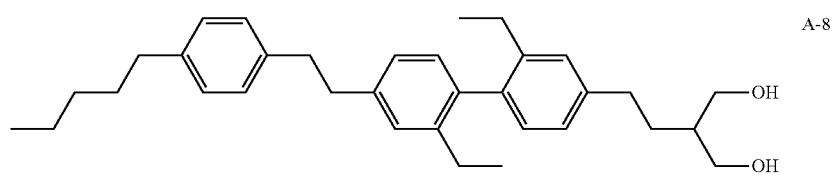
A-8

In the present application, the term "compounds", also written as "compound(s)", denotes, unless explicitly indicated otherwise, both one and also a plurality of compounds. Conversely, the term "compound" generally also encompasses a plurality of compounds, if this is possible according to the definition and is not indicated otherwise. The same applies to the terms LC media and LC medium. The term "component" in each case encompasses one or more substances, compounds and/or particles.

In addition, the following abbreviations and symbols are used:

$n_e$ extraordinary refractive index at 20° C. and 589 nm,
$n_o$ ordinary refractive index at 20° C. and 589 nm,
Δn optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
Δε dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN]
$V_0$ capacitive threshold (Freedericks threshold) at 20° C. [V].

Unless explicitly noted otherwise, all concentrations in the present application are quoted in percent by weight and relate to the corresponding mixture as a whole comprising all solid or liquid-crystalline components, without solvents.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δε at 1 kHz, unless explicitly indicated otherwise in each case.

The polymerisable compounds are polymerised in the display or test cell by irradiation with UVA light (usually 365 nm) of defined intensity for a pre-specified time, with a voltage optionally being applied simultaneously to the display (usually 10 to 30 V alternating current, 1 kHz). In the examples, unless indicated otherwise, a 100 mW/cm² mercury vapour lamp is used, and the intensity is measured using a standard UV meter (Ushio UNI meter) fitted with a 320 nm (optionally 340 nm) band-pass filter.

The following examples explain the present invention without intending to restrict it in any way. However, the physical properties make clear to the person skilled in the art what properties can be achieved and in what ranges they can be modified. In particular, the combination of the various properties which can preferably be achieved is thus well defined for the person skilled in the art.

Further combinations of the embodiments and variants of the invention in accordance with the description also arise from the claims.

EXAMPLES

The compounds employed, if not commercially available, are synthesised by standard laboratory procedures. The LC media originate from Merck KGaA, Germany.

A) Synthesis Examples

Example 1. Synthesis of 3-{2-[4-hydroxy-3-(hydroxymethyl)butoxy]-3-{3-[(2-methylprop-2-enoyl)oxy]propyl}-5-[4-(4-pentylcyclohexyl)cyclohexyl]phenyl}-propyl 2-methylprop-2-enoate 1

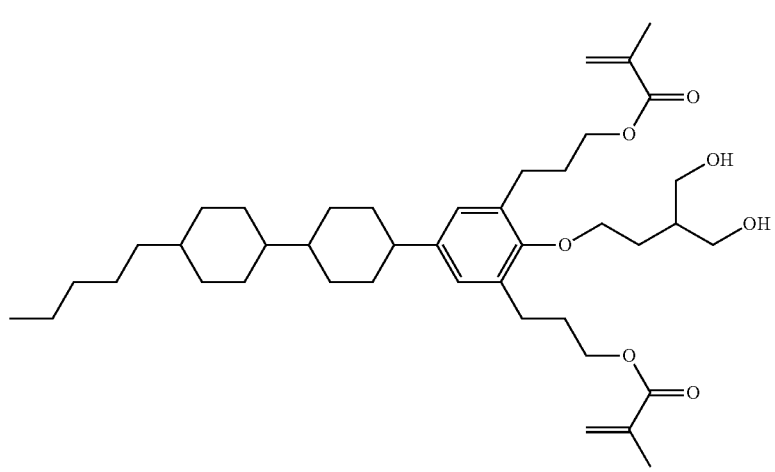

1.1. Synthesis of 1-(benzyloxy)-4-[4-(4-pentylcyclohexyl)cyclohex-1-en-1-yl]-benzene (A)

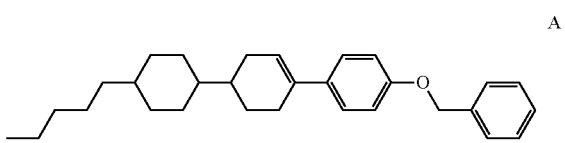 [SMILES: CCCCCC1CCC(C2CC=C(c3ccc(OCc4ccccc4)cc3)CC2)CC1]

A 3.40 g (140 mmol) of magnesium turnings are initially introduced in 10 ml of tetrahydrofuran (THF), the mixture is warmed to the boiling point, and 10 ml of a solution of 36.0 g (137 mmol) of 1-(benzyloxy)-4-bromobenzene in 90 ml of THF are added in order to initiate the Grignard reaction. The heat source is removed, and the remaining solution is slowly added dropwise to the reaction mixture at such a rate that the reaction solution boils under reflux. During this addition, the reaction mixture changes colour to brown, and, when the addition is complete, the mixture is stirred at the boiling point for a further 1 h. A solution of 30.0 g (120 mmol) of 4-(4-pentylcyclohexyl)cyclohexan-1-one in 200 ml of THF is added dropwise at the boiling point, and the mixture is stirred at this temperature for 1 h. The reaction mixture is allowed to cool to room temperature, carefully acidified using water and semiconcentrated hydrochloric acid and extracted with methyl tert-butyl ether, and the phases are separated. The combined organic phases are washed with water and saturated $NaHCO_3$ solution, dried over sodium sulfate, filtered and evaporated in vacuo. The intermediate obtained is then dissolved in 700 ml of toluene, 1.29 g (6.97 mmol) of toluene-4-sulfonic acid monohydrate are added, and the mixture is stirred under reflux for 7 h. During this time, the reaction solution changes colour from yellow-orange to dark brown. The suspension is washed with saturated $NaHCO_3$ solution, the aqueous phase is extracted with toluene, and the combined organic phases are washed with saturated NaCl solution, dried over sodium sulfate, filtered and evaporated in vacuo, giving the crude product as a brown solid, which is purified by column chromatography on silica gel with heptane/toluene (9:1 to 2:1). The product fractions are evaporated in vacuo, and the solid obtained is extracted from toluene by stirring with a little hot heptane and, after cooling, filtered off with suction, giving the reaction product as a pale-yellow solid.

$^1$H NMR (500 MHz, $CDCl_3$): δ=0.91 ppm ($t_{(superimposed)}$, 7.23 Hz, 5 H, $CH_3$, $CH_2$), 1.03 ($m_c$, 2 H, $CH_2$), 1.18 ($m_c$, 4 H, $CH_2$), 1.23-1.46 (m, 8 H, $CH_2$), 1.75-1.89 (m, 4 H, $CH_2$), 1.96 ($m_c$, 2 H, $CH_2$), 2.56 ($m_c$, 1 H), 2.35-2.43 (m, 1 H), 2.45-2.52 (m, 1 H), 5.08 (s, 2 H, $CH_2$—O), 6.05 ($m_c$, 1 H), 6.94 (d, 8.86 Hz, 2 H), 7.34 ($d_{(superimposed)}$, J=8.82 Hz, 3 H), 7.40 (t, 7.66 Hz, 2 H), 7.46 (d, 7.33 Hz, 2 H).

1.2. Synthesis of 4-[4-(4-pentylcyclohexyl)cyclohexyl]phenol (B)

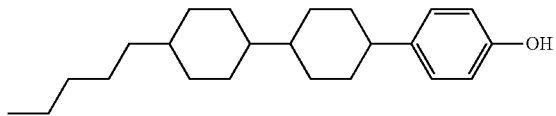

B 28.6 g (68.6 mmol) of benzyl ether A are dissolved in 280 ml of THF, and 7.5 g of palladium on carbon (54% of water, E101 R, Degussa) are added. The reaction mixture is then stirred under atmospheric pressure at room temperature under a hydrogen atmosphere for 17.5 h. The reaction solution is separated off from the catalyst and evaporated in vacuo. The crude product obtained is crystallised from heptane, giving a colourless solid.

$^1$H NMR (500 MHz, $CDCl_3$): δ=0.91 ppm ($t_{(superimposed)}$, 5 H, $CH_3$ $CH_2$), 1.03 ($m_c$, 3 H), 1.11-1.21 (m, 6 H), 1.22-1.47 (m, 8 H), 1.78 ($m_c$, 4 H), 1.85 ($m_c$, 2 H), 1.91 ($d_{(broad)}$, 12.03 Hz, 2 H), 2.41 (tt, J=3.37, 12.14 Hz, 1 H, $CH(CH_2)_2$), 4.52 (s, 1 H, OH), 6.77 (d, J=8.58, 2 H), 7.10 (d, J=8.49, 2 H).

1.3 Synthesis of 2,6-dibromo-4-[4-(4-pentylcyclohexyl)cyclohexyl]phenol (C)

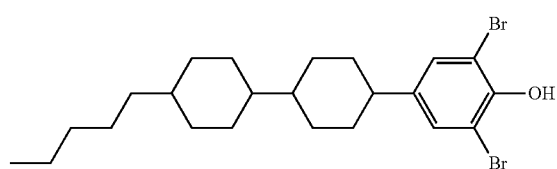

C 22.3 g (67.3 mmol) of phenol B are suspended in 400 ml of dichloromethane, and 2.00 ml (14.0 mmol) of diisopropylamine are added. 24.00 g (134.8 mmol) of N-bromosuccinimide are dissolved in 200 ml of dichloromethane and added dropwise to the reaction solution at room temperature. The reaction mixture is stirred at room temperature for 16 h, and water is subsequently added, the mixture is stirred, and the phases are separated. The water phase is extracted with dichloromethane, and the combined organic phases are washed with saturated NaCl solution, dried over sodium sulfate, filtered and evaporated in vacuo, giving a yellow solid, which is crystallised from heptane (1:5) at 5° C., giving the product as a pale-yellow solid.

$^1$H NMR (500 MHz, $CDCl_3$): δ=0.91 ppm ($t_{(superimposed)}$, J=7.22 Hz, 5 H, $CH_3$ $CH_2$), 0.95-1.21(m, 9 H), 1.22-1.44 (m, 8 H), 1.76 ($m_c$, 4 H), 1.87 ($m_c$, 4 H), 2.40 (tt, J=3.32, 12.15 Hz, 1 H, $CH(CH_2)_2$, 5.57 ($s_{(broad)}$, 1 H, OH), 7.30 (s, 2 H).

1.4 Synthesis of 6-(2-{2.6-dibromo-4-[4-(4-pentyl-cyclohexyl)cyclohexyl]-phenoxy}ethyl)-2.2,3.3,9.9,10.10-octamethyl-4.8-dioxa-3.9-disilaundecane (E)

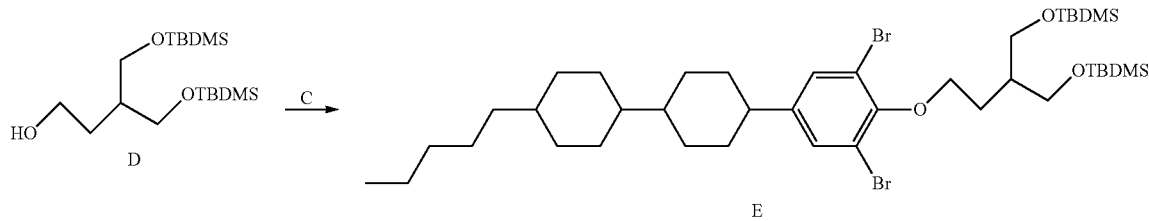

10.00 g (20.36 mmol) of dibromide C, 8.90 g (25.5 mmol) of alcohol D (synthesis cf. EP 2918658 A2) and 6.70 g (25.55 mmol) of triphenylphosphine are dissolved in 70.0 ml of tetrahydrofuran, and 5.30 ml (27.00 mmol) of diisopropyl azodicarboxylate are added dropwise. The reaction solution is stirred at room temperature for 16 h and subsequently evaporated in vacuo. The solid obtained is filtered through silica gel with heptane and heptane/ethyl acetate (9:1), and the product fractions are combined and evaporated in vacuo, giving the product as a yellow solid.

1.5 Synthesis of 3-(2-{4-[(tert-butyldimethylsilyl)oxy]-3-{[(tert-butyldimethylsilyl)oxy]methyl}butoxy}-3-(3-hydroxypropyl)-5-[4-(4-pentylcyclohexyl)cyclohexyl]phenyl)propan-1-ol F

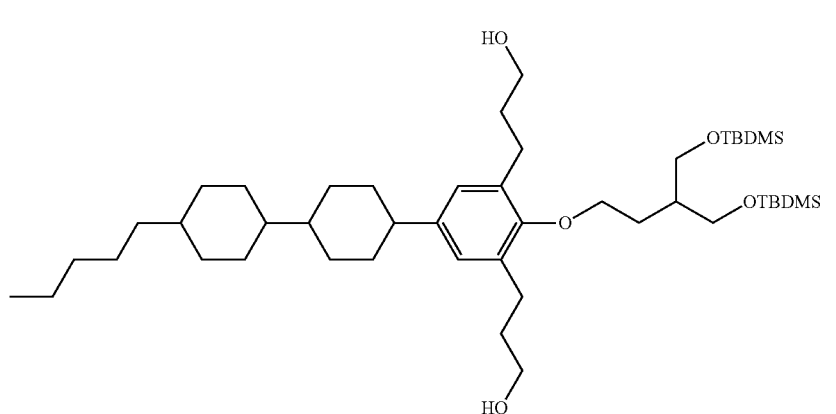

18.13 g (171.1 mmol) of sodium carbonate are dissolved in 96.4 ml of water. A solution of 31.2 g (38.0 mmol) of bromide E and 59.6 g (420.1 mmol) of 2-butoxy-1,2-oxaborolane in 371.3 ml of tetrahydrofuran is added. 0.53 ml (3.81 mmol) of triethylamine, 0.80 g (4.58 mmol) of palladium(II) chloride and 4.28 g (9.17 mmol) of 2-dicyclohexylphosphino-2',6'-diisopropoxy-1,1'-biphenyl are added to the reaction mixture. The reaction mixture is stirred at 80° C. for 72 h and allowed to cool to room temperature, water and methyl tert-butyl ether are added, the mixture is stirred, and the phases are separated. The water phase is extracted with methyl tert-butyl ether, and the combined organic phases are washed with saturated NaCl solution, dried over sodium sulfate, filtered and evaporated in vacuo. The orange-yellow oil obtained is filtered through silica gel with heptane/ethyl acetate (8:2), and the product fractions are combined and evaporated in vacuo, giving the product as a pale-yellow oil.

1.6 Synthesis of 3-{2-[4-hydroxy-3-(hydroxymethyl)butoxy]-3-{3-[(2-methylprop-2-enoyl)oxy]propyl}-5-[4-(4-pentylcyclohexyl)cyclohexyl]phenyl}propyl 2-methylprop-2-enoate (G)

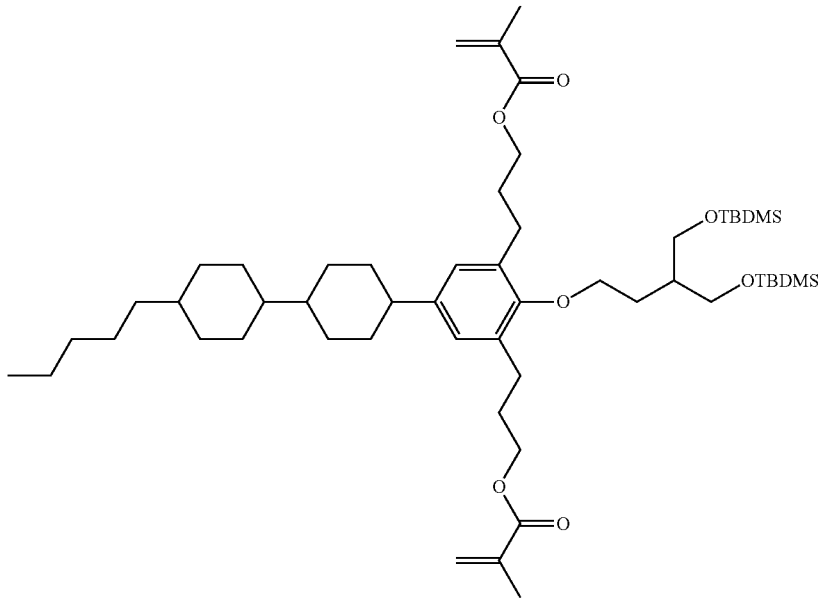

9.80 g (13.0 mmol) of bisalcohol F and 4.5 ml (53.1 mmol) of methacrylic acid are dissolved in 60 ml of dichloromethane and cooled to 2° C. A solution of 9.10 ml (52.8 mmol) of 1-(3-dimethylaminopropyl)-3-ethylcarbodiimide in 40 ml of dichloromethane is then added dropwise, and the mixture is stirred at room temperature for 16 h. The reaction mixture is evaporated in vacuo and filtered through silica gel with an upper layer of $Al_2O_3$ (basic) with dichloromethane and dichloromethane/methyl tert butyl ether (95:5). The product fractions are combined and evaporated in vacuo, giving the reaction product as a colourless oil.

$^1$H NMR (500 MHz, $CDCl_3$): δ=0.00 ppm (s, 12 H, $Si(CH_3)_2$), 0.85 ($s_{(superimposed)}$, 23 H, $Si(C(CH_3)_3)$, $CH_3$, $CH_2$), 0.90-1.16 (m, 9 H), 1.16-1.14 (m, 8 H), 1.66-1.87 (m, 11 H), 1.91 (s, 6 H, $CH_3$), 1.96 ($m_c$, 4 H), 2.30 (tt, J=3.17, 12.13 Hz, 1 H, $CH(CH_2)_2$), 2.65 ($m_c$, 4 H), 3.56 ($m_c$, 4 H), 3.76 (t, J=6.68 Hz, 2 H), 4.13 (t, J=6.56 Hz, 4 H), 5.51 (t, 1.6 Hz, 2 H), 6.06 (s, 2 H), 6.81 (s, 2 H).

1.7 Synthesis of 3-{2-[4-hydroxy-3-(hydroxymethyl)butoxy]-3-{3-[(2-methylprop-2-enoyl)oxy]propyl}-5-[4-(4-pentylcyclohexyl)cyclohexyl]phenyl}propyl 2-methylprop-2-enoate 1

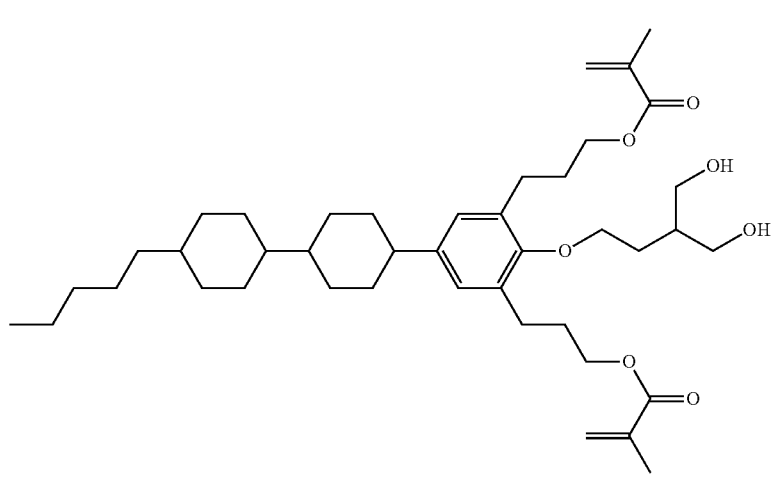

4.70 g (5.00 mmol) of compound G are dissolved in 40 ml of tetrahydrofuran and cooled to 2° C. 7.00 ml (14.0 mmol) of hydrochloric acid (2 N) are then added dropwise. The reaction solution is then stirred at room temperature for 4 h. When deprotection is complete, the reaction mixture is neutralised using saturated $NaHCO_3$ solution, methyl tert-butyl ether is added, and the mixture is stirred. The phases are separated, the water phase is extracted with methyl tert-butyl ether, and the combined organic phases are washed with water and saturated NaCl solution, dried over sodium sulfate, filtered and evaporated in vacuo at a maximum temperature of 40° C. The crude product obtained is filtered through silica gel with heptane/ethyl acetate (1:1), and the product fractions are evaporated in vacuo. The solid obtained is crystallised from heptane/methyl tert butyl ether (95:5) (60° C. for the solution). The reaction product precipitates out as a colourless solid at room temperature and can be filtered off with suction.

Phases: Tg −35° C., melting point 79° C.

$^1$H NMR (500 MHz, $CDCl_3$): δ=0.83-0.94 ppm ($t_{(superimposed)}$, J=7.21 Hz, 5 H), 0.96-1.21, 9 H), 1.22-1.45 (m, 8 H), 1.72-1.94 (m, 10 H), 1.97 ($s_{(superimposed)}$, 6 H, $CH_3$), 2.02 ($m_c$, 4 H), 2.10 ($m_c$, 1 H), 2.37 ($tt_{(superimposed\ with\ 2\ OH)}$, J=3.14, 12.1 Hz, 3 H, $CH(CH_2)_2$), 2.69 ($m_c$, 4 H), 3.79 (dd, 6.7, 10.81 Hz, 2 H, $CH_2OH$), 3.86 (t, J=6.31 Hz, 2 H), 3.90 (dd, 4.31, 10.80 Hz, 2 H, CH2OH), 4.24 (t, 6.7 Hz, 4 H), 5.56 (t, 1.59 Hz, 2 H, $O(CO)C(CH_3)CH_2$), 6.13 ($s_{(broad)}$ 2 H, $O(CO)C(CH_3)CH_2$), 6.88 (s, 2 H).

The following compounds can be prepared analogously by the synthesis described:

Example 2

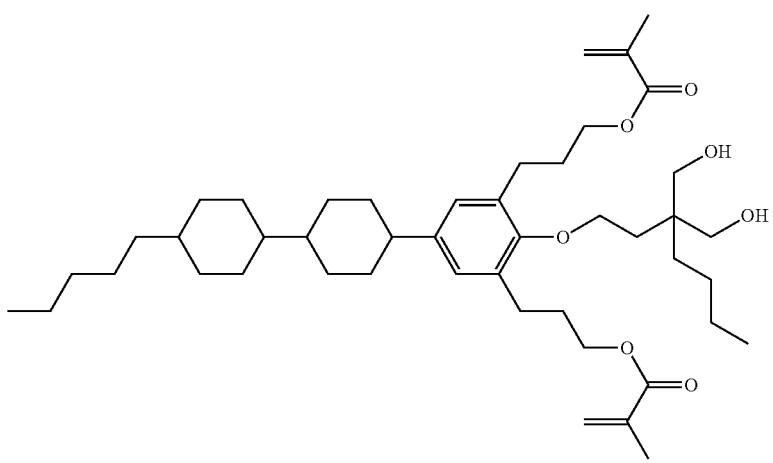

2

Colourless crystals.

Phases: Tg −28° C., melting point 47° C.

$^1$H NMR (500 MHz, $CDCl_3$): δ=0.91 ppm ($m_c$, 8 H, $CH_3$, $CH_2$), 1.03 ($m_c$, 3 H), 1.10-1.21 (m, 6 H), 1.22-1.50 (m, 14 H), 1.67-1.92 (m, 8 H), 1.97 ($s_{(superimposed)}$, 8 H, $CH_3$), 2.02 ($m_c$, 4 H), 2.37 ($tt_{(superimposed\ with\ 2x\ OH)}$, 2.94, 9.18 Hz, 3 H, $CH(CH_2)_2$), 2.72 ($m_c$, 4 H), 3.67 (2× $d_{(superimposed)}$, J=11.58 Hz, 4 H), 3.90 (t, J=6.26 Hz, 2 H), 4.23 (t, J=6.6 Hz, 4 H), 5.58 (t, J=1.54 Hz, 2 H, $O(CO)C(CH_3)CH_2$), 6.13 ($s_{(broad)}$, 2 H, $O(CO)C(CH_3)CH_2$), 6.89 (s, 2 H).

Example 3

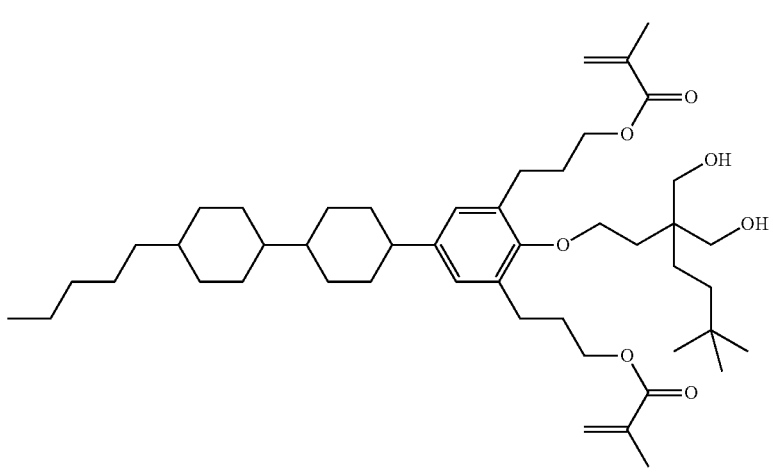

3

Colourless crystals.

Phases: Tg −18° C., melting point 73° C.

$^1$H NMR (500 MHz, CDCl$_3$): δ=0.82-0.94 ppm (s$_{(superimposed)}$, 14 H, t-Bu, CH$_3$, CH$_2$), 1.02 (m$_c$, 3 H), 1.16 (m$_c$, 8 H), 1.30 (m$_c$, 8 H), 1.40 (m$_c$, 2 H), 1.70-1.92 (m, 8 H), 1.94 (t, J=6.28 Hz, 2 H), 1.97 (s$_{(superimposed)}$, 6 H, CH$_3$), 2.02 (quint.$_{(broad)}$ J=7.53 Hz, 4 H), 2.37 (tt, J=2.92, 12.08 Hz, 1 H, CH(CH$_2$)$_2$), 2.50 (s$_{(broad)}$, 2 H, OH), 2.71 (m$_c$, 4 H), 3.65 (d, J=11.13 Hz, 2 H, CH$_2$OH), 3.68 (d, J=11.14 Hz, CH$_2$—OH), 3.89 (t, J=6.23 H, 2 H), 4.23 (t, J=6.61, 4 H), 5.59 (s$_{(broad)}$, 2 H, O(CO)C(CH$_3$)CH$_2$), 6.13 (s$_{(broad)}$, 2 H, O(CO)C(CH$_3$)CH$_2$), 6.89 (s, 2 H).

Example 4

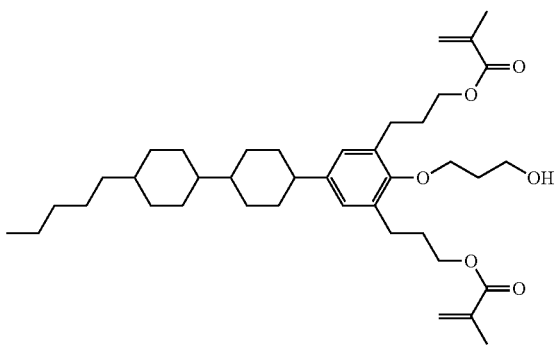

Colourless crystals.

Phases: Tg −56° C., melting point 65° C.

B) Mixture Examples

LC media according to the invention are prepared using the following liquid-crystalline mixtures consisting of low-molecular-weight components in the percentage proportions by weight indicated (acronyms cf. Tables A-E above).

| H1: Nematic host mixture (Δε < 0) | | | |
|---|---|---|---|
| B-2O-O5 | 4.00% | Clearing point [° C.]: | 74.2 |
| CPP-3-2 | 8.00% | Δn (589 nm, 20° C.): | 0.109 |
| CC-3-V1 | 9.00% | Δε (1 kHz, 20° C.): | −3.1 |
| CC-3-O1 | 2.00% | ε$_∥$ (1 kHz, 20° C.): | 3.6 |
| CC-3-4 | 8.00% | ε$_⊥$ (1 kHz, 20° C.): | 6.7 |
| CC-3-5 | 7.00% | K$_1$ (20° C.) [pN]: | 14.5 |
| CCP-3-1 | 8.00% | K$_3$ (20° C.) [pN]: | 16.5 |
| CCP-V2-1 | 5.00% | γ$_1$ (20° C.) [mPa · s]: | 108 |
| CCY-3-O2 | 10.50% | V$_0$ (20° C.) [V]: | 2.41 |
| CLY-3-O2 | 1.00% | | |
| CPY-3-O2 | 2.50% | | |
| CY-3-O2 | 11.5% | | |
| CP-3-O1 | 5.50% | | |
| PY-3-O2 | 18.0% | | |
| H2: Nematic host mixture (Δε < 0) | | | |
| CPP-3-2 | 6.0% | Clearing point [° C.]: | 74.8 |
| CC-3-V1 | 6.0% | Δn (589 nm, 20° C.): | 0.107 |
| CC-3-4 | 9.0% | Δε (1 kHz, 20° C.): | −3.3 |
| CC-3-5 | 7.0% | ε$_∥$ (1 kHz, 20° C.): | 3.6 |
| CCP-3-1 | 8.0% | ε$_⊥$ (1 kHz, 20° C.): | 6.9 |
| CCP-3-3 | 3.0% | K$_1$ (20° C.) [pN]: | 14.2 |
| CCY-3-1 | 2.0% | K$_3$ (20° C.) [pN]: | 16.5 |
| CCY-3-O2 | 10.5% | γ$_1$ (20° C.) [mPa · s]: | 118 |
| CCY-4-O2 | 5.0% | V$_0$ (20° C.) [V]: | |
| CPY-3-O2 | 3.5% | | |
| CY-3-O2 | 14% | | |
| CP-3-O1 | 5.5% | | |
| PY-1-O4 | 6.5% | | |
| PY-3-O2 | 14% | | |
| H3: Nematic host mixture (Δε < 0) | | | |
| CY-3-O2 | 15.5% | Clearing point [° C.]: | 75.1 |
| CCY-3-O3 | 8.00% | Δn (589 nm, 20° C.): | 0.098 |
| CCY-4-O2 | 10.0% | Δε (1 kHz, 20° C.): | −3.0 |
| CPY-2-O2 | 5.50% | ε$_∥$ (1 kHz, 20° C.): | 3.4 |
| CPY-3-O2 | 11.5% | ε$_⊥$ (1 kHz, 20° C.): | 6.4 |
| CC-3-4 | 9.25% | K$_1$ (20° C.) [pN]: | 13.1 |
| CC-2-3 | 24.5% | K$_3$ (20° C.) [pN]: | 13.3 |
| PYP-2-3 | 8.75% | γ$_1$ (20° C.) [mPa · s]: | 113 |
| CP-3-O1 | 7.00% | V$_0$ (20° C.) [V]: | 2.22 |
| H4: Nematic host mixture (Δε < 0) | | | |
| CY-3-O4 | 14.0% | Clearing point [° C.]: | 80.0 |
| CCY-3-O2 | 9.00% | Δn (589 nm, 20° C.): | 0.090 |
| CCY-3-O3 | 9.00% | Δε (1 kHz, 20° C.): | −3.3 |
| CPY-2-O2 | 10.0% | ε$_∥$ (1 kHz, 20° C.): | 3.4 |
| CPY-3-O2 | 10.0% | ε$_⊥$ (1 kHz, 20° C.): | 6.7 |
| CCY-3-1 | 8.00% | K$_1$ (20° C.) [pN]: | 15.1 |
| CC-3-4 | 9.00% | K$_3$ (20° C.) [pN]: | 14.6 |
| CC-3-5 | 6.00% | γ$_1$ (20° C.) [mPa · s]: | 140 |
| CP-5-3 | 10.0% | V$_0$ (20° C.) [V]: | 2.23 |
| CC-3-O1 | 6.00% | | |
| CC-3-O3 | 9.00% | | |
| H5: Nematic host mixture (Δε < 0) | | | |
| CC-3-V1 | 9.00% | Clearing point [° C.]: | 74.7 |
| CC-2-3 | 18.0% | Δn (589 nm, 20° C.): | 0.098 |
| CC-3-4 | 3.00% | Δε (1 kHz, 20° C.): | −3.4 |
| CC-3-5 | 7.00% | ε$_∥$ (1 kHz, 20° C.): | 3.5 |
| CCP-3-1 | 5.50% | ε$_⊥$ (1 kHz, 20° C.): | 6.9 |
| CCY-3-O2 | 11.5% | K$_1$ (20° C.) [pN]: | 14.9 |
| CPY-2-O2 | 8.00% | K$_3$ (20° C.) [pN]: | 15.9 |
| CPY-3-O2 | 11.0% | γ$_1$ (20° C.) [mPa · s]: | 108 |
| CY-3-O2 | 15.5% | V$_0$ (20° C.) [V]: | 2.28 |
| PY-3-O2 | 11.5% | | |
| H6: Nematic host mixture (Δε < 0) | | | |
| CC-3-V | 37.5% | Clearing point [° C.]: | 74.8 |
| CC-3-V1 | 2.00% | Δn (589 nm, 20° C.): | 0.099 |
| CCY-4-O2 | 14.5% | Δε (1 kHz, 20° C.): | −2.9 |
| CPY-2-O2 | 10.5% | ε$_∥$ (1 kHz, 20° C.): | 3.7 |
| CPY-3-O2 | 9.50% | ε$_⊥$ (1 kHz, 20° C.): | 6.6 |
| CY-3-O2 | 15.0% | K$_1$ (20° C.) [pN]: | 12.2 |
| CY-3-O4 | 4.50% | K$_3$ (20° C.) [pN]: | 13.4 |
| PYP-2-4 | 5.50% | γ$_1$ (20° C.) [mPa · s]: | 92 |
| PPGU-3-F | 1.00% | V$_0$ (20° C.) [V]: | 2.28 |
| H7: Nematic host mixture (Δε < 0) | | | |
| CC-2-3 | 20.0% | Clearing point [° C.]: | 74.8 |
| CC-3-O1 | 6.00% | Δn (589 nm, 20° C.): | 0.105 |
| CC-3-4 | 6.00% | Δε (1 kHz, 20° C.): | −3.2 |
| CCP-3-1 | 3.00% | ε$_∥$ (1 kHz, 20° C.): | 3.5 |
| CCY-3-O2 | 11.0% | ε$_⊥$ (1 kHz, 20° C.): | 6.8 |
| CPY-2-O2 | 12.0% | K$_1$ (20° C.) [pN]: | 12.7 |
| CPY-3-O2 | 11.0% | K$_3$ (20° C.) [pN]: | 13.6 |
| CY-3-O2 | 14.0% | γ$_1$ (20° C.) [mPa · s]: | 120 |
| CY-3-O4 | 4.00% | V$_0$ (20° C.) [V]: | 2.16 |
| CP-3-O1 | 4.00% | | |
| PYP-2-3 | 9.00% | | |
| H8: Nematic host mixture (Δε < 0) | | | |
| CC-4-V | 17.0% | Clearing point [° C.]: | 106.1 |
| CCP-V-1 | 15.0% | Δn (589 nm, 20° C.): | 0.120 |

| | | | | |
|---|---|---|---|---|
| CCEPC-3-3 | 2.50% | Δε (1 kHz, 20° C.): | | −3.6 |
| CCY-3-O2 | 4.00% | $\varepsilon_\parallel$ (1 kHz, 20° C.): | | 3.5 |
| CCY-3-O3 | 5.00% | $\varepsilon_\perp$ (1 kHz, 20° C.): | | 7.0 |
| CCY-4-O2 | 5.00% | $K_1$ (20° C.) [pN]: | | 16.8 |
| CLY-3-O2 | 3.50% | $K_3$ (20° C.) [pN]: | | 17.3 |
| CLY-3-O3 | 2.00% | $\gamma_1$ (20° C.) [mPa·s]: | | 207 |
| CPY-2-O2 | 8.00% | $V_0$ (20° C.) [V]: | | 2.33 |
| CPY-3-O2 | 10.0% | | | |
| CY-3-O4 | 17.0% | | | |
| PYP-2-3 | 11.0% | | | |

H9: Nematic host mixture (Δε < 0)

| | | | |
|---|---|---|---|
| CY-3-O2 | 15.0% | Clearing point [° C.]: | 75.5 |
| CCY-4-O2 | 9.50% | Δn (589 nm, 20° C.): | 0.108 |
| CCY-5-O2 | 5.00% | Δε (1 kHz, 20° C.): | −3.0 |
| CPY-2-O2 | 9.00% | $\varepsilon_\parallel$ (1 kHz, 20° C.): | 3.5 |
| CPY-3-O2 | 9.00% | $\varepsilon_\perp$ (1 kHz, 20° C.): | 6.5 |
| CC-3-4 | 9.00% | $K_1$ (20° C.) [pN]: | 12.9 |
| CC-2-3 | 22.0% | $K_3$ (20° C.) [pN]: | 13.0 |
| PYP-2-3 | 7.00% | $\gamma_1$ (20° C.) [mPa·s]: | 115 |
| PYP-2-4 | 7.50% | $V_0$ (20° C.) [V]: | 2.20 |
| CP-3-O1 | 7.00% | | |

H10: Nematic host mixture (Δε < 0)

| | | | |
|---|---|---|---|
| CY-3-O2 | 15.0% | Clearing point [° C.]: | 74.7 |
| CY-5-O2 | 6.50% | Δn (589 nm, 20° C.): | 0.108 |
| CCY-3-O2 | 11.0% | Δε (1 kHz, 20° C.): | −3.0 |
| CPY-2-O2 | 5.50% | $\varepsilon_\parallel$ (1 kHz, 20° C.): | 3.6 |
| CPY-3-O2 | 10.5% | $\varepsilon_\perp$ (1 kHz, 20° C.): | 6.6 |
| CC-3-V | 28.5% | $K_1$ (20° C.) [pN]: | 12.9 |
| CC-3-V1 | 10.0% | $K_3$ (20° C.) [pN]: | 15.7 |
| PYP-2-3 | 12.5% | $\gamma_1$ (20° C.) [mPa·s]: | 97 |
| PPGU-3-F | 0.50% | $V_0$ (20° C.) [V]: | 2.42 |

H11: Nematic host mixture (Δε < 0)

| | | | |
|---|---|---|---|
| CC-3-5 | 9.50% | Clearing point [° C.]: | 79.1 |
| CC-5-O1 | 5.00% | Δn (589 nm, 20° C.): | 0.091 |
| CCY-2-1 | 9.50% | Δε (1 kHz, 20° C.): | −3.6 |
| CCY-3-1 | 10.5% | $\varepsilon_\parallel$ (1 kHz, 20° C.): | 3.5 |
| CCY-3-O2 | 10.5% | $\varepsilon_\perp$ (1 kHz, 20° C.): | 7.1 |
| CCY-5-O2 | 9.50% | $K_1$ (20° C.) [pN]: | 14.6 |
| CPY-2-O2 | 12.0% | $K_3$ (20° C.) [pN]: | 14.5 |
| CY-3-O4 | 9.00% | $\gamma_1$ (20° C.) [mPa·s]: | 178 |
| CY-5-O4 | 11.0% | $V_0$ (20° C.) [V]: | 2.12 |
| CP-5-3 | 13.5% | | |

H12: Nematic host mixture (Δε < 0)

| | | | |
|---|---|---|---|
| CPP-3-2 | 4.00% | Clearing point [° C.]: | 74.8 |
| CC-3-V1 | 8.00% | Δn (589 nm, 20° C.): | 0.106 |
| CC-2-3 | 13.0% | Δε (1 kHz, 20° C.): | −3.5 |
| CC-3-4 | 7.00% | $\varepsilon_\parallel$ (1 kHz, 20° C.): | 3.6 |
| CC-3-5 | 7.00% | $\varepsilon_\perp$ (1 kHz, 20° C.): | 7.1 |
| CCY-3-O2 | 13.0% | $K_1$ (20° C.) [pN]: | 14.8 |
| CPY-2-O2 | 7.00% | $K_3$ (20° C.) [pN]: | 15.8 |
| CPY-3-O2 | 12.0% | $\gamma_1$ (20° C.) [mPa·s]: | 115 |
| CY-3-O2 | 12.0% | $V_0$ (20° C.) [V]: | 2.23 |
| CP-3-O1 | 2.00% | | |
| PY-3-O2 | 15.0% | | |

H13: Nematic host mixture (Δε < 0)

| | | | |
|---|---|---|---|
| CY-3-O4 | 22.0% | Clearing point [° C.]: | 86.9 |
| CY-5-O4 | 12.0% | Δn (589 nm, 20° C.): | 0.111 |
| CCY-3-O2 | 6.00% | Δε (1 kHz, 20° C.): | −4.9 |
| CCY-3-O3 | 6.00% | $\varepsilon_\parallel$ (1 kHz, 20° C.): | 3.8 |
| CCY-4-O2 | 6.00% | $\varepsilon_\perp$ (1 kHz, 20° C.): | 8.7 |
| CPY-2-O2 | 10.0% | $K_1$ (20° C.) [pN]: | 14.9 |
| CPY-3-O2 | 10.0% | $K_3$ (20° C.) [pN]: | 15.9 |
| PYP-2-3 | 7.00% | $\gamma_1$ (20° C.) [mPa·s]: | 222 |
| CC-3-V1 | 7.00% | $V_0$ (20° C.) [V]: | 1.91 |
| CC-5-V | 10.0% | | |
| CCEPC-3-3 | 2.00% | | |
| CCEPC-3-5 | 2.00% | | |

H14: Nematic host mixture (Δε < 0)

| | | | |
|---|---|---|---|
| CY-3-O4 | 12.0% | Clearing point [° C.]: | 86.0 |
| CY-5-O2 | 10.0% | Δn (589 nm, 20° C.): | 0.110 |
| CY-5-O4 | 8.00% | Δε (1 kHz, 20° C.): | −5.0 |
| CCY-3-O2 | 8.00% | $\varepsilon_\parallel$ (1 kHz, 20° C.): | 3.8 |
| CCY-4-O2 | 7.00% | $\varepsilon_\perp$ (1 kHz, 20° C.): | 8.8 |
| CCY-5-O2 | 6.00% | $K_1$ (20° C.) [pN]: | 14.7 |
| CCY-2-1 | 8.00% | $K_3$ (20° C.) [pN]: | 16.0 |
| CCY-3-1 | 7.00% | $\gamma_1$ (20° C.) [mPa·s]: | 250 |
| CPY-3-O2 | 9.00% | $V_0$ (20° C.) [V]: | 1.90 |
| CPY-3-O2 | 9.00% | | |
| CPP-3-2 | 6.00% | | |
| CP-5-3 | 10.0% | | |

H15: Nematic host mixture (Δε < 0)

| | | | |
|---|---|---|---|
| CC-3-V1 | 10.25% | Clearing point [° C.]: | 74.7 |
| CC-2-3 | 18.5% | Δn (589 nm, 20° C.): | 0.103 |
| CC-3-5 | 6.75% | Δε (1 kHz, 20° C.): | −3.1 |
| CCP-3-1 | 6.00% | $\varepsilon_\parallel$ (1 kHz, 20° C.): | 3.4 |
| CCY-3-1 | 2.50% | $\varepsilon_\perp$ (1 kHz, 20° C.): | 6.4 |
| CCY-3-O2 | 12.0% | $K_1$ (20° C.) [pN]: | 15.4 |
| CPY-2-O2 | 6.00% | $K_3$ (20° C.) [pN]: | 16.8 |
| CPY-3-O2 | 9.75% | $\gamma_1$ (20° C.) [mPa·s]: | 104 |
| CY-3-O2 | 11.5% | $V_0$ (20° C.) [V]: | 2.46 |
| PP-1-2V1 | 3.75% | | |
| PY-3-O2 | 13.0% | | |

H16: Nematic host mixture (Δε < 0)

| | | | |
|---|---|---|---|
| CC-3-V | 27.5% | Clearing point [° C.]: | 74.7 |
| CC-3-V1 | 10.0% | Δn (589 nm, 20° C.): | 0.104 |
| CC-3-5 | 8.00% | Δε (1 kHz, 20° C.): | −3.0 |
| CCY-3-O2 | 9.25% | $\varepsilon_\parallel$ (1 kHz, 20° C.): | 3.4 |
| CLY-3-O2 | 10.0% | $\varepsilon_\perp$ (1 kHz, 20° C.): | 6.4 |
| CPY-3-O2 | 11.75% | $K_1$ (20° C.) [pN]: | 15.3 |
| PY-3-O2 | 14.0% | $K_3$ (20° C.) [pN]: | 16.2 |
| PY-4-O2 | 9.00% | $\gamma_1$ (20° C.) [mPa·s]: | 88 |
| PYP-2-4 | 0.50% | $V_0$ (20° C.) [V]: | 2.44 |

H17: Nematic host mixture (Δε < 0)

| | | | |
|---|---|---|---|
| CPP-3-2 | 6.50% | Clearing point [° C.]: | 74.7 |
| CC-3-V1 | 8.00% | Δn (589 nm, 20° C.): | 0.104 |
| CC-2-3 | 17.0% | Δε (1 kHz, 20° C.): | −3.0 |
| CC-3-4 | 6.50% | $\varepsilon_\parallel$ (1 kHz, 20° C.): | 3.4 |
| CCY-3-O1 | 3.50% | $\varepsilon_\perp$ (1 kHz, 20° C.): | 6.3 |
| CCY-3-O2 | 12.5% | $K_1$ (20° C.) [pN]: | 14.8 |
| CPY-2-O2 | 5.50% | $K_3$ (20° C.) [pN]: | 15.8 |
| CPY-3-O2 | 10.0% | $\gamma_1$ (20° C.) [mPa·s]: | 106 |
| CY-3-O2 | 15.5% | | |
| CP-3-O1 | 4.50% | | |
| PP-1-2V1 | 5.00% | | |
| PY-3-O2 | 5.50% | | |

H18: Nematic host mixture (Δε < 0)

| | | | |
|---|---|---|---|
| CPP-3-2 | 10.5% | Clearing point [° C.]: | 74.5 |
| CC-3-4 | 9.0% | Δn (589 nm, 20° C.): | 0.104 |
| CC-3-5 | 9.0% | Δε (1 kHz, 20° C.): | −3.4 |
| CCP-3-1 | 8.0% | $\varepsilon_\parallel$ (1 kHz, 20° C.): | 3.7 |
| CCY-3-O2 | 9.5% | $\varepsilon_\perp$ (1 kHz, 20° C.): | 7 |
| CCY-4-O2 | 5.5% | $K_1$ (20° C.) [pN]: | 14 |
| CPY-3-O2 | 5.5% | $K_3$ (20° C.) [pN]: | 15.7 |
| CY-3-O2 | 15% | $\gamma_1$ (20° C.) [mPa·s]: | 128 |
| CY-5-O2 | 5.0% | | |
| CP-3-O1 | 7.0% | | |
| PY-3-O2 | 16% | | |

H19: Nematic host mixture (Δε > 0)

| | | | |
|---|---|---|---|
| CC-4-V | 10.0% | Clearing point [° C.]: | 77.0 |
| CC-5-V | 13.5% | Δn (589 nm, 20° C.): | 0.113 |
| PGU-3-F | 6.50% | Δε (1 kHz, 20° C.): | 19.2 |
| ACQU-2-F | 10.0% | $\varepsilon_\parallel$ (1 kHz, 20° C.): | 23.8 |
| ACQU-3-F | 12.0% | $\varepsilon_\perp$ (1 kHz, 20° C.): | 4.6 |
| PUQU-3-F | 11.0% | $K_1$ (20° C.) [pN]: | 11.5 |
| CCP-V-1 | 12.0% | $K_3$ (20° C.) [pN]: | 11.1 |
| APUQU-2-F | 6.00% | $\gamma_1$ (20° C.) [mPa·s]: | 122 |
| APUQU-3-F | 7.00% | $V_0$ (20° C.) [V]: | 0.81 |
| PGUQU-3-F | 8.00% | | |
| CPGU-3-OT | 4.00% | | |

H20: Nematic host mixture (Δε > 0)

| Component | % | Property | Value |
|---|---|---|---|
| PGU-2-F | 3.50% | Clearing point [° C.]: | 77.0 |
| PGU-3-F | 7.00% | Δn (589 nm, 20° C.): | 0.105 |
| CC-3-V1 | 15.0% | Δε (1 kHz, 20° C.): | 7.2 |
| CC-4-V | 18.0% | $\varepsilon_\parallel$ (1 kHz, 20° C.): | 10.3 |
| CC-5-V | 20.0% | $\varepsilon_\perp$ (1 kHz, 20° C.): | 3.1 |
| CCP-V-1 | 6.00% | $K_1$ (20° C.) [pN]: | 15.3 |
| APUQU-3-F | 15.0% | $K_3$ (20° C.) [pN]: | 13.5 |
| PUQU-3-F | 5.50% | $\gamma_1$ (20° C.) [mPa·s]: | 63 |
| PGP-2-4 | 3.00% | $V_0$ (20° C.) [V]: | 1.53 |
| CPP-3-2 | 7.00% | | |

H21: Nematic host mixture (Δε > 0)

| Component | % | Property | Value |
|---|---|---|---|
| APUQU-2-F | 6.00% | Clearing point [° C.]: | 74.0 |
| APUQU-3-F | 12.0% | Δn (589 nm, 20° C.): | 0.120 |
| PUQU-3-F | 18.0% | Δε (1 kHz, 20° C.): | 17.4 |
| CPGU-3-OT | 9.00% | $\varepsilon_\parallel$ (1 kHz, 20° C.): | 22.0 |
| CCGU-3-F | 3.00% | $\varepsilon_\perp$ (1 kHz, 20° C.): | 4.5 |
| CPU-3-F | 14.0% | $K_1$ (20° C.) [pN]: | 10.1 |
| CCQU-3-F | 10.0% | $K_3$ (20° C.) [pN]: | 10.8 |
| CC-3-V | 25.0% | $\gamma_1$ (20° C.) [mPa·s]: | 111 |
| PGP-2-2V | 3.00% | $V_0$ (20° C.) [V]: | 0.80 |

H22: Nematic host mixture (Δε > 0)

| Component | % | Property | Value |
|---|---|---|---|
| PUQU-3-F | 15.0% | Clearing point [° C.]: | 74.3 |
| APUQU-2-F | 5.00% | Δn (589 nm, 20° C.): | 0.120 |
| APUQU-3-F | 12.0% | Δε (1 kHz, 20° C.): | 14.9 |
| CCQU-3-F | 11.0% | $\varepsilon_\parallel$ (1 kHz, 20° C.): | 19.1 |
| CCQU-5-F | 1.50% | $\varepsilon_\perp$ (1 kHz, 20° C.): | 4.3 |
| CPGU-3-OT | 5.00% | $K_1$ (20° C.) [pN]: | 11.2 |
| CPP-3-OT | 4.50% | $K_3$ (20° C.) [pN]: | 10.8 |
| CGU-3-F | 10.0% | $\gamma_1$ (20° C.) [mPa·s]: | 98 |
| PGP-2-3 | 1.50% | $V_0$ (20° C.) [V]: | 0.91 |
| PGP-2-2V | 8.00% | | |
| CC-3-V | 26.5% | | |

H23: Nematic host mixture (Δε > 0)

| Component | % | Property | Value |
|---|---|---|---|
| CCQU-3-F | 9.00% | Clearing point [° C.]: | 94.5 |
| CCQU-5-F | 9.00% | Δn (589 nm, 20° C.): | 0.121 |
| PUQU-3-F | 16.0% | Δε (1 kHz, 20° C.): | 20.4 |
| APUQU-2-F | 8.00% | $\varepsilon_\parallel$ (1 kHz, 20° C.): | 24.7 |
| APUQU-3-F | 9.00% | $\varepsilon_\perp$ (1 kHz, 20° C.): | 4.3 |
| PGUQU-3-F | 8.00% | $K_1$ (20° C.) [pN]: | 12.1 |
| CPGU-3-OT | 7.00% | $K_3$ (20° C.) [pN]: | 13.9 |
| CC-4-V | 18.0% | $\gamma_1$ (20° C.) [mPa·s]: | 163 |
| CC-5-V | 5.00% | $V_0$ (20° C.) [V]: | 0.81 |
| CCP-V-1 | 6.00% | | |
| CCEPC-3-3 | 3.00% | | |
| PPGU-3-F | 2.00% | | |

H24: Nematic host mixture (Δε > 0)

| Component | % | Property | Value |
|---|---|---|---|
| CC-3-V | 28.50% | Clearing point [° C.]: | 85.6 |
| CCP-V-1 | 3.00% | Δn (589 nm, 20° C.): | 0.121 |
| CCEPC-3-3 | 2.00% | Δε (1 kHz, 20° C.): | 19.5 |
| PGU-2-F | 4.00% | $\varepsilon_\parallel$ (1 kHz, 20° C.): | 23.8 |
| CCQU-3-F | 8.00% | $\varepsilon_\perp$ (1 kHz, 20° C.): | 4.3 |
| CCQU-5-F | 6.00% | $K_1$ (20° C.) [pN]: | 11.6 |
| CCGU-3-F | 3.00% | $K_3$ (20° C.) [pN]: | 12.7 |
| PUQU-2-F | 2.00% | $\gamma_1$ (20° C.) [mPa·s]: | 126 |
| PUQU-3-F | 10.0% | $V_0$ (20° C.) [V]: | 0.81 |
| APUQU-2-F | 6.00% | | |
| APUQU-3-F | 9.00% | | |
| PGUQU-3-F | 5.00% | | |
| PGUQU-4-F | 5.00% | | |
| PGUQU-5-F | 4.00% | | |
| CPGU-3-OT | 4.00% | | |
| PPGU-3-F | 0.50% | | |

H25: Nematic host mixture (Δε < 0)

| Component | % | Property | Value |
|---|---|---|---|
| CC-3-V1 | 9.00% | Clearing point [° C.]: | 74.6 |
| CC-3-O1 | 3.50% | Δn (589 nm, 20° C.): | 0.0984 |
| CC-3-4 | 8.00% | Δε (1 kHz, 20° C.): | -3.6 |
| CC-3-5 | 8.00% | $\varepsilon_\parallel$ (1 kHz, 20° C.): | 3.6 |
| CCP-3-1 | 6.00% | $\varepsilon_\perp$ (1 kHz, 20° C.): | 7.1 |
| CCY-3-O1 | 6.50% | $K_1$ (20° C.) [pN]: | 14.1 |
| CCY-3-O2 | 12.5% | $K_3$ (20° C.) [pN]: | 17 |
| CPY-3-O2 | 10.0% | $\gamma_1$ (20° C.) [mPa·s]: | 119 |
| CY-3-O2 | 15.5% | $V_0$ (20° C.) [V]: | 2.31 |
| CP-3-O1 | 8.5% | | |
| PY-3-O2 | 12.5% | | |

H26: Nematic host mixture (Δε < 0)

| Component | % | Property | Value |
|---|---|---|---|
| CC-3-5 | 9.50% | Clearing point [° C.]: | 79.1 |
| CC-5-O1 | 5.00% | Δn (589 nm, 20° C.): | 0.0911 |
| CCY-2-1 | 9.50% | Δε (1 kHz, 20° C.): | -3.6 |
| CCY-3-1 | 10.5% | $\varepsilon_\parallel$ (1 kHz, 20° C.): | 3.5 |
| CCY-3-O2 | 10.5% | $\varepsilon_\perp$ (1 kHz, 20° C.): | 7.1 |
| CCY-5-O2 | 9.50% | $K_1$ (20° C.) [pN]: | 14.6 |
| CPY-2-O2 | 12.0% | $K_3$ (20° C.) [pN]: | 14.5 |
| CY-3-O4 | 9.00% | $\gamma_1$ (20° C.) [mPa·s]: | 178 |
| CY-5-O4 | 11.0% | $V_0$ (20° C.) [V]: | 2.12 |
| CP-5-3 | 13.5% | | |

H27: Nematic host mixture (Δε < 0)

| Component | % | Property | Value |
|---|---|---|---|
| CC-3-V | 37.5% | Clearing point [° C.]: | 74.8 |
| CC-3-V1 | 2.00% | Δn (589 nm, 20° C.): | 0.0987 |
| CCY-4-O2 | 14.5% | Δε (1 kHz, 20° C.): | -2.9 |
| CPY-2-O2 | 10.5% | $\varepsilon_\parallel$ (1 kHz, 20° C.): | 3.7 |
| CPY-3-O2 | 9.5% | $\varepsilon_\perp$ (1 kHz, 20° C.): | 6.6 |
| CY-3-O2 | 15.0% | $K_1$ (20° C.) [pN]: | 12.2 |
| CY-3-O4 | 4.50% | $K_3$ (20° C.) [pN]: | 13.4 |
| PYP-2-4 | 5.50% | $\gamma_1$ (20° C.) [mPa·s]: | 92 |
| PPGU-3-F | 1.00% | $V_0$ (20° C.) [V]: | 2.28 |

H28: Nematic host mixture (Δε < 0)

| Component | % | Property | Value |
|---|---|---|---|
| CC-3-V | 37.5% | Clearing point [° C.]: | 75.4 |
| CC-5-O1 | 2.00% | Δn (589 nm, 20° C.): | 0.1034 |
| CCY-3-O2 | 12.0% | Δε (1 kHz, 20° C.): | -3.3 |
| CCY-3-O3 | 6.50% | $\varepsilon_\parallel$ (1 kHz, 20° C.): | 3.6 |
| CPY-2-O2 | 12.0% | $\varepsilon_\perp$ (1 kHz, 20° C.): | 6.9 |
| CPY-3-O2 | 10.0% | $K_1$ (20° C.) [pN]: | 13.4 |
| CY-3-O2 | 2.00% | $K_3$ (20° C.) [pN]: | 15 |
| PY-3-O2 | 16.0% | $\gamma_1$ (20° C.) [mPa·s]: | 95 |
| CP-3-O1 | 2.00% | $V_0$ (20° C.) [V]: | 2.24 |

H29: Nematic host mixture (Δε < 0)

| Component | % | Property | Value |
|---|---|---|---|
| CC-3-V | 22.5% | Clearing point [° C.]: | 74.8 |
| CC-3-V1 | 9.75% | Δn (589 nm, 20° C.): | 0.1027 |
| CC-1-3 | 0.75% | Δε (1 kHz, 20° C.): | -3.2 |
| CC-3-4 | 5.5% | $\varepsilon_\parallel$ (1 kHz, 20° C.): | 3.5 |
| CC-3-5 | 4.00% | $\varepsilon_\perp$ (1 kHz, 20° C.): | 6.8 |
| CCY-3-O1 | 10% | $K_1$ (20° C.) [pN]: | 14.4 |
| CCY-3-O2 | 12% | $K_3$ (20° C.) [pN]: | 15.2 |
| CPY-2-O2 | 10% | $\gamma_1$ (20° C.) [mPa·s]: | |
| CPY-3-O2 | 2.0% | $V_0$ (20° C.) [V]: | 2.29 |
| CY-3-O2 | 0.5% | | |
| PP-1-2V1 | 0.25% | | |
| PY-1-O4 | 4.25% | | |
| PY-3-O2 | 17% | | |
| PYP-2-3 | 1.5% | | |

H30: Nematic host mixture (Δε < 0)

| Component | % | Property | Value |
|---|---|---|---|
| CPP-3-2 | 4.0% | Clearing point [° C.]: | 74.6 |
| CC-3-V | 10% | Δn (589 nm, 20° C.): | 0.099 |
| CC-3-V1 | 8.5% | Δε (1 kHz, 20° C.): | -3.4 |
| CC-3-4 | 4.5% | $\varepsilon_\parallel$ (1 kHz, 20° C.): | 3.6 |
| CC-3-5 | 8.0% | $\varepsilon_\perp$ (1 kHz, 20° C.): | 7 |
| CCP-3-1 | 4.25% | $K_1$ (20° C.) [pN]: | 14.2 |
| CCY-3-O1 | 6.5% | $K_3$ (20° C.) [pN]: | 15.9 |
| CCY-3-O2 | 12.75% | $\gamma_1$ (20° C.) [mPa·s]: | 108 |
| CCY-4-O2 | 6.0% | $V_0$ (20° C.) [V]: | 2.28 |
| CY-3-O2 | 15.5% | | |
| CP-3-O1 | 2.0% | | |
| PY-3-O2 | 16% | | |
| PYP-2-3 | 2.0% | | |

H31: Nematic host mixture (Δε < 0)

| Component | % | Property | Value |
|---|---|---|---|
| CC-3-V | 15% | Clearing point [° C.]: | 74.4 |
| CC-3-V1 | 9.0% | Δn (589 nm, 20° C.): | 0.1086 |
| CC-2-3 | 8.0% | Δε (1 kHz, 20° C.): | -3.2 |
| CC-3-4 | 7.5% | $\varepsilon_\parallel$ (1 kHz, 20° C.): | 3.5 |
| CCY-3-O2 | 10% | $\varepsilon_\perp$ (1 kHz, 20° C.): | 6.7 |
| CCY-5-O2 | 8.0% | $K_1$ (20° C.) [pN]: | 14.3 |
| CPY-2-O2 | 3.0% | $K_3$ (20° C.) [pN]: | 15.7 |
| CPY-3-O2 | 8.5% | $\gamma_1$ (20° C.) [mPa·s]: | 102 |
| CY-3-O2 | 7.0% | $V_0$ (20° C.) [V]: | 2.33 |

-continued

| | |
|---|---|
| PY-3-O2 | 16% |
| PYP-2-3 | 8.0% |

H32: Nematic host mixture ($\Delta\varepsilon < 0$)

| | | | |
|---|---|---|---|
| CPP-3-2 | 6.0% | Clearing point [° C.]: | 75.2 |
| CC-3-O1 | 4.0% | $\Delta n$ (589 nm, 20° C.): | 0.1095 |
| CC-3-4 | 9.0% | $\Delta\varepsilon$ (1 kHz, 20° C.): | −3.1 |
| CC-3-5 | 9.0% | $\varepsilon_\parallel$ (1 kHz, 20° C.): | 3.6 |
| CCP-3-1 | 8.0% | $\varepsilon_\perp$ (1 kHz, 20° C.): | 6.7 |
| CCP-3-3 | 1.0% | $K_1$ (20° C.) [pN]: | 13.8 |
| CCY-3-O2 | 12% | $K_3$ (20° C.) [pN]: | 16.5 |
| CLY-3-O2 | 1.0% | $\gamma_1$ (20° C.) [mPa · s]: | 119 |
| CPY-3-O2 | 11% | $V_0$ (20° C.) [V]: | 2.41 |
| CY-3-O2 | 9.5% | | |
| CP-3-O1 | 11.5% | | |
| PY-3-O2 | 18% | | |

H33: Nematic host mixture ($\Delta\varepsilon < 0$)

| | | | |
|---|---|---|---|
| CPP-3-2 | 3.0% | Clearing point [° C.]: | 75.2 |
| CC-3-V1 | 9.0% | $\Delta n$ (589 nm, 20° C.): | 0.1098 |
| CC-3-O1 | 2.5% | $\Delta\varepsilon$ (1 kHz, 20° C.): | −3.1 |
| CC-3-4 | 9.0% | $\varepsilon_\parallel$ (1 kHz, 20° C.): | 3.6 |
| CC-3-5 | 9.0% | $\varepsilon_\perp$ (1 kHz, 20° C.): | 6.7 |
| CCP-3-1 | 7.5% | $K_1$ (20° C.) [pN]: | 14.6 |
| CCP-V2-1 | 5.0% | $K_3$ (20° C.) [pN]: | 16.6 |
| CCY-3-O2 | 4.0% | $\gamma_1$ (20° C.) [mPa · s]: | 114 |
| CPY-2-O2 | 5.5% | $V_0$ (20° C.) [V]: | 2.43 |
| CPY-3-O2 | 10.5% | | |
| CY-3-O2 | 15% | | |
| CP-3-O1 | 1.5% | | |
| PY-3-O2 | 18% | | |
| PPGU-3-F | 0.5% | | |

H34: Nematic host mixture ($\Delta\varepsilon < 0$)

| | | | |
|---|---|---|---|
| CPP-3-2 | 8.5% | Clearing point [° C.]: | 74.7 |
| CC-3-V1 | 9.0% | $\Delta n$ (589 nm, 20° C.): | 0.1097 |
| CC-3-O1 | 2.0% | $\Delta\varepsilon$ (1 kHz, 20° C.): | −3.1 |
| CC-3-4 | 9.0% | $\varepsilon_\parallel$ (1 kHz, 20° C.): | 3.5 |
| CC-3-5 | 9.0% | $\varepsilon_\perp$ (1 kHz, 20° C.): | 6.6 |
| CCP-3-1 | 2.5% | $K_1$ (20° C.) [pN]: | 14.2 |
| CCP-V2-1 | 5.0% | $K_3$ (20° C.) [pN]: | 16.6 |
| CCY-3-O2 | 7.5% | $\gamma_1$ (20° C.) [mPa · s]: | 112 |
| CLY-3-O2 | 1.0% | $V_0$ (20° C.) [V]: | 2.44 |
| CPY-3-O2 | 10.5% | | |
| CY-3-O2 | 15% | | |
| CP-3-O1 | 3.0% | | |
| PY-3-O2 | 18% | | |

H35: Nematic host mixture ($\Delta\varepsilon < 0$)

| | | | |
|---|---|---|---|
| B-2O-O5 | 4.0% | Clearing point [° C.]: | 75 |
| CPP-3-2 | 2.0% | $\Delta n$ (589 nm, 20° C.): | 0.1094 |
| CC-3-O1 | 5.0% | $\Delta\varepsilon$ (1 kHz, 20° C.): | −3.1 |
| CC-3-4 | 9.0% | $\varepsilon_\parallel$ (1 kHz, 20° C.): | 3.6 |
| CC-3-5 | 9.0% | $\varepsilon_\perp$ (1 kHz, 20° C.): | 6.7 |
| CCP-3-1 | 8.0% | $K_1$ (20° C.) [pN]: | 13.9 |
| CCP-3-3 | 5.0% | $K_3$ (20° C.) [pN]: | 16.4 |
| CCY-3-O2 | 11.5% | $\gamma_1$ (20° C.) [mPa · s]: | 117 |
| CLY-3-O2 | 1.0% | $V_0$ (20° C.) [V]: | 2.42 |
| CPY-3-O2 | 10.5% | | |
| CY-3-O2 | 2.0% | | |
| CP-3-O1 | 15% | | |
| PY-3-O2 | 18% | | |

H36: Nematic host mixture ($\Delta\varepsilon < 0$)

| | | | |
|---|---|---|---|
| CPP-3-2 | 7.5% | Clearing point [° C.]: | 74.8 |
| CC-3-V1 | 9.0% | $\Delta n$ (589 nm, 20° C.): | 0.1098 |
| CC-3-O1 | 1.5% | $\Delta\varepsilon$ (1 kHz, 20° C.): | −3.1 |
| CC-3-4 | 9.0% | $\varepsilon_\parallel$ (1 kHz, 20° C.): | 3.5 |
| CC-3-5 | 9.0% | $\varepsilon_\perp$ (1 kHz, 20° C.): | 6.6 |
| CCP-3-1 | 4.0% | $K_1$ (20° C.) [pN]: | 14.4 |
| CCP-V2-1 | 5.0% | $K_3$ (20° C.) [pN]: | 16.6 |
| CCY-3-O2 | 7.0% | $\gamma_1$ (20° C.) [mPa · s]: | 112 |
| CPY-2-O2 | 2.0% | $V_0$ (20° C.) [V]: | 2.44 |
| CPY-3-O2 | 10% | | |
| CY-3-O2 | 15% | | |
| CP-3-O1 | 3.0% | | |
| PY-3-O2 | 18% | | |

H37: Nematic host mixture ($\Delta\varepsilon < 0$)

| | | | |
|---|---|---|---|
| CY-3-O2 | 10% | Clearing point [° C.]: | 100 |
| CY-3-O4 | 20% | $\Delta n$ (589 nm, 20° C.): | 0.0865 |
| CY-5-O4 | 20% | $\Delta\varepsilon$ (1 kHz, 20° C.): | −5.4 |
| CCY-3-O2 | 6.0% | $\varepsilon_\parallel$ (1 kHz, 20° C.): | 3.9 |
| CCY-3-O3 | 6.0% | $\varepsilon_\perp$ (1 kHz, 20° C.): | 9.3 |
| CCY-4-O2 | 6.0% | $K_1$ (20° C.) [pN]: | 15.6 |
| CCY-5-O2 | 6.0% | $K_3$ (20° C.) [pN]: | 16.6 |
| CCZC-3-3 | 3.0% | $\gamma_1$ (20° C.) [mPa · s]: | 347 |
| CCZC-3-5 | 3.5% | $V_0$ (20° C.) [V]: | 1.84 |
| CCZC-4-3 | 3.5% | | |
| CCZC-4-5 | 3.5% | | |
| CCEPC-3-3 | 4.0% | | |
| CCEPC-3-4 | 4.5% | | |
| CCEPC-3-5 | 4.0% | | |

H38: Nematic host mixture ($\Delta\varepsilon < 0$)

| | | | |
|---|---|---|---|
| Y-4O-O4 | 12.5% | Clearing point [° C.]: | 105 |
| CY-3-O4 | 5.0% | $\Delta n$ (589 nm, 20° C.): | 0.0868 |
| CY-5-O4 | 18% | $\Delta\varepsilon$ (1 kHz, 20° C.): | −5.4 |
| CCY-3-O1 | 4.0% | $\varepsilon_\parallel$ (1 kHz, 20° C.): | 4.2 |
| CCY-3-O2 | 6.0% | $\varepsilon_\perp$ (1 kHz, 20° C.): | 9.6 |
| CCY-3-O3 | 6.0% | $K_1$ (20° C.) [pN]: | 16.7 |
| CCY-4-O2 | 6.0% | $K_3$ (20° C.) [pN]: | 16.5 |
| CCY-5-O2 | 6.0% | $\gamma_1$ (20° C.) [mPa · s]: | |
| CPY-3-O2 | 4.5% | $V_0$ (20° C.) [V]: | 1.85 |
| CCZC-3-3 | 4.0% | | |
| CCZC-3-5 | 4.0% | | |
| CCZC-4-3 | 4.0% | | |
| CCZC-4-5 | 4.0% | | |
| CCOC-3-3 | 2.0% | | |
| CCOC-4-3 | 2.0% | | |
| CCEPC-3-3 | 4.0% | | |
| CCEPC-3-4 | 4.0% | | |
| CCEPC-3-5 | 4.0% | | |

H39: Nematic host mixture ($\Delta\varepsilon < 0$)

| | | | |
|---|---|---|---|
| Y-4O-O4 | 3.0% | Clearing point [° C.]: | 108 |
| CY-3-O4 | 8.0% | $\Delta n$ (589 nm, 20° C.): | 0.1096 |
| CCY-3-O1 | 4.0% | $\Delta\varepsilon$ (1 kHz, 20° C.): | −2.4 |
| CCY-3-O2 | 6.0% | $\varepsilon_\parallel$ (1 kHz, 20° C.): | 3.2 |
| CCY-3-O3 | 6.0% | $\varepsilon_\perp$ (1 kHz, 20° C.): | 5.6 |
| CPY-2-O2 | 8.0% | $K_1$ (20° C.) [pN]: | 16.3 |
| CPY-3-O2 | 8.0% | $K_3$ (20° C.) [pN]: | 18.9 |
| CP-3-O1 | 5.5% | $\gamma_1$ (20° C.) [mPa · s]: | |
| CC-4-V | 15% | $V_0$ (20° C.) [V]: | 2.99 |
| CC-3-V1 | 5.5% | | |
| CCP-V-1 | 13% | | |
| CCP-V2-1 | 13% | | |
| CPTP-3-O1 | 5.0% | | |

H40: Nematic host mixture ($\Delta\varepsilon < 0$)

| | | | |
|---|---|---|---|
| CY-3-O4 | 16% | Clearing point [° C.]: | 109 |
| CCY-3-O1 | 4.0% | $\Delta n$ (589 nm, 20° C.): | 0.0854 |
| CCY-3-O2 | 6.0% | $\Delta\varepsilon$ (1 kHz, 20° C.): | −2.3 |
| CCY-3-O3 | 6.0% | $\varepsilon_\parallel$ (1 kHz, 20° C.): | 3.1 |
| CCY-4-O2 | 6.0% | $\varepsilon_\perp$ (1 kHz, 20° C.): | 5.4 |
| CCY-5-O2 | 5.0% | $K_1$ (20° C.) [pN]: | 16.3 |
| CC-3-O1 | 6.0% | $K_3$ (20° C.) [pN]: | 19.4 |
| CC-4-V | 15% | $\gamma_1$ (20° C.) [mPa · s]: | |
| CC-3-V1 | 6.0% | $V_0$ (20° C.) [V]: | 3.08 |
| CCP-V-1 | 13% | | |
| CCP-V2-1 | 13% | | |
| CCEPC-3-3 | 4.0% | | |

H41: Nematic host mixture ($\Delta\varepsilon < 0$)

| | | | |
|---|---|---|---|
| Y-4O-O4 | 10% | Clearing point [° C.]: | 107 |
| CY-3-O2 | 7.0% | $\Delta n$ (589 nm, 20° C.): | 0.1104 |
| CY-3-O4 | 15% | $\Delta\varepsilon$ (1 kHz, 20° C.): | −6 |
| CCY-3-O1 | 4.0% | $\varepsilon_\parallel$ (1 kHz, 20° C.): | 4.3 |
| CCY-3-O2 | 6.0% | $\varepsilon_\perp$ (1 kHz, 20° C.): | 10.3 |
| CCY-3-O3 | 6.0% | $K_1$ (20° C.) [pN]: | 15.7 |
| CCY-4-O2 | 6.0% | $K_3$ (20° C.) [pN]: | 19.1 |
| CCY-5-O2 | 6.0% | $\gamma_1$ (20° C.) [mPa · s]: | |
| CPY-2-O2 | 9.0% | $V_0$ (20° C.) [V]: | 1.88 |

| | | | |
|---|---|---|---|
| CPY-3-O2 | 9.0% | | |
| CCP-V-1 | 8.5% | | |
| CCEPC-3-3 | 4.0% | | |
| CCEPC-3-4 | 4.0% | | |
| CCEPC-3-5 | 3.5% | | |
| CGPC-3-3 | 2.0% | | |
| H42: Nematic host mixture ($\Delta\varepsilon < 0$) | | | |
| Y-4O-O4 | 10% | Clearing point [° C.]: | 108 |
| CY-3-O2 | 4.0% | $\Delta n$ (589 nm, 20° C.): | 0.1403 |
| CY-3-O4 | 15% | $\Delta\varepsilon$ (1 kHz, 20° C.): | −6.4 |
| CCY-3-O1 | 4.0% | $\varepsilon_\parallel$ (1 kHz, 20° C.): | 4.3 |
| CCY-3-O2 | 6.0% | $\varepsilon_\perp$ (1 kHz, 20° C.): | 10.7 |
| CCY-3-O3 | 6.0% | $K_1$ (20° C.) [pN]: | 16.8 |
| CCY-4-O2 | 6.0% | $K_3$ (20° C.) [pN]: | 20.5 |
| CLY-3-O2 | 5.0% | $\gamma_1$ (20° C.) [mPa · s]: | |
| CPY-2-O2 | 5.0% | $V_0$ (20° C.) [V]: | 1.89 |
| CPY-3-O2 | 5.0% | | |
| PTY-3-O2 | 10% | | |
| PTY-5-O2 | 10% | | |
| CCP-V-1 | 7.0% | | |
| CCP-V2-1 | 7.0% | | |
| H43: Nematic host mixture ($\Delta\varepsilon < 0$) | | | |
| Y-4O-O4 | 10% | Clearing point [° C.]: | 109 |
| CCY-3-O1 | 5.0% | $\Delta n$ (589 nm, 20° C.): | 0.1405 |
| PTY-3-O2 | 3.0% | $\Delta\varepsilon$ (1 kHz, 20° C.): | −2 |
| PTY-3-O2 | 10% | $\varepsilon_\parallel$ (1 kHz, 20° C.): | 3.4 |
| PTY-5-O2 | 10% | $\varepsilon_\perp$ (1 kHz, 20° C.): | 5.4 |
| CP-3-O1 | 4.0% | $K_1$ (20° C.) [pN]: | 16.5 |
| CC-4-V | 15% | $K_3$ (20° C.) [pN]: | 19.9 |
| CC-3-V1 | 8.0% | $\gamma_1$ (20° C.) [mPa · s]: | |
| CCP-V-1 | 13% | $V_0$ (20° C.) [V]: | 3.34 |
| CCP-V2-1 | 13% | | |
| CPTP-3-1 | 4.5% | | |
| CPTP-3-2 | 4.5% | | |
| H44: Nematic host mixture ($\Delta\varepsilon < 0$) | | | |
| CY-3-O4 | 13% | Clearing point [° C.]: | 107 |
| CCY-3-O1 | 4.0% | $\Delta n$ (589 nm, 20° C.): | 0.082 |
| CCY-3-O2 | 5.0% | $\Delta\varepsilon$ (1 kHz, 20° C.): | −2 |
| CCY-3-O3 | 5.0% | $\varepsilon_\parallel$ (1 kHz, 20° C.): | 3 |
| CCY-4-O2 | 5.0% | $\varepsilon_\perp$ (1 kHz, 20° C.): | 5 |
| CCY-5-O2 | 5.0% | $K_1$ (20° C.) [pN]: | 16.3 |
| CC-3-O1 | 13% | $K_3$ (20° C.) [pN]: | 19.2 |
| CC-4-V | 12% | $\gamma_1$ (20° C.) [mPa · s]: | |
| CC-3-V1 | 6.0% | $V_0$ (20° C.) [V]: | 3.29 |
| CCP-V-1 | 13% | | |
| CCP-V2-1 | 13% | | |
| CCZC-3-3 | 3.0% | | |
| CCEPC-3-3 | 3.0% | | |
| H45: Nematic host mixture ($\Delta\varepsilon < 0$) | | | |
| Y-4O-O4 | 5.0% | Clearing point [° C.]: | 107 |
| CY-3-O4 | 15% | $\Delta n$ (589 nm, 20° C.): | 0.0821 |
| CY-5-O4 | 14.5% | $\Delta\varepsilon$ (1 kHz, 20° C.): | −4.5 |
| CCY-3-O1 | 5.0% | $\varepsilon_\parallel$ (1 kHz, 20° C.): | 3.7 |
| CCY-3-O2 | 6.0% | $\varepsilon_\perp$ (1 kHz, 20° C.): | 8.2 |
| CCY-3-O3 | 6.0% | $K_1$ (20° C.) [pN]: | 16 |
| CCY-4-O2 | 6.0% | $K_3$ (20° C.) [pN]: | 17 |
| CCY-5-O2 | 6.0% | $\gamma_1$ (20° C.) [mPa · s]: | |
| CC-4-V | 8.5% | $V_0$ (20° C.) [V]: | 2.04 |
| CCZC-3-3 | 3.0% | | |
| CCZC-3-5 | 3.0% | | |
| CCZC-4-3 | 3.0% | | |
| CCZC-4-5 | 3.0% | | |
| CCOC-3-3 | 4.0% | | |
| CCEPC-3-3 | 4.0% | | |
| CCEPC-3-4 | 4.0% | | |
| CCEPC-3-5 | 4.0% | | |
| H46: Nematic host mixture ($\Delta\varepsilon < 0$) | | | |
| B-2O-O5 | 4.0% | Clearing point [° C.]: | 75 |
| CPP-3-2 | 4.5% | $\Delta n$ (589 nm, 20° C.): | 0.1095 |
| CC-3-V1 | 9.0% | $\Delta\varepsilon$ (1 kHz, 20° C.): | −3.1 |
| CC-3-O1 | 3.0% | $\varepsilon_\parallel$ (1 kHz, 20° C.): | 3.6 |
| CC-3-4 | 9.0% | $\varepsilon_\perp$ (1 kHz, 20° C.): | 6.7 |
| CC-3-5 | 9.0% | $K_1$ (20° C.) [pN]: | 14.5 |
| CCP-3-1 | 8.0% | $K_3$ (20° C.) [pN]: | 16.7 |
| CCP-V2-1 | 5.0% | $\gamma_1$ (20° C.) [mPa · s]: | 109 |
| CCY-3-O2 | 6.0% | $V_0$ (20° C.) [V]: | 2.43 |
| CPY-3-O2 | 10.5% | | |
| CY-3-O2 | 9.5% | | |
| CP-3-O1 | 4.5% | | |
| PY-3-O2 | 18% | | |
| H47: Nematic host mixture ($\Delta\varepsilon < 0$) | | | |
| B-2O-O5 | 4.0% | Clearing point [° C.]: | 75.2 |
| CPP-3-2 | 12% | $\Delta n$ (589 nm, 20° C.): | 0.1101 |
| CC-3-V1 | 9.0% | $\Delta\varepsilon$ (1 kHz, 20° C.): | −3.1 |
| CC-3-5 | 5.5% | $\varepsilon_\parallel$ (1 kHz, 20° C.): | 3.6 |
| CCP-3-1 | 5.5% | $\varepsilon_\perp$ (1 kHz, 20° C.): | 6.7 |
| CCP-V2-1 | 5.0% | $K_1$ (20° C.) [pN]: | 13 |
| CCY-3-O2 | 4.0% | $K_3$ (20° C.) [pN]: | 16.3 |
| CLY-3-O2 | 1.0% | $\gamma_1$ (20° C.) [mPa · s]: | 121 |
| CPY-2-O2 | 2.5% | $V_0$ (20° C.) [V]: | 2.39 |
| CPY-3-O2 | 10.5% | | |
| CY-3-O2 | 15% | | |
| CY-3-O4 | 11% | | |
| CP-3-O1 | 15% | | |

The following polymerisable self-alignment additives (PSAAs) are used:

| PSAA No. | Structure |
|---|---|
| 1 | 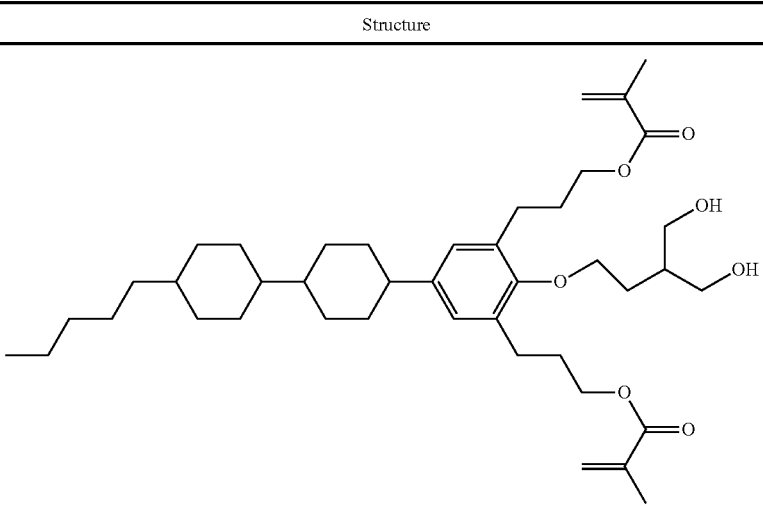 |

-continued
| PSAA No. | Structure |
|---|---|
| V1 | 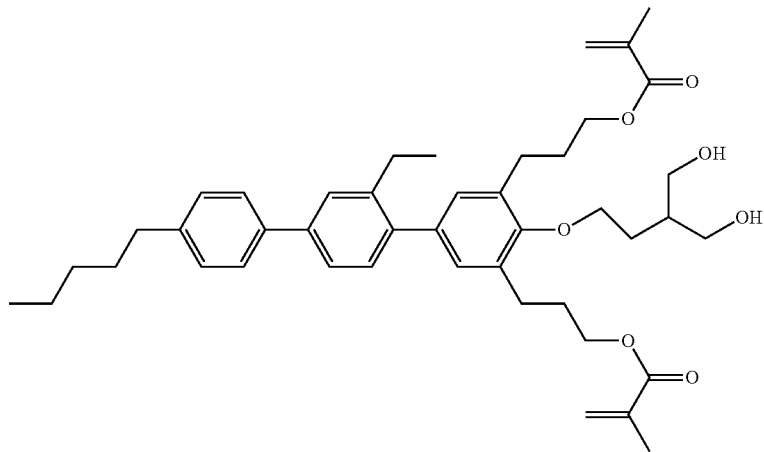 [SMILES: C=C(C)C(=O)OCCCc1cc(-c2ccc(-c3ccc(CCCCC)cc3)cc2CC)cc(CCCOC(=O)C(=C)C)c1OCCC(CO)CO] |
| 2 | 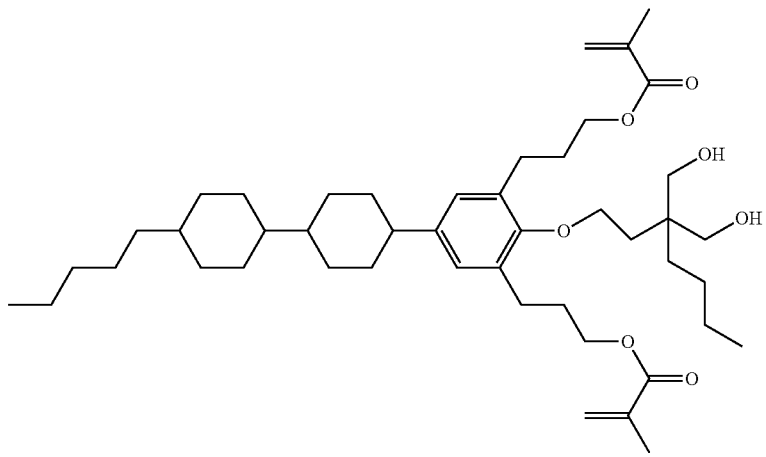 [SMILES: C=C(C)C(=O)OCCCc1cc(C2CCC(C3CCC(CCCCC)CC3)CC2)cc(CCCOC(=O)C(=C)C)c1OCCC(CO)(CO)CCCC] |
| 3 | 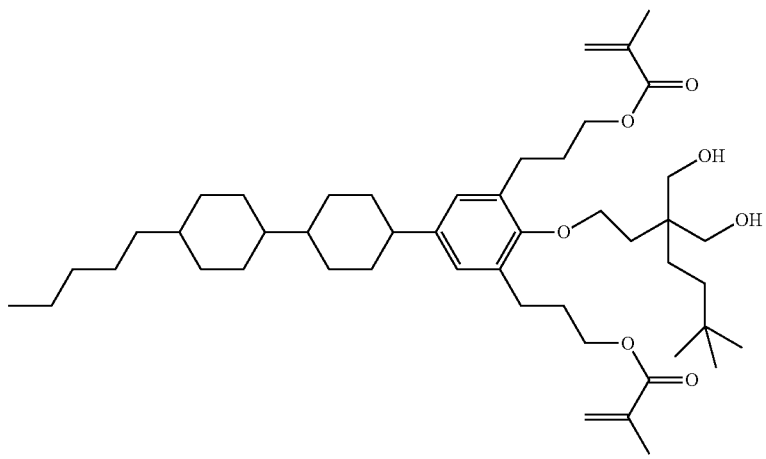 [SMILES: C=C(C)C(=O)OCCCc1cc(C2CCC(C3CCC(CCCCC)CC3)CC2)cc(CCCOC(=O)C(=C)C)c1OCCC(CO)(CO)CCC(C)(C)C] |

-continued

| PSAA No. | Structure |
|---|---|
| 4 | 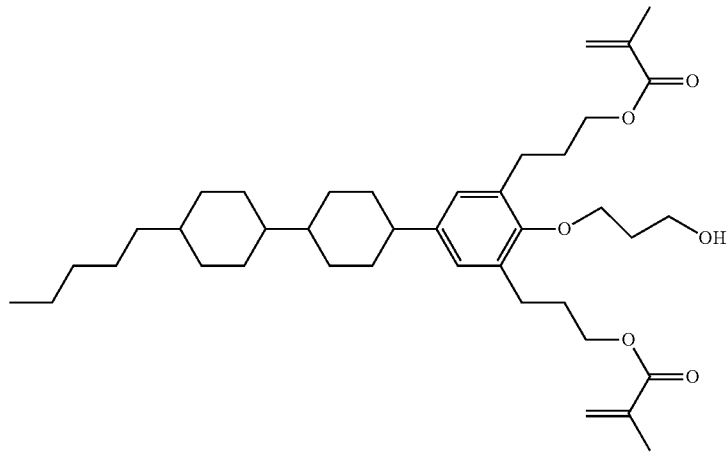 [SMILES: C=C(C)C(=O)OCCCc1cc(C2CCC(C3CCC(CCCCC)CC3)CC2)cc(CCCOC(=O)C(=C)C)c1OCCCO] |
| V2 | 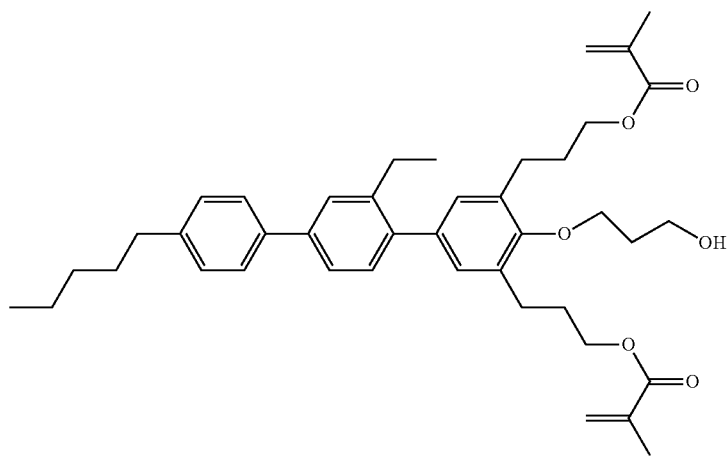 [SMILES: C=C(C)C(=O)OCCCc1cc(-c2ccc(-c3ccc(CCCCC)cc3)cc2CC)cc(CCCOC(=O)C(=C)C)c1OCCCO] |

The following polymerisable compound is used:

RM-1

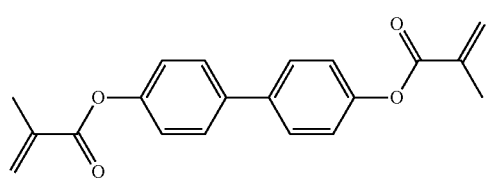

Mixture Example 1

A polymerisable compound RM-1 (0.3% by weight) and polymerisable self-alignment additive 1 (0.6% by weight) are added to a nematic LC medium H0 of the VA type ($\Delta\varepsilon<0$), and the mixture is homogenised.

Use in Test Cells without Pre-alignment Layer:

The mixture formed is introduced into a test cell (without polyimide alignment layer, layer thickness d≈4.0 μm, ITO coating on both sides, without passivation layer). The LC medium has a spontaneous homeotropic (vertical) alignment with the substrate surfaces. This alignment remains stable up to the clearing point, and the VA cell formed can be switched reversibly by application of a voltage.

Polymer Stabilisation of the Cell:

The VA cell is irradiated with UV light of intensity 100 mW/cm² at 20° C. or 40° C. and with a 340 nm band-pass filter with application of a voltage greater than the optical threshold voltage (for example 14 Vpp). This causes polymerisation of the polymerisable compounds. The homeotropic alignment is thus additionally stabilised, a 'pre-tilt' is established, and a polymer layer forms. The PSA-VA cell obtained can be switched reversibly in a broad temperature range (up to the clearing point) on application of a voltage. The response times are shortened compared with the unpolymerised cell.

VA alignment layers (for example polyimide) which are used for VA, PM-VA, PVA, MVA and analogous technologies are no longer necessary on use of additives such as polymerisable self-alignment additive 1.

The polymerisation can in principle also be carried out without application of a voltage. The homeotropic alignment is also stabilised without an applied voltage.

Mixture Example V1 (for Comparison)

A polymerisable compound RM-1 (0.3% by weight) and polymerisable self-alignment additive V1, which is based on a terphenyl structure (0.6% by weight), are added to a nematic LC medium H1 of the VA type ($\Delta\varepsilon<0$), and the mixture is homogenised.

Mixture Examples 2 and 3

Polymerisable self-alignment additive 2 (0.6% by weight) or 3 (0.6% by weight) and a polymerisable compound RM-1 (0.3% by weight) are in each case added individually analogously to Mixture Example 1 to a nematic LC medium H1 ($\Delta\varepsilon<0$), and the mixture is homogenised. The mixtures formed are introduced into test cells without pre-alignment layer and tested as above.

The LC medium has a spontaneous homeotropic (vertical) alignment with the substrate surfaces. This alignment remains stable up to the clearing point, and the VA cell formed can be switched reversibly by application of a voltage.

Characterisation of the Mixtures in the Cell (Display Device)

VHR measurement: Effect of the self-alignment additive

The VHR (voltage holding ratio) values of the test cells are measured before and after the polymerisation process (PSA stabilisation), which is initiated by UV irradiation (Table 1).

TABLE 1

Comparison of VHR values (60° C., 60 Hz/3 Hz) in test cells with host mixture H1.

| VHR [%] | Mixture Example | | | |
|---|---|---|---|---|
| | 1 | V1 | 2 | 3 |
| before UV, 60 Hz | 76.19 | 94.69 | 97.03 | 93.32 |
| after UV, 60 Hz | 97.72 | 96.69 | 97.42 | 97.14 |
| before UV, 3 Hz | 22.51 | 50.40 | 63.13 | 45.11 |
| after UV, 3 Hz | 91.60 | 88.17 | 92.90 | 91.47 |

The VHR values for the mixture according to the invention after the polymerisation process are greater than those of a conventional mixture.

Tilt stability: The tilt stability under electrical stress of 60 $V_{pp}$, 200 Hz, 25° C. for 60 h shows no significant difference between Mixture Examples 1, 2, 3 and V1.

Mixture Example 4

A polymerisable compound RM-1 (0.3% by weight) and polymerisable self-alignment additive 1 (0.6% by weight) are added to a nematic LC medium H2 of the VA type ($\Delta\varepsilon<0$), and the mixture is homogenised.

Use in Test Cells without Pre-alignment Layer:

The mixture formed is introduced into a test cell (without polyimide alignment layer, layer thickness d≈4.0 µm, ITO coating on both sides, without passivation layer). The LC medium has a spontaneous homeotropic (vertical) alignment with the substrate surfaces. This alignment remains stable up to the clearing point, and the VA cell formed can be switched reversibly by application of a voltage.

Polymer Stabilisation of the Cell:

The VA cell is irradiated with UV light of intensity 100 mW/cm$^2$ at 20° C. or 40° C. and with a 340 nm band-pass filter with application of a voltage greater than the optical threshold voltage (for example 14 Vpp). This causes polymerisation of the polymerisable compounds. The homeotropic alignment is thus additionally stabilised, a 'pre-tilt' is established, and a polymer layer forms. The PSA-VA cell obtained can be switched reversibly in a broad temperature range (up to the clearing point) on application of a voltage. The response times are shortened compared with the unpolymerised cell.

VA alignment layers (for example polyimide) which are used for VA, PM-VA, PVA, MVA and analogous technologies are no longer necessary on use of additives such as polymerisable self-alignment additive 1.

The polymerisation can in principle also be carried out without application of a voltage. The homeotropic alignment is also stabilised without an applied voltage.

Mixture Example V2 (for Comparison)

A polymerisable compound RM-1 (0.25% by weight) and polymerisable self-alignment additive V1, which is based on a terphenyl structure (0.6% by weight), are added to a nematic LC medium H2 of the VA type ($\Delta\varepsilon<0$), and the mixture is homogenised.

Mixture Examples 5 and 6

Polymerisable self-alignment additive 2 (0.6% by weight) or 3 (0.6% by weight) and a polymerisable compound RM-1 (0.25% by weight) are in each case added individually analogously to Mixture Example 1 to a nematic LC medium H1 ($\Delta\varepsilon<0$), and the mixture is homogenised. The mixtures formed are introduced into test cells without pre-alignment layer and tested as above.

The LC medium has a spontaneous homeotropic (vertical) alignment with the substrate surfaces. This alignment remains stable up to the clearing point, and the VA cell formed can be switched reversibly by application of a voltage.

Characterisation of the Mixtures in the Cell (Display Device)

VHR measurement: Effect of the self-alignment additive

The VHR (voltage holding ratio) values of the test cells are measured before and after the polymerisation process (PSA stabilisation), which is initiated by UV irradiation (Table 2).

TABLE 2

Comparison of VHR values (60° C., 60 Hz/3 Hz) in test cells with host mixture H2.

| VHR [%] | Mixture Example | | | |
|---|---|---|---|---|
| | 4 | V2 | 5 | 6 |
| before UV, 60 Hz | 90.64 | 94.25 | 97.93 | 96.93 |
| after UV, 60 Hz | 98.08 | 94.91 | 97.92 | 97.21 |
| before UV, 3 Hz | 42.22 | 57.71 | 80.87 | 73.48 |
| after UV, 3 Hz | 93.34 | 82.85 | 94.44 | 92.81 |

The VHR values for the mixture according to the invention after the polymerisation process are greater than those of a conventional mixture.

Tilt stability: The tilt stability under electrical stress of 60 $V_{pp}$, 200 Hz, 25° C. for 60 h shows no significant difference between Mixture Examples 4, 5, 6 and V2.

Mixture Example 7

A polymerisable compound RM-1 (0.3% by weight) and polymerisable self-alignment additive 1 (0.3% by weight) are added to a nematic LC medium H15 of the VA type ($\Delta\epsilon<0$), and the mixture is homogenised.

Use in Test Cells without Pre-alignment Layer:

The mixture formed is introduced into a test cell (without polyimide alignment layer, layer thickness d≈4.0 μm, ITO coating on both sides, without passivation layer). The LC medium has a spontaneous homeotropic (vertical) alignment with the substrate surfaces. This alignment remains stable up to the clearing point, and the VA cell formed can be switched reversibly by application of a voltage.

Polymer Stabilisation of the Cell:

The VA cell is irradiated with UV light of intensity 100 mW/cm² at 20° C. or 40° C. and with a 340 nm band-pass filter with application of a voltage greater than the optical threshold voltage (for example 14 Vpp). This causes polymerisation of the polymerisable compounds. The homeotropic alignment is thus additionally stabilised, a 'pre-tilt' is established, and a polymer layer forms. The PSA-VA cell obtained can be switched reversibly in a broad temperature range (up to the clearing point) on application of a voltage. The response times are shortened compared with the unpolymerised cell.

VA alignment layers (for example polyimide) which are used for VA, PM-VA, PVA, MVA and analogous technologies are no longer necessary on use of additives such as polymerisable self-alignment additive 1.

Mixture Example V3 (for Comparison)

A polymerisable compound RM-1 (0.3% by weight) and the polymerisable self-alignment additive of the formula V1, which is based on a terphenyl structure (0.3% by weight), are added to a nematic LC medium H15 of the VA type ($\Delta\epsilon<0$), and the mixture is homogenised.

Mixture Examples 8 and 9

Polymerisable self-alignment additive 2 (0.7% by weight) or 3 (0.7% by weight) and a polymerisable compound RM-1 (0.25% by weight) are in each case added individually analogously to Mixture Example 1 to a nematic LC medium H15 ($\Delta\epsilon<0$), and the mixture is homogenised. The mixtures formed are introduced into test cells without pre-alignment layer and tested as above.

The LC medium has a spontaneous homeotropic (vertical) alignment with the substrate surfaces. This alignment remains stable up to the clearing point, and the VA cell formed can be switched reversibly by application of a voltage.

Characterisation of the Mixtures in the Cell (Display Device)

VHR measurement: Effect of the self-alignment additive

The VHR (voltage holding ratio) values of the test cells are measured before and after the polymerisation process (PSA stabilisation), which is initiated by UV irradiation (Table 3).

TABLE 3

Comparison of VHR values (60° C., 60 Hz/0.6 Hz) in test cells with host mixture H15.

| VHR [%] | Mixture Example | | | |
|---|---|---|---|---|
| | 7 | V3 | 8 | 9 |
| Additive | 1 | V1 | 2 | 3 |
| before UV, 60 Hz | 83.14 | 93.62 | 95.33 | 97.2 |
| after UV, 60 Hz | 99.02 | 96.89 | 98.86 | 98.98 |
| before UV, 0.6 Hz | 35.6 | 10.52 | 15.68 | 27.7 |
| after UV, 0.6 Hz | 92.09 | 84.32 | 92.91 | 92.01 |

The VHR values for the mixture according to the invention after the polymerisation process are greater than those of a conventional mixture.

Mixture Example 10

A polymerisable compound RM-1 (0.3% by weight) and polymerisable self-alignment additive 4 (1.5% by weight) are added to a nematic LC medium H15 of the VA type ($\Delta\epsilon<0$), and the mixture is homogenised.

Use in Test Cells without Pre-alignment Layer:

The mixture formed is introduced into a test cell (without polyimide alignment layer, layer thickness d≈4.0 μm, ITO coating on both sides, without passivation layer). The LC medium has a spontaneous homeotropic (vertical) alignment with the substrate surfaces. This alignment remains stable up to the clearing point, and the VA cell formed can be switched reversibly by application of a voltage.

Polymer Stabilisation of the Cell:

The VA cell is irradiated with UV light of intensity 100 mW/cm² at 20° C. or 40° C. and with a 340 nm band-pass filter with application of a voltage greater than the optical threshold voltage (for example 14 Vpp). This causes polymerisation of the polymerisable compounds. The homeotropic alignment is thus additionally stabilised, a 'pre-tilt' is established, and a polymer layer forms. The PSA-VA cell obtained can be switched reversibly in a broad temperature range (up to the clearing point) on application of a voltage. The response times are shortened compared with the unpolymerised cell.

VA alignment layers (for example polyimide) which are used for VA, PM-VA, PVA, MVA and analogous technologies are no longer necessary on use of additives such as polymerisable self-alignment additive 1.

Mixture Example V4 (for Comparison)

A polymerisable compound RM-1 (0.3% by weight) and the polymerisable self-alignment additive of the formula V2, which is based on a terphenyl structure (1.5% by weight), are added to a nematic LC medium H15 of the VA type ($\Delta\epsilon<0$), and the mixture is homogenised.

Characterisation of the Mixtures in the Cell (Display Device)

VHR measurement: Effect of the self-alignment additive

The VHR (voltage holding ratio) values of the test cells are measured before and after the polymerisation process (PSA stabilisation), which is initiated by UV irradiation (Table 4).

TABLE 4

Comparison of VHR values (60° C., 60 Hz/0.6 Hz) in test cells with host mixture H15.

| VHR [%] | Mixture Example | |
|---|---|---|
| | 10 | V4 |
| Additive No. | 4 | V2 |
| before UV, 60 Hz | — | — |
| after UV, 60 Hz | — | — |
| before UV, 0.6 Hz | 71.04 | 38.77 |
| after UV, 0.6 Hz | 91.94 | 83.09 |

The VHR values for the mixture according to the invention after the polymerisation process are greater than those of a conventional mixture.

Mixture Example 11 (Positive Δε)

A polymerisable compound RM-1 (0.3% by weight) and polymerisable self-alignment additive 1 (1.0% by weight) are added to a nematic LC medium (host mixture) H19 of the VA-IPS type (Δε>0), and the mixture is homogenised.

Use in Test Cells without Pre-alignment Layer:

The mixture formed is introduced into a test cell (without polyimide alignment layer, layer thickness d≈4.0 μm, ITO interdigital electrodes arranged on one substrate surface, glass on the opposite substrate surface, without passivation layer). The LC medium has a spontaneous homeotropic (vertical) alignment with the substrate surfaces. This alignment remains stable up to the clearing point, and the VA-IPS cell formed can be switched reversibly by application of a voltage.

The LC medium in each case has a spontaneous homeotropic (vertical) alignment with the substrate surfaces. This alignment remains stable up to the clearing point, and the VA cell formed can be switched reversibly by application of a voltage.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure[s] of all applications, patents and publications, cited herein and of corresponding DE application No. 102016013815.7, filed Nov. 21, 2016, are incorporated by reference herein.

The invention claimed is:

1. A compound of formula IB-1, IB-2, IB-3, IB-4, IC-3 or IC-4

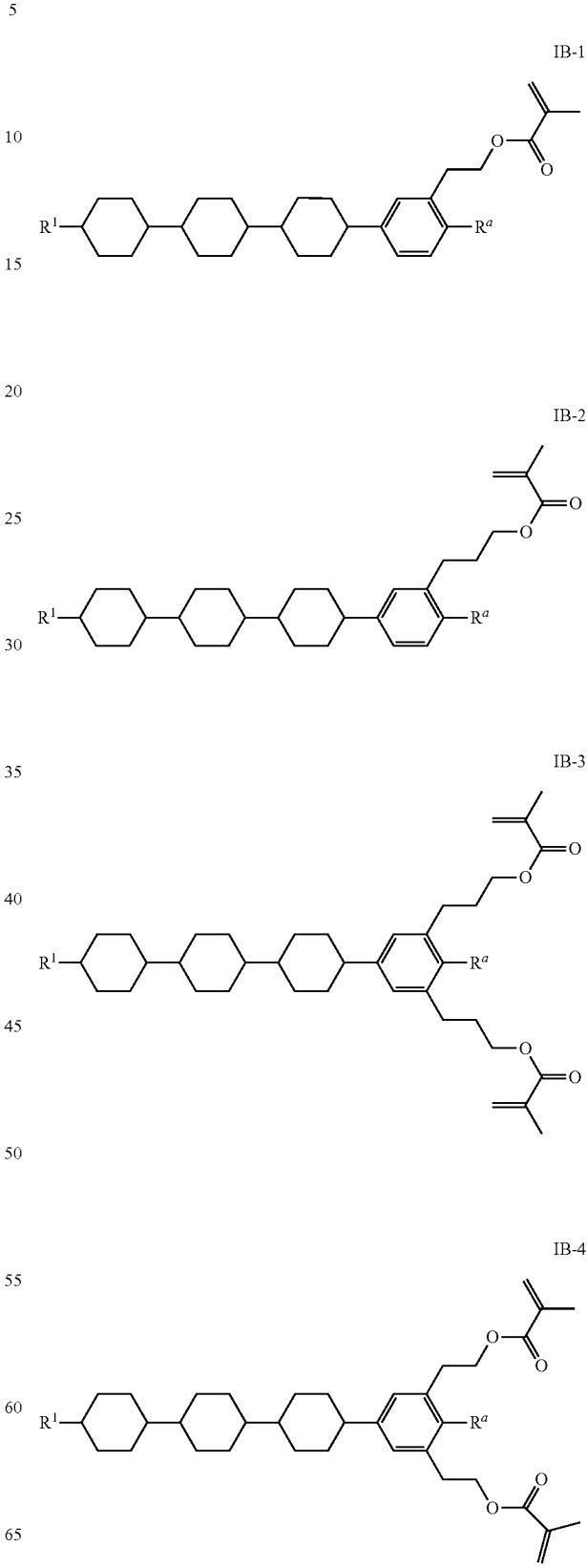

-continued

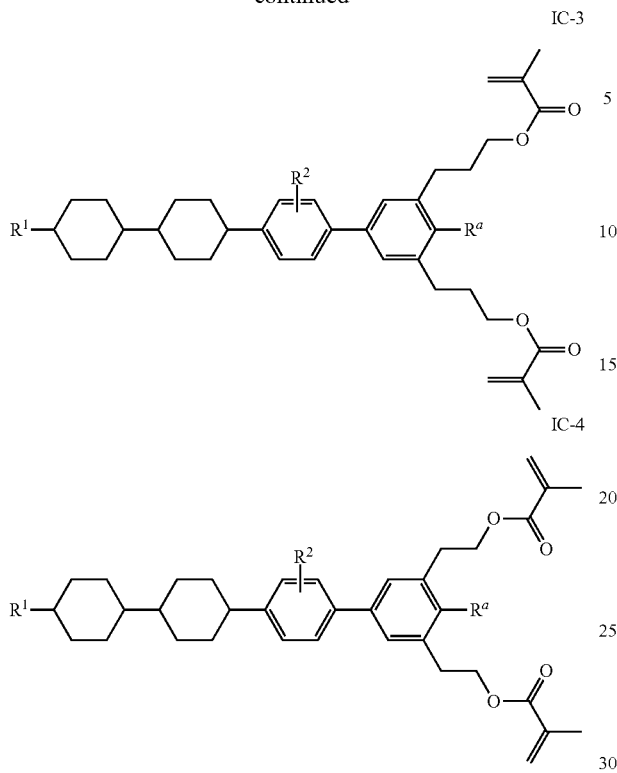

in which
R² denotes a straight-chain or branched alkyl, alkenyl, alkoxy, alkylcarbonyl, alkoxycarbonyl, alkylcarbonyloxy or alkoxycarbonyloxy having 1 to 25 C atoms, in which optionally one or more H atoms are replaced by F or Cl, or denotes F, Cl, Br, I, —CN, —NO₂, —NCO, —NCS, —OCN, —SCN,) —C(=O)N(R⁰)₂, —C(=O)R⁰, or optionally substituted aryl or cycloalkyl having 3 to 20 C atoms,
P denotes a polymerisable group,
Sp denotes a spacer group or a single bond,
R$^a$ denotes an anchor group of the following formula

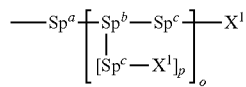

p denotes 1 or 2,
o denotes 0 or 1 for formulae IB-1, IB-2, IB-3 and IB-4, and denotes 0 for formulae IC-3 and IC-4,
X¹ each, independently of one another, denotes H, alkyl, fluoroalkyl, —OH, —SH, —NH₂, —NHR¹¹, —NR¹¹₂, NHC(O)—R¹¹, —OR¹¹, —C(O)OH or —CHO, where at least one group X¹ denotes —OH, —SH, —NH₂, —NHR¹¹, —C(O)OH or —CHO,
R¹¹ denotes alkyl having 1 to 12 C atoms,
Sp$^a$, Sp$^c$ each, in each case, independently of one another, denotes a spacer group or a single bond,
Sp$^b$ denotes a tri- or tetravalent group,
R¹ denotes H, halogen, straight-chain, branched or cyclic alkyl having 1 to 25 C atoms, in which one or more non-adjacent CH₂ groups are optionally replaced by —O—, —S—, —CH=CH—, —C≡C—, —CO—, —CO—O—, —O—CO— or —O—CO—O— in such a way that O and/or S atoms are not linked directly to one another and in which one or more H atoms are optionally replaced by F or Cl, or denotes a group -Sp-P, and
R⁰ each, in each case, independently of one another, denotes alkyl having 1 to 12 C atoms.

2. The compound according to claim 1, wherein R² denotes F, Cl, CH₃, ethyl, propyl, cyclopropyl or isopropyl.

3. The compound according to claim 1, wherein for formulae IB-1, IB-2, IB-3 and IB-4 the group R$^a$ contains one or two OH groups.

4. The compound according to claim 1, wherein for formulae IB-1, IB-2, IB-3 and IB-4 the group R$^a$ denotes a group of one of the following formulae

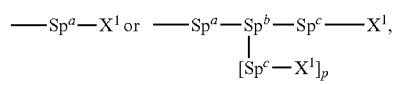

in which
p denotes 1 or 2,
X¹ each, independently of one another, denotes H, alkyl, fluoroalkyl, —OH, —SH, —NH₂, —NHR¹¹, —NR¹¹₂, NHC(O)—R¹¹, —OR¹¹, —C(O)OH or —CHO, where at least one group X¹ denotes —OH, —SH, —NH₂, —NHR¹¹, —C(O)OH or —CHO,
R¹¹ denotes alkyl having 1 to 12 C atoms,
Sp$^a$, Sp$^c$ each, in each case, independently of one another, denotes a spacer group or a single bond, and
Sp$^b$ denotes a tri- or tetravalent group.

5. The compound according to claim 1, wherein for formulae IB-1, IB-2, IB-3 and IB-4 the group R$^a$ denotes one of the following formulae

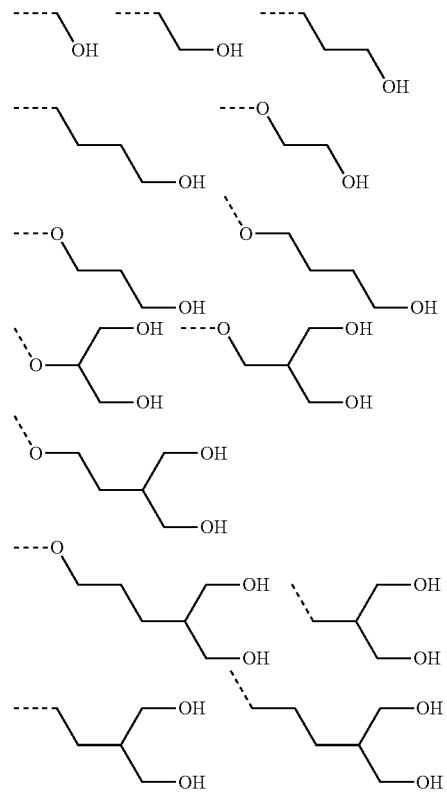

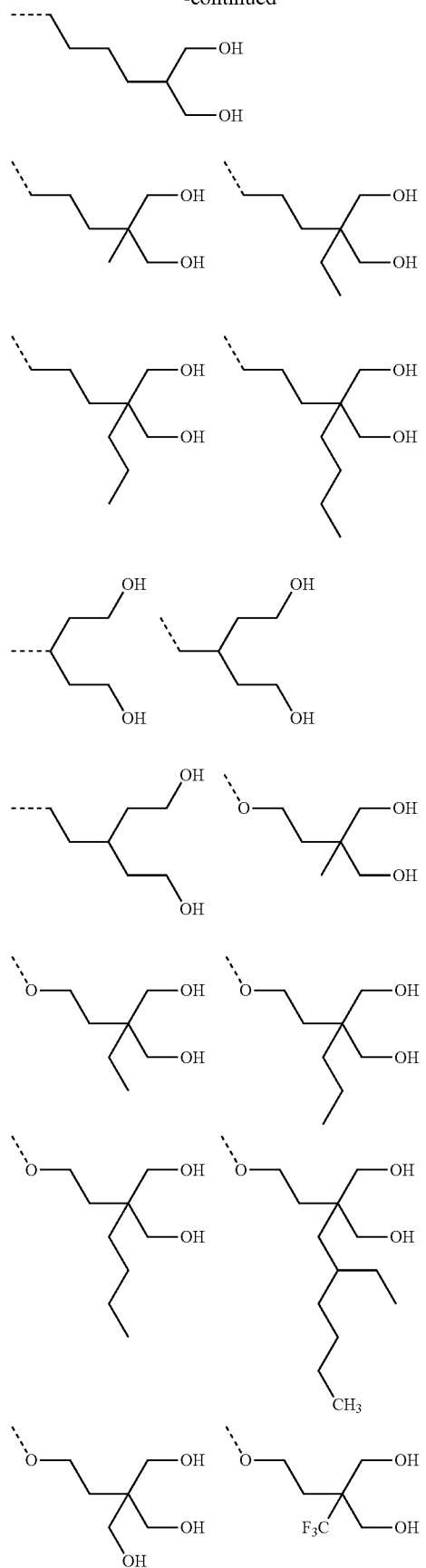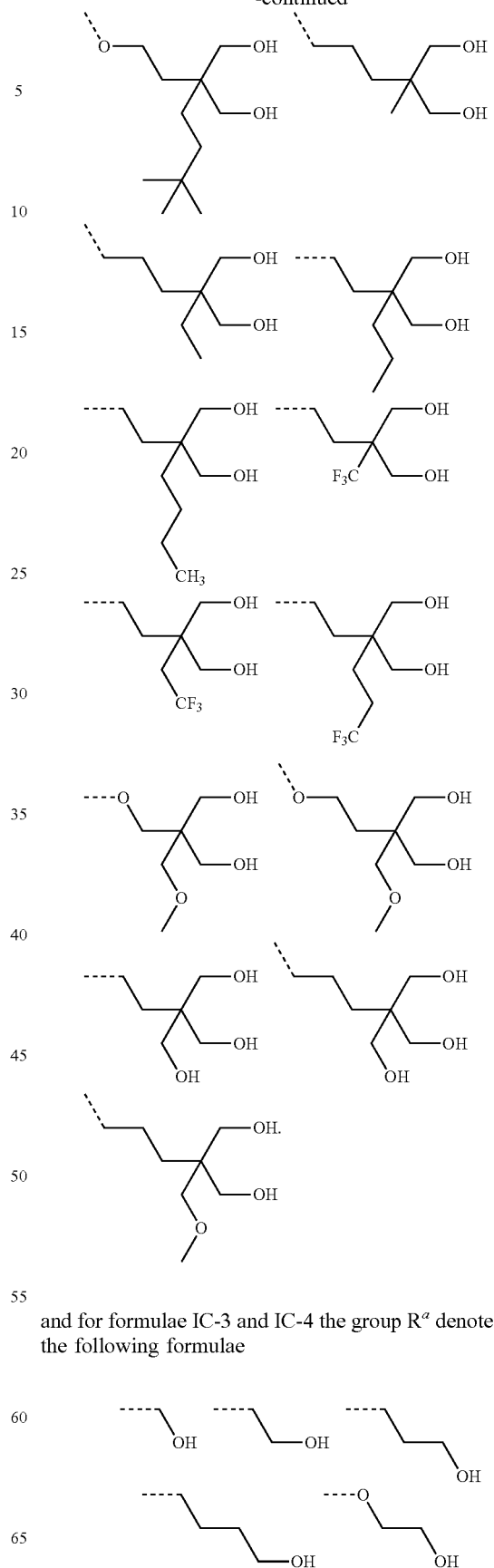
and for formulae IC-3 and IC-4 the group $R^a$ denotes one of the following formulae

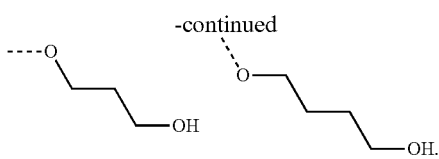

6. The compound according to claim 1, in which P is acrylate, methacrylate, fluoroacrylate, chloroacrylate, vinyloxy, oxetane or epoxide.

7. A method for effecting a homeotropic alignment with respect to a surface delimiting an LC medium, comprising providing the compound according to claim 1 as additive for said LC media, where said compound is optionally polymerised after effecting the homeotropic alignment.

8. A LC medium comprising a low-molecular-weight, unpolymerisable, liquid-crystalline component and a polymerisable or polymerised component comprising one or more polymerisable compounds according to claim 1, where the polymerised component is obtainable by polymerisation of the polymerisable component.

9. A LC medium according to claim 8, which comprises said one or more polymerisable compounds in a concentration of less than 10% by weight.

10. A LC medium according to claim 9, further comprising one or more polymerisable compounds of formula M or a (co)polymer comprising one or more compounds of formula M:

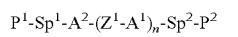

in which
$P^1$, $P^2$ each independently denote a polymerisable group,
$Sp^1$, $Sp^2$ each independently denote a spacer group,
$A^1$, $A^2$ each, independently of one another, denotes
a) trans-1,4-cyclohexylene, 1,4-cyclohexenylene or 4,4'-bicyclohexylene, in which one or more non-adjacent $CH_2$ groups are optionally replaced by —O— and/or —S— and in which one or more H atoms are optionally replaced by a group L, or denotes

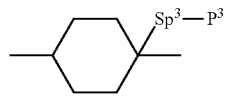

b) 1,4-phenylene or 1,3-phenylene, in which one or two CH groups are optionally replaced by N and in which one or more H atoms are optionally replaced by a group L or -$Sp^3$-P,
c) tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl or selenophene-2,5-diyl, each of which is optionally mono- or polysubstituted by a group L,
d) a saturated, partially unsaturated or fully unsaturated, and optionally substituted, polycyclic radical having 5 to 20 cyclic C atoms, one or more of which is optionally replaced by heteroatoms,
$P^3$ denotes a polymerisable group,
$Sp^3$ denotes a spacer group,
n denotes 0, 1, 2 or 3,
$Z^1$ each, in each case, independently of one another, denotes —CO—O—, —O—CO—, —$CH_2$O—, —O$CH_2$—, —$CF_2$O—, —O$CF_2$—, or —$(CH_2)_{n2}$—,
where n2 is 2, 3 or 4, —O—, —CO—, —C($R^cR^d$)—, —$CH_2CF_2$—, —$CF_2CF_2$— or a single bond,
L on each occurrence, identically or differently, denotes F, Cl, CN, SCN, $SF_5$ or straight-chain or branched, in each case optionally fluorinated, alkyl, alkoxy, alkylcarbonyl, alkoxy-carbonyl, alkylcarbonyloxy or alkoxycarbonyloxy having 1 to 12 C atoms,
$R^0$, $R^{00}$ each, independently of one another, denote H, F or straight-chain or branched alkyl having 1 to 12 C atoms, in which one or more H atoms are optionally replaced by F, and
$R^c$ and $R^d$ each, independently of one another, denote H or alkyl having 1 to 6 C atoms
where one or more of the groups $P^1$-$Sp^1$—, $Sp^2$-$P^2$ and -$Sp^3$-$P^3$ optionally denote a radical $R^{aa}$, with the proviso that at least one of the groups $P^1$-$Sp^1$-, -$Sp^2$-$P^2$ and -$Sp^3$-$P^3$ present does not denote $R^{aa}$,
$R^{aa}$ denotes H, F, Cl, CN or straight-chain or branched alkyl having 1 to 25 C atoms, in which one or more non-adjacent $CH_2$ groups are each optionally replaced, independently of one another, by C($R^0$)=C($R^{00}$)—, —C≡C—, —S—, —CO—, —CO—O—, —O—CO—, or —O—CO—O— in such a way that O and/or S atoms are not linked directly to one another, and in which one or more H atoms are optionally replaced by F, Cl, CN or $P^1$-$Sp^1$-, which $P^1$-$Sp^1$- herein cannot be a further $R^{aa}$ group; where the groups —OH, —$NH_2$, —SH, —NHR, —C(O)OH and —CHO are not present in $R^{aa}$.

11. A LC medium according to claim 9, further comprising one or more compounds of formulae A, B or C:

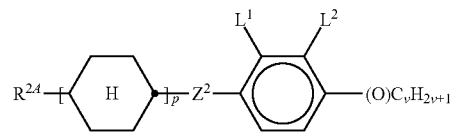

A

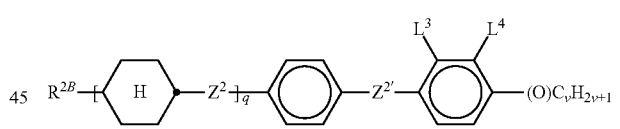

B

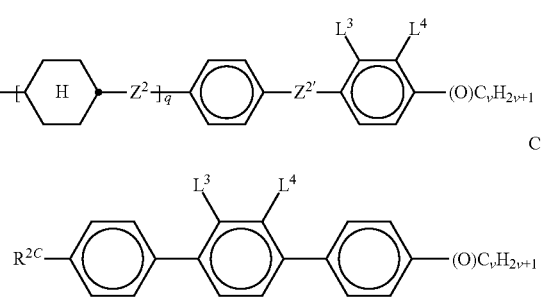

C in which
$R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, in which one or more $CH_2$ groups are optionally replaced by —O—, —S—,

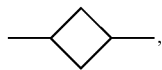

—C≡C—, —CH=CH—, —CF$_2$O—, —OCF$_2$—, —OC—O— or —O—CO— in such a way that O atoms are not linked directly to one another, L$^{1-4}$ each, independently of one another, denote F, Cl, CF$_3$ or CHF$_2$, Z$^2$ and Z$^{2'}$ each, independently of one another, denote a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or —CH=CHCH$_2$O—, p denotes 1 or 2,
q denotes 0 or 1,
(O) denotes —O— or a single bond, and
v denotes 1 to 6.

12. A LC display comprising an LC cell having two substrates and at least two electrodes, where at least one substrate is transparent to light and at least one substrate has one or two electrodes, and having a layer of the LC medium according to claim 9 located between the substrates, where the compound of formula IB-1, IB-2, IB-3, IB-4, IC-3 or IC-4 is suitable for effecting homeotropic alignment of the LC medium with respect to the substrate surfaces.

13. The LC display according to claim 12, wherein one or both of the substrates have no alignment layers for homeotropic alignment.

14. The LC display according to claim 12, which is a VA display containing an LC medium having negative dielectric anisotropy and electrodes arranged on opposite substrates.

15. A process for preparing a LC medium, comprising mixing one or more compounds according to claim 1 with a low-molecular-weight liquid-crystalline component, and one or more polymerisable compounds and/or additives are optionally added.

16. A process for preparing a LC display comprising an LC cell having two substrates and at least two electrodes, where at least one substrate is transparent to light and at least one substrate has one or two electrodes, comprising:
    filling of the cell with the LC medium according to claim 9, where homeotropic alignment of the LC medium with respect to the substrate surfaces is established, and
    polymerizing of the polymerisable component(s), optionally with application of a voltage to the cell or under the action of an electric field.

17. A LC medium according to claim 9, further comprising one or more polymerisable compounds of formula M or a (co)-polymer comprising one or more compounds of formula M:

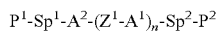

in which
P$^1$, P$^2$ each independently denote a polymerisable group,
Sp$^1$, Sp$^2$ each independently denote a spacer group,
A$^1$, A$^2$ each, independently of one another, denotes
    a) trans-1,4-cyclohexylene, 1,4-cyclohexenylene or 4,4'-bicyclohexylene, in which one or more non-adjacent CH$_2$ groups are optionally replaced by —O— and/or —S— and in which one or more H atoms are optionally replaced by a group L, or denotes

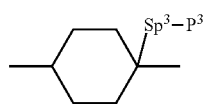

b) 1,4-phenylene or 1,3-phenylene, in which one or two CH groups are optionally replaced by N and in which one or more H atoms are optionally replaced by a group L or -Sp$^3$-P, c) tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl or selenophene-2,5-diyl, each of which is optionally mono- or polysubstituted by a group L, d) bicyclo[1.1.1]pentane-1,3-diyl, bicyclo[2.2.2]octane-1,4-diyl, spiro[3.3]heptane-2,6-diyl,

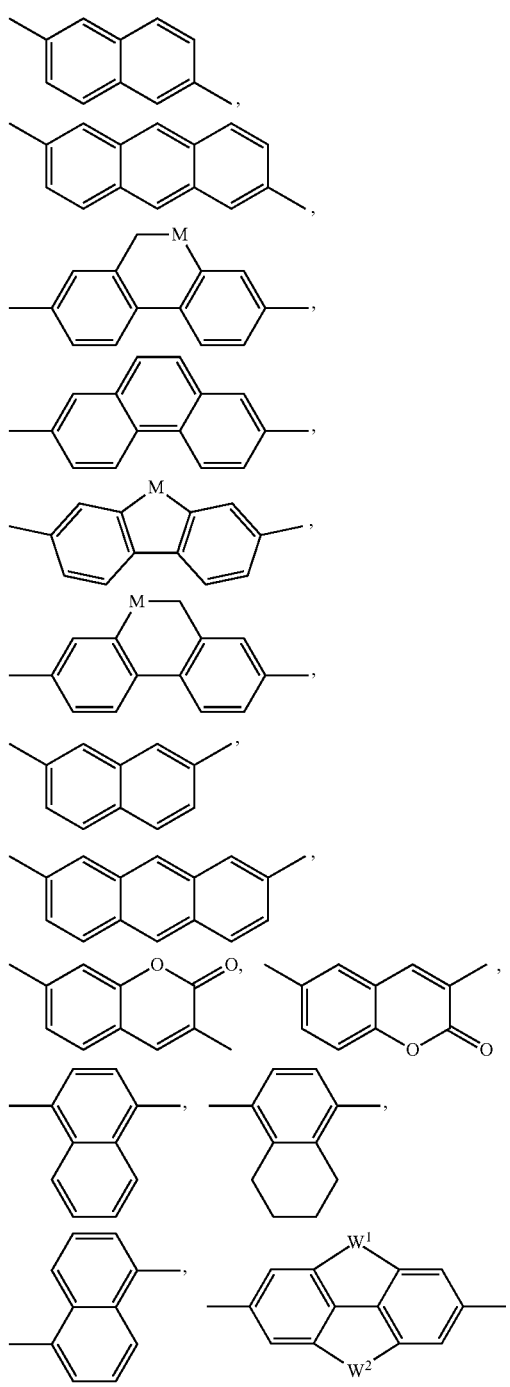

-continued

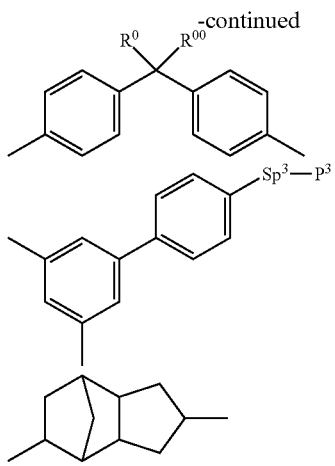

in which one or more H atoms are optionally replaced by a group L or -Sp³-P³, and/or one or more double bonds are optionally replaced by single bonds, and/or one or more CH groups are optionally replaced by N, P³ denotes a polymerisable group,
Sp³ denotes a spacer group,
n denotes 0, 1, 2 or 3,
$Z^1$ each, in each case, independently of one another, denotes —CO—O—, —O—CO—, —CH₂O—, —OCH₂—, —CF₂O—, —OCF₂—, or —(CH₂)$_{n2}$—, where n2 is 2, 3 or 4, —O—, —CO—, —C(R$^c$R$^d$)—, —CH₂CF₂—, —CF₂CF₂— or a single bond,
L on each occurrence, identically or differently, denotes F, Cl, CN, SCN, SF₅ or straight-chain or branched, in each case optionally fluorinated, alkyl, alkoxy, alkylcarbonyl, alkoxy-carbonyl, alkylcarbonyloxy or alkoxycarbonyloxy having 1 to 12 C atoms, R⁰,R⁰⁰ each, independently of one another, denote H, F or straight-chain or branched alkyl having 1 to 12 C atoms, in which one or more H atoms are optionally replaced by F, and R$^c$ and R$^d$ each, independently of one another, denote H or alkyl having 1 to 6 C atoms where one or more of the groups P¹-, -Sp¹, -Sp² -P² and -Sp³-P³ optionally denote a radical R$^{aa}$, with the proviso that at least one of the groups P¹-Sp¹-, -Sp₂-P² and -Sp³-P³ present does not denote R$^{aa}$, R$^{aa}$ denotes H, F, Cl, CN or straight-chain or branched alkyl having 1 to 25 C atoms, in which one or more non-adjacent CH₂ groups are each optionally replaced, independently of one another, by C(R⁰)=C(R⁰⁰)—, —C≡C—, —O—, —S—, —CO—, —CO—, —CO—O—, —O—CO—, or —O—CO—O— in such a way that O and/or S atoms are not linked directly to one another, and in which one or more H atoms are optionally replaced by F, Cl, CN or P¹-Sp¹-, which P¹-Sp¹- herein cannot be a further R$^{aa}$ group; where the groups —OH, —NH₂, —SH, —NHR, —C(O)OH and —CHO are not present in R$^{aa}$.

18. The compound according to claim 1, which is of formula IB-1 or IB-2.

19. The compound according to claim 1, which is of formula IB-3 or IB-4.

20. The compound according to claim 1, which is of formula IC-3 or IC-4.

* * * * *